US010878710B1

(12) United States Patent
Shaw et al.

(10) Patent No.: US 10,878,710 B1
(45) Date of Patent: Dec. 29, 2020

(54) SYSTEMS AND METHODS FOR ELECTRONIC PLATFORM AND DATA PROCESSING FOR STUDENT SUCCESS IN HIGHER EDUCATION INSTITUTIONS

(71) Applicant: The Advisory Board Company, Washington, DC (US)

(72) Inventors: Catherine Ingrid Shaw, Washington, DC (US); John Daniel Nelson, II, Washington, DC (US); Philip James Friesen, Ashburn, VA (US); Kathleen Susan Ash Chew, Manassas, VA (US); Robert Laurence Alcorn, IV, Arlington, VA (US); Sarah Zauner, Boulder, CO (US); Brittney Lim Davidson, Washington, DC (US); Christopher Lance Johnson, Washington, DC (US)

(73) Assignee: EAB Global, Inc., Washington, DC (US)

( * ) Notice: Subject to any disclaimer, the term of this patent is extended or adjusted under 35 U.S.C. 154(b) by 717 days.

(21) Appl. No.: 14/845,057

(22) Filed: Sep. 3, 2015

Related U.S. Application Data

(60) Provisional application No. 62/045,347, filed on Sep. 3, 2014.

(51) Int. Cl.
*G09B 7/00* (2006.01)
*G09B 5/00* (2006.01)

(52) U.S. Cl.
CPC ................ *G09B 7/00* (2013.01); *G09B 5/00* (2013.01)

(58) Field of Classification Search
CPC ........... G09B 3/00; G09B 19/00; G09B 5/065
USPC ............................................ 434/350; 33/350
See application file for complete search history.

(56) References Cited

U.S. PATENT DOCUMENTS

| | | | | |
|---|---|---|---|---|
| 2002/0188583 A1* | 12/2002 | Rukavina | G06N 99/005 706/26 |
| 2005/0069094 A1* | 3/2005 | James | H04M 3/5233 379/52 |
| 2006/0105315 A1* | 5/2006 | Shaver | G06Q 10/02 434/362 |

(Continued)

OTHER PUBLICATIONS

Crowe, Michael J. "History of Vector Analysis". (Year: 2002).*

*Primary Examiner* — Robert J Utama
(74) *Attorney, Agent, or Firm* — Bookoff McAndrews, PLLC

(57) ABSTRACT

Systems and methods are disclosed herein for recommending an educational course to a user, and may comprise receiving data records associated with availability of a plurality of educational courses at one or more institutions; receiving educational course data and educational course focus data associated with the user; receiving prior user data records comprising prior user educational course data and prior user educational course focus data; determining index scores for each of the plurality of educational courses based upon a similarity between the educational course data and prior user educational course data, and based upon a similarity between the educational course focus data and prior user educational course focus data; and providing a recommended educational course from the plurality of educational courses to the user based upon the determined index scores.

20 Claims, 197 Drawing Sheets

(56) References Cited

U.S. PATENT DOCUMENTS

| | | | | | |
|---|---|---|---|---|---|
| 2007/0111179 | A1* | 5/2007 | Hochwarth | G09B 7/02 | 434/350 |
| 2007/0111190 | A1* | 5/2007 | Cohen | G06Q 10/10 | 434/350 |
| 2007/0224586 | A1* | 9/2007 | Massie | G09B 5/00 | 434/350 |
| 2009/0035733 | A1* | 2/2009 | Meitar | G09B 7/00 | 434/118 |
| 2011/0039249 | A1* | 2/2011 | Packard | G09B 5/00 | 434/362 |
| 2011/0055100 | A1* | 3/2011 | Perreault | G06Q 10/10 | 705/327 |
| 2012/0149000 | A1* | 6/2012 | Baker | G09B 7/00 | 434/362 |
| 2012/0276516 | A1* | 11/2012 | Teskey | G09B 5/00 | 434/362 |
| 2016/0063878 | A1* | 3/2016 | Subashchandrabose | G09B 5/12 | 434/322 |

* cited by examiner

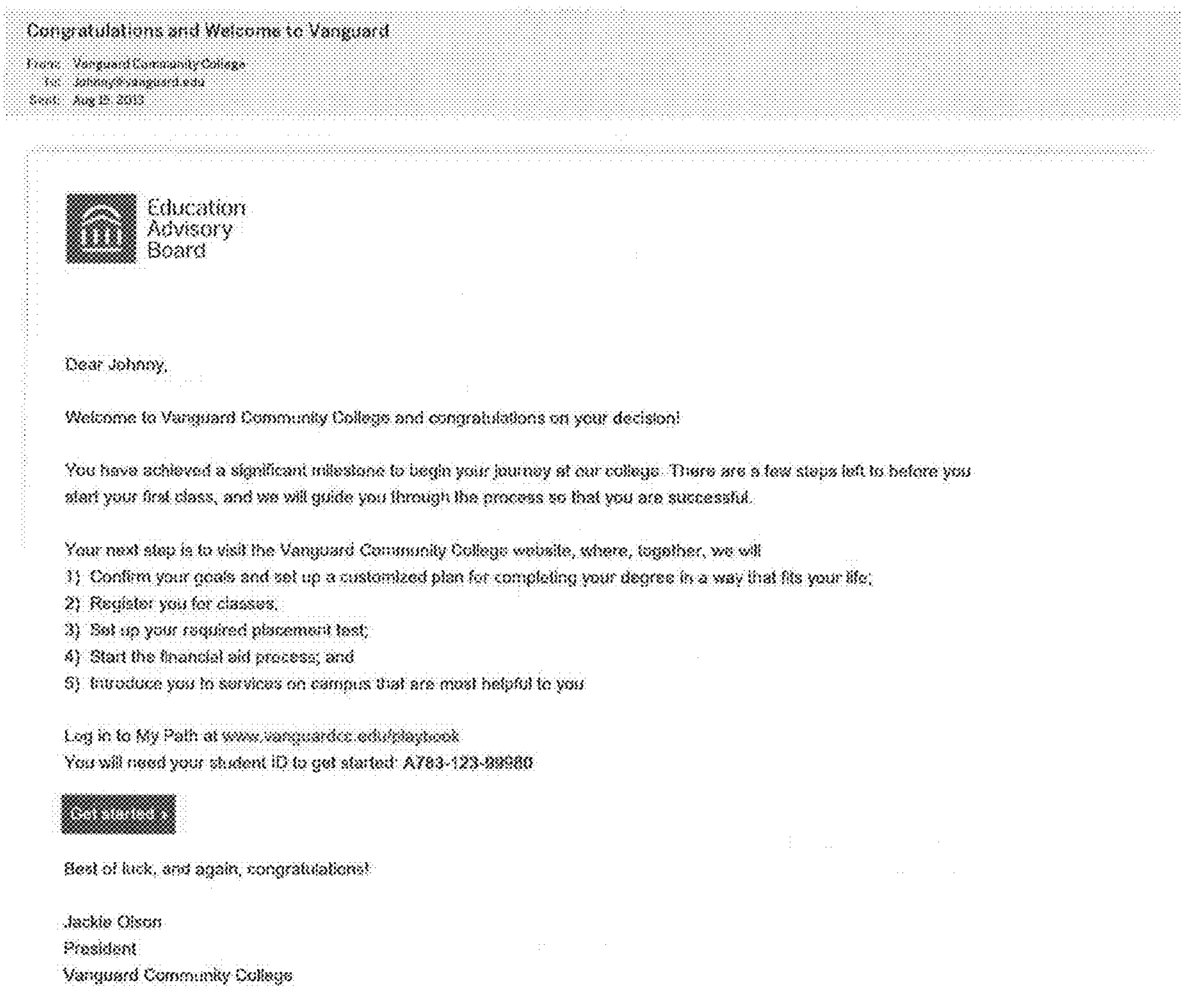

Congratulations and Welcome to Vanguard

From: Vanguard Community College
To: Johnny@vanguard.edu
Sent: [illegible]

Education Advisory Board

Dear Johnny,

Welcome to Vanguard Community College and congratulations on your decision!

You have achieved a significant milestone to begin your journey at our college. There are a few steps left to before you start your first class, and we will guide you through the process so that you are successful.

Your next step is to visit the Vanguard Community College website, where, together, we will 1) Confirm your goals and set up a customized plan for completing your degree in a way that fits your life;
2) Register you for classes;
3) Set up your required placement test;
4) Start the financial aid process; and
5) Introduce you to services on campus that are most helpful to you Log in to My Path at www.vanguardcc.edu/playbook
You will need your student ID to get started: A783-123-99980

Get started ›

Best of luck, and again, congratulations!

Jackie Olson
President
Vanguard Community College

FIGURE 13

FIGURE 33
Education
Advisory
Board
My Playbook
Path
Course schedule
Progress toward degree
My Profile
Registration for Computer Science I cannot be completed until placement test scores are complete.
Take a look at the schedule below. Fine tune your availability and course schedule blocks below. Click Register when you are done.
7
classes
$2,378.75
semester tuition
May 2016
projected graduation at this pace
Adjust
SUN
MON
TUE
WED
THU
FRI
SAT
Classes this semester
7 classes
Select days you can take class
Time between classes
At least
Up to
Class does not contribute to degree requirement
Register for these classes
Need help? See an advisor

Education Advisory Board | My Playbook

Path | Course schedule | Progress toward degree | My Profile

Registration Complete

Congratulations! You have completed registering for these classes:

Summary

11 degree credits
13 total credits $1,932.13 semester tuition
Due by 5 pm tomorrow

| | | |
|---|---|---|
| College Composition | 3 credits | M W F 10 am - 11 am |
| Intro to Communication | 3 credits | M W F 11 am - 12 pm |
| Intro Biology | 4 credits | M W F 2:30 pm - 4:30 pm |
| Lifetime Fitness & Wellness | 1 credit | W 5:30 pm - 6:30 pm |
| College Success Skills | 1 credit | W 12 pm - 1 pm |
| Developmental Math | 1 credit | T 10 am - 11 am |

You are NOT registered for Computer Science I until placement test scores are fine.

Summary

4 degree credits

Computer Science I — 4 credits

Placement test must be taken by September 4 to enroll in this course

Placement testing center
Suite 402
Mon - Th 9 am - 7 pm,
Fri 8 am - 12 pm
Sat 9 am - 3 pm
908 - 442 - 5426

Show other campuses

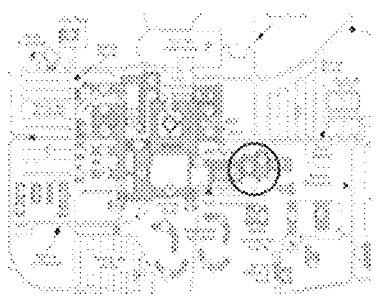

FIGURE 34

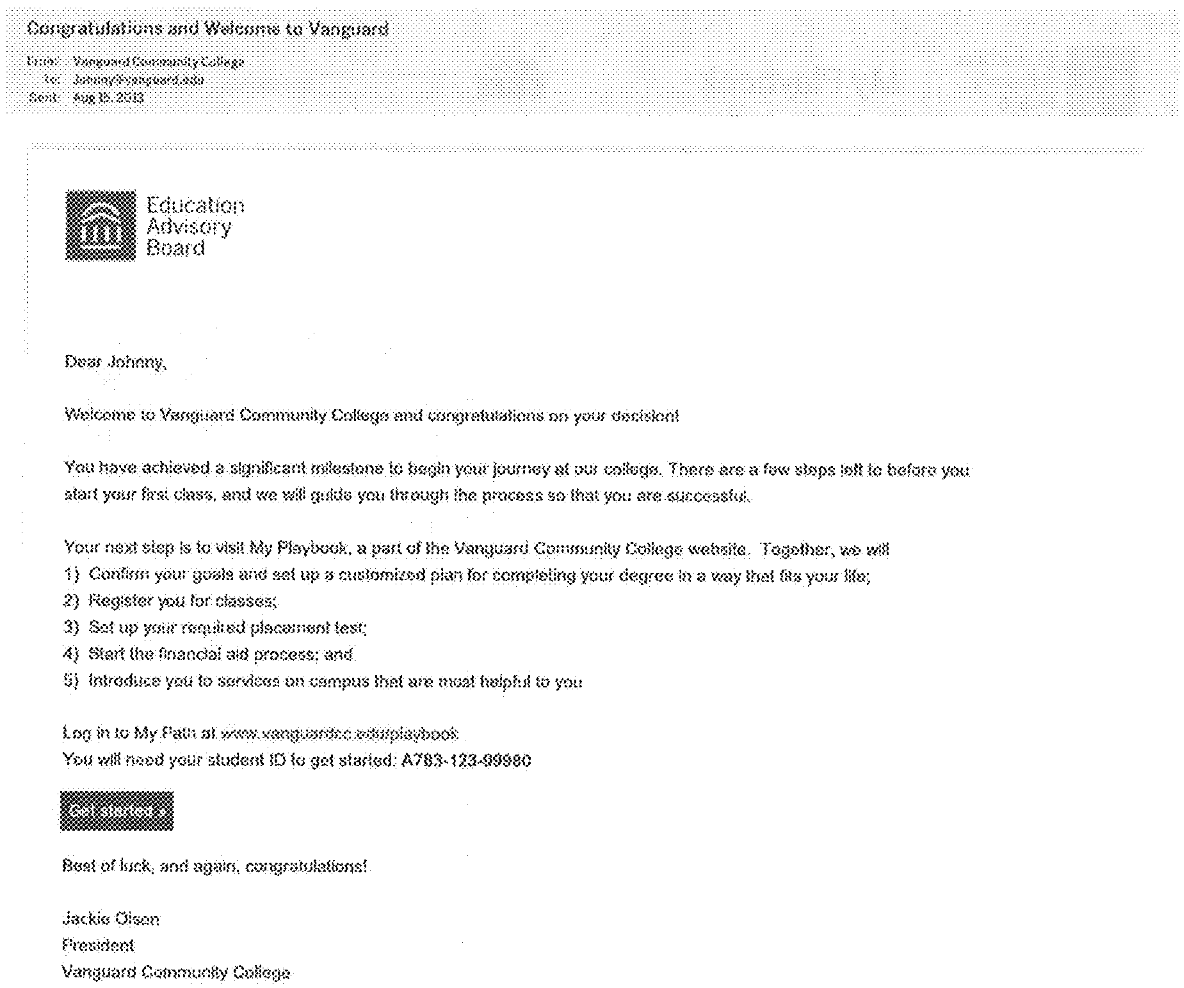

Congratulations and Welcome to Vanguard

From: Vanguard Community College
To: Johnny@vanguard.edu
Sent: Aug 15, 2013

Education Advisory Board

Dear Johnny,

Welcome to Vanguard Community College and congratulations on your decision!

You have achieved a significant milestone to begin your journey at our college. There are a few steps left to before you start your first class, and we will guide you through the process so that you are successful.

Your next step is to visit My Playbook, a part of the Vanguard Community College website. Together, we will 1) Confirm your goals and set up a customized plan for completing your degree in a way that fits your life;
2) Register you for classes;
3) Set up your required placement test;
4) Start the financial aid process; and
5) Introduce you to services on campus that are most helpful to you Log in to My Path at www.vanguardcc.edu/playbook
You will need your student ID to get started: A783-123-99980

Best of luck, and again, congratulations!

Jackie Olson
President
Vanguard Community College

FIGURE 39

FIGURE 59
Education Advisory Board
My Playbook
Path
Course schedule
Progress toward degree
My Profile
Registration for Computer Science I cannot be completed until placement test scores are complete. Learn more
Degree requirements
Fall 2014 Course Options
A.S. Computer Science
20 classes
60 credits
Most common
5 degree classes
Fewer classes
4 degree classes
More classes
6 degree classes
Select
May 2016 pace to grad
$2,378 term tuition
Dec 2016 pace to grad
$1,950 term tuition
Dec 2015 pace to grad
$2,742 term tuition
Intro to Communication (CST 110)
College Composition (ENG 111, 112)
Scientific Programming (CSC 130)
Programming Tools (CSC 160)
Computer Science (CSC 201, 202)
Computer Organization (CSC 205)
General Education Elective
Humanities/Fine Arts Elective
Calculus with Analytic Geometry (MTH 173, MTH 174)
Physical or Life Science Elective with Lab
Lifetime Fitness & Wellness (PED 116)
Social Science Electives
No credit granted toward degree
Developmental Math (MTT 1)
College Success Skills (SDV 100)
Intro to Communication CST 110, 3 credits
College Composition ENG 111, 3 credits
Computer Science 1 CSC 201, 4 credits
History of Design ART 250, 3 credits
Intro Biology BIO 101, 4 credits
Lifetime Fitness & Wellness PED 116, 1 credit
Developmental Math MTT 1, 1 credit
College Success Skills SDV 100, 1 credit
Physical or Life Science Elective...
Any of these courses will satisfy this requirement:
BIO 101 Introduction to Biology (4 credits) Selected
BIO 112 Environmental Biology (4 credits) Use this
BIO 116 Introduction to Plants (4 credits) Use this
CHE 101 Introduction to Chemistry (4 credits) Use this
CHE 102 Intro to Chemistry II (4 credits) Use this
Next
Need help? See an advisor

FIGURE 62
Education Advisory Board
My Playbook
Path
Course schedule
Progress toward degree
My Profile
Review the recommended schedule below, and fine tune your availability and course schedule preferences.
Click Register or Save when you are done.
7
classes
$2,378.75
term tuition
May 2016
projected graduation at this pace
Adjust
SUN
MON
TUE
WED
THU
FRI
SAT
Classes this term
7 classes
Select days you can take class
Time between classes
Class does not contribute to degree requirement
Need help? See an advisor

FIGURE 63
Education
Advisory
Board
My Playbook
Path
Course schedule
Progress toward degree
My Profile
Review the recommended schedule below, and fine tune your availability and course schedule preferences.
Click Register or Save when you are done.
7
classes
$2,378.75
term tuition
May 2016
projected graduation at this pace
Adjust
SUN
MON
TUE
WED
THU
FRI
SAT
Classes this term
7 classes
Select days you can take class
Time between classes
Class does not contribute to degree requirement
Need help? See an advisor

FIGURE 64
Education
Advisory
Board
My Playbook
Path
Course schedule
Progress toward degree
My Profile
Registration for Computer Science I cannot be completed until placement test scores are complete. Learn more
Review the recommended schedule below, and fine tune your availability and course schedule preferences.
Click Register or Save when you are done.
7
classes
$2,378.75
term tuition
May 2016
projected graduation at this pace
Adjust
SUN
MON
TUE
WED
THU
FRI
SAT
Classes this term
7 classes
Select days you can take class
Time between classes
At least
Up to
Class does not contribute to degree requirement
Register for these classes
Save and exit
Need help? See an advisor

Education Advisory Board

My Playbook

Path | Course schedule | Progress toward degree | My Profile

Registration Complete

Print

Congratulations! You have completed registering for these classes:

Summary

11 degree credits
13 total credits $1,932.13 term tuition
Due by 5 pm tomorrow

| | | |
|---|---|---|
| College Composition (ENG 111) | 3 credits | M W F 10 am - 11 am |
| Intro to Communication (COM 110) | 3 credits | M W F 11 am - 12 pm |
| Intro Biology (BIO 131) | 4 credits | M W F 2:30 pm - 4:30 pm |
| Lifetime Fitness & Wellness (PED 110) | 1 credit | W 5:30 pm - 6:30 pm |
| College Success Skills (SDV 100) | 1 credit | W 12 pm - 1 pm |
| Developmental Math (MTT 1) | 1 credit | T 10 am - 11 am |

You are NOT registered for Computer Science I until placement test scores are fine.

Summary

4 degree credits

Computer Science I (CSC 201) 4 credits

Placement test must be taken by September 4 to enroll in this course

Placement testing center
Suite 402
Mon - Th 8 am - 7 pm
Fri 8 am - 12 pm
Sat 9 am - 3 pm
919 - 442 - 5428
Show other campuses

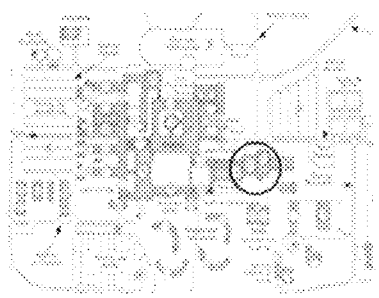

Return to My Path

FIGURE 65

FIGURE 66
Carrier
12:34 PM
Education
Advisory
Board
How are you?
Johnny,
Just checking in to see how the term is going. Making it to class on time? Finishing your work? We're here to help! Go to My Playbook.
On-campus day-care... because you asked.
Slots open in all infant and preschool rooms!
Daycare operates from M - F 6:30 am to 5:30 pm
Read our reviews | Schedule a visit
Other services that may be of interest
Commuting
Ride Finder
Carpools in your area
Need extra cash?
Campus jobs
Local listings
Feeling overwhelmed?
Campus counselor
Visit an advisor

FIGURE 133B
Starts: June 23 // By: Aug 14
Connect with resources that matter most to you!
By August 21
Get your Student ID
By August 21
Driving? Don't forget a parking pass!
By August 28
Buy books and supplies for Fall classes
By September 01
Pay tuition for your Fall term
Starts: Sept 1 // By: Sep 7
First Week of Fall Classes
By Sept 15
Last day to drop Eng101, SPN101, PSYC101
By Oct 16
Last day to withdraw from Eng101, SPN101, PSYC101

FIGURE 184
Are you sure you want to unplan this term?
All courses in this term will be removed from your plan.
Cancel
Yes

SYSTEMS AND METHODS FOR ELECTRONIC PLATFORM AND DATA PROCESSING FOR STUDENT SUCCESS IN HIGHER EDUCATION INSTITUTIONS

RELATED APPLICATIONS

This application claims the benefit of priority from U.S. Provisional Patent Application No. 62/045,347, filed Sep. 3, 2014, which is herein incorporated by reference in its entirety.

TECHNICAL FIELD

The present application relates to systems and methods for providing an electronic, computer implemented, self-advising tool to enhance student success at post-secondary, higher education institutions, particularly community colleges.

BACKGROUND

Many post-secondary, higher education institutions (i.e., universities, colleges and other academic institutions) face challenges to improve and measure student success (e.g., graduation/certification, completion, on time graduation, transfer, job placement, job preparedness). These challenges appear to be heightened for community college institutions. Community college students, in particular, who are often considered non-traditional students, with jobs and family obligations, differ from other students in their experience with the academic process. It has been shown that these students are often unprepared for the rigors of higher education, especially first generation college students. Such students have commonly shown difficulties managing their time, defining and executing on goals, and structuring their lives. It is with respect to this general environment that embodiments of the present application are directed.

SUMMARY OF THE DISCLOSURE

Systems and methods are disclosed herein for recommending an educational course to a user, and may comprise receiving data records associated with availability of a plurality of educational courses at one or more institutions; receiving educational course data and educational course focus data associated with the user; receiving prior user data records comprising prior user educational course data and prior user educational course focus data; determining index scores for each of the plurality of educational courses based upon a similarity between the educational course data and prior user educational course data, and based upon a similarity between the educational course focus data and prior user educational course focus data; and providing a recommended educational course from the plurality of educational courses to the user based upon the determined index scores.

Systems and methods disclosed herein may further include determining a first candidate educational course and a second candidate educational course based upon the determined index scores; and recommending the first candidate educational course to the user based upon a determination that the second candidate educational course is closer to full capacity than the first candidate educational course.

Systems and methods disclosed herein may further include the computer-implemented method of claim 1, wherein providing a recommended educational course further comprises determining a batch of two or more educational courses based upon their associated index scores and a compatibility of the two or more educational courses in the batch; and recommending the batch of two or more educational courses to the user.

Systems and methods disclosed herein may further determine a compatibility of the two or more educational courses in the batch by determining that the educational courses are either taken coincident with each other or within a predetermined time period of each other in the prior use data records.

Systems and methods disclosed herein may further provide a recommended educational course further by recommending the educational course based upon proximity between a location of each of the plurality of educational courses and an address associated with the user.

Systems and methods disclosed herein may further include receiving, from the user, a selection of an educational course from the plurality of educational courses; and providing a recommended educational course from the plurality of educational courses based upon the determined index scores, wherein the index scores are determined at least in part based upon the selection of the educational course.

Systems and methods disclosed herein may further comprise receiving, from the user via a user interface, a selection of a first educational course from the plurality of educational courses; receiving, from the user via the user interface, a selection of a second educational course from the plurality of educational courses, wherein the second educational course has a dependency upon the first educational course; receiving a move command, from the user via the user interface, to move the first educational course; moving the first educational course, on the user interface, in a manner corresponding to the move command; automatically moving the second educational course, on the user interface, based upon the dependency upon the first educational course.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF DRAWINGS

The accompanying drawings, which are incorporated in and constitute a part of this specification, illustrate various exemplary embodiments and together with the description, serve to explain the principles of the disclosed embodiments.

Further advantageous features of the present invention will become more apparent with the following detailed description when taken with reference to the accompanying drawings in which:

FIG. 13 depicts an admissions letter from an academic institution to an applicant, according to exemplary embodiments of the present disclosure.

FIG. 34 depicts a form confirming completion of a course schedule, according to exemplary embodiments of the present disclosure.

FIG. 39 depicts an admissions letter from an academic institution to an applicant, according to exemplary embodiments of the present disclosure.

FIG. 65 depicts a form confirming completion of a course schedule, according to exemplary embodiments of the present disclosure.

task as displayed in a web browser, according to exemplary embodiments of the present disclosure.

Figure 89:
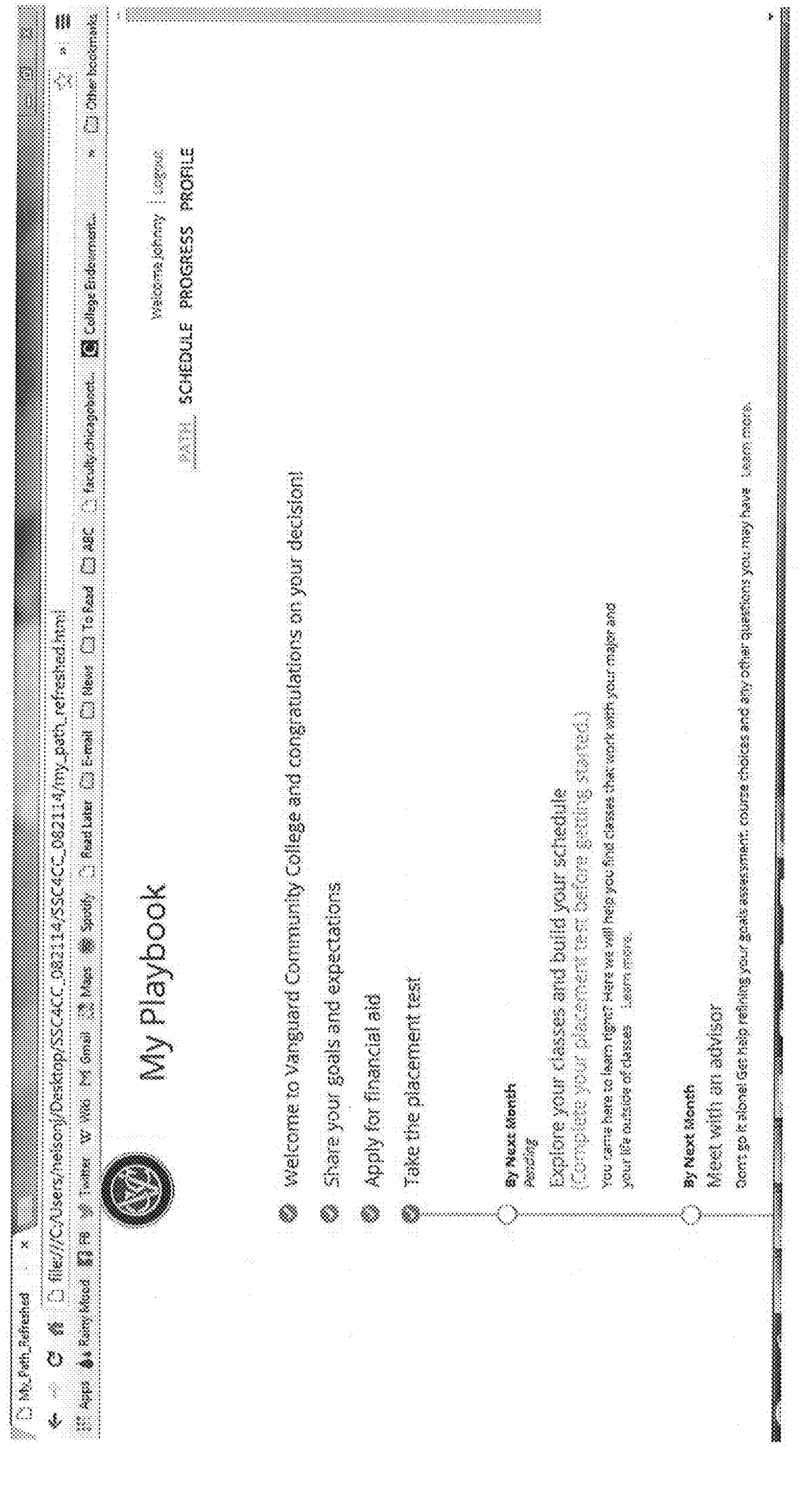

FIG. 89 depicts a "My Playbook" form as displayed in a web browser, according to exemplary embodiments of the present disclosure.

Figure 90:
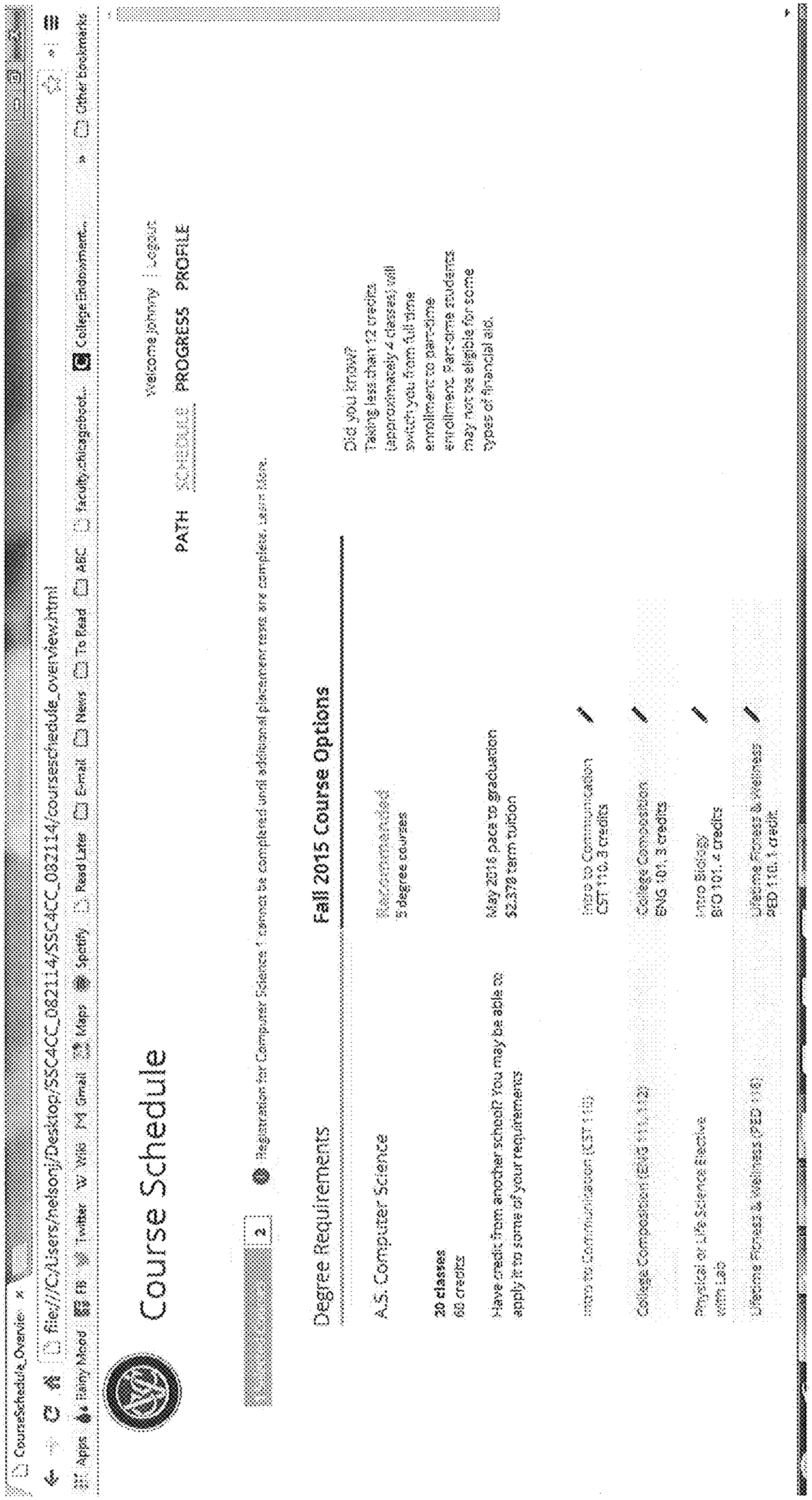

FIG. 90 depicts a form to display an exemplary course schedule as displayed in a web browser, according to exemplary embodiments of the present disclosure.

Figure 91:
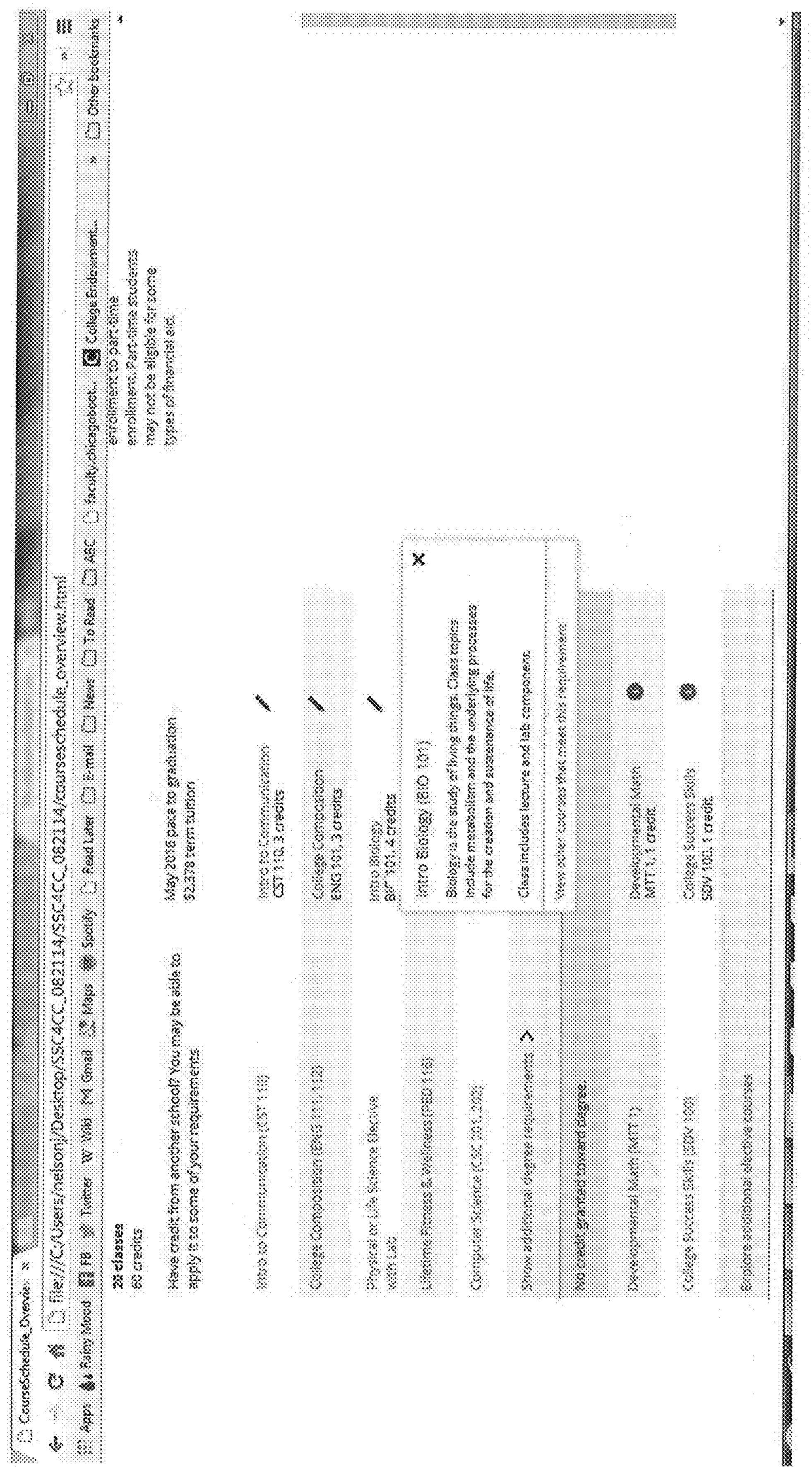

FIG. 91 depicts a form to display an exemplary course schedule as displayed in a web browser, according to exemplary embodiments of the present disclosure.

Figure 92:
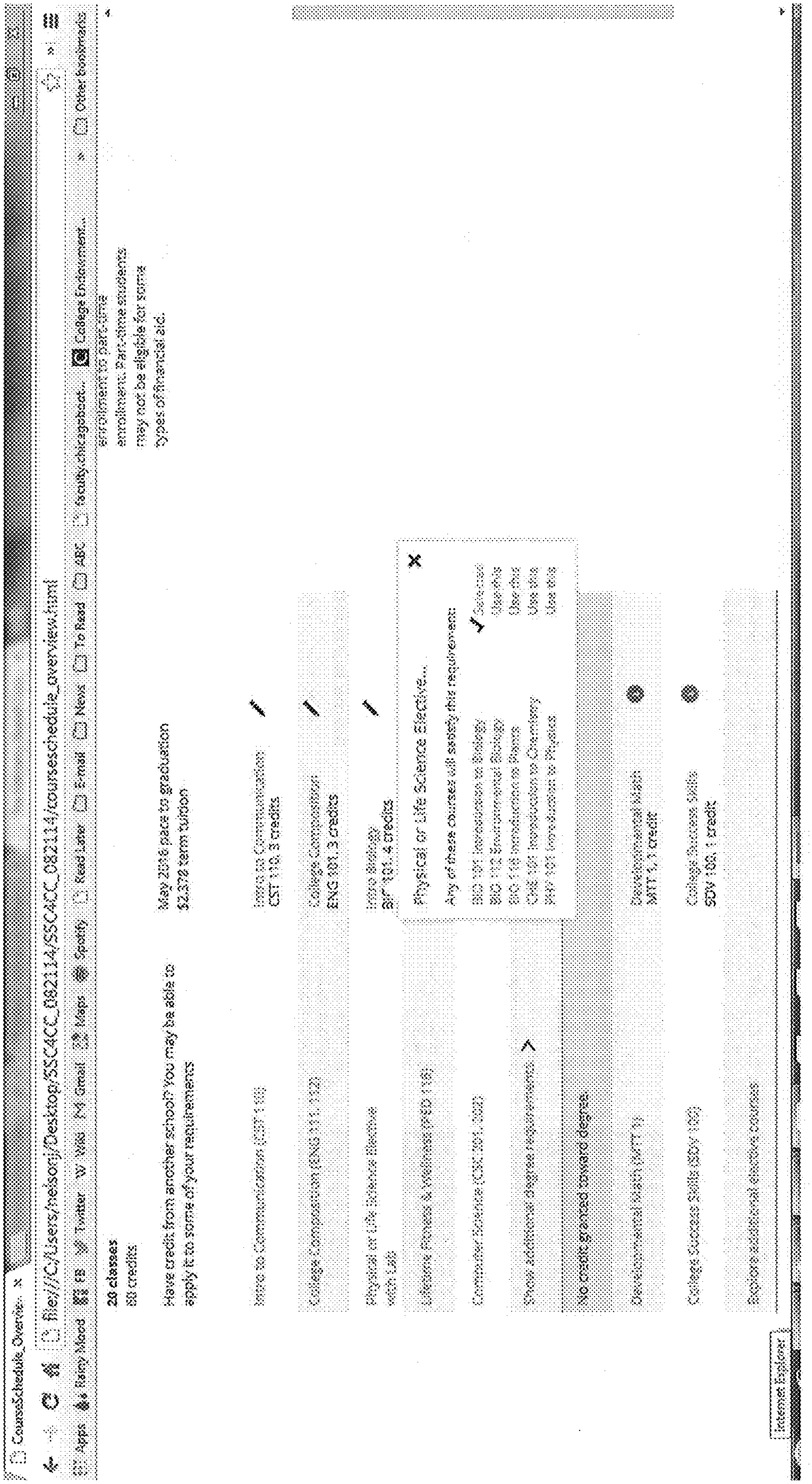

FIG. 92 depicts a form to display an exemplary course schedule, according to exemplary embodiments of the present disclosure as displayed in a web browser.

Figure 93:
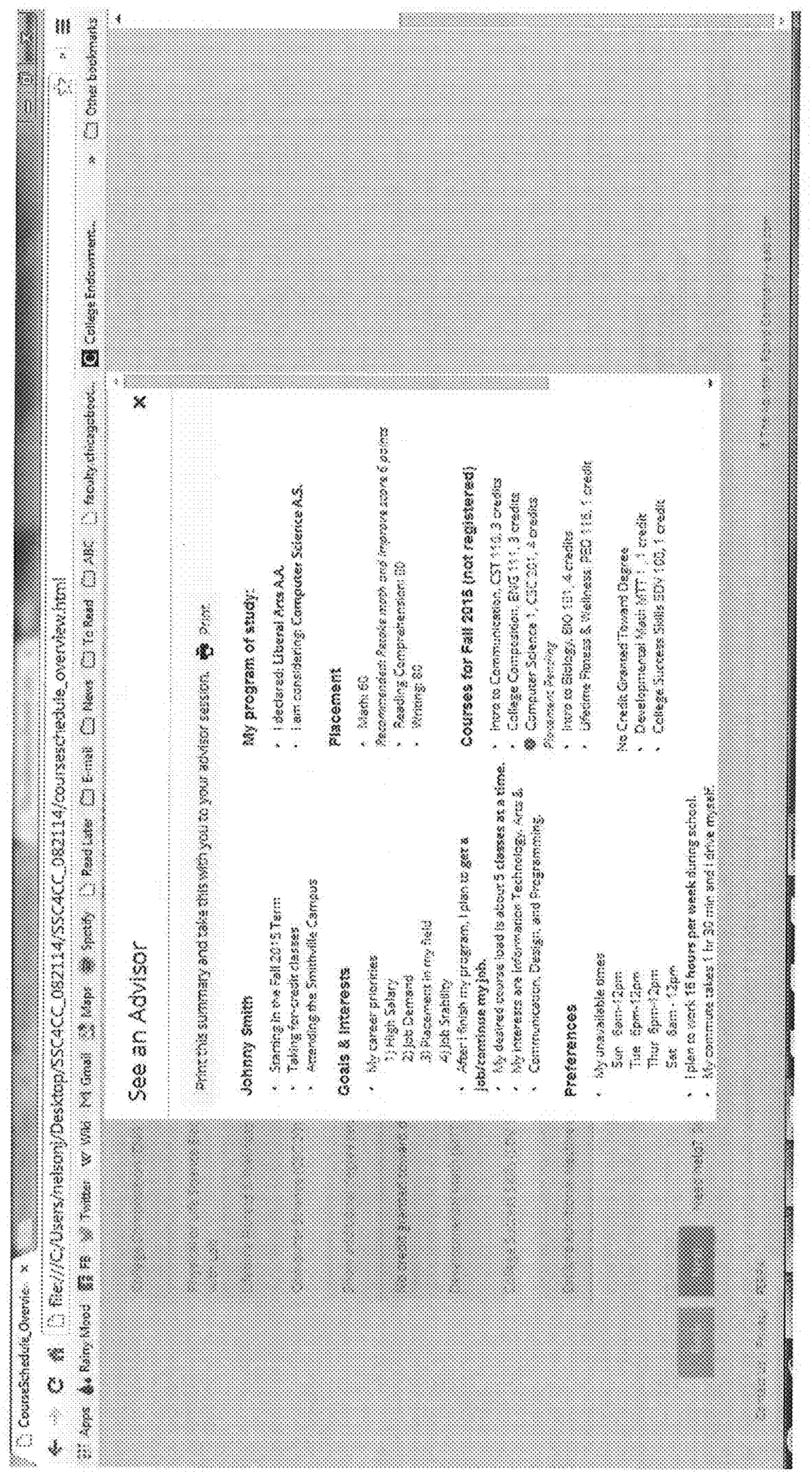
Figure 94:
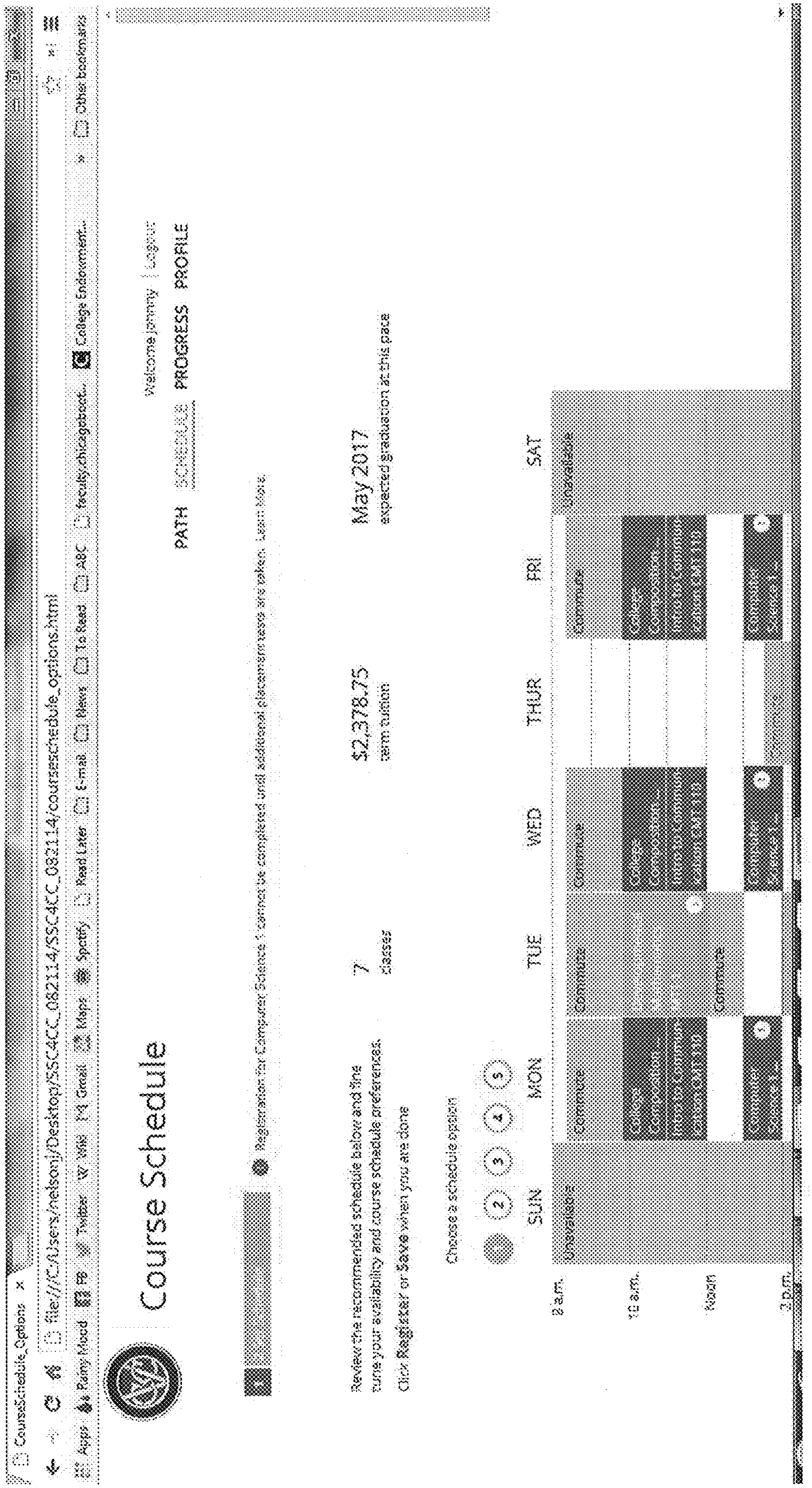

FIG. 93 depicts a summary page that may be displayed according to exemplary embodiments of the present disclosure as displayed in a web browser, for example in combination with a form to display an exemplary course schedule.

FIGS. 94-97 depict a form for arranging selected courses on a calendar grid as displayed in a web browser, according to exemplary embodiments of the present disclosure.

Figure 98:
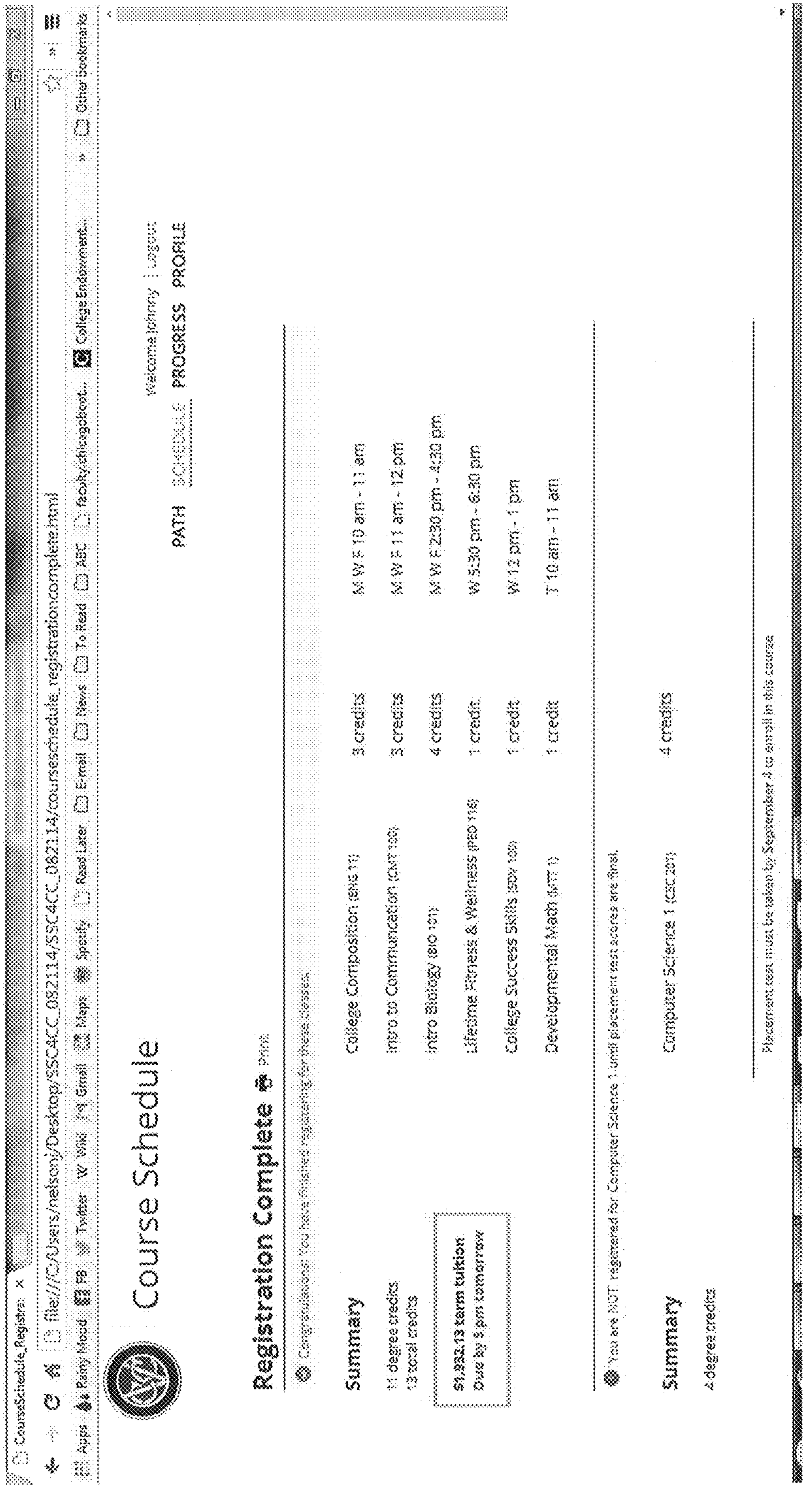
Figure 99:
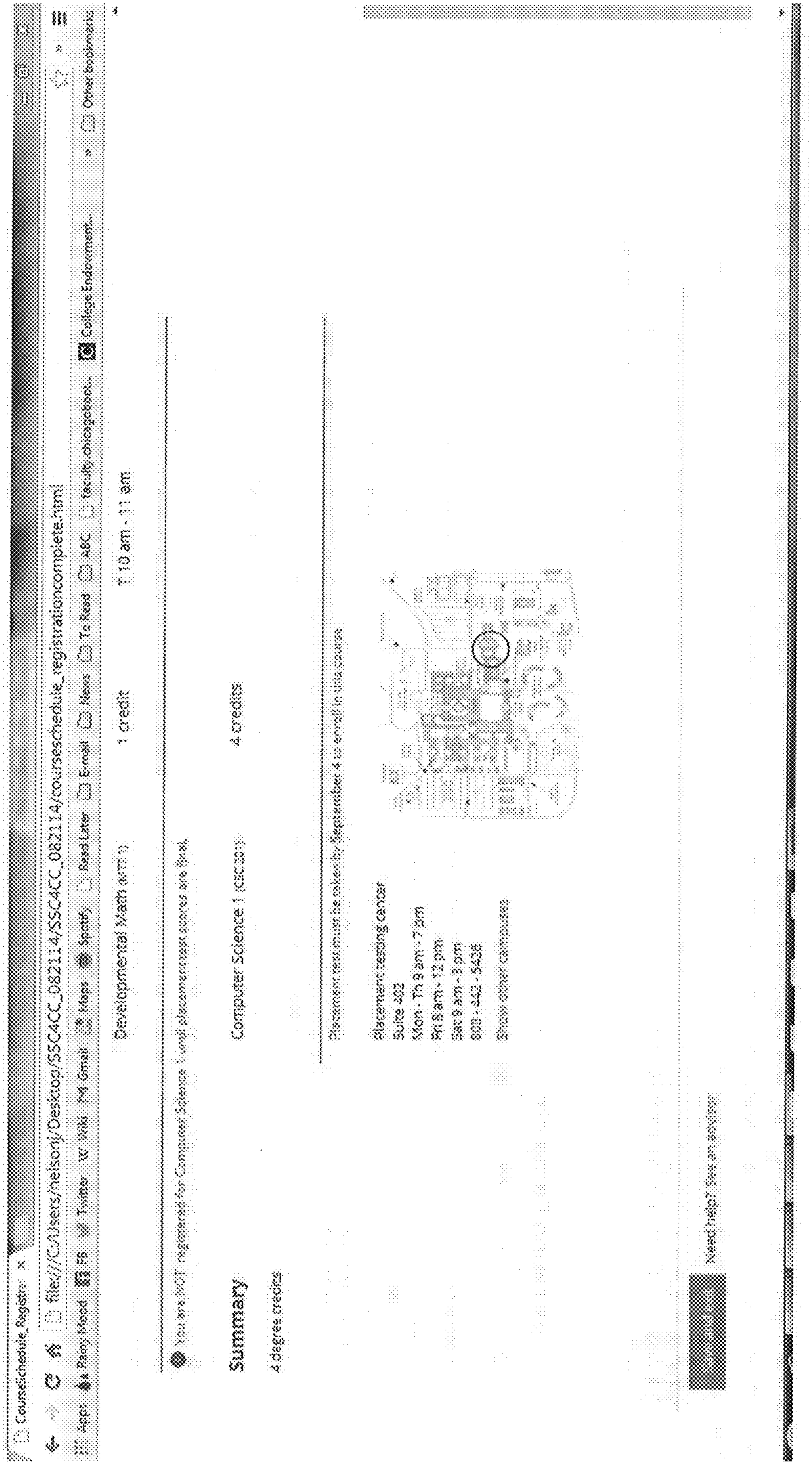

FIGS. 98 and 99 depict a form confirming completion of a course schedule as displayed in a web browser, according to exemplary embodiments of the present disclosure.

Figure 100:
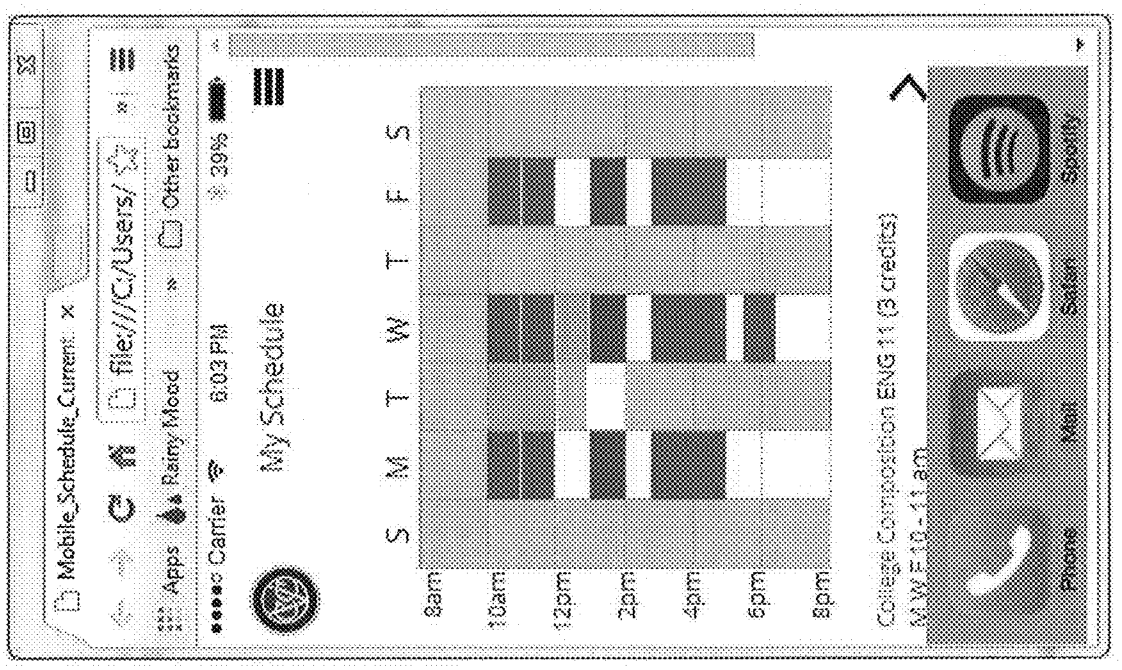

FIG. 100 depicts depict a form for arranging selected courses on a calendar grid as displayed on a mobile device, according to exemplary embodiments of the present disclosure.

Figure 101:
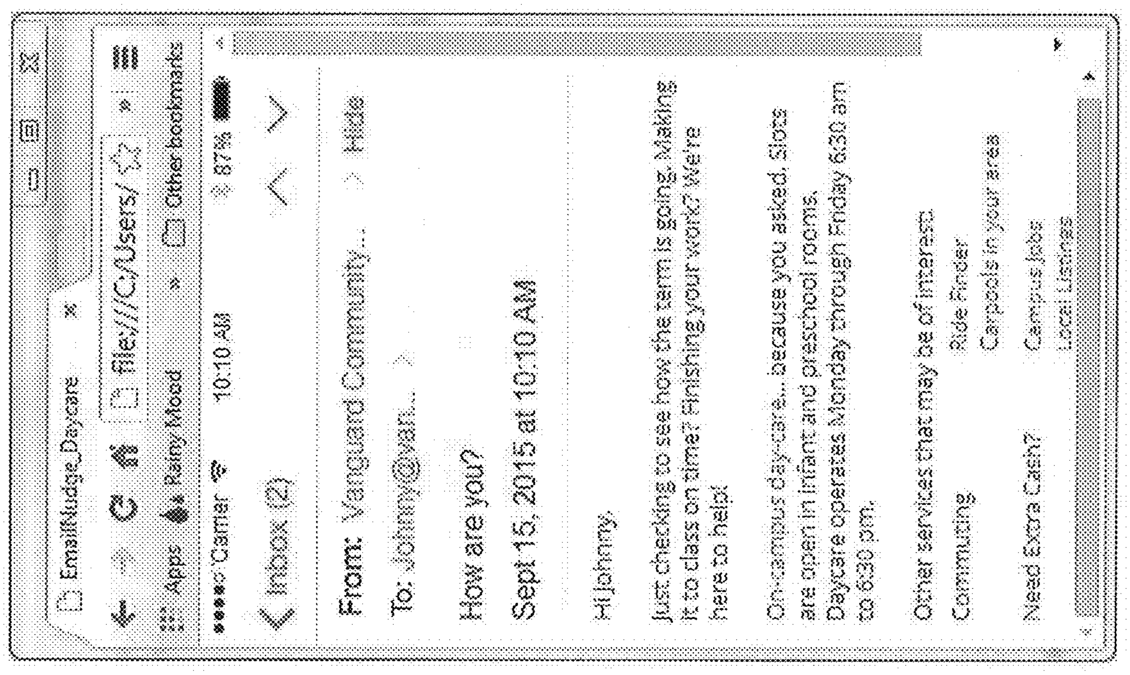

FIG. 101 depicts a communication related to a current task as displayed in an e-mail application on a mobile device, according to exemplary embodiments of the present disclosure.

Figure 102:
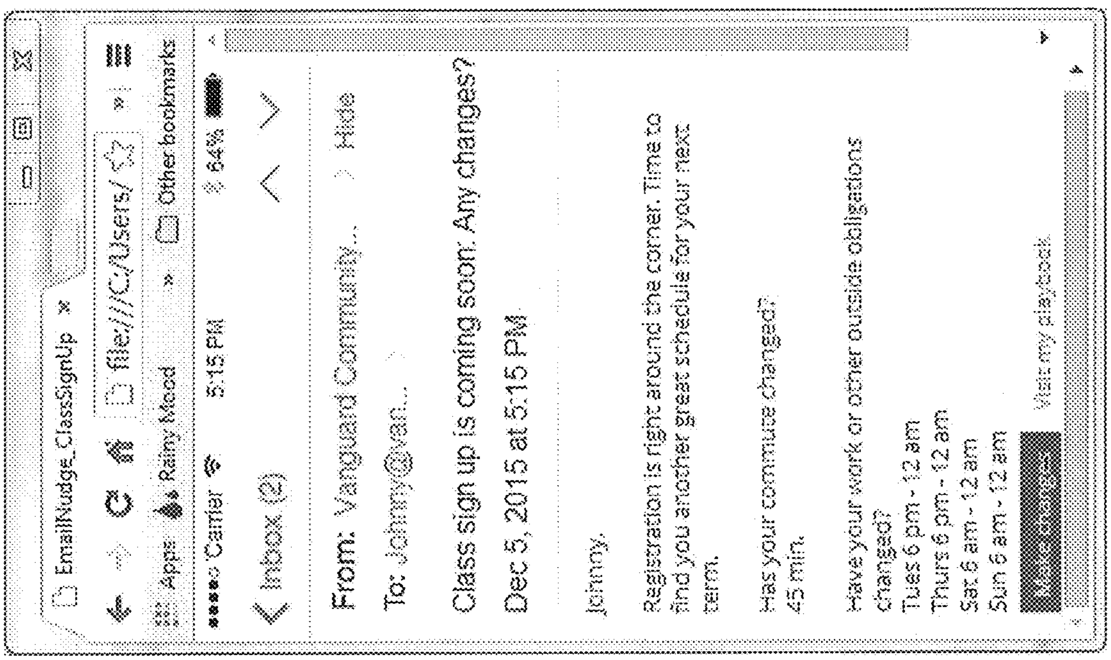

FIG. 102 depicts a communication to a user of My Playbook as displayed in an e-mail application on a mobile device, according to exemplary embodiments of the present disclosure.

Figure 103:
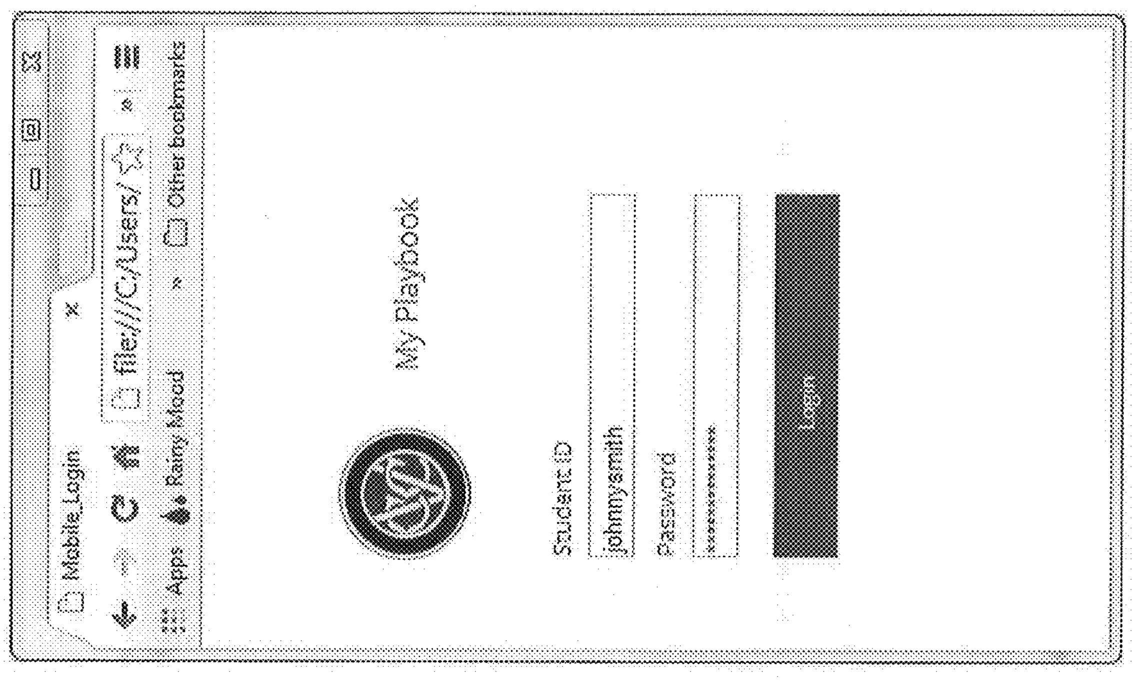

FIG. 103 depicts a form for logging in to "My Playbook" for an academic institution as displayed on a mobile device, according to exemplary embodiments of the present disclosure.

Figure 104:
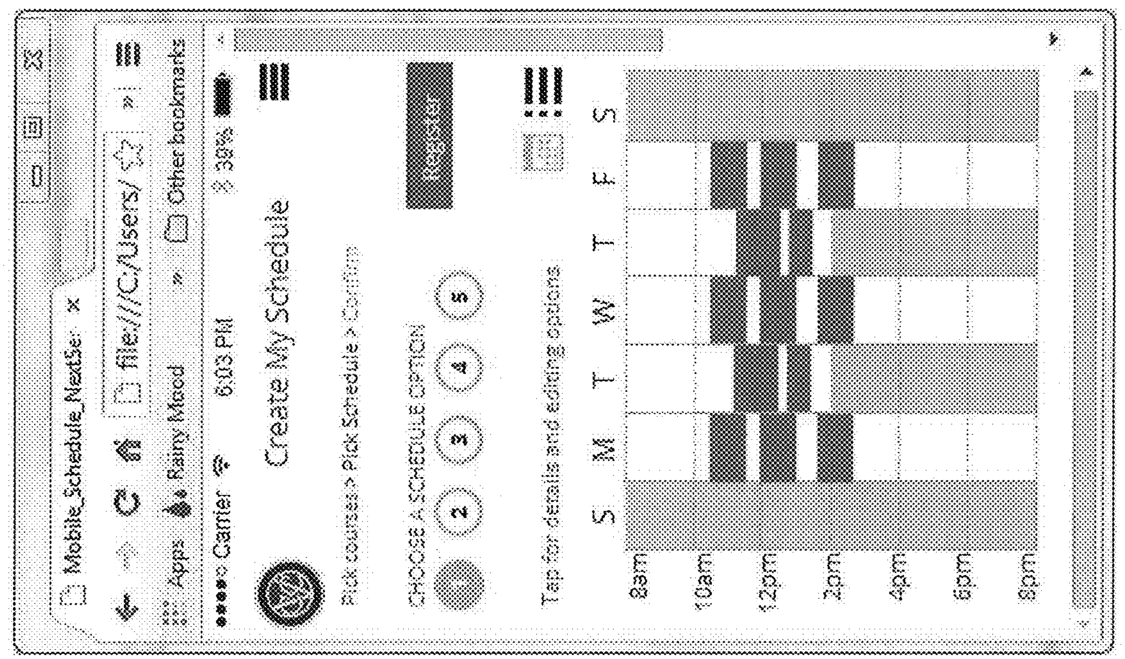
Figure 105:
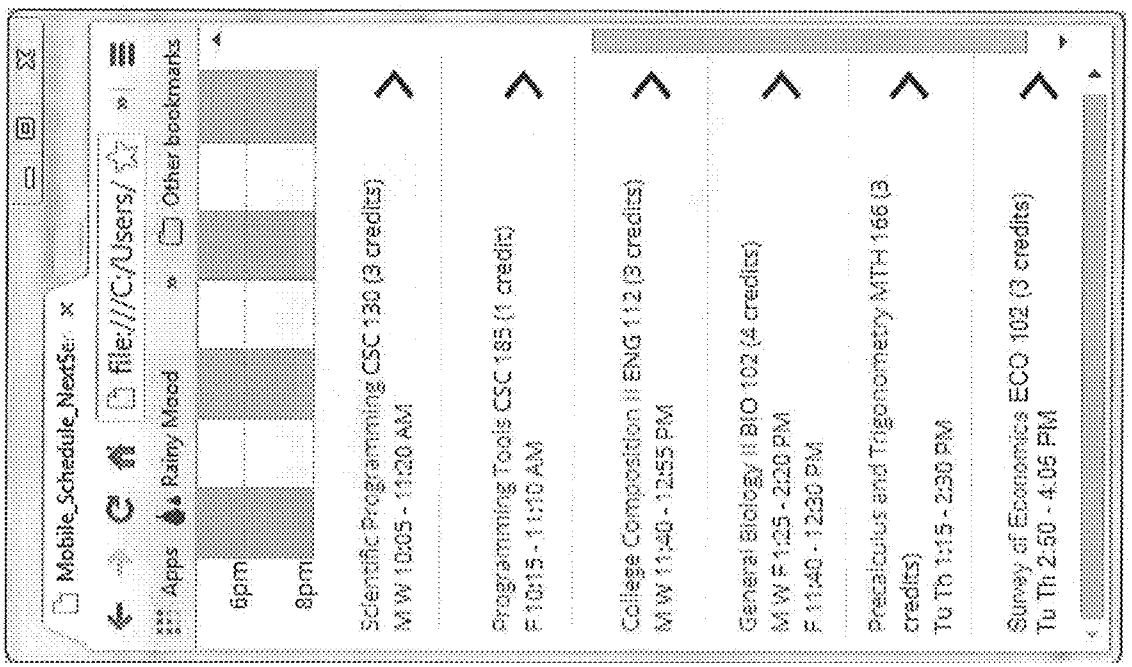

FIGS. 104-105 depict a form for selecting one or more course scheduling options as displayed on a mobile device, according to exemplary embodiments of the present disclosure.

Figure 106:
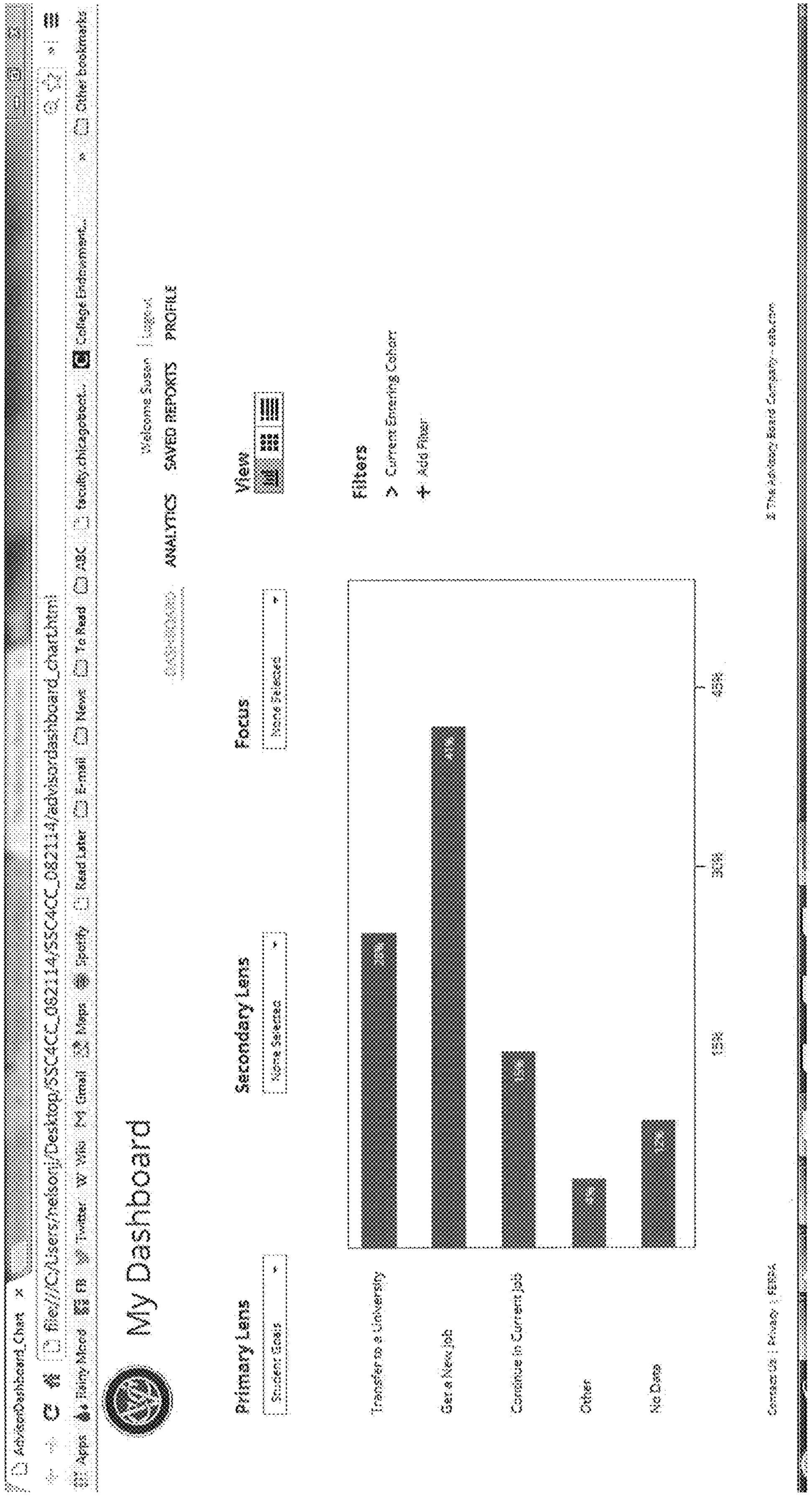

FIG. 106 depicts a "My Dashboard" form displaying statistics about students at an academic institution as displayed in a web browser, according to exemplary embodiments of the present disclosure.

Figure 107:
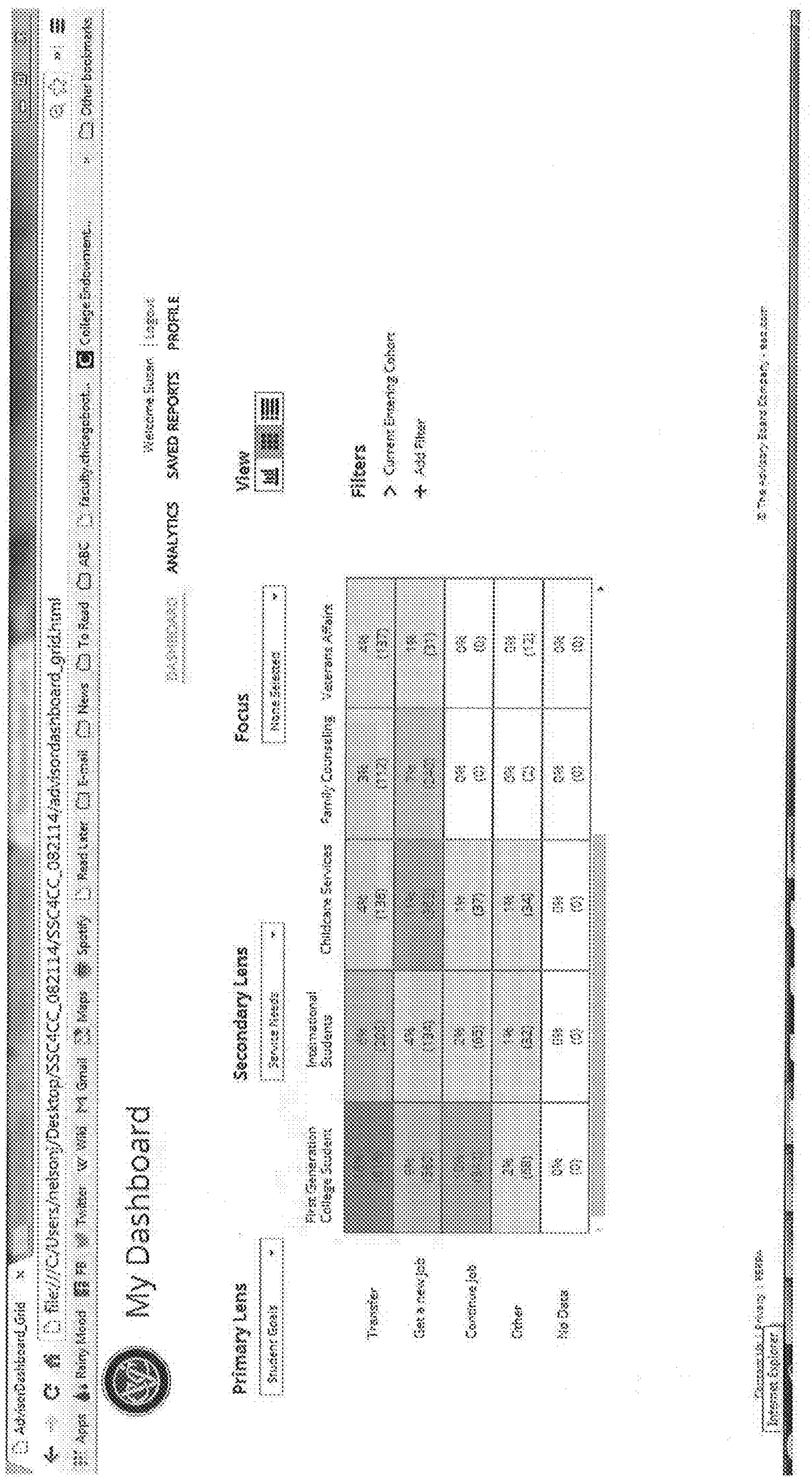

FIG. 107 depicts a "My Dashboard" form displaying statistics about students at an academic institution as displayed in a web browser, according to exemplary embodiments of the present disclosure.

Figure 108:
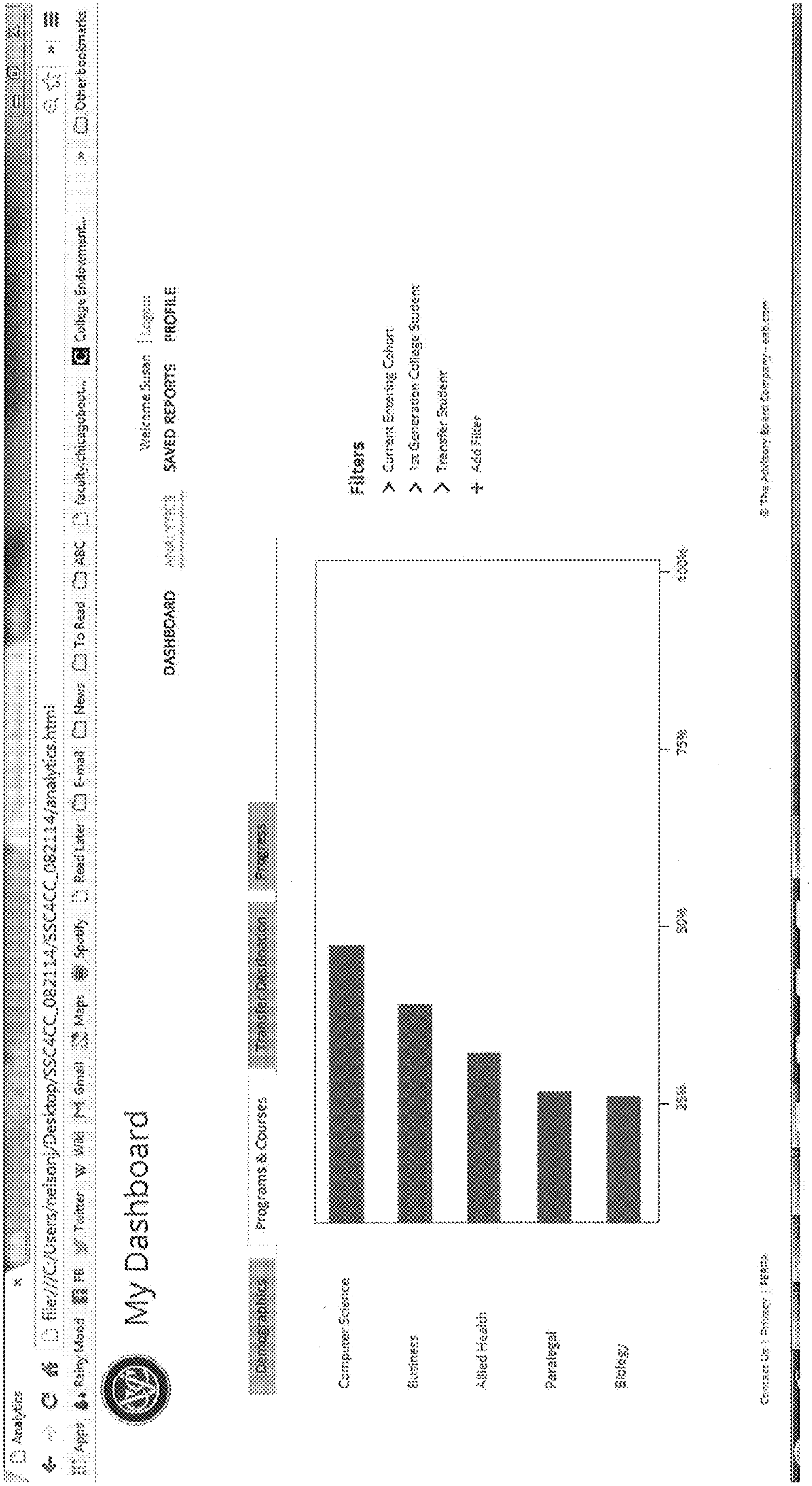

FIG. 108 depicts a "My Dashboard" form displaying statistics about students at an academic institution as displayed in a web browser, according to exemplary embodiments of the present disclosure.

Figure 109:
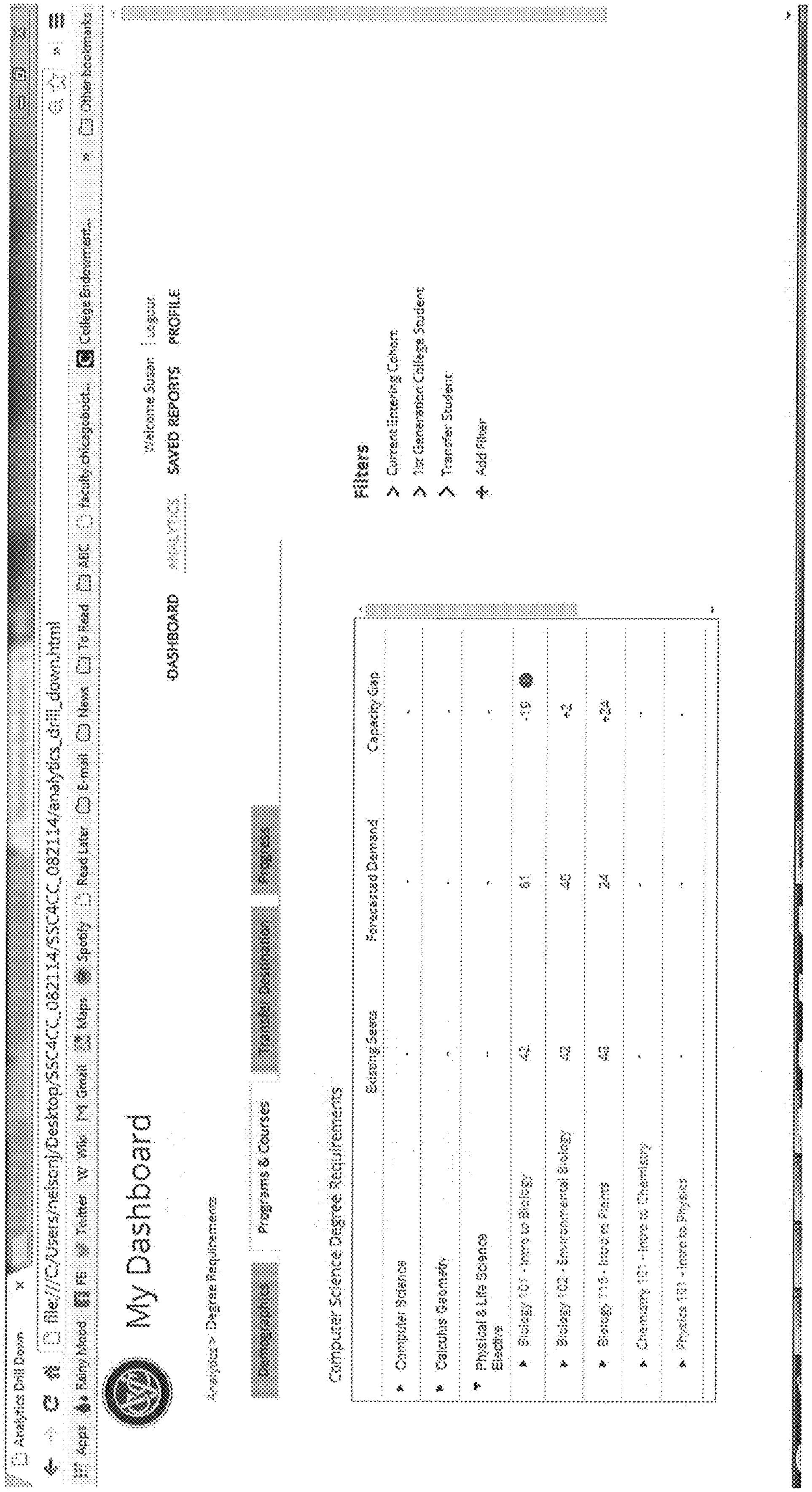
Figure 110:
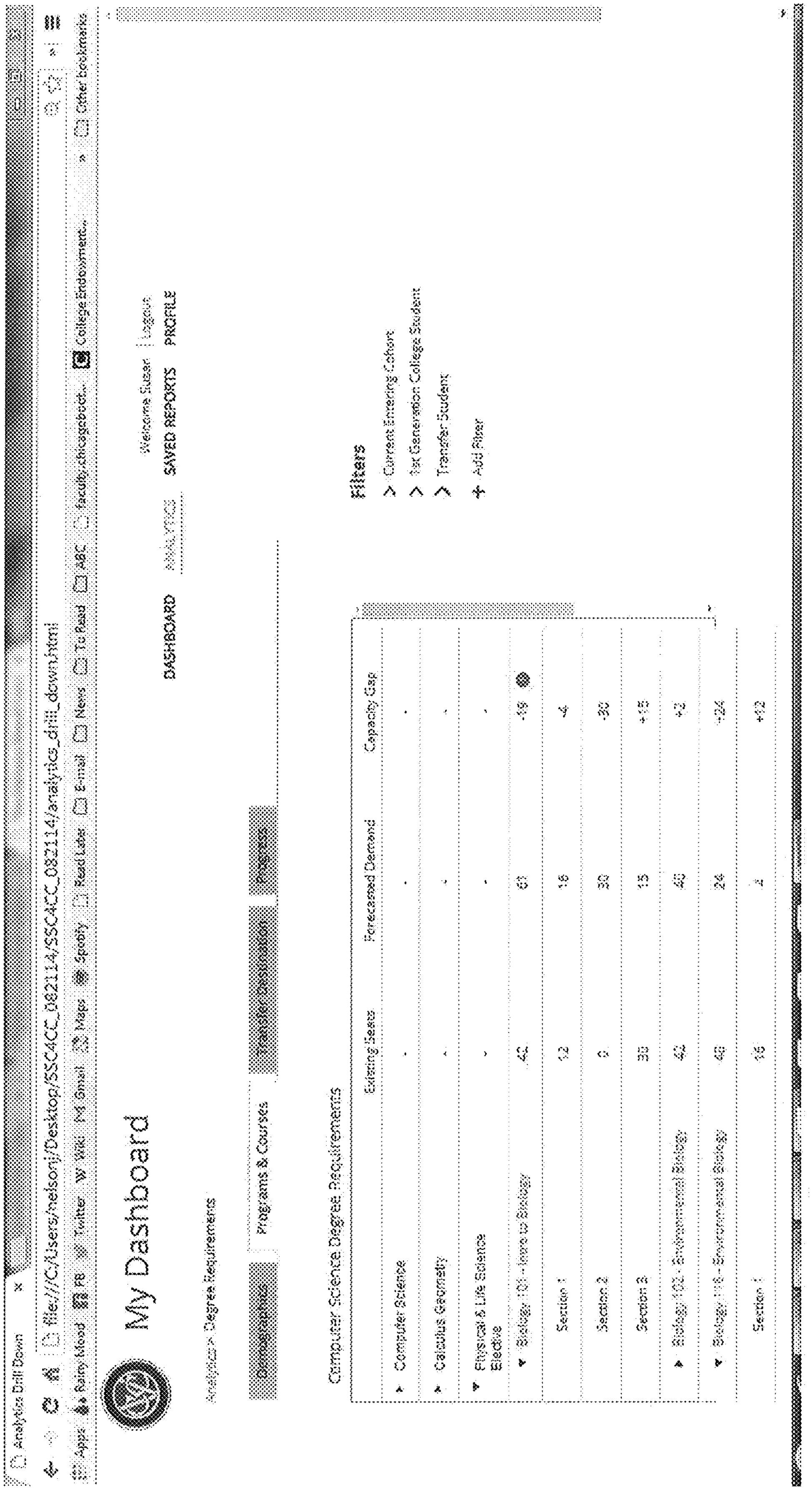

FIGS. 109 and 110 depict a "My Dashboard" form displaying information about courses satisfying one or more academic requirement in a selected course of study as displayed in a web browser, according to exemplary embodiments of the present disclosure.

Figure 111:
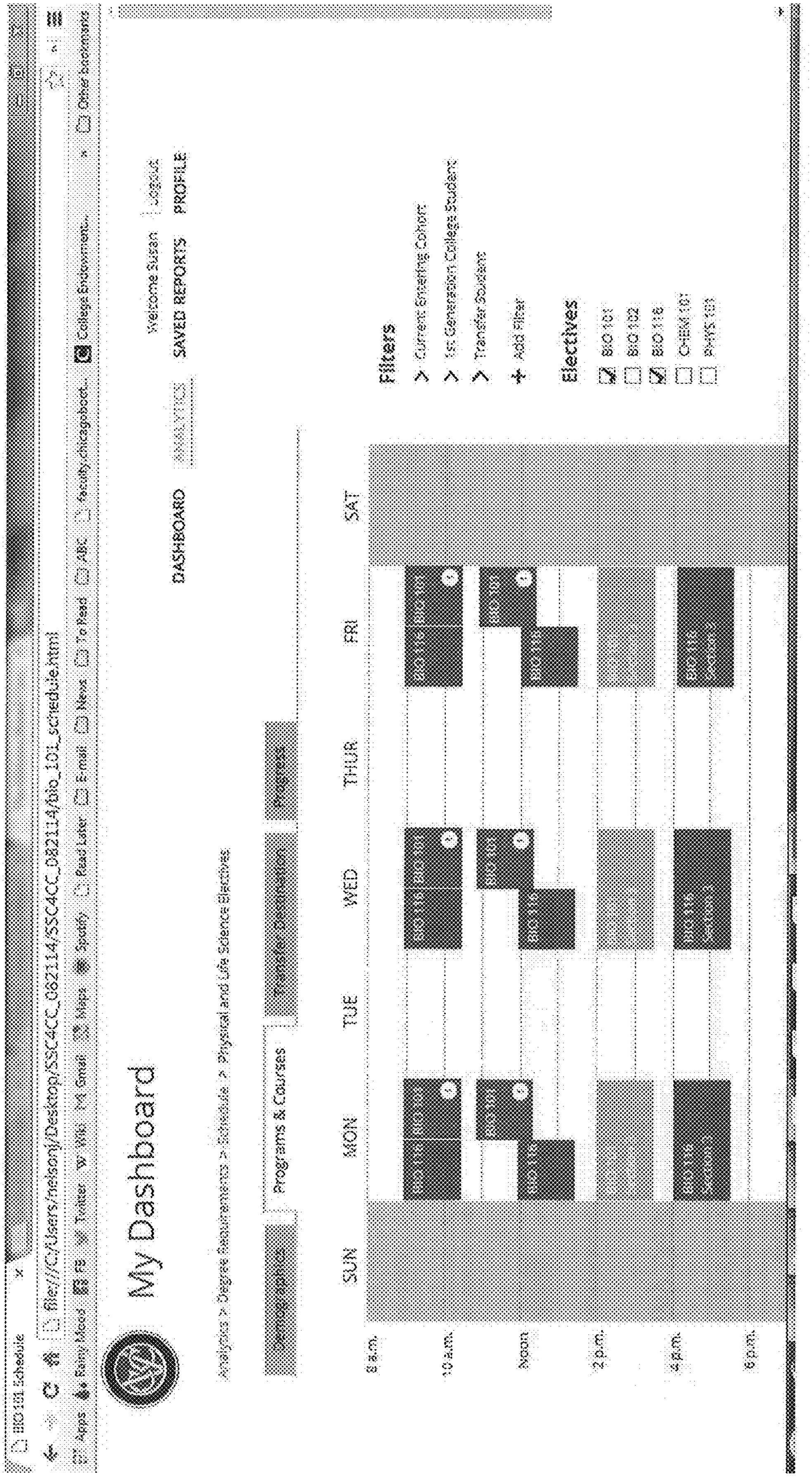
Figure 112:
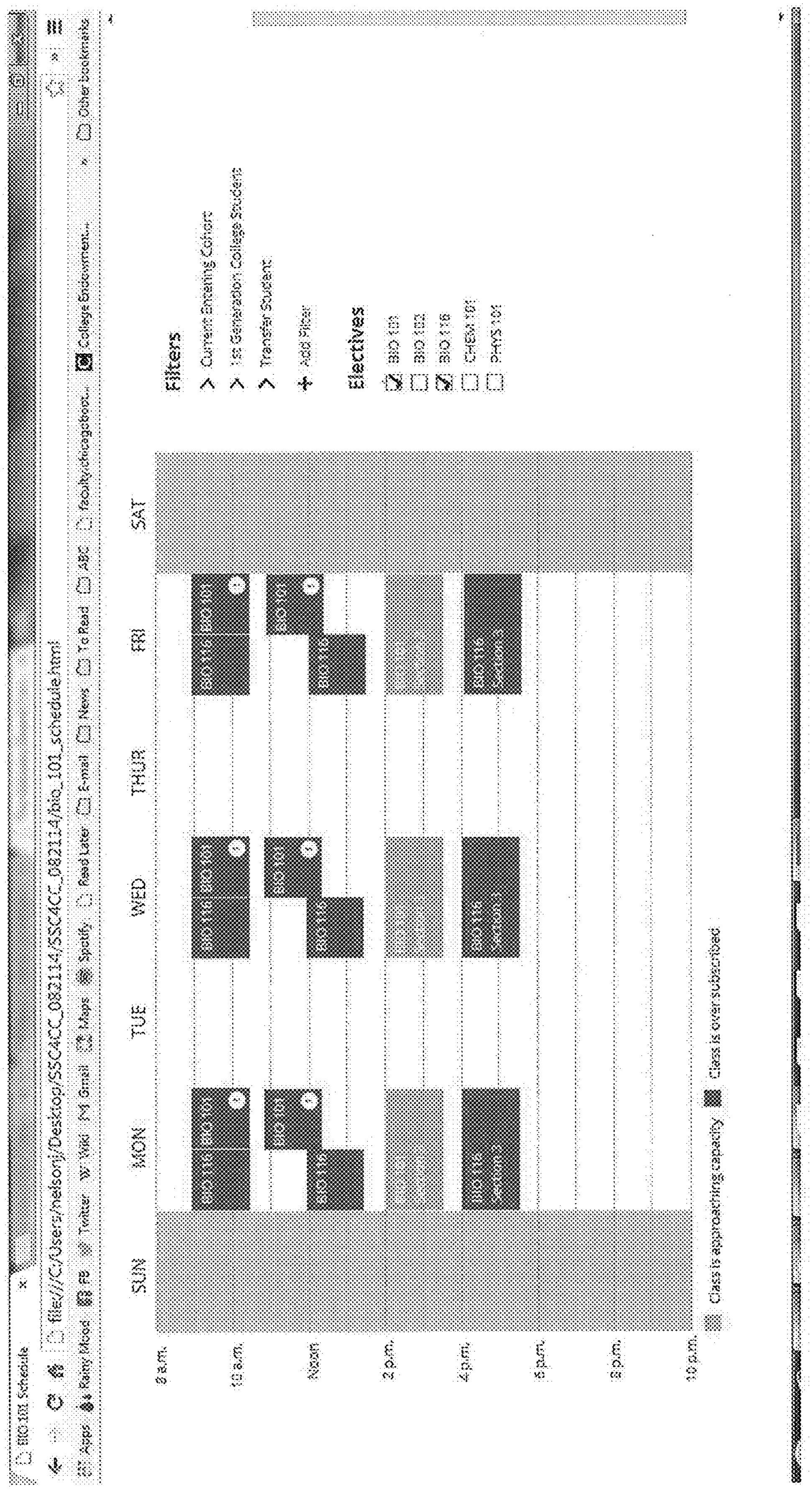

FIGS. 111 and 112 depict a "My Dashboard" form displaying information about courses satisfying one or more academic requirement in a selected course of study as displayed in a web browser, according to exemplary embodiments of the present disclosure.

Figure 113:
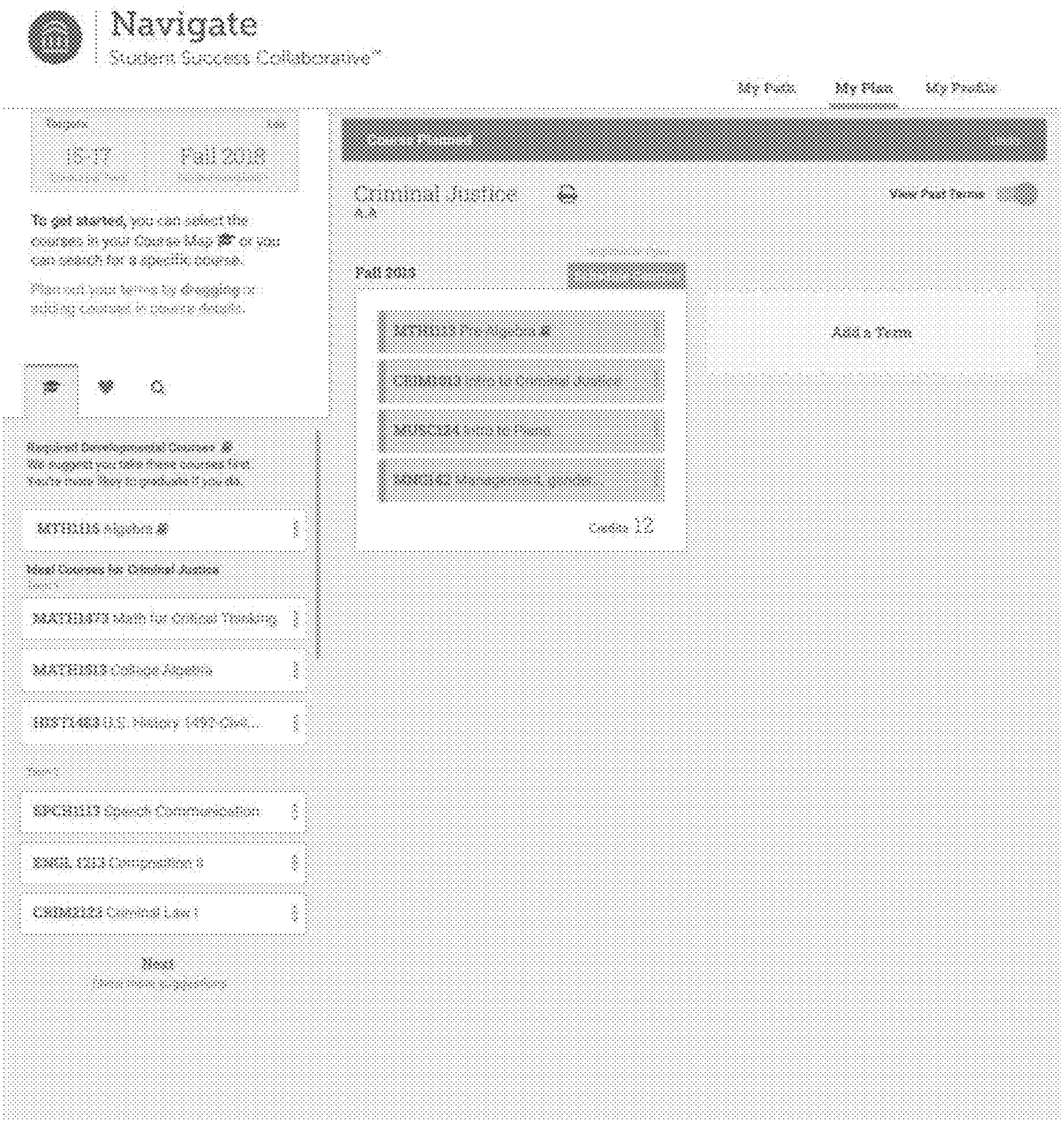

FIG. 113 depicts a form for selecting courses related to a student's course of study, according to exemplary embodiments of the present disclosure.

FIGS. 114-127 depict a form for scheduling courses within an academic term, according to exemplary embodiments of the present disclosure.

Figure 128:
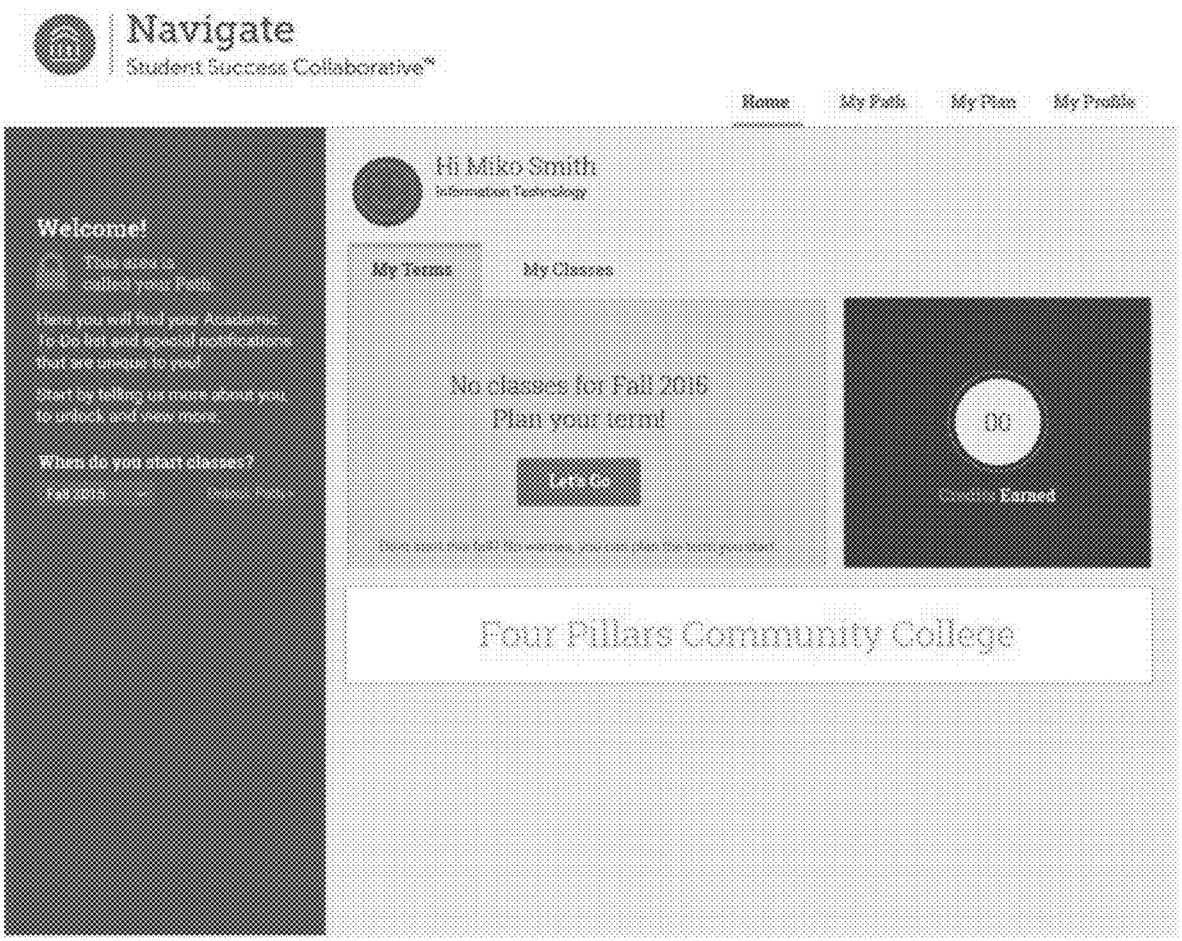
Figure 129:
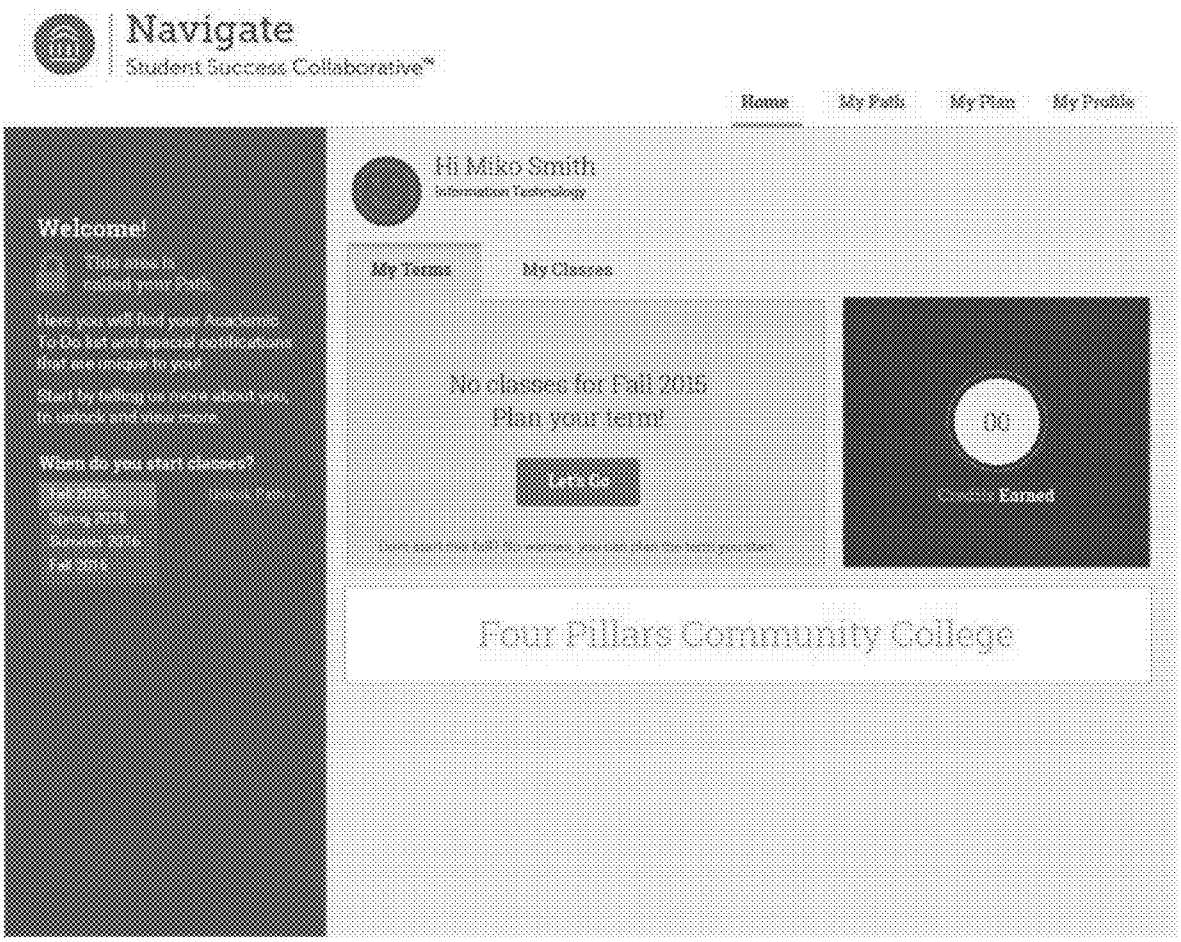

FIGS. 128-129 depict a form for initiating a process of academic planning, according to exemplary embodiments of the present disclosure.

FIGS. 130-144 depict a form for managing a process of academic planning, according to exemplary embodiments of the present disclosure.

Figure 145:
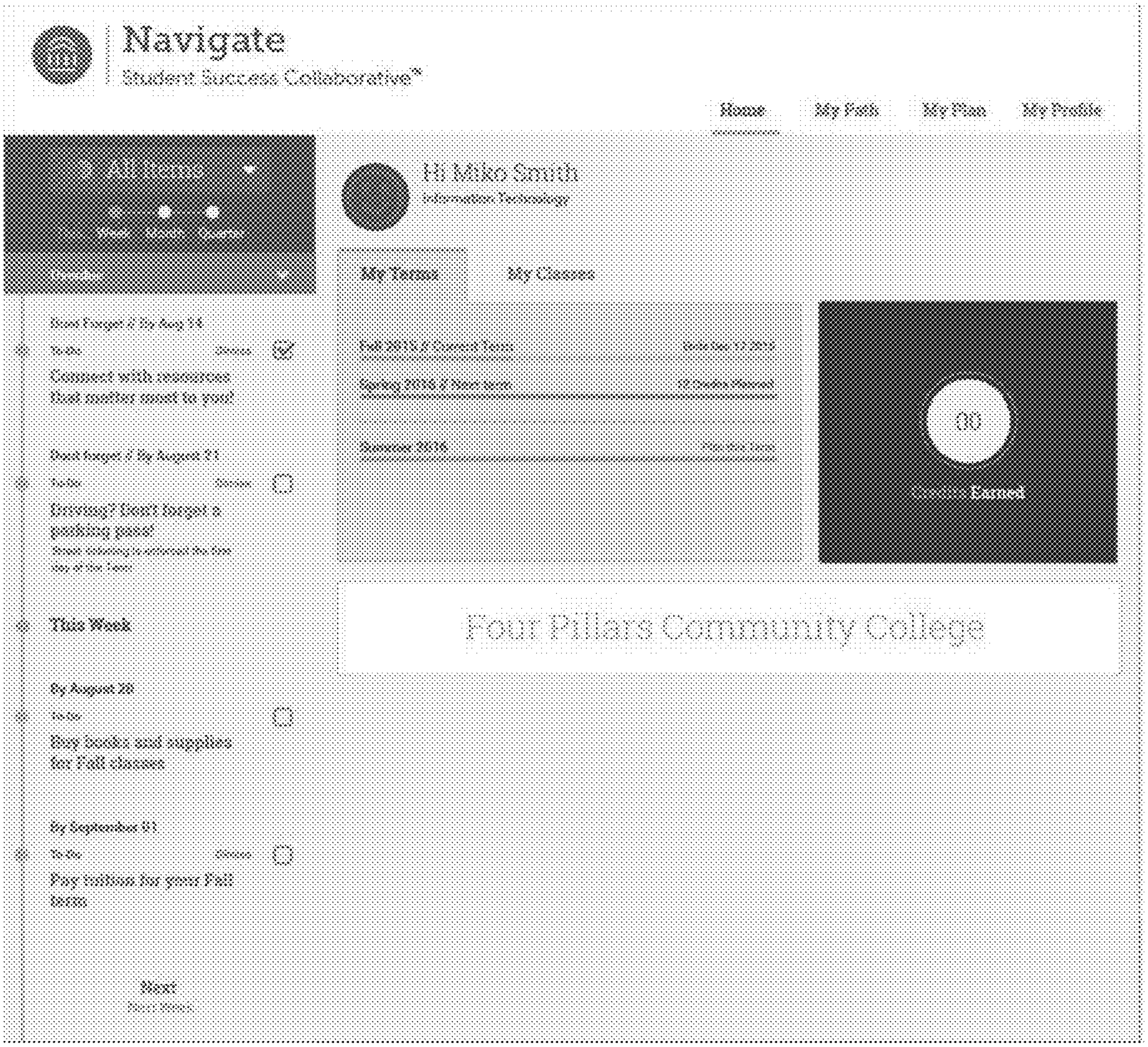
Figure 146:
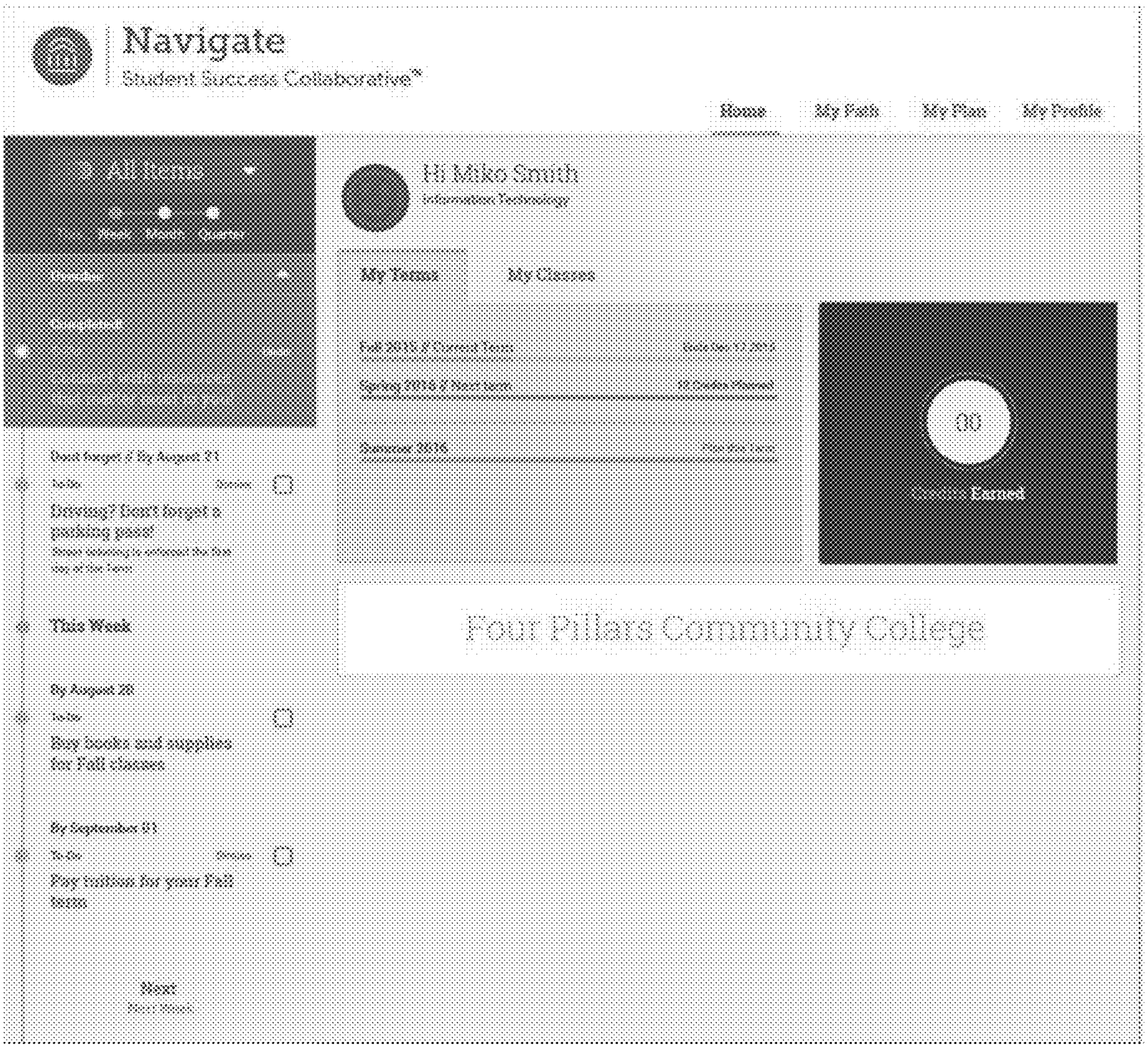
Figure 147:
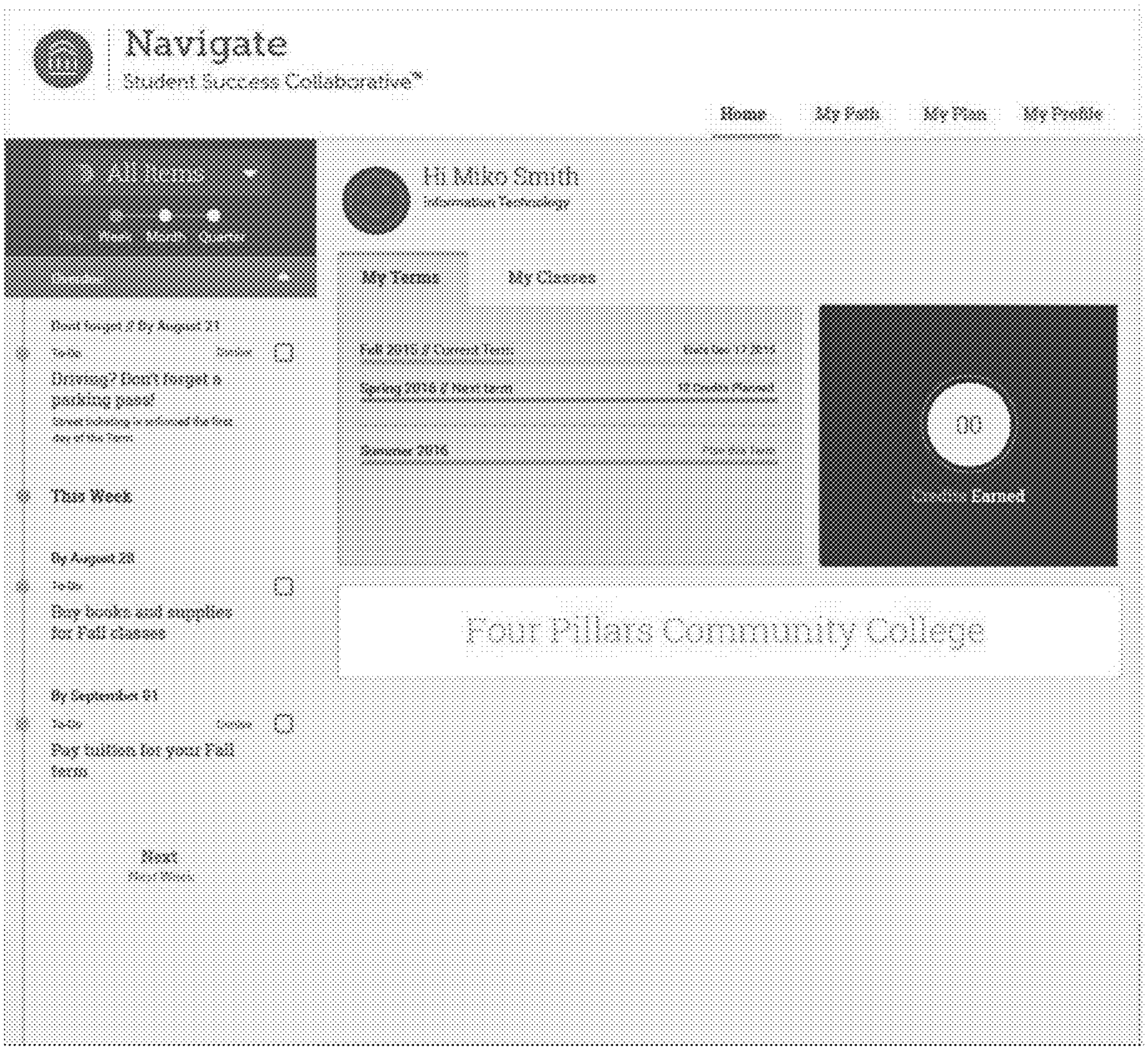

FIGS. 145-147 depict a process of marking an overdue task as completed on a form for managing a process of academic planning, according to exemplary embodiments of the present disclosure.

Figure 148:
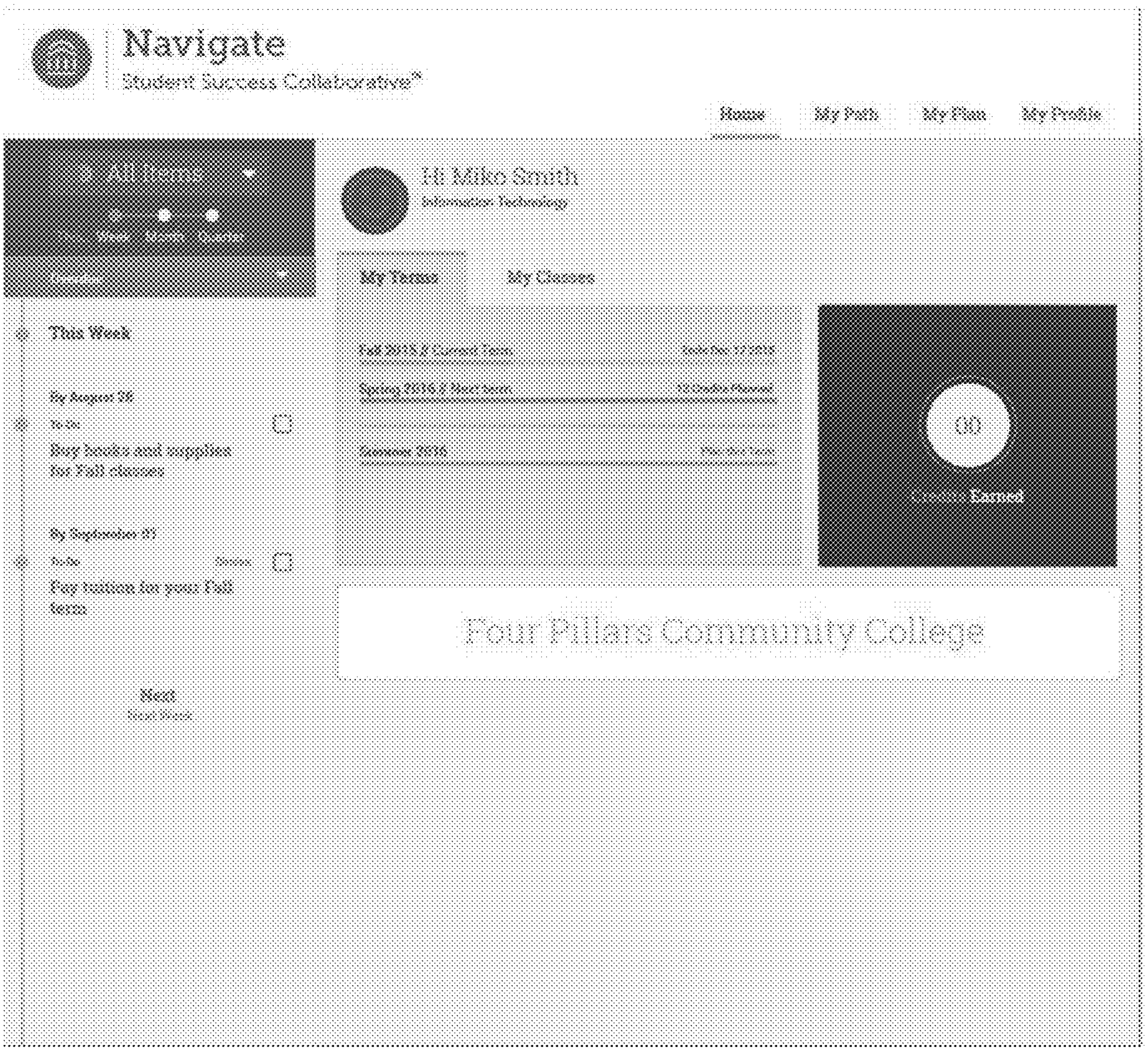

FIG. 148 depicts a form for managing a process of academic planning, according to exemplary embodiments of the present disclosure.

Figure 149:
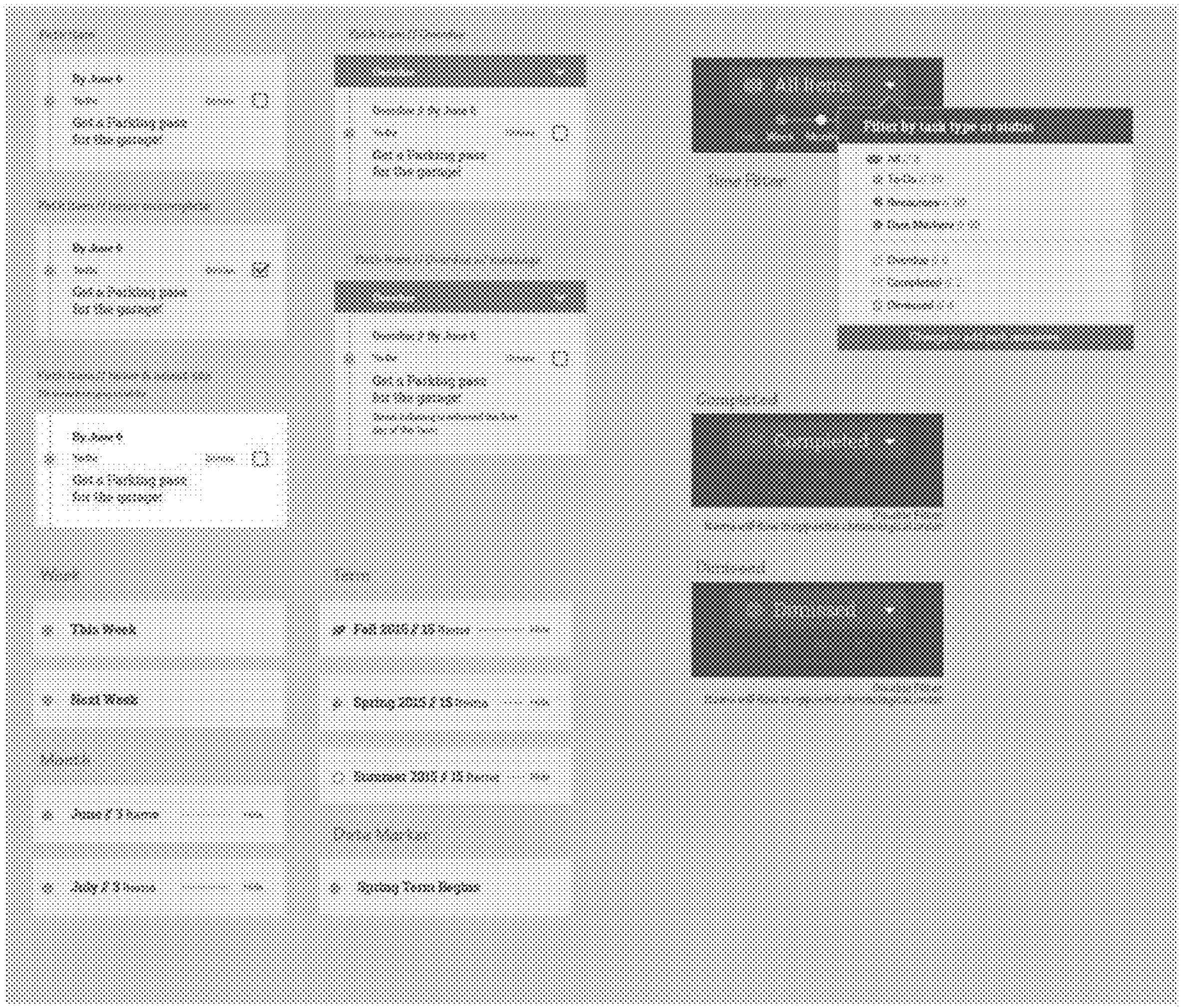

FIG. 149 depicts examples of information and controls that may be displayed on a form for managing a process of academic planning, according to exemplary embodiments of the present disclosure.

Figure 150:
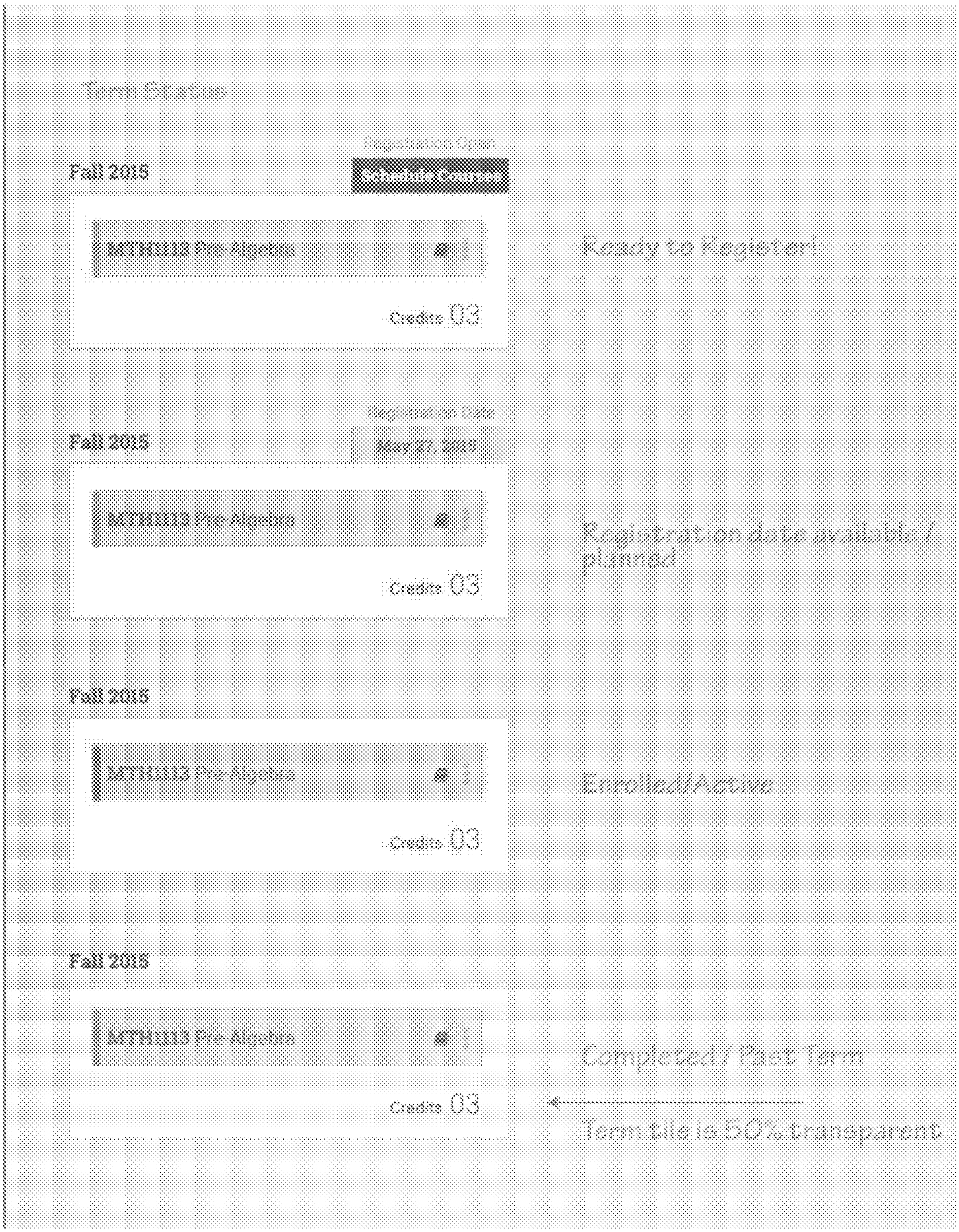

FIG. 150 depicts exemplary status identifiers for courses displayed in a form for managing a process of academic planning, according to exemplary embodiments of the present disclosure.

FIGS. 151-162 depict a form for managing a process of academic planning, according to exemplary embodiments of the present disclosure.

FIGS. 163-172 depict a process of selecting courses for registration on a form for managing a process of academic planning, according to exemplary embodiments of the present disclosure.

Figure 173:
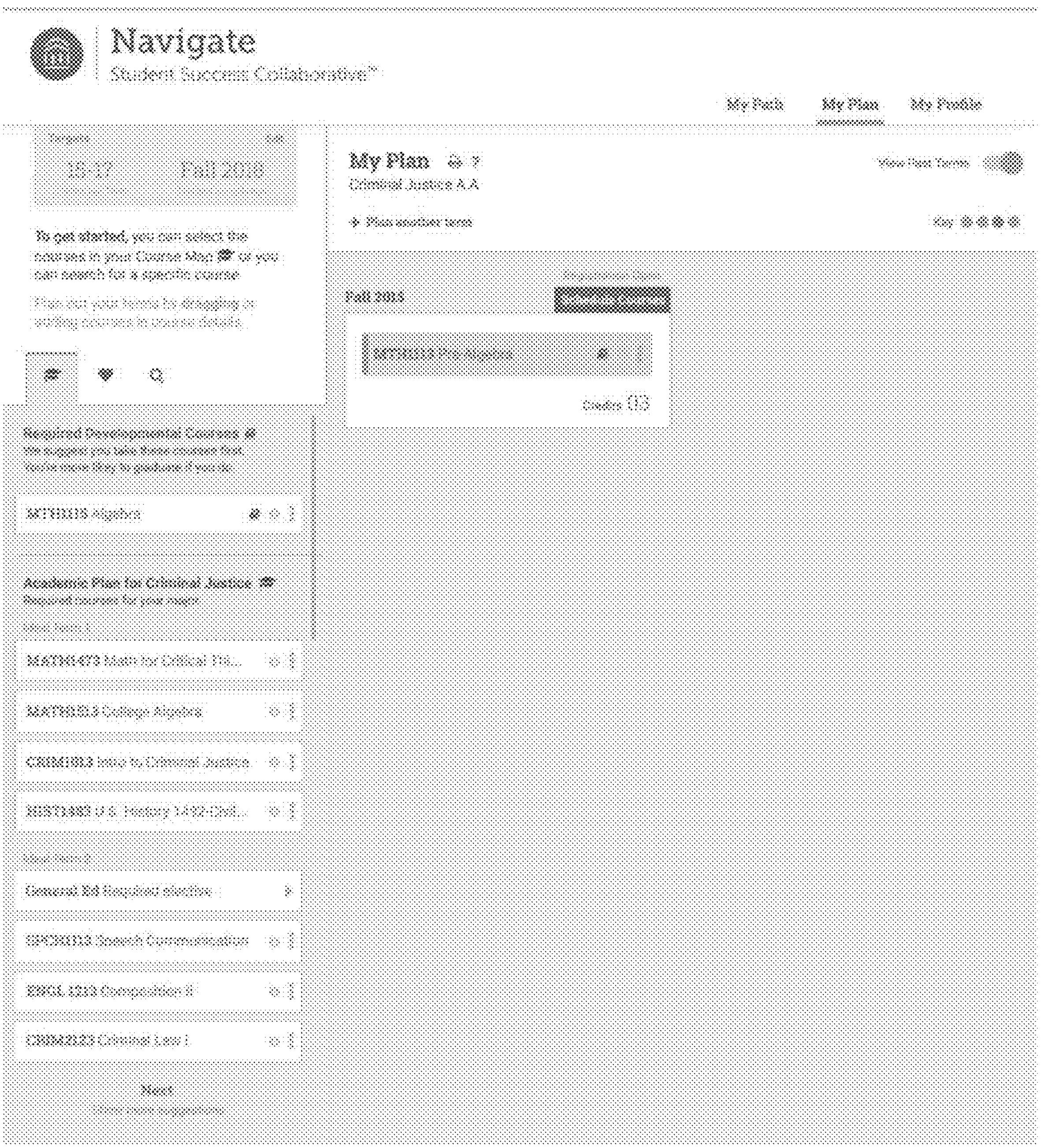
Figure 174:
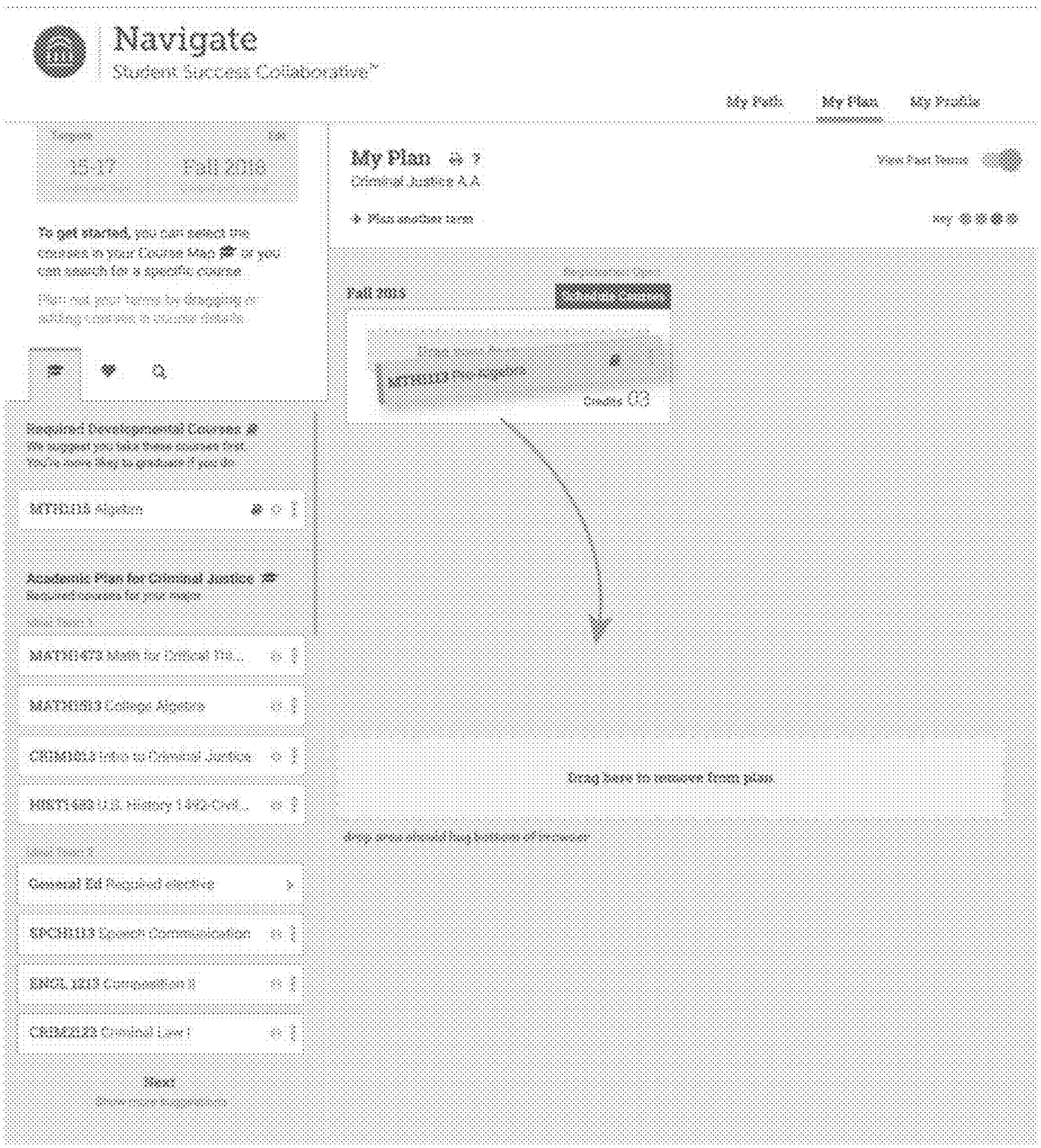

FIGS. 173-174 depict a process of removing a course from a list of planned courses for registration on a form for managing a process of academic planning, according to exemplary embodiments of the present disclosure.

Figure 175:
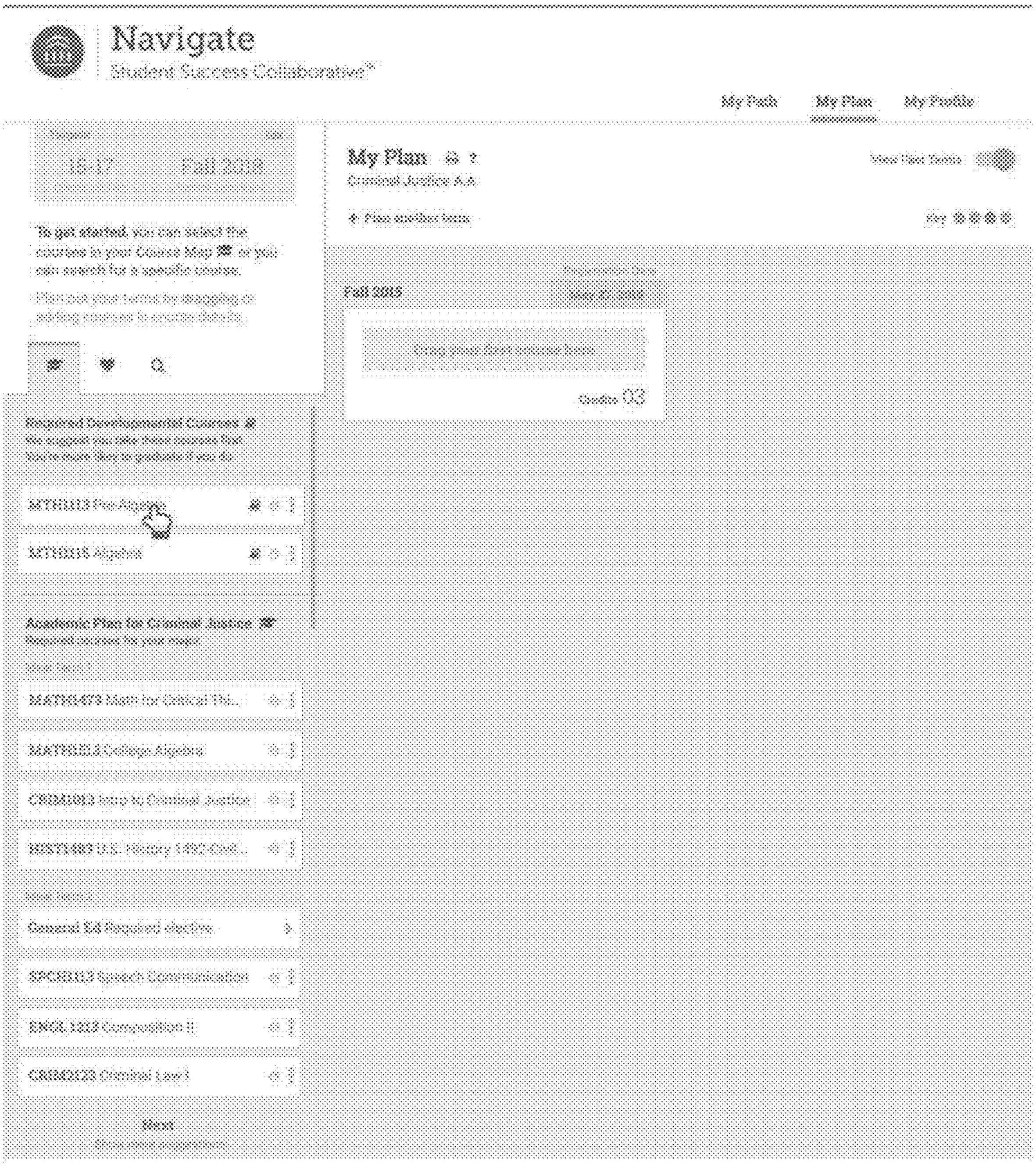
Figure 176:
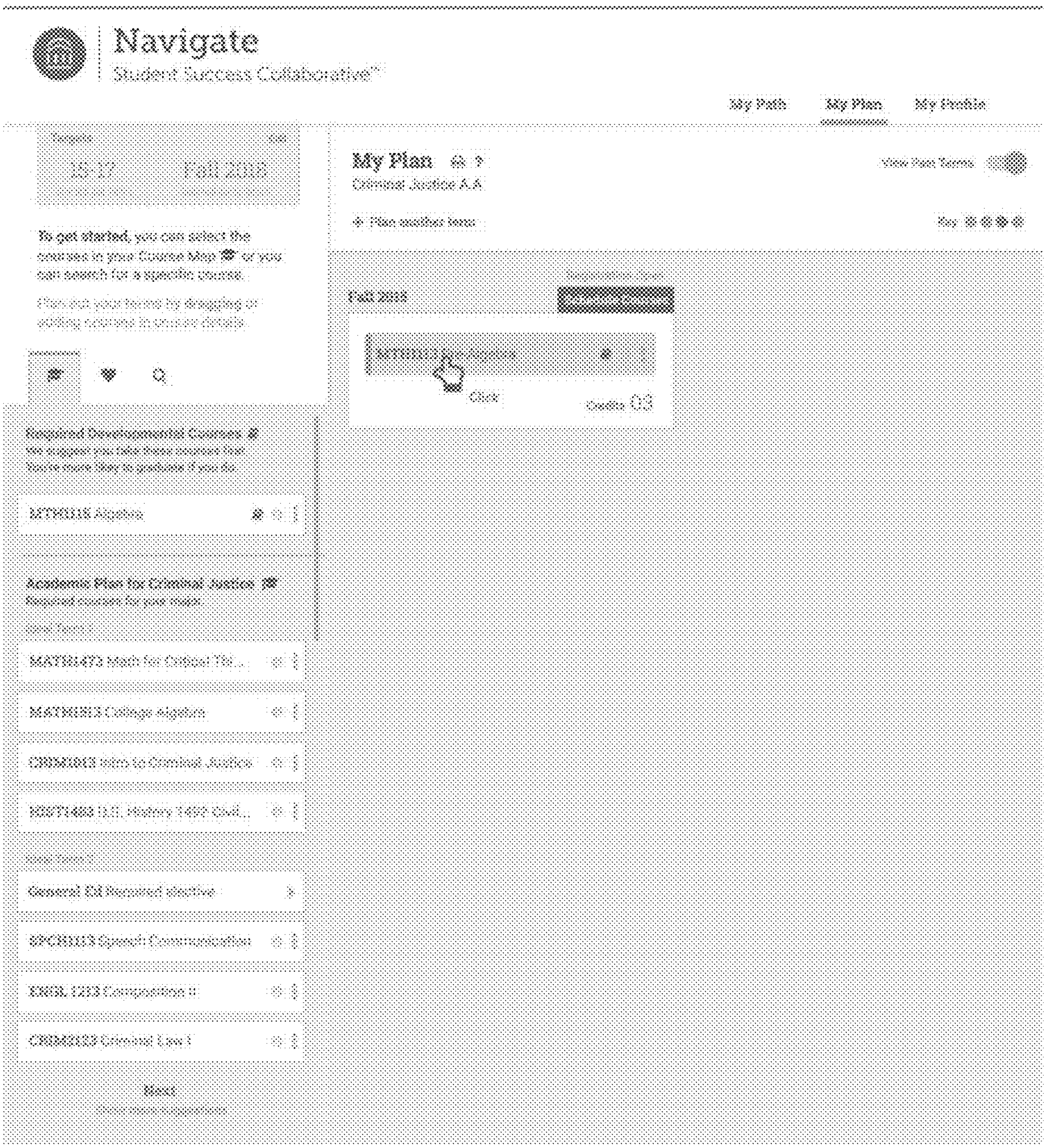

FIGS. 175-176 depict a process of selecting courses for registration on a form for managing a process of academic planning, according to exemplary embodiments of the present disclosure.

Figure 177:
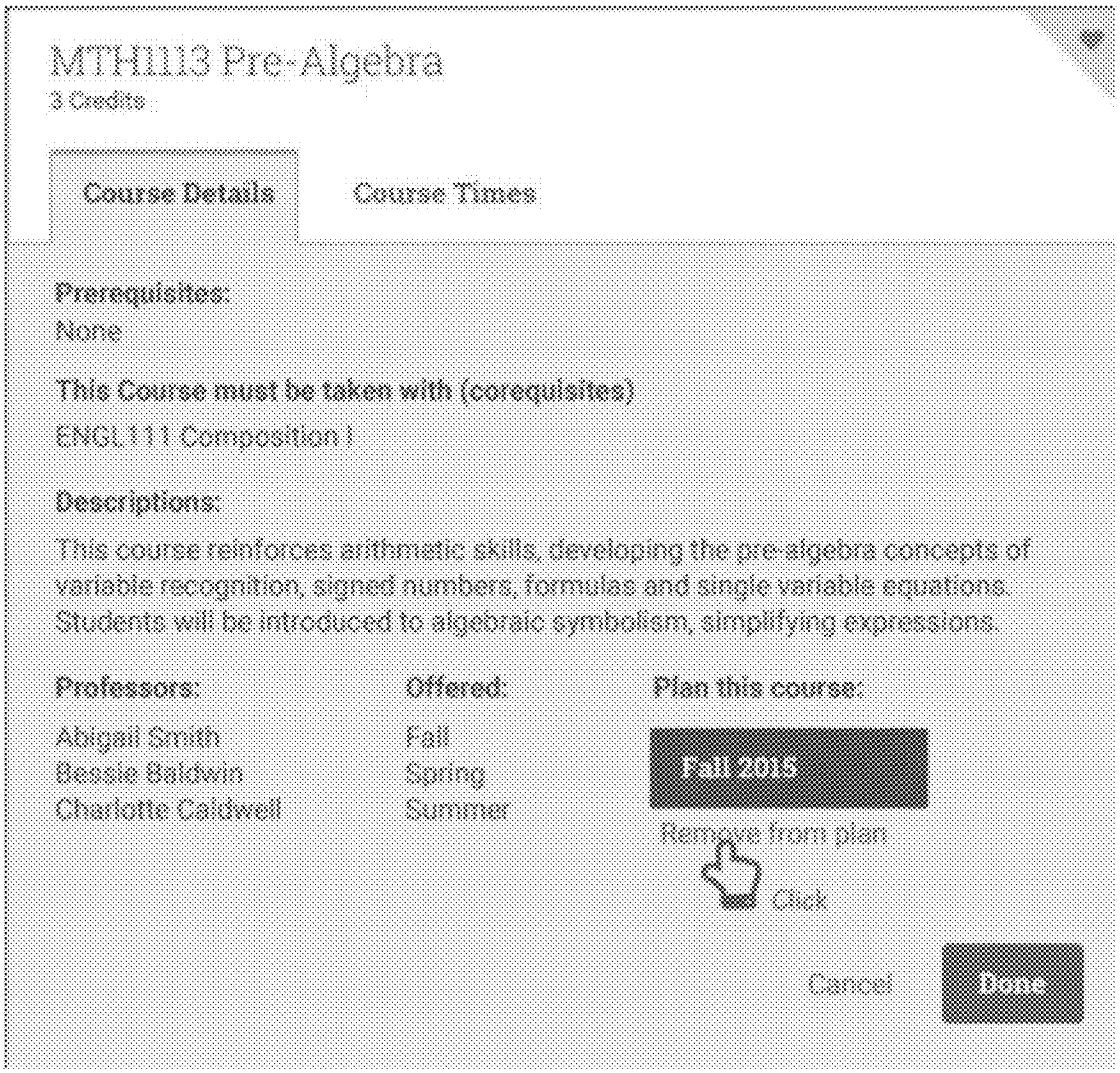
Figure 178:
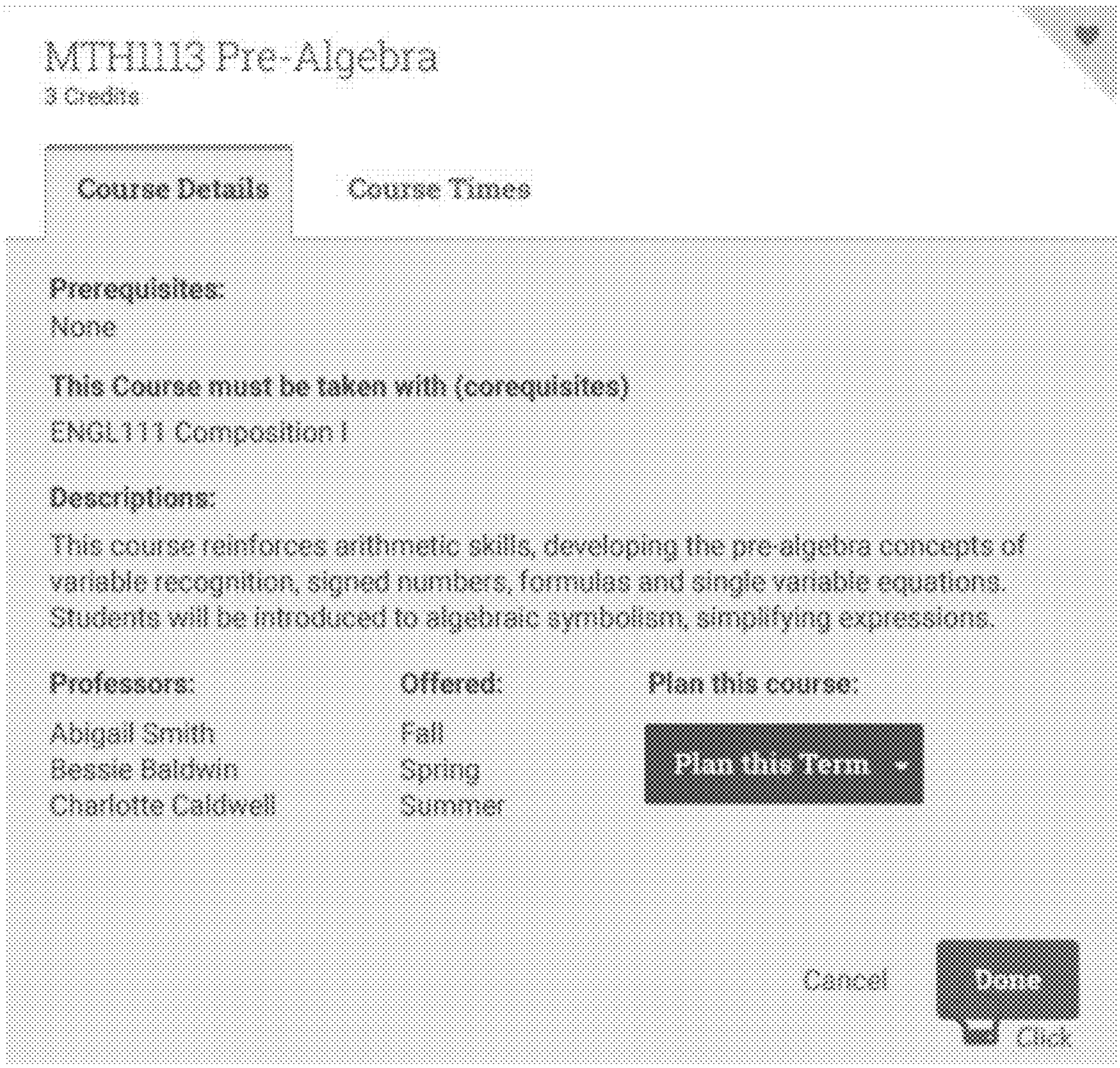
Figure 179:
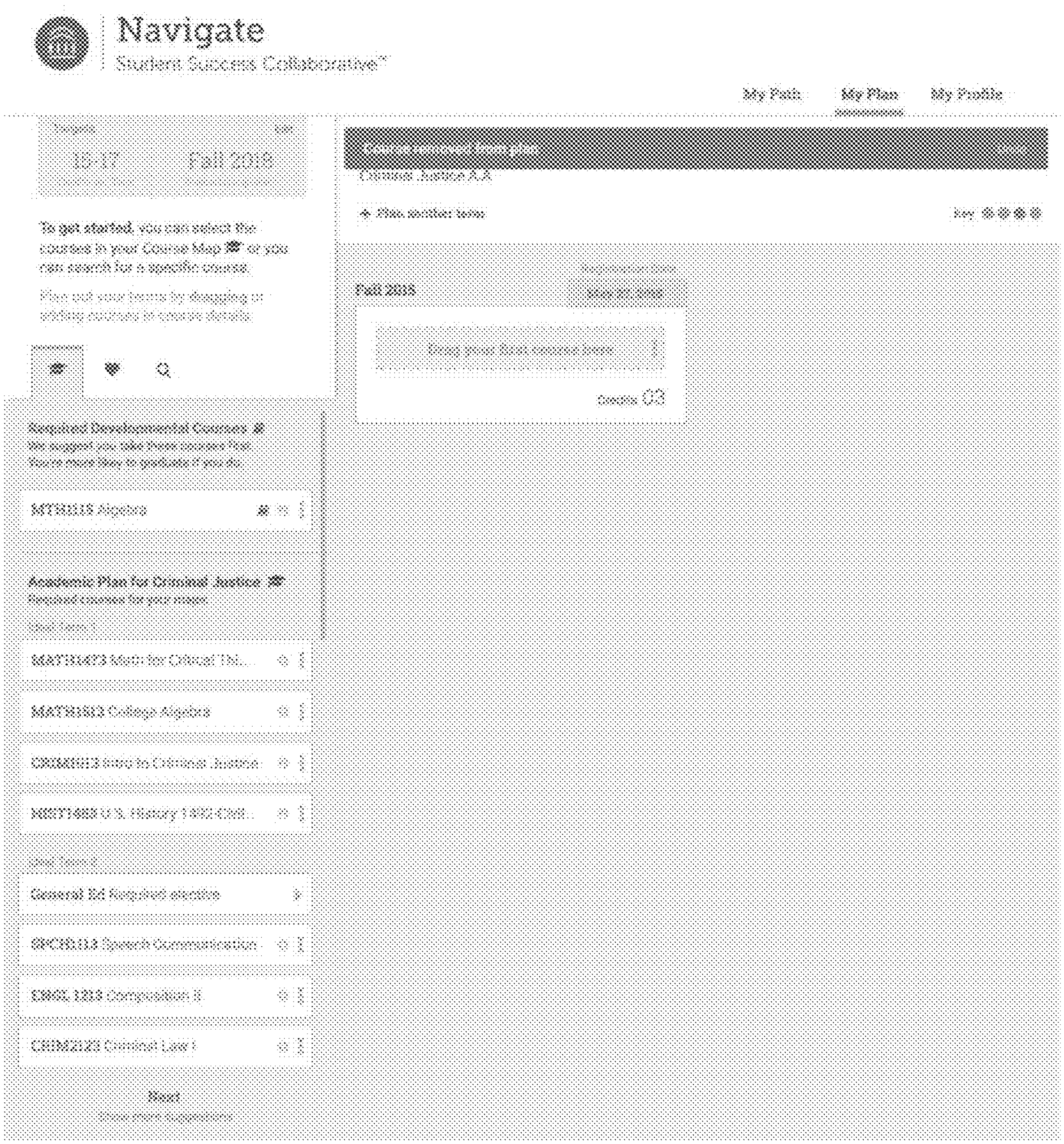

FIGS. 177-179 depict a process of removing a course from a list of planned courses for registration on a form for managing a process of academic planning, according to exemplary embodiments of the present disclosure.

Figure 180:
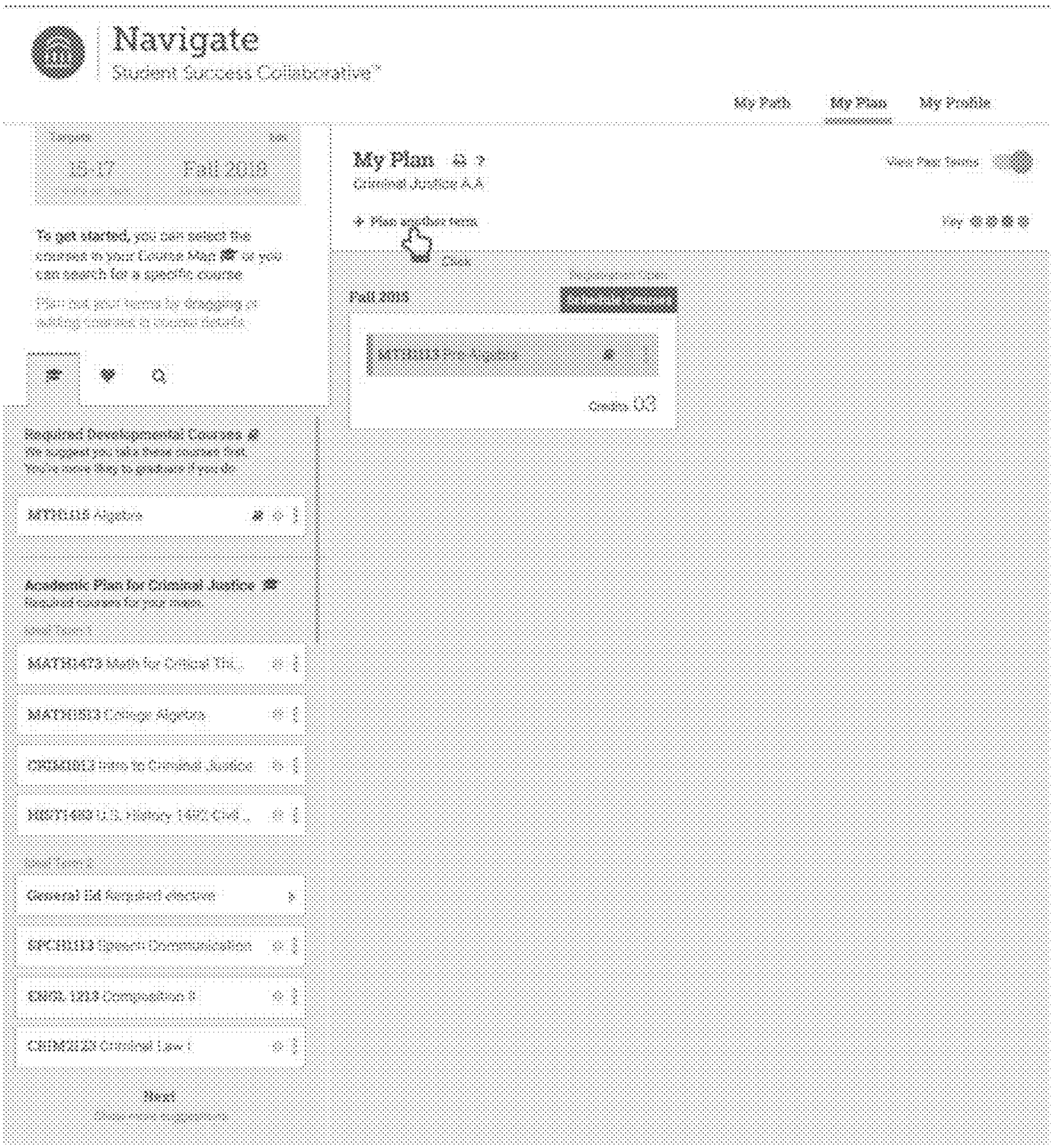
Figure 181:
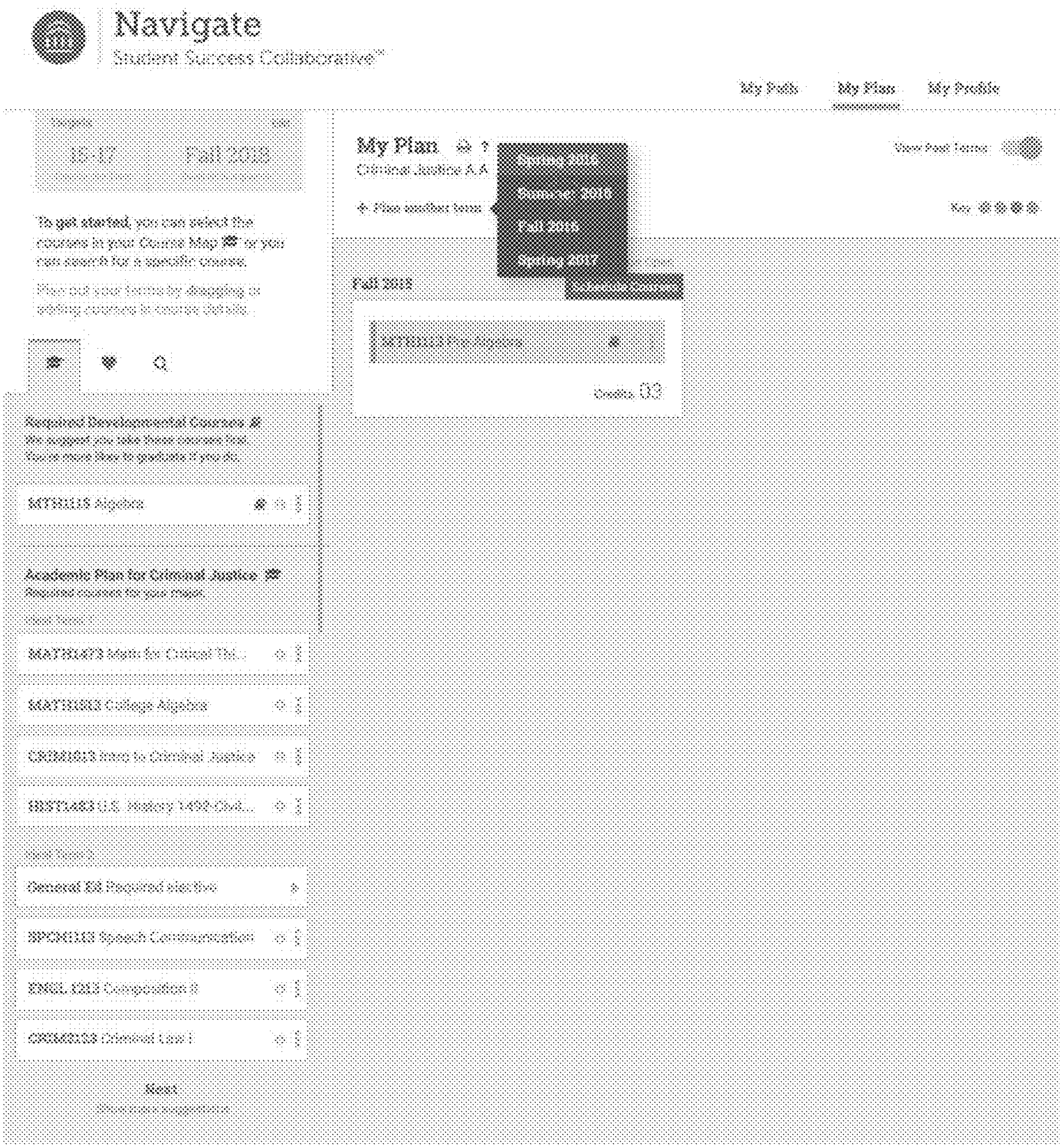
Figure 182:
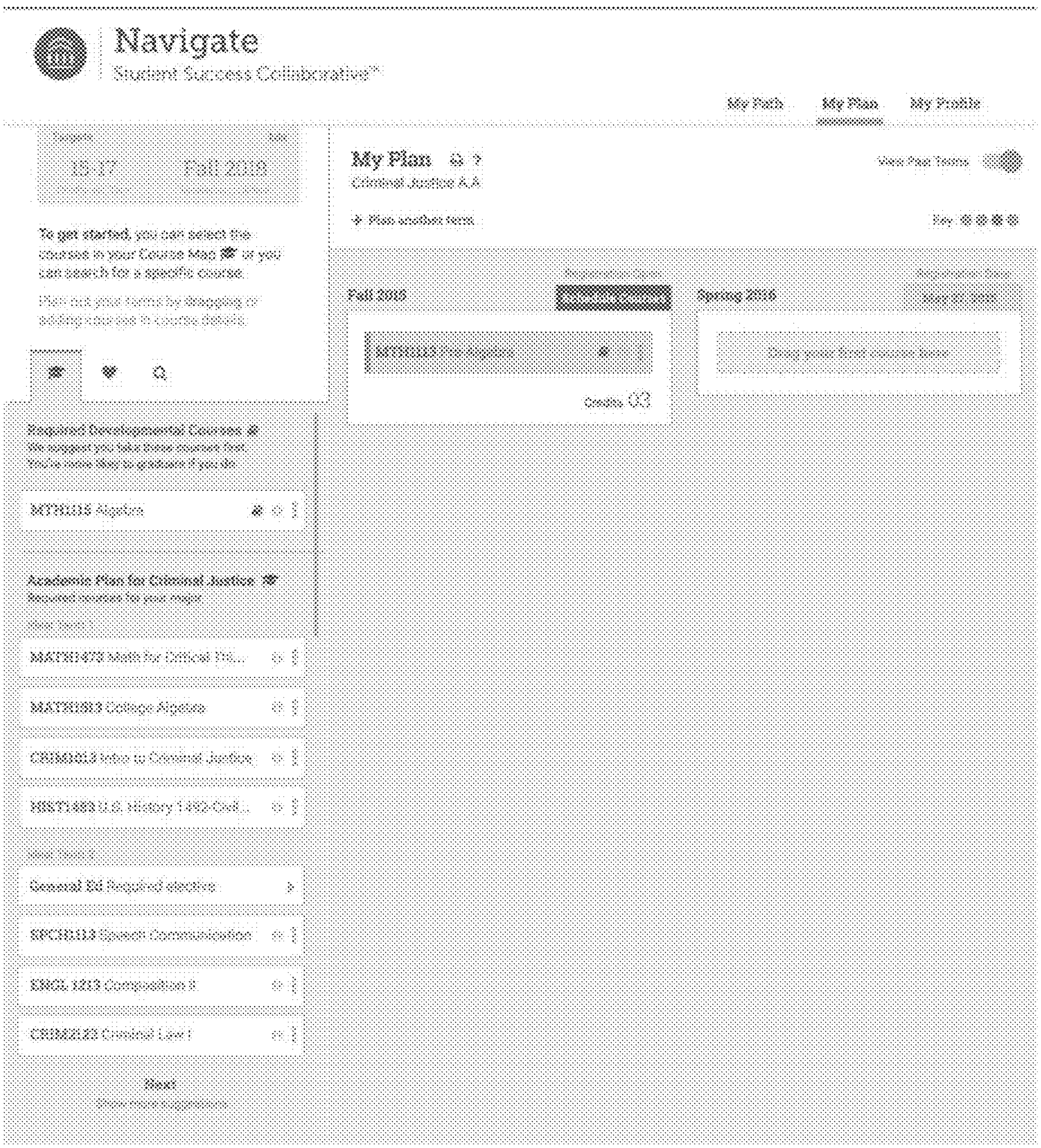

FIGS. 180-182 depict a process of adding an academic term in a form for managing a process of academic planning, according to exemplary embodiments of the present disclosure.

Figure 183:
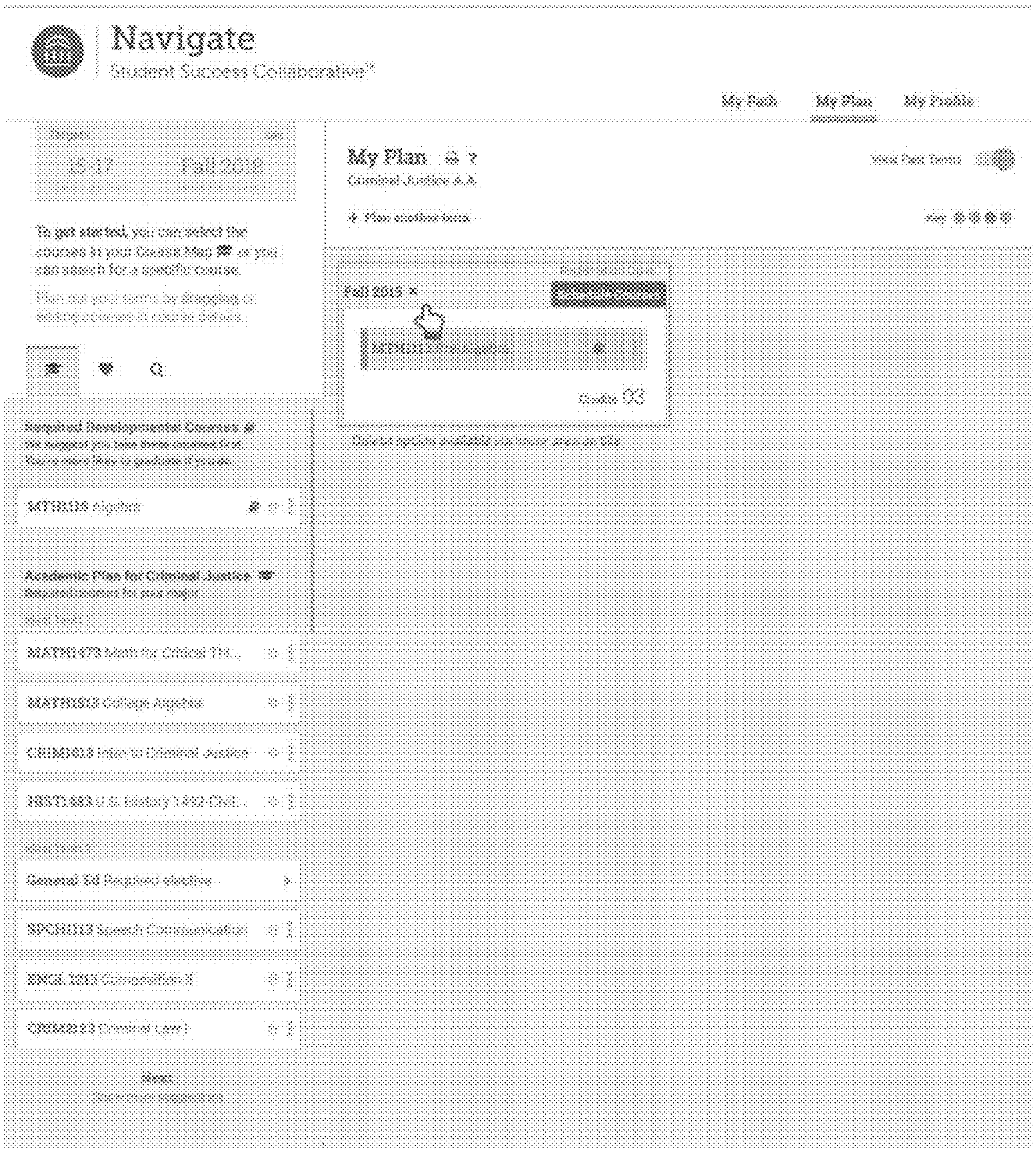
Figure 184:
Figure 185:
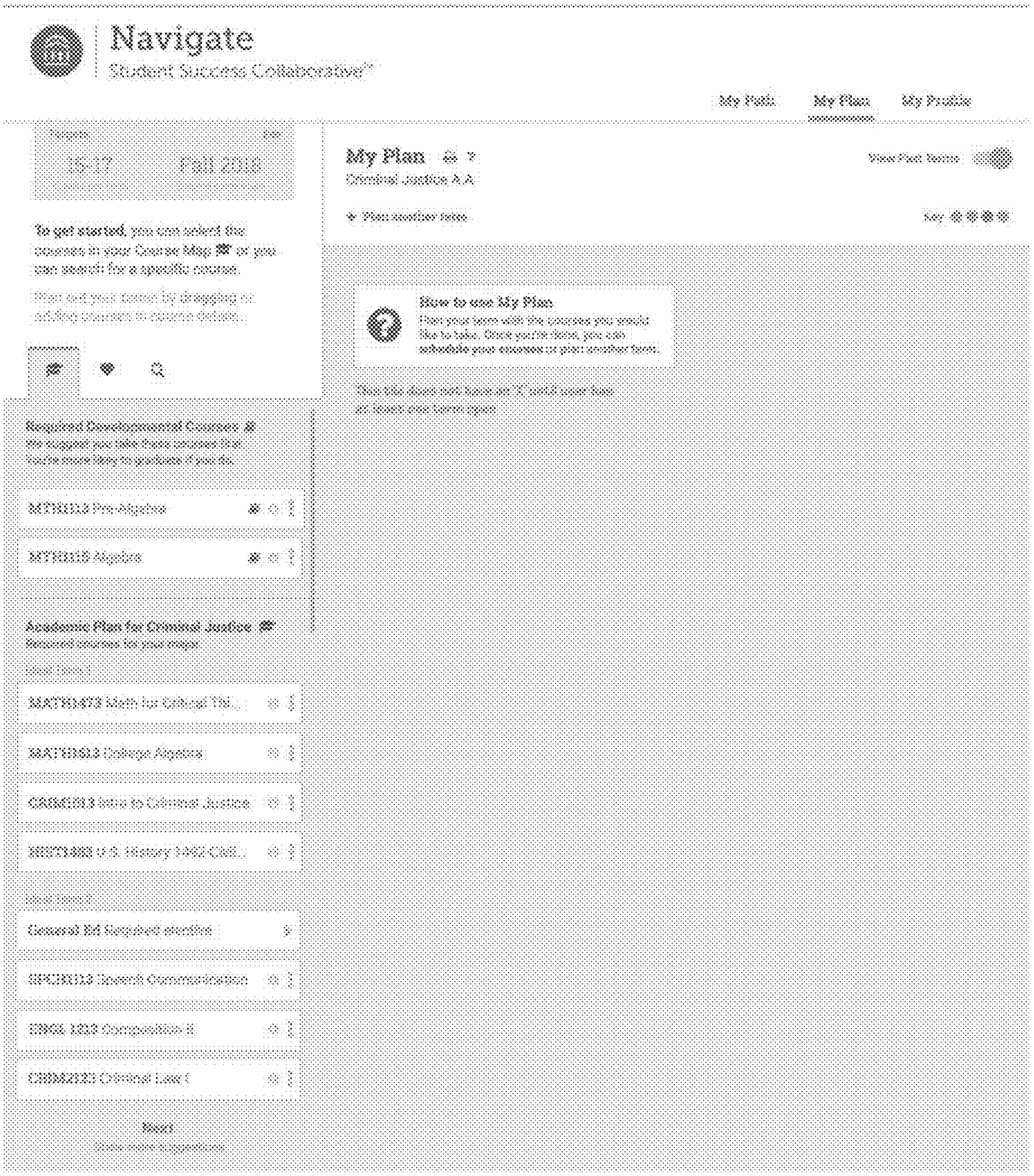

FIGS. 183-185 depict a process of removing an academic term in a form for managing a process of academic planning, according to exemplary embodiments of the present disclosure.

Figure 186:
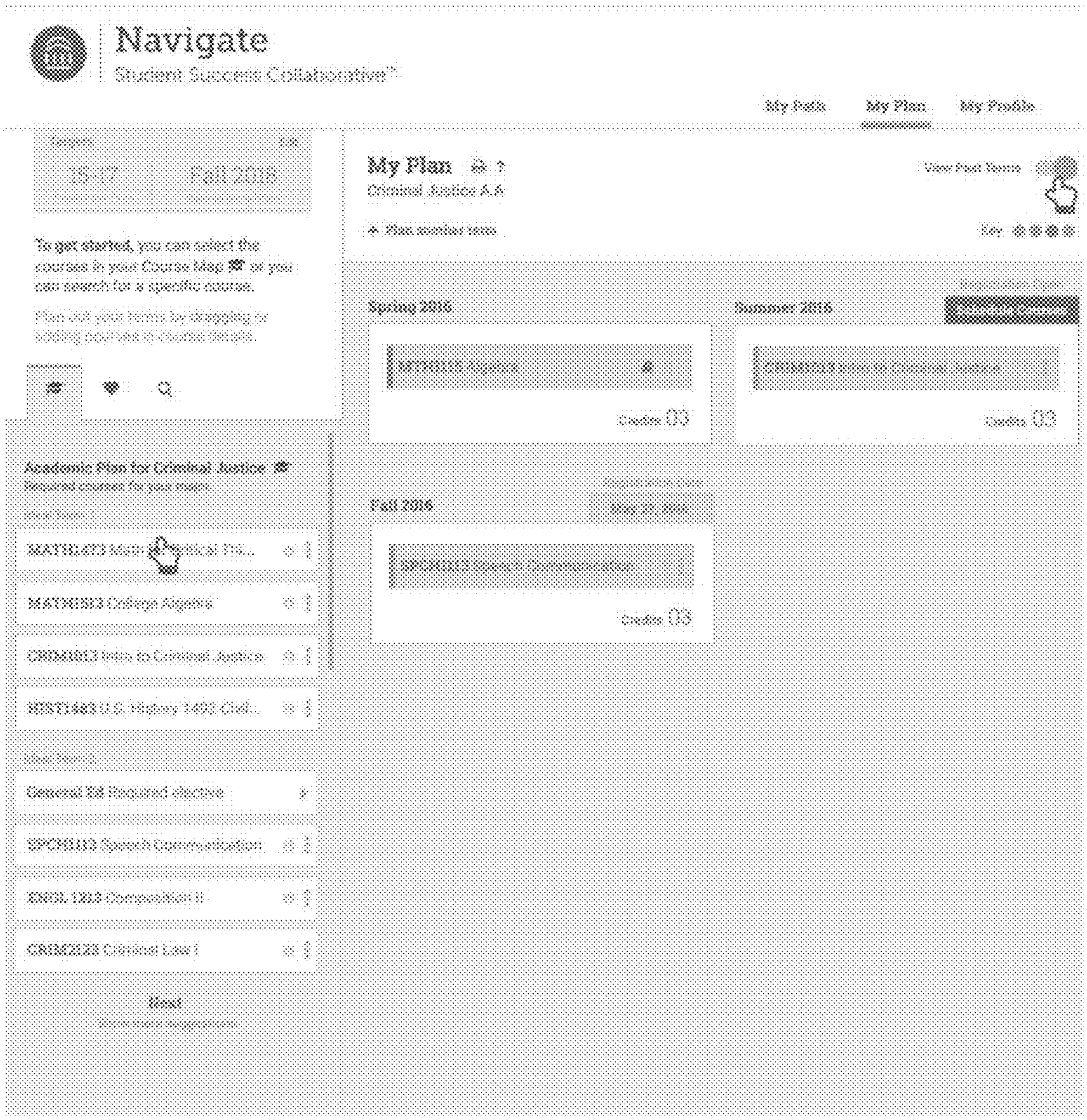
Figure 187:
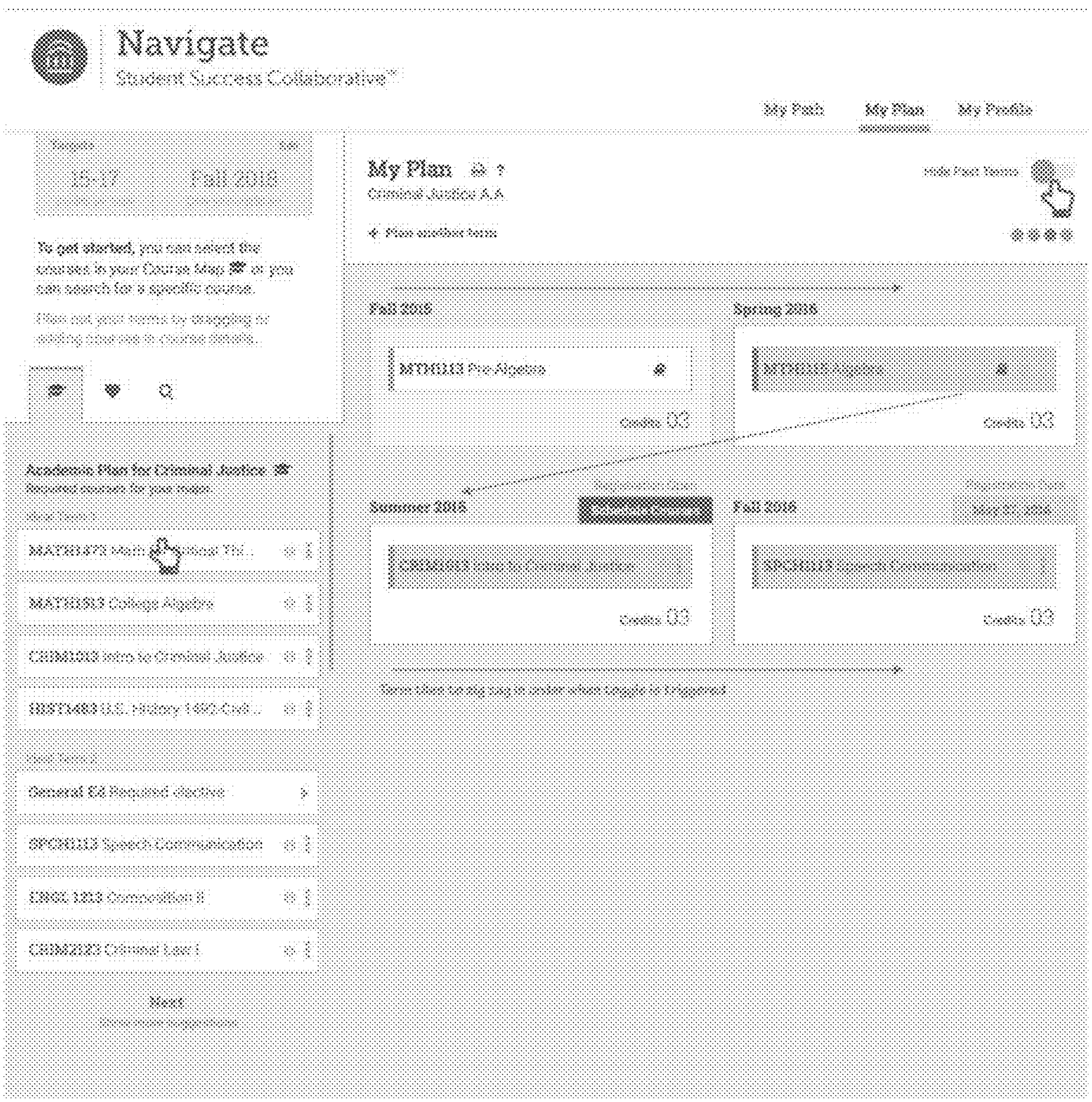

FIGS. 186-187 depict a form for managing a process of academic planning, according to exemplary embodiments of the present disclosure.

Figure 188:
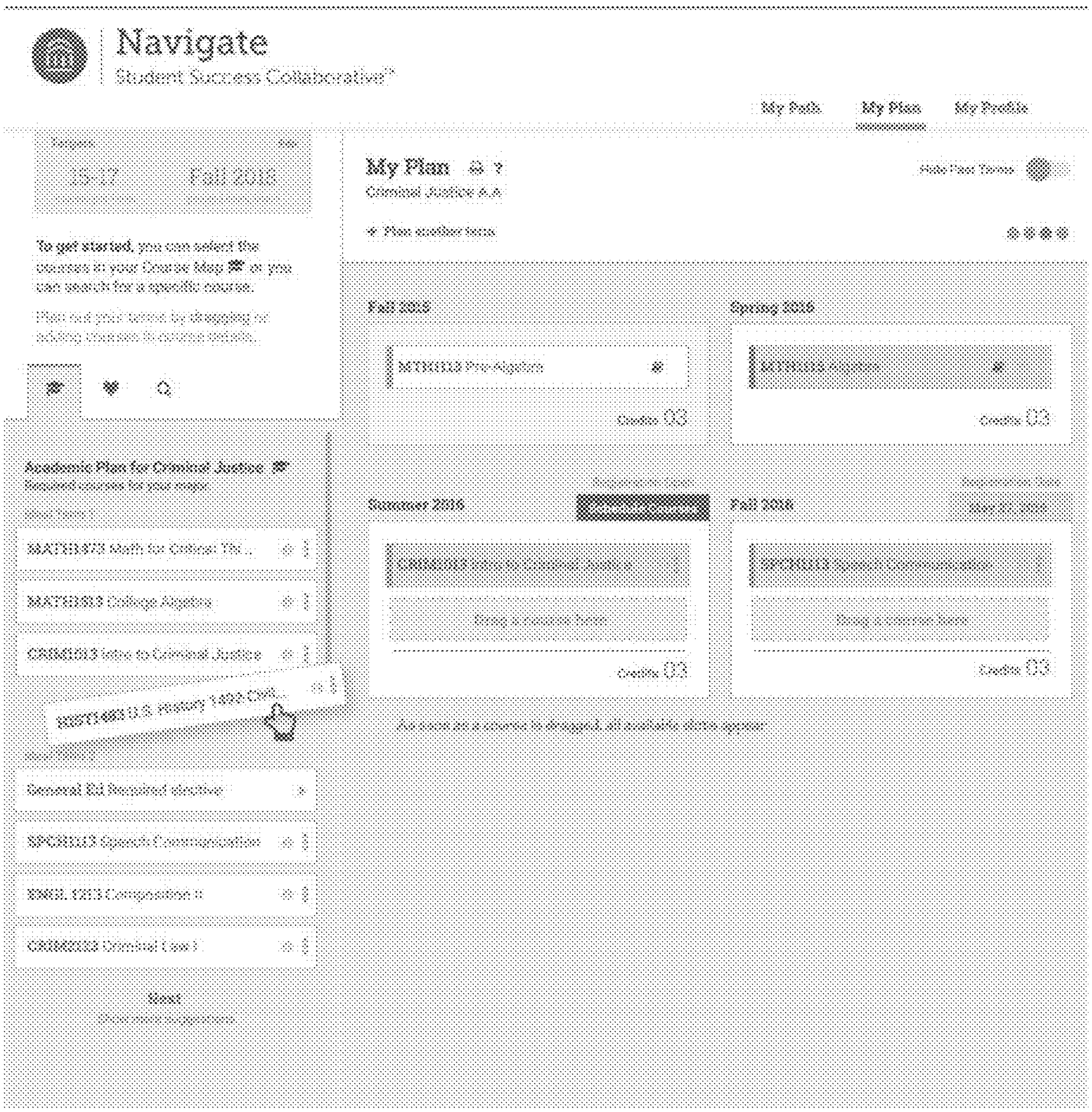

FIG. 188 depicts a process of selecting courses for registration on a form for managing a process of academic planning, according to exemplary embodiments of the present disclosure.

Figure 189:
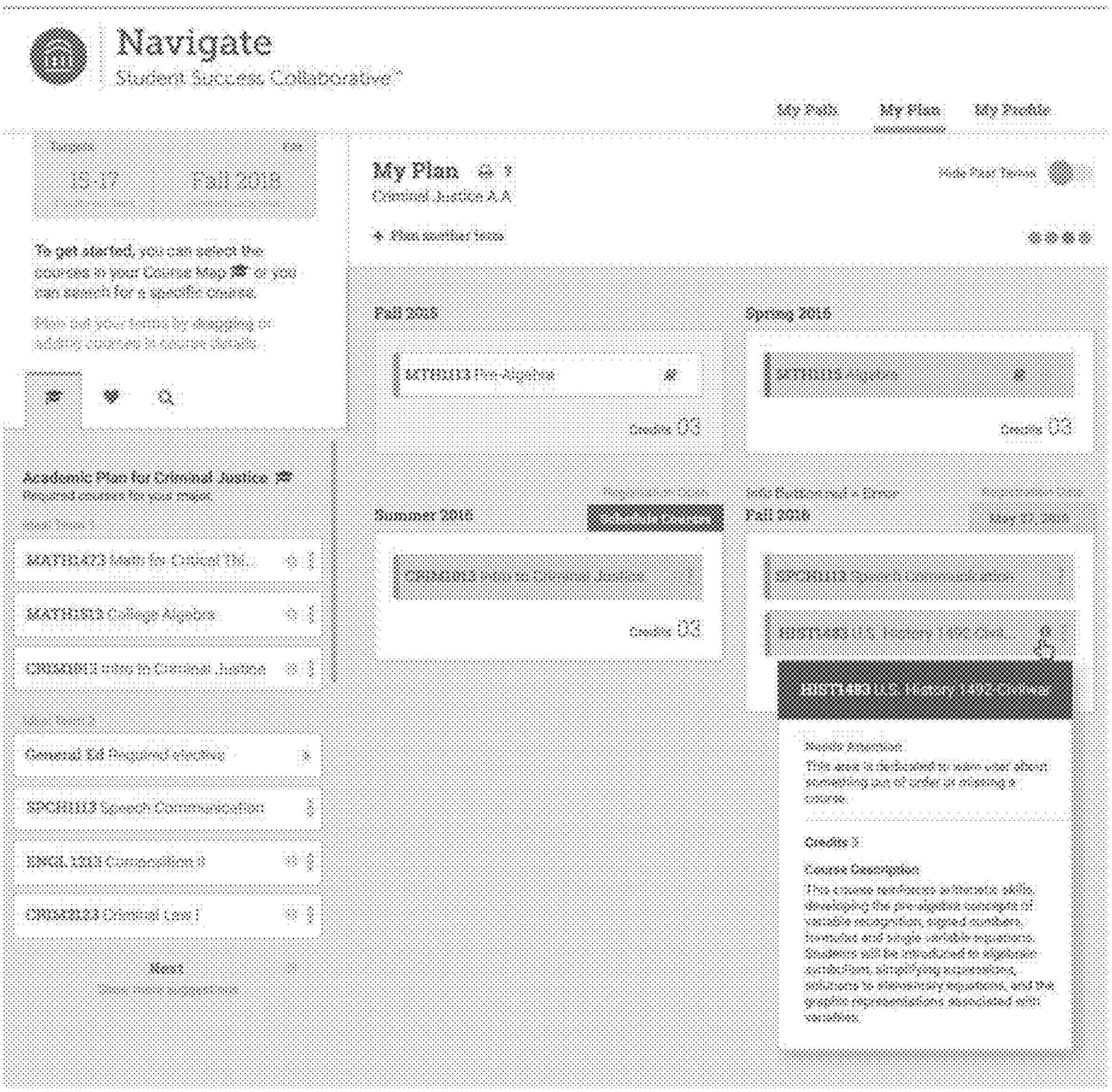

FIG. 189 depicts a form for managing a process of academic planning, according to exemplary embodiments of the present disclosure.

DETAILED DESCRIPTION

Reference will now be made in detail to the exemplary embodiments of the disclosure, examples of which are illustrated in the accompanying drawings. Wherever possible, the same reference numbers will be used throughout the drawings to refer to the same or like parts.

Educational institutions are often not able to identify students in need of help in order to provide assistance because of lack of resources and systems in place. Even if they can identify these students, institutions have been unable to intervene adequately or in a timely manner on behalf of these students, academic advising/counseling and other student support services, such as tutoring, a writing center, financial aid, career counseling, veteran's office, international office.

Such face-to-face counseling is impractical and has many limitations. In many community colleges, students may not be assigned to an individual advisor. Rather, a pool of advisors serves the needs of all students. The student may not have established continuity or a relationship with any one advisor, resulting in poor or inefficient dialogue between the student and advisor. Furthermore, because counseling is highly people-dependent, the sheer ratio of students to advisors (roughly 1,500 students per one advisor in some estimates) makes it impractical and unable to be scaled and unduly taxing on resources for most institutions. As a result, institutions have not been able provide sufficient counseling to their students to provide relevant and timely guidance to their students, particularly guidance related to academic and professional pursuits that could account not only for academic factors, but also for non-academic factors, such as the student's personal conditions, non-academic commitments, and constraints.

Some institutions, not necessarily in the community college space, have provided technology-based solutions, such as conventional, degree and academic planning tools and customer relationship manager (CRM) software, to their students, but this technology merely gathered data from students and matched a program of study based on a recommendation engine. At best, this conventional technology provides minimal curriculum information, a limited view of costs and obligations, and very basic insight for a program of study. It provides no other institutional information, such as administrative to-do lists and reconciliation of personal life factors. Additionally, the conventional technology generates static information that does not change or account for ongoing changes, including changes in student's schedule or personal responsibilities. Moreover, students engage with this technology only at the beginning of their academic careers, or once at most. Finally, many of these technology-based solutions still require significant human invention to be effective, thus not truly alleviating any of the demands for counselor or advisor time. Higher education institutions, particularly community colleges, can benefit from identifying student issues and/or providing comprehensive and meaningful advice frequently and at least before student success is derailed. Accordingly, there is an unmet need in the art to provide students and institutions with a dynamic and responsive tool to improve student success at postsecondary higher education institutions. Specifically, there is a need in the art for a scalable, technology solution to provide empirical data on academic, personal, and professional data based on a plurality of data sources and to provide an ongoing reference tool providing guidance to the student. It is with respect to these general considerations that embodiments of the present invention have been contemplated.

The present invention provides systems and methods related to an electronic, computer implemented workflow technology to enhance or assist with student success at higher education institutions such as, for example, community colleges (also alternatively known as "two-year colleges," "junior colleges," or "associate degree colleges"). The technology (also interchangeably referred to herein as the "student success collaborative system for community colleges (SSC4CC)," "platform," or "tool") collects and records student information, processes such information, and creates an integrated, electronic exchange of information between a plurality of sources. The tool processes data to generate solutions and visual displays to provide students with an accurate, dynamic, and unified pathway for guiding students through processes, milestones, and planning from intake and orientation to graduation or transfer, and throughout their post-secondary education career from term-to-term. Embodiments of the present invention are intended to enhance the student experience at the institution. Generally, embodiments of the invention provide the student with a single, unified source of information related to the student's requirements, obligations, and activities while the student is associated with the institution.

Moreover, some embodiments of the invention are directed to the community college population, including the administration, the faculty, and/or most preferably, the students. Generally, community college students are demographically different from, or distinguishable from, students at four-year institutions. Often they (a) may have jobs, families, and other obligations; (b) may be the first from their families to attend post-secondary educational institutions; (c) may have time between high school and community college; and (d) may have developmental education needs. These are some of the reasons such community college students are deemed "non-traditional" students.

Unlike students at four-year universities, who already have partial or completed student profiles (wherein the profile is built in part through the admission process which collects applications, essays, and high school records such as transcripts) upon entering the institution, students at community colleges generally do not have a profile established at their institutions. Typically, community college students may register with their institutions as a matter of right, through a basic application, primarily requiring identification verification and generally excluding personal, non-factual information. Often institutions do not require a lengthy or in-depth application or narratives or essays. As a result, community colleges typically do not have a great deal of insight into their students' lives, backgrounds, or experiences prior to or at the time of enrollment, or any time in their careers at the institution, for that matter.

The tool, as discussed in embodiments herein, may be able to establish an accurate and current student profile using an interactive format for collecting data (e.g., an intake survey), that would not only describe the student's academic interests, but also provide insight on the student's life experiences, non-academic life, and developmental education challenges. In some embodiments, the data collection aspect of the tool is designed to collect information correlated to the academic success of the student while at the institution. In preferred embodiments of the invention, the tool includes a specialized intake survey focused on three topic areas: Students' Goals, Obstacles, and Incoming Credentials. The Students' Goals area preferably collects information about individual student goals (e.g. transfer, workforce participation or salary requirements, credential obtainment), student expected timeframe for credentialing, and subject areas of interest. The Student Obstacles area preferably collects information about their life outside of academics such as time commitments to work and family as well as hours spent commuting to campus. The Incoming Credentials area preferably collects information about incoming credentials, remedial education needs, and intent to apply for financial aid.

Once the student intake information is received, the tool can process such information, preferably in view of, or in combination with, any other data on or related to the student, to generate customized and automated content, including program recommendation functionality, a course recommendation functionality, a scheduling functionality, one or more optimization functionalities, and a deadline and obligation calendaring and notification functionality.

The tool satisfies the needs in the art, in some embodiments, by centrally locating institutional, academic and non-academic considerations, including student responses (i.e., student input data), and external outcomes data, in a student-facing, electronic application or device. In preferred embodiments, the tool may serve as a self-advising mechanism for the user. The tool can direct information and feedback from the institution and third-party sources to provide a comprehensive view of the student's academic and non-academic life. The tool may allow the student to use a single unified system to identify issues (e.g., upcoming deadlines), resolve issues, stay informed of processes at the institution, develop resources, and organize his/her paths.

The tool includes multiple pillars and modules, each of which is intended to assist the student by providing reliable, personalized and timely information, processing complex data which may come from multiple sources, and prompting subsequent actions, as necessary. Each pillar module may be provided in an application or program, or in conjunction with one or more pillars and modules. In instances in which the tool is comprised of multiple applications or programs, such applications and programs are preferably communicably linked. For example, each of the modules and pillars may be accessible in one or more applications (also known as "app" or "apps," software, or systems).

Embodiments of the present invention are directed to and/or may be used by, a user, who is commonly referred to as a "user," "student," "prospective student," or "candidate" (interchangeably referred to herein as "user" or "student"), attending, enrolled in, or more broadly affiliated with, an institution. Attendance in the institution generally includes a period: (i) in which the student is enrolled in classes; (ii) any time after acceptance in the institution independent of whether the student is enrolled in a class; or (iii) after registration, acceptance, and/or enrollment in the institution until a departure event, such as graduation or transfer. Affiliation with the institution may include the period between recruitment and a termination date (e.g., graduation, transfer). Accordingly, depending on the institution, the tool may be provided to students upon, concurrently with, or any time after, acceptance or registration with the institution. In some embodiments, the tool may be provided to a user prior to intake, such as the period directed to prospective students (e.g., recruits), who have not enrolled or been accepted to the institution. In certain embodiments, the tool may be used by an advisor or other person associated with the school or student, such as a parent, a counselor, an advisor, a faculty member/teacher, an administrator, a consultant, or another staff member.

Figure 1A:
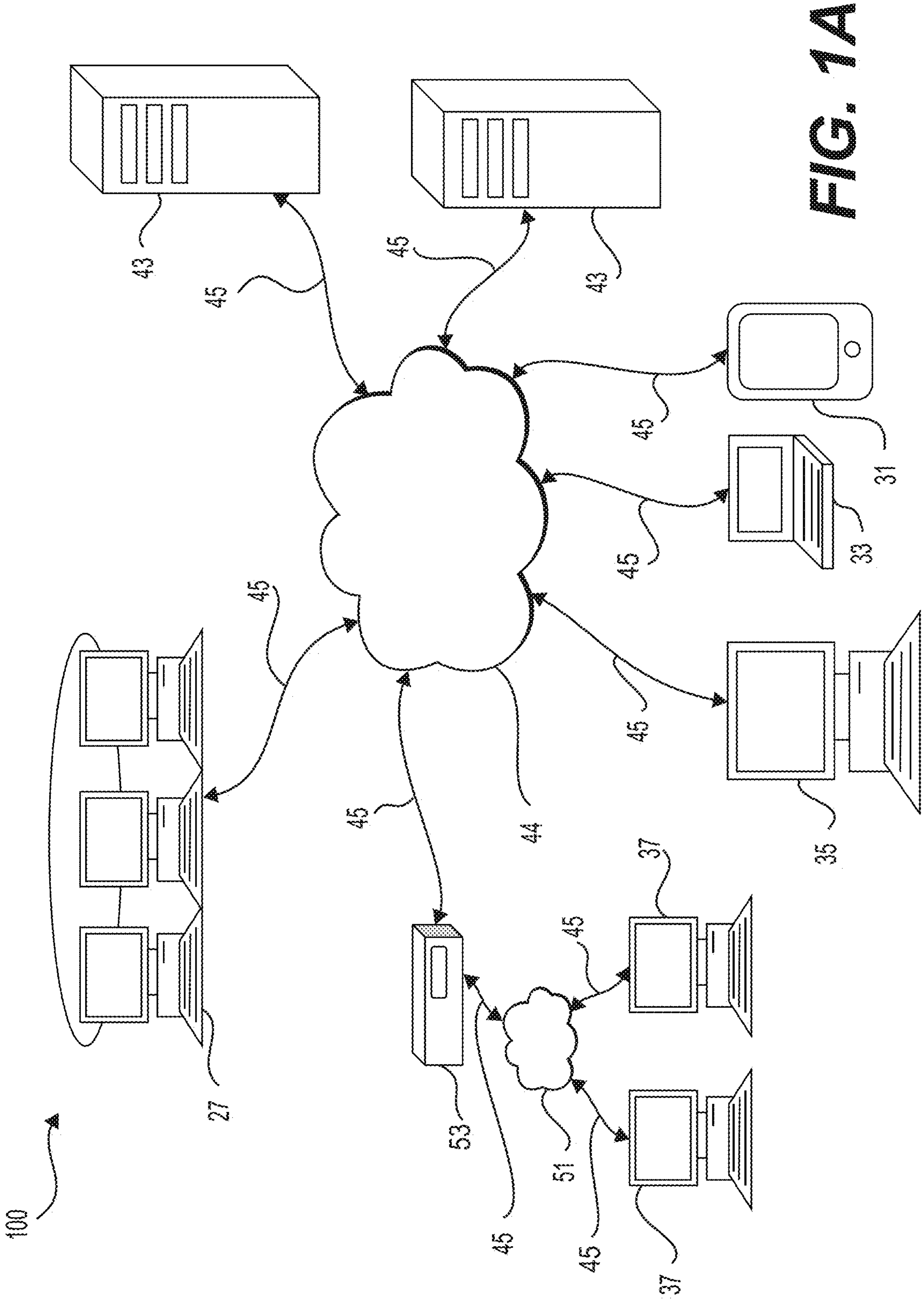
FIG. 1A illustrates exemplary system, wherein end user devices and the system are functionally interconnected through an electronic network, in accordance with one or more embodiments of the present invention.

FIG. 1A illustrates a network in which an exemplary embodiment of the present invention may operate. The network may include any type of interconnected computer technologies and/or devices (including mobile devices (e.g., smartphones), computers, and other hardware having a processor and a repository for data or connection to a repository for maintained data) (interchangeably referred to herein as "computers"). The network may be public or private, or a hybrid thereof. The network may include conventional network backbones, long-haul telephone lines, internet service providers, routers, switches, and other means for routing data/information between computers. The network connections would be understood to one skilled in the art, and may include wired, wireless, or fiber optic connections. Computer networks would be well known in the art, including, for example, a local area network (LAN), wide area network (WAN), personal area network (PAN), near me area network (NAN), home area network (HAN), storage area network (SAN), campus area network (CAN), metropolitan area network (MAN), backbone network, enterprise private network, virtual private network (VPN) or any combination thereof. In embodiments, the systems and methods disclosed herein may also be performed using a distributed computing network, or a cloud network. Networks may include near field communication (NFC) and Bluetooth network standards. Another network, and the preferred network as noted above, is the Internet.

Computers may communicate using communications hardware and/or software 45 through conventional means, such as through one or more network protocols (e.g., TCP/IP) to a plurality of servers, clients or terminals 27, 31, 33, 35, 37, 43. In this network architecture, a server computer system 100 and terminals 31, 33, 35 are directly coupled to a WAN (e.g., Internet) 44. Terminals 27 may represent a conventional modem pool. Terminals 37, which form a sub-network 51, such as a LAN, represent an alternative connection to the WAN via a gateway 53. In this manner, terminals can communicate with one another through the LAN or with server 43 through the gateway 53 via the WAN 44.

Information may be input via a terminal (also referred to as "device"), such as a microcomputer, personal computer (PC) 35 (e.g., desktop), portable personal computer 33 (e.g., notebook, laptop, netbook, minicomputer), server or mainframe computer 43, ultraportable device 31 (e.g., telephone or smartphone device, personal digital assistant (PDA), tablet, gaming console, or other device having a processor and input capability).

In a particular implementation of this network configuration, a server computer 43 may operate as a web server if the Internet's World-Wide Web (WWW) is used for wide area network 44. Using the HTTP protocol and the HTML coding language across wide-area network 44, web server 100 may communicate across the World Wide Web with terminals 27, 31, 33, 35, 37. In this configuration, terminals 27, 31, 33, 35, 37 use a client application program known as a web browser such as the Internet Explorer (Microsoft Corporation, Redmond, Wash.) or the web browser, executable program or HTML renderer of any other supplier. Using such conventional browsers and the World Wide Web, terminals 27, 31, 33, 35, 37 may access image, graphical, and textual data provided by web server 43 or they may run Web application software. Conventional means exist by which clients 27, 31, 33, 35, 37 may supply information to web server 43 through the Worldwide Web 110 and the web server 43 may return processed data to terminals 27, 31, 33, 35, 37.

Figure 1B:
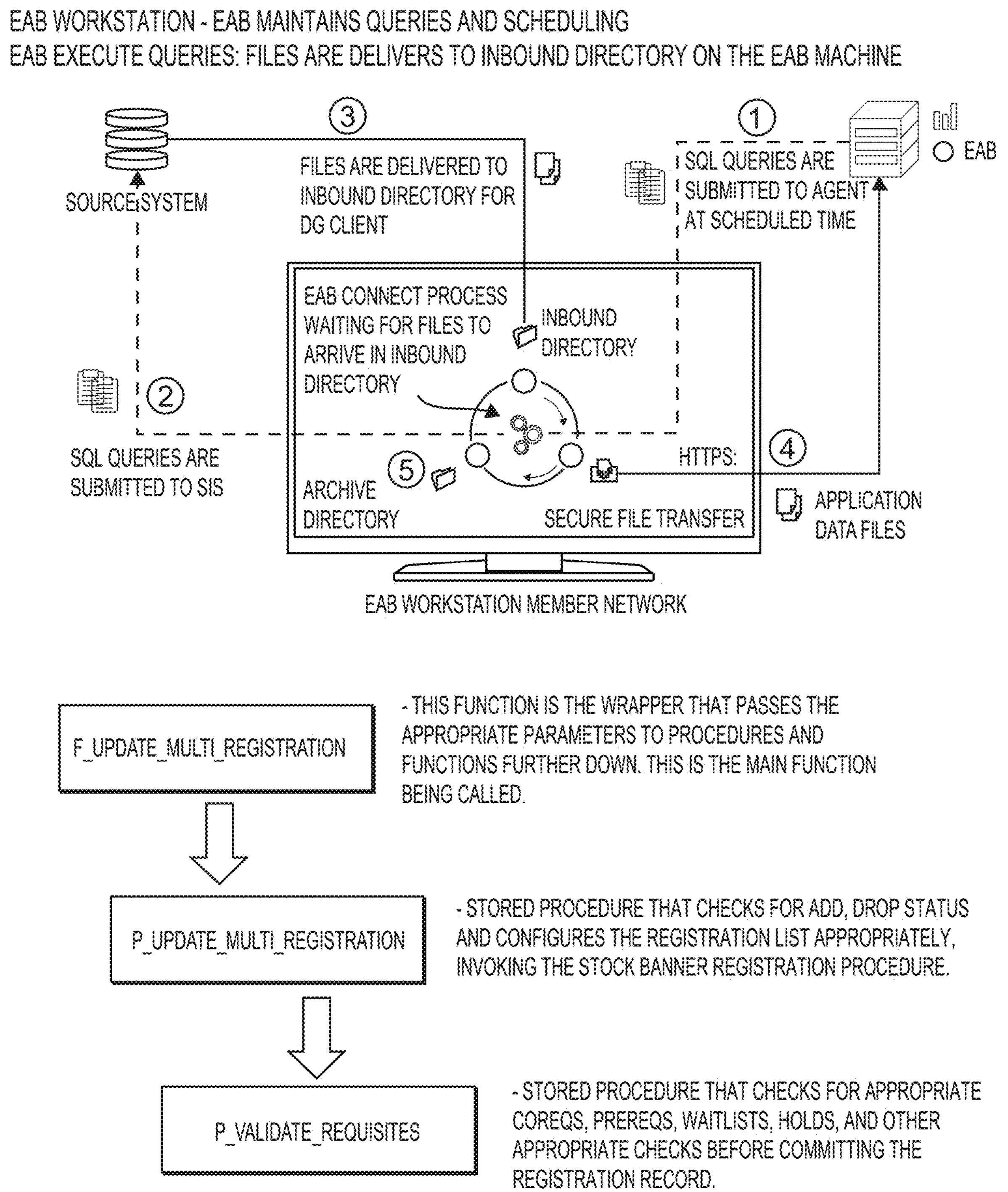
FIG. 1B depicts a computing system environment for executing a method of managing a process of academic planning and depicting information flow between modules implementing portions of a method of managing a process of academic planning, according to exemplary embodiments of the present disclosure.

FIG. 1B depicts a computing system environment for implementing exemplary embodiments of the present disclosure. When initially configuring system 100, a technology audit may be performed of university systems. Types of data interfaces, databases, and data formats may be determined. For example, it may be determined if the existing university system uses a Structured Query Language (SQL) interface. Accordingly, a SQL module may be enabled which Formatting and type of student data may be determined. As shown in FIG. 1B, the computing system environment may include a workstation (or EAB Workstation), a source information system (SIS) and an EAB server. The SIS may correspond to one or more university servers and/or databases. The EAB server, along with the workstation, may work together and/or independently to execute techniques presented herein. SQL queries may be transmitted to the SIS, for example, at scheduled times. Files from the SIS in response to SQL queries, such as flat files, may be provided to an inbound directory of the workstation. Application data files may be transferred from the workstation to an EAB server by secure file transfer such as, for example HTTPS. The workstation may run an EAB Connect process which may wait for files to arrive in the inbound directory. The EAB workstation may also maintain an archive directory. Based on the student data retrieved from the SIS, the dynamic student path and scheduling tools may be configured for use.

As further shown in FIG. 1B, an upper-level function may act as a wrapper to pass parameters to lower-level procedures and functions. For example, a procedure that configures a registration process may check add and drop status and configure a registration list. Such a procedure may invoke one or more lower-level procedures to validate registration parameters such, for example, as corequisites, prerequisites waitlists, holds, etc. before committing a registration record.

Figure 2:
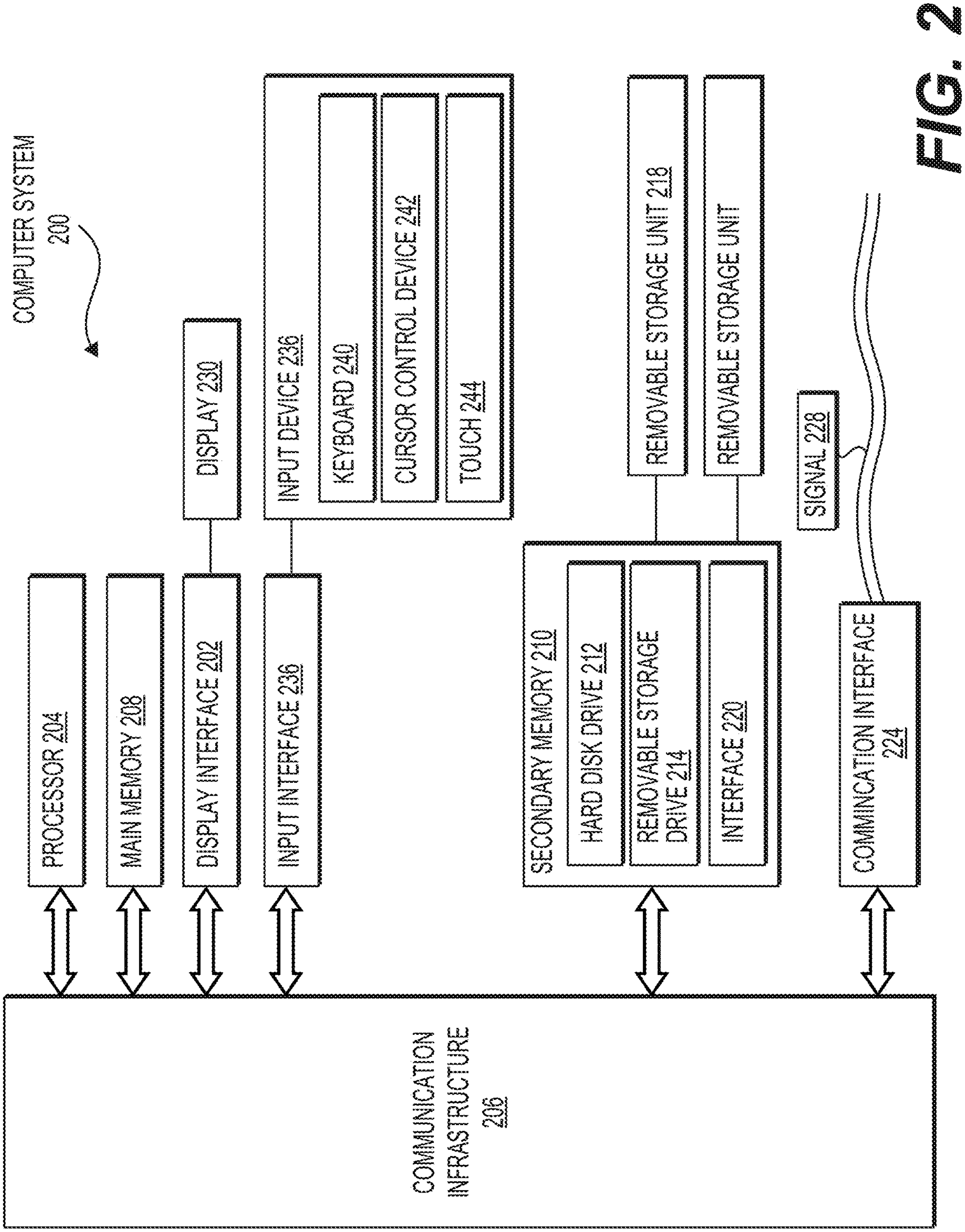
FIG. 2 illustrates exemplary system architecture, in accordance with one or more embodiments of the present invention.

FIG. 2 illustrates an exemplary computer system (or "operating environment") 200. Various software embodiments are described in terms of this exemplary computer system. After reading this description, it will become apparent to a person skilled in the relevant art(s) how to implement the invent ion using other computer systems and/or architectures. This exemplary system is not intended to suggest any limitation as to the scope of use or functionality. Other well-known computing systems, environments, and/or configurations that may be suitable for use include, but are not limited to, personal computers, server computers, tablet, hand-held or laptop devices, multiprocessor systems, microprocessor-based systems, programmable consumer electronics such as smartphones (e.g., The iPhone®, by Apple, Inc., Cupertino, Calif.), network PCs, minicomputers, mainframe computers, distributed computing environments that include any of the above systems or devices, and the like. Accordingly, Computer System 200 may be terminals 27, 31, 33, 35, 37 and server 43.

As shown in FIG. 2, computer system 200 includes one or more processors, such as processor 204. The processor 204 is connected to a communication infrastructure 206 (e.g., a communications bus, cross-over bar, or network). Computer system 200 can include a display interface 202 that forwards graphics, text, and other data from the communication infrastructure 206 (or from a frame buffer not shown) for display on the display unit 230 (e.g., a CRT or LCD display). The display unit 230 may display information (e.g., text, video, graphical depictions) via a GUI to a computer user. Computer system 200 can further include an input interface allowing a user to input commands (text or graphical user interface commands, for example) via a cursor control device (e.g., a mouse), a keyboard for alpha-numeric input, or touch-based system (e.g., capacitive touch or general touch screen device, which may be functionally linked to the display unit 230).

Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, flash media, cloud storage device, etc. The removable storage drive 214 reads from and/or writes to a removable storage unit 218 in a well-known manner. Removable storage unit 218, represents a floppy disk, magnetic tape, optical disk, f lash media, cloud storage device, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other executable instructions to be loaded into computer system 200. Such devices may include, for example, a removable storage unit 222 and an interface 220. Examples of such may include a program disk/cartridge and cartridge/disk interface (such as that found in dedicated video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Additionally, computer system 200 may include a communications interface 224. Communications interface 224 allows software and data to be transferred between computer system 200 and external devices. Examples of communications interface 224 may include a modem, a network interface (such as an Ethernet card or wireless access card or point or hotspot, Token ring, etc.), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. The computer system 200 may be coupled to a number of servers 43 and/or other terminals 27, 31, 33, 35, 37 via a conventional network infrastructure, such as the infrastructure illustrated in FIG. 1A and described above.

In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products and computer implemented processes.

Computer programs (also referred to as computer control logic) are stored in main memory 208 and/or secondary memory 210. Computer programs may also be received via communications interface 224. Such computer programs, when executed, enable the computer system 200 to perform the features of embodiments of the present invention, as discussed herein. In particular, the computer programs, when executed, enable the processor 204 to perform the features of embodiments of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software. Additionally, the system of the various embodiments includes software, information processing hardware, and various processing steps, which will be described below. The features and process steps of the various embodiments may be implemented in machine or computer executable instructions. The instructions can be used to cause a general purpose or special purpose processor, which is programmed with the instructions to perform the steps of the various embodiments. Alternatively, the features or steps of the various embodiments may be performed by specific hardware components that contain hard-wired logic for performing the steps, or by any combination of programmed computer components and custom hardware components.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. Aspects of the present disclosure may be embodied as a system, method, or computer program product. Any combination of one or more computer readable medium(s) may be utilized.

While various embodiments will be described with reference to the Internet, the method and apparatus described herein is equally applicable to other network infrastructures or other data communications systems, as discussed above. Various embodiments are described as implemented in computer-implemented processing logic denoted herein as the "software." As described above, however, the claimed invention is not limited to a purely software implementation.

The tool may be provided on an electronic, computer-implemented medium, such as a webpage, through a native application or through a browser. The tool may be accessed on a traditional computer or a mobile device. The tool can access an institution's enterprise resources planning (ERP) system or its student information system (SIS), which may be operated as a proprietary or open platform by each institution to manage student data. As would be understood by one skilled in the art, the SIS may consist of a database of student-related records, admission information, recruitment information, financial aid information, and other data relating to the institution's students and services.

Furthermore, the tool and other systems (such as the institution's or third party's computer systems) may communicate through (1) a real-time or near-real-time bidirectional exchange of data, such as through application programming interface (API), which may provide two-way, read and write capabilities; (2) unidirectional batch extracts, which would allow data to flow out of the computer system to the tool; or (3) a combination thereof.

The tool is generally designed to provide institutional information, third party information (e.g., job placement, student and academic resources, etc.) and student-specific information to the student. The information transmitted may include personally-identifiable information (PII), or information that may be deemed private and/or confidential. Transmission may be governed by and/or compliant with applicable laws, such as the Family Education Rights and Privacy Act (FERPA). Embodiments of the present invention may utilize any privacy and security measures to be compliant with such laws, including but not limited to encryption, user validation, and secure access. For example, in many embodiments of the invention, the tool may provide a welcome interface, which requires validated, student-specific credentials, such as a login and/or password. In variations, the credentials for the tool are consistent with, the same as, or integrated with the single sign on credentials for other aspects of the institution.

The tool may serve as an intake, onboarding, and academic planning resource. As primarily used herein, the terms "intake" and "onboarding" may have the same meanings in some contexts, and may refer to the period beginning with acceptance and the first day of class or first day of a term (e.g., semester, quarter, etc.). It is contemplated, however, that "intake" and "onboarding" could have varying meanings in the art. For example, "intake" may refer to the procedural process for new students, while "onboarding" may relate to navigation through the institutions processes, such as registration and enrollment. In one variation, intake may begin before acceptance. In another variation, intake and onboarding cover the period from acceptance to 120 days, or preferably 60 to 90 days from acceptance. The distinction between the terminology, however, has no effect on the scope of this disclosure or the functionality of the tool, as discussed herein.

Figure 3A:
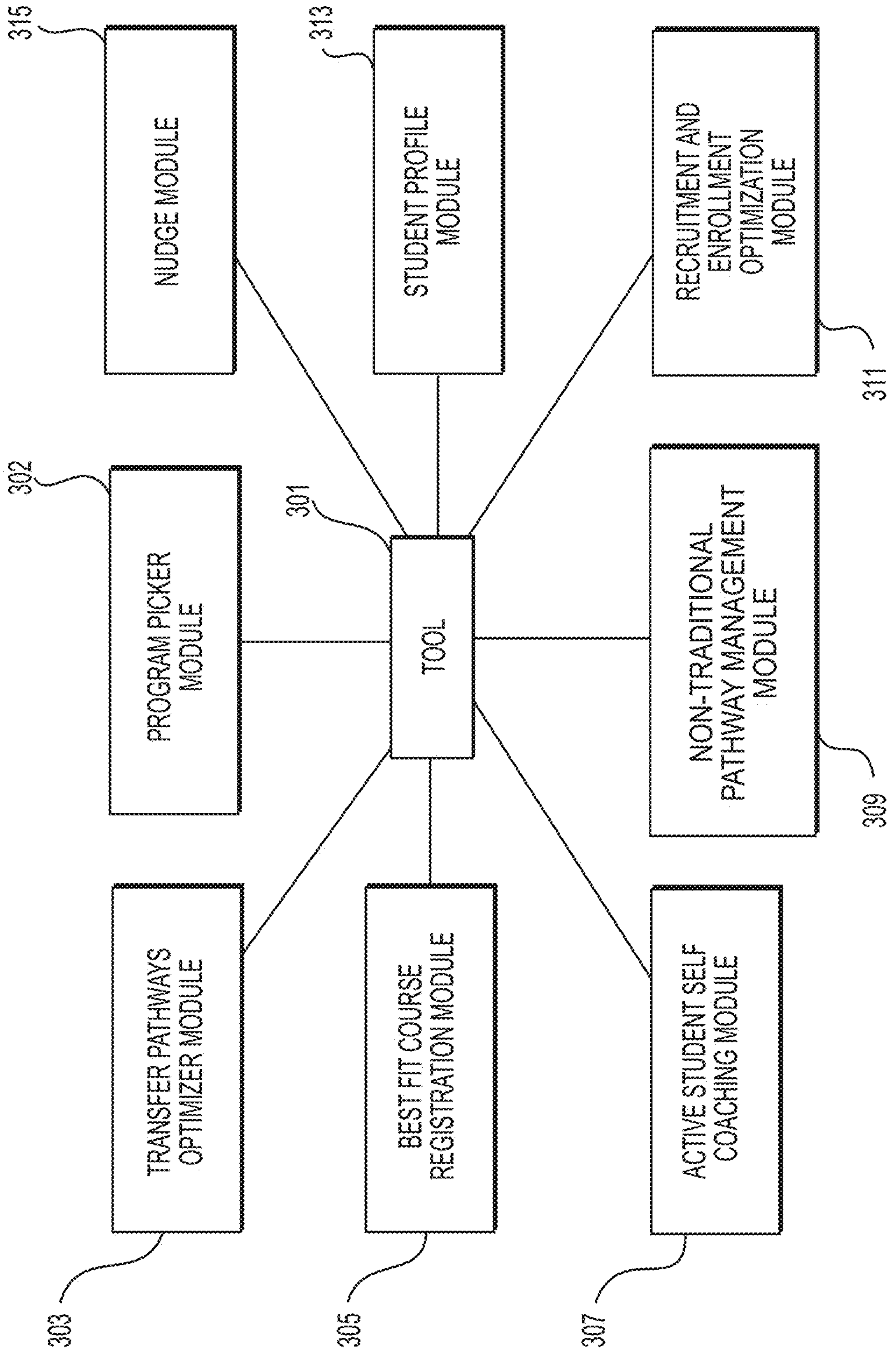
FIG. 3A illustrates an exemplary schematic of representative modules, in accordance with one or more embodiments of the present invention, including an exemplary module designed to help students make data-informed decisions about program choice.

FIG. 3A depicts exemplary pillars and modules of the tool. Each of the modules may provide adjusted analysis as new data is made available, thereby allowing the platform to continually or periodically (e.g., term-by-term) adjust to provide accurate and relevant information. The tool 301 may include a transfer pathways optimizer module 303, a program optimization module (referred to herein as "program picker") 302, based on information related to job trend data (e.g. salary by program, and job posting counts by program in a specified metropolitan statistical area) and developmental coursework needs, for example, a best fit course registration module 305, an active student self-coaching module 307, a non-traditional pathway management (e.g. late registration start, or part-time student) module 309, a recruitment and enrollment optimization module 311, a student profile module 313, a nudge notification module 315, and a high school/adult prospect recruitment tool module 317.

In some embodiments, the transfer pathways optimizer module 303 can assist students with decision-making and processes related to transfer from first institution, such as a community college, to a second institution, such as a community college or four-year university. Aspects of the tool may receive transcript data from two-year college students. The tool may identify not only what courses can be used as early transfer success markers, but also develop pathways for efficient exchange of credits between two- and four-year institutions resulting in the potential to pass cost savings to students for example.

The tool may utilize the transfer pathways optimizer module 303, and may further utilize electronic articulation agreements, but doing so at the course level, so the academic plan may be based on future transfer to a particular school. For example, a student may be a communications major and have plans to ultimately transfer to one of two four-year institutions. The tool may present a first academic plan, based on the electronic articulation agreement with the first school, showing courses that would successfully transfer into a given major at the first school. The tool may also present a second academic plan, based on the electronic articulation agreement with the second school, showing courses that would successfully transfer into a given major at the second school. The tool may also prioritize providing recommendations of courses that have dual compatibility to multiple possible transfer schools, particularly those to which the student is interested to transfer.

Additionally, the best fit course registration module 305 may selector recommend a student's courses based on received information, such as a student's program of study (e.g., major or academic concentration), the student's preferences, the student's academic history, the student's schedule, the institution's course catalogue, job-related considerations, or any combination thereof. The recruitment module 311 may highlight academic planning processes to the institution's recruits (e.g., high school students and non-enrolled adults). For example, the tool can provide prospective students with insight into the value of the community college and tool itself by providing data-driven evidence on jobs, transfer rates, and other outcomes. The tool may coordinate with enrollment managers after interaction with the platform to complete the recruit's application for admission. A high school student might not receive a student ID until they are accepted as a college student. High school students may be identified and allowed access to the tool with a user credential but without a Single Sign On. The user credential may stay associated with the high school student until they are accepted as a college student, when they may be linked to the identification system used by other college students.

The best fit course registration module 305, and user interface associated therewith, may allow a student to select among one or more possible course pathways. Rather than presenting many possible options for a student, which may create paralysis, a single course option, or small number of course options may be presented. These options may be based on the student's interests, prerequisites, major, and by analysis of student data, such as work conflicts. The options may also be based on the student data of other students, as will be discussed further herein.

The recommended course pathway, or schedule, may be created by the tool for more than one term, and may span up until graduation. Students have been shown to have substantially higher rates of graduation when an academic plan exists, which may include a course schedule for at least one term. The tool may also identify potential conflicts one term or more in advance. For example, if the expected graduation time is two years away, the tool may determine the required courses for graduation that have not yet been taken. Some of those courses may themselves have prerequisites. The tool may then notify the student that, if a certain class is not taken in the upcoming term, it may be difficult (i.e., requiring summer classes) or impossible to graduate on schedule.

At anytime, a student may be able to activate and view a degree audit, which may generate a list of all remaining requirements for graduation. Sample schedules may be generated based on the degree audit, which may present one or more variations of schedules over one or more semesters to graduate by a selected date. Techniques presented herein may displace traditional degree auditing systems, which tend to comprise older data that can be inaccurate. The sample schedules may further be based upon analysis of past successfully student trajectories, for example, student schedules which resulted in graduation, on-time graduation, dean's list students, etc. Schedules may be scored based upon meeting a graduation date, preferred time of day, preferred geographic distribution, etc. Using techniques presented herein, historical data may be used to recommend academic plan templates based on a determined optimal sequence and timing of courses, and by identifying beneficial or detrimental combinations of courses.

The tool may make recommendations based on course reviews. For example, if prior literature majors enjoyed a "physics for poets" course, the course may be recommended to other literature majors in the future. This algorithm may use machine learning techniques to incorporate a variety of data dynamically in order to make recommendations to a student. For example, a feature vector may be created representing features of the student and prior students of the institutions. Course recommendations may then be made based upon similarities between the feature vector of the current student and the course histories of prior students with similar feature vectors. Any of the data points discussed herein may be incorporated into the recommendation engine.

The tool may also recommend course groupings. For example, students may commonly take physics 101 along with biology 101 in a given term. The tool may notice this pairing and recommend biology 101 to other students that select physics 101. One technique may log common course pairings within a given term (semester, quarter, etc.). However, this technique may perform less well at schools like community colleges, where one or two classes per term may be common. Another technique may bundle class groupings by credit bundle, or within a predetermined number of courses apart, or within a predetermined number of terms apart. For example, the tool may determine two or more courses commonly taken together within a 15-credit span for students, though this span may be spread out over multiple terms. As another example, the tool may determine two or more courses commonly taken together within the same term, or within a predetermined number of terms or courses of each other. For example, many part-time students may take physics 101 in the fall term, and biology 101 in the spring term, though one is not actually a prerequisite for the other. The tool may thereafter recommend biology 101 to students, such as full-time students, based on a selection of physics 101 in their course schedule.

The tool may also recommend courses based upon seat availability. For example, if two courses are compatible with a student's schedule, the tool may suggest the course which has lower seat availability. This way, the student may be able to later drop the higher-demand course and switch to the lower-demand course if desired, while the reverse may not be later possible. The tool may also recommend the opposite, if so configured. If two courses are available, a higher-demand course and a lower-demand course, both of which are compatible with a student's degree requirements, the tool may recommend the lower-demand course. This helps a university more evenly allocate student load across available classes. Students also benefit, as they may have better access to the professor and teaching assistants in a class that is less crowded. These features may be student and/or administrator configurable.

Class location may also be a factor when generating a recommended course schedule. Some community colleges have multiple campuses, and some students may be transit limited to one of, or a subset of those campuses. The student may be able to indicate a preference for one or more campuses and/or a requirement of taking classes at one or more campuses. Even if a student does not designate a required campus, the tool may recommend certain classes based on proximity to a work or home address. For example, biology 101 may be available at two community college campuses, one campus being closer to the student's home and another being closer to the student's place of work. The tool may also account for not only geographical location, but also time as it relates to geography. It is well understood that a while two locations may be geographically close, the time to go from one location to the other, particularly considering the time of day, events, traffic, and other factors, may not be directly correlated. Based upon the time of the class, for example 6 PM, the tool may recommend the class closer to the student's place of work. The system may also warn students based on location. For example, if two classes begin 15 minutes apart, but occur on different campuses, the tool may alert the user during the scheduling process.

When recommending courses, the tool may further account for child care responsibilities (e.g., no evening classes), preferred study times before and after certain courses, course types, or at certain times of the day, student meals, preferred sleeping times, preferred commute times, and any other metric discussed herein.

The tool may also re-generate recommended courses and/or schedule when a student makes a course selection. For example, a student may select a course at a certain time and place it in the schedule. The tool may then determine, based upon student attributes, the selected course, desired course load, the remaining time slots, etc., as discussed elsewhere herein, one or more recommended course schedules.

The tool may also automatically reshuffle the display based upon user changes. For example, if a user moves a prerequisite class forward a semester, the tool may automatically move all subsequent courses dependent on that prerequisite forward a term on the user interface, where possible. Alerts or notifications may also be generated to inform the user of the move.

Once the student completes the academic planning, using the scheduling algorithm, the student may be able to execute a "one-click registration" which may automatically register the student for the desired classes, execute payment, and/or any other steps needed prior to attending class. See, for example, FIG. 121. The tool may be able to combine multiple requests into one request in a core system/third party system. An API may be used for bi-directional exchange of data to allow for the sending of a single request to the SIS system. In this manner, a student may be able to schedule courses with one action, and receive confirmation for a successful sign-up.

The tool may also utilize an advisor dashboard, which may be a portal and/or series of user interfaces directed for use by an advisor, such as by university staff. The advisor dashboard may utilize any of the user interface elements presented herein, and may be focused towards advising students on coursework, schedules, majors, financial aid, etc. Embodiments of the advisor dashboard will be discussed further below, at least in relation to FIG. 12.

Figure 3B:
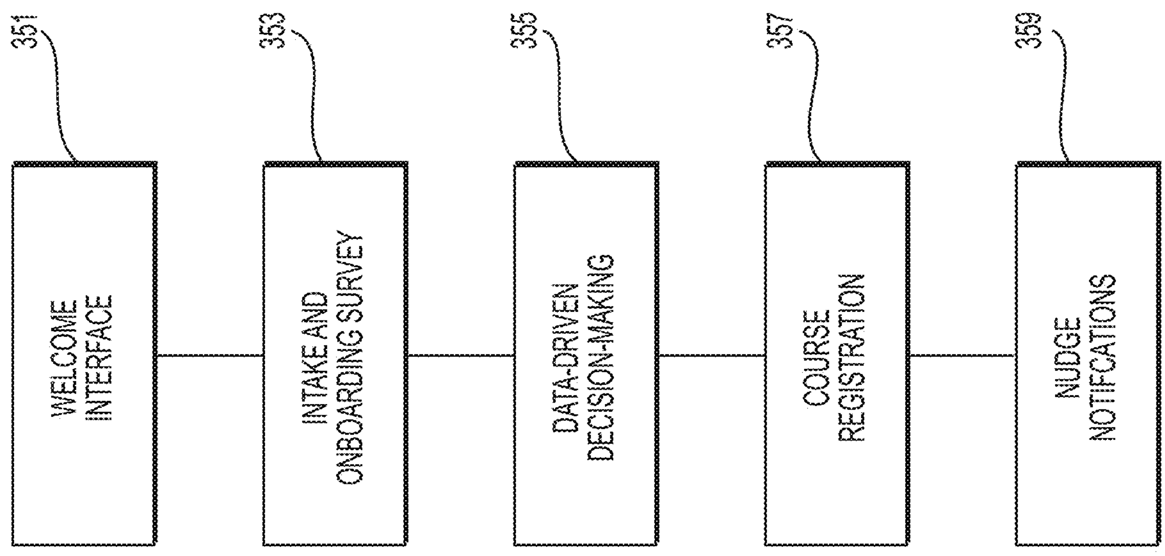
FIG. 3B illustrates an exemplary diagram of representative functional pillars, in accordance with one or more embodiments of the present invention.

FIG. 3B illustrates an exemplary workflow provided by the tool. The welcome interface pillar 351 provides a global view for user (e.g., a home page or landing page) and allows user to select subsequent options and operations within the tool. The intake and on boarding pillar 353 provides a unified or consolidated view of orientation, including obligations and recommendations for incoming students, preferably graphically displayed and capable of receiving a user response when selected. Typically, the information and actions populating the intake and onboarding pillar could only be available from multiple, disparate sources. In many instances, information from the student is unavailable, is not collected, or is difficult to collect. In other instances, the information may be collected, but it would not be integrated into technology solutions, particularly technology solutions which are customized for the student and which account for or address the student's intake information. This pillar preferably allows the user to organize, locate, satisfy and/or receive the institution's services, particularly those services relevant to the student and those services that are required or suggested for the student. The data-driven decision-making pillar 355 provides an interactive interface to collect user information and generate responsive feedback and information. The course registration pillar 357 processes various sources of information to develop course schedules and academic pathways. Steps 355 and 357 may further comprise academic planning, scheduling, and registration steps, as discussed elsewhere herein. The nudge notification pillar 359 provides electronic messaging for the user preferably related to the previously mentioned pillars and other academic and non-academic events, milestones, deadlines and to-do items (collectively referred to herein as "institution events"). Although shown in a linear form in FIG. 3*b*, the pillars may be provided concurrently or in any sequence, and not all pillars must be present or delineated in the tool.

Figure 4:
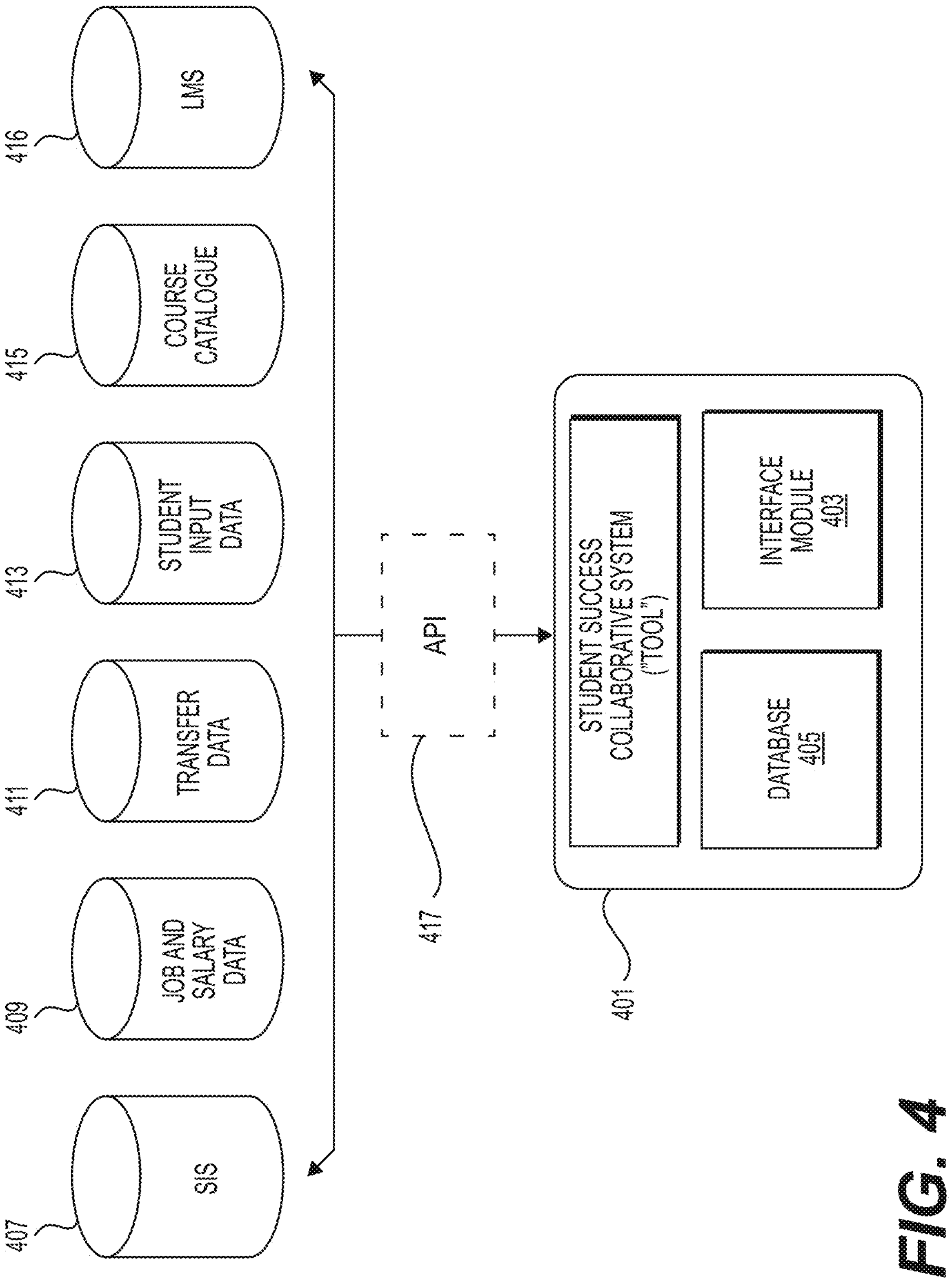
FIG. 4 illustrates an exemplary structural schematic, in accordance with one or more embodiments of the present invention.

FIG. 4 provides an exemplary architecture for one embodiment of the tool 401, which may include an interface module 403 with (or functionally interfaceable with) a database 405. Embodiments of the tool are connected to receive data from, and in instances transmit data to, sources, such as the SIS 407, job and salary data 409, transfer data 411, student input data 413, course catalogue data 415, inter alia. Data may be obtained from additional data sources, including one or more customer relationship management (CRM) systems, one or more degree audit systems, etc. The degree audit system may obtain degree audit results themselves, which may show where a student is efficient and/or deficient. The degree audit system may also obtain fundamental rules guiding the audit process. In some embodiments, the tool may be integrated or configured to exchange information with a learning management system (LMS) 416, such as LMS solutions provided by Blackboard, Washington, D.C.

Figure 5A:
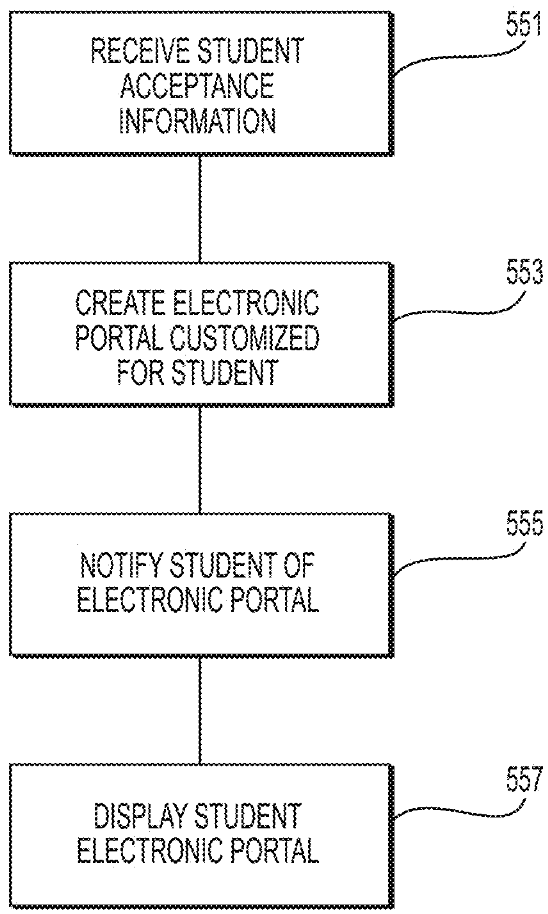
FIG. 5A illustrates an exemplary flow diagram for an initial user welcome and set up module, in accordance with one or more embodiments of the present invention.

As previously noted above, institutions can customize when the tool is provided to, or accessible by, the student. FIG. 5A illustrates an example in which the tool is made available to a student upon acceptance, as shown in step 551. The tool may be made prior to admission, particularly as a recruitment tool, or any time after acceptance. The tool is typically provisioned to create a student account, as shown generally in step 553. The tool may customize the type of account, type of display, type of scheduling suggestions, etc., based on a determination that the student is an athlete or has some other special status or scheduling constraints. Path user interface items displayed may change based on when the student starts school (what year, time of year, etc.), the geographic location of the student, the modality such as online/in-person student, etc. As data is entered or received into the tool, the path/user interface may be changed corresponding to the user's needs. An institution may optionally contact the student, as shown in step 555, through the tool (e.g., an in-messaging application) or via conventional means (e.g., email), for example, to notify the student of the tool and/or to provide access. The tool is then presented to the student through an electronic display, as shown in step 557. The milestones 511 and/or to-do list 513 may be continuously updated throughout the student's tenure in school, and might not be limited to a student's progress, but rather might also be modified if a student is underperforming or has special needs.

Figure 5B:
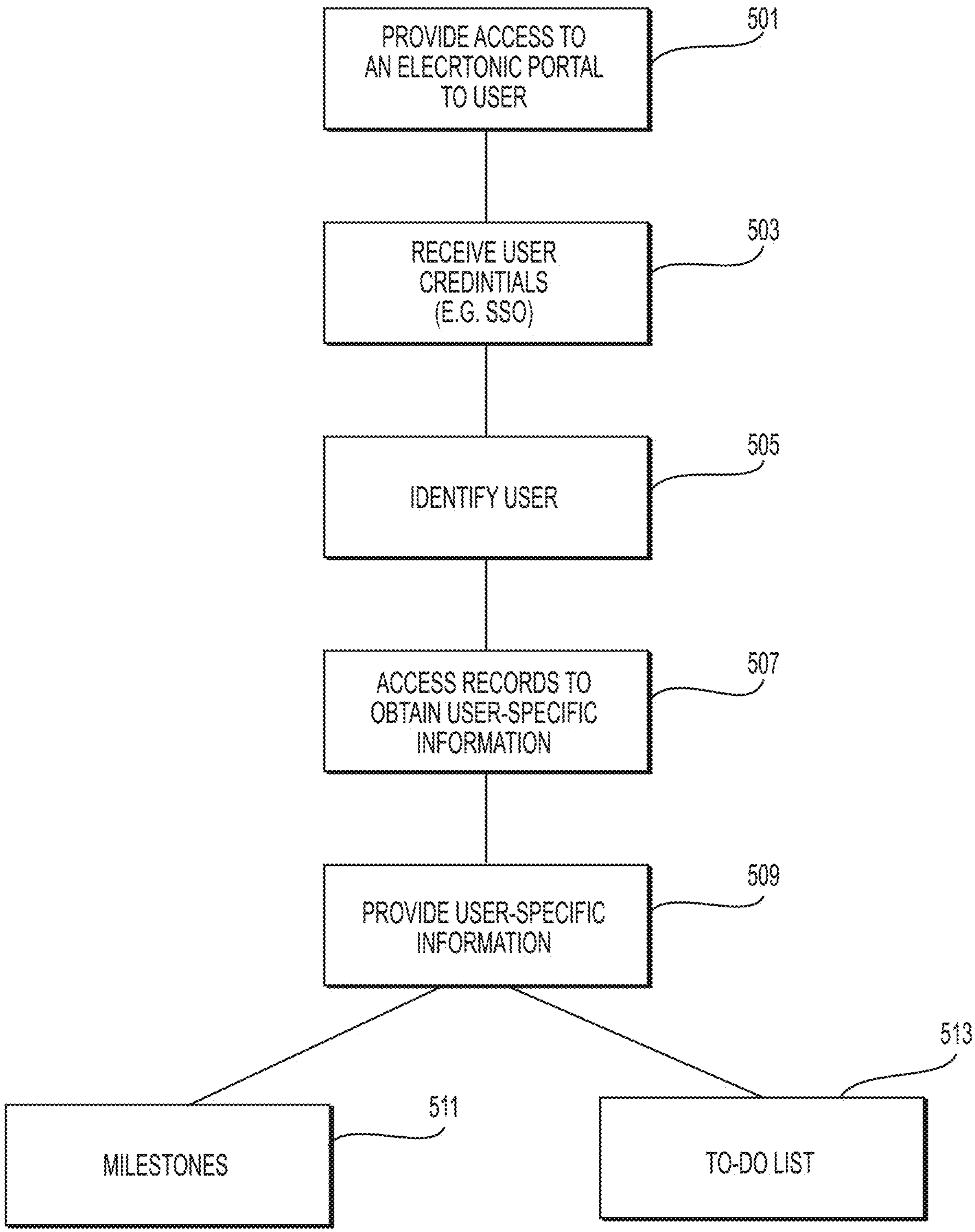
FIG. 5B illustrates an exemplary flow diagram illustrating access provided to users, in accordance with one or more embodiments of the present invention.

FIG. 5B illustrates an exemplary flow in which a student may login and be displayed a path user interface with milestones, a to-do list, and other features discussed elsewhere herein. The tool is presented to the student, as shown in step 501, preferably with functionality to validate the user. The tool may receive user credentials, such as login and password, as shown in step 503, and after processing, the tool may identify the user, as shown in step 505. In preferred embodiments, the tool accesses the user record, as shown in step 507, or otherwise loads user preference and user-specific data. As discussed below, the tool would display the user-specific information, as shown in step 509, such as milestones 511, to-do items 513, among other institution events.

The milestones 511, to-do items 513, etc., may comprise a "student path." The student path may be based upon student attributes as well as student actions. For example, a student may be an athlete with known scheduling conflicts, may be a parent and requiring child care, and further may start the term late. The tool would be able to generate a dynamic student pathway, configure a recommended schedule, warn the student of any potential conflicts, and nudge the student about upcoming deadlines, etc., in accordance with techniques presented herein. The tool may also be able to accommodate dual enrollment students, i.e. high school students taking college coursework, by determining conflict times, available hours, bus schedules, transit times, etc. The student path, academic planner, and schedulers may together provide a comprehensive onboarding and scheduling process. In some embodiments, the tool may track high school students as they enroll in the institution, thereby eliminating or reducing redundant student profiles and/or records.

Figure 6A:
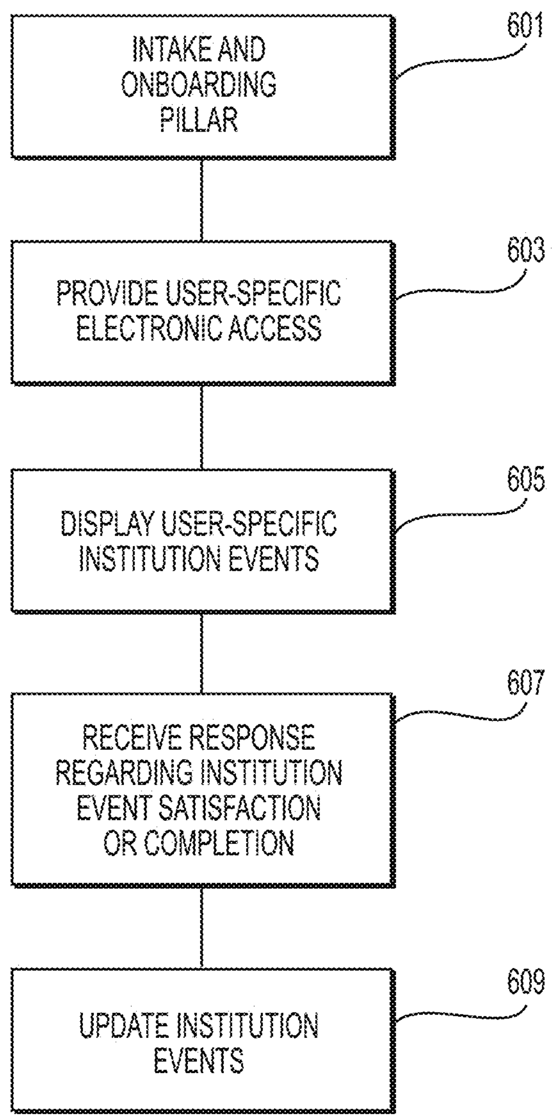
FIG. 6A illustrates an exemplary flow diagram for an intake and on boarding to provide user with institution events, in accordance with one or more embodiments of the present invention.
Figure 6B:
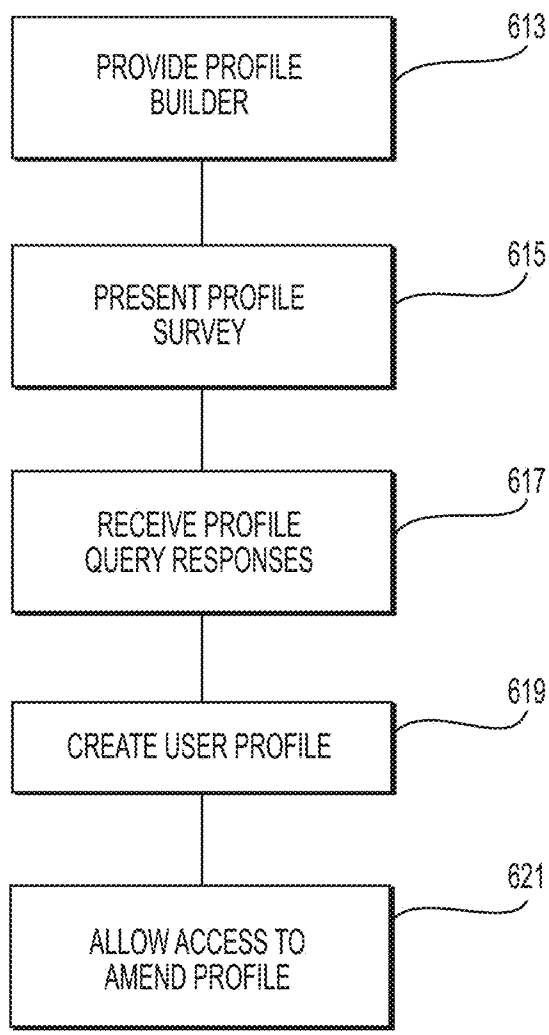
FIG. 6B illustrates an exemplary flow diagram for a profile builder module, in accordance with one or more embodiments of the present invention.

As shown in steps 601 and 603 of FIG. 6A, user-specific information may be provided during the intake and/or on boarding process. In embodiments of the first pillar of the present invention, the tool provides students with a unified, comprehensive view of institution events, as shown by step 605. In accordance with preferred embodiments, the tool provides the user with one resource that records, processes, and or displays various sources of information in one virtual location. Conventionally, such information (e.g., from the bursar's office, registrar's office, and from a counselor's office) may have been disseminated in a variety of ways by a variety of offices in a variety of formats, requiring the user to collect and address each institution event in piecemeal fashion.

Milestones and to-dos, discussed elsewhere herein, may be automatically generated at step 605 based on student action and/or action by the institution. The milestones and to-dos may be generated at the individual student level, or for a plurality of students, such as at the population level.

The tool aggregates and synchronizes institution events. For example, the tool may aggregate and display deadlines and to-do items, such as (a) academic or course-related events (e.g., deadlines for quizzes, exams, and term papers); (b) administrative, non-academic events (e.g., financial aid deadlines, on campus vehicle registration, and student ID validation requirements); (c) personal events (e.g., study groups, job schedules, collaborations, trips, etc.); and (d) institution-wide events or events that affect certain student populations (e.g., freshman orientations). In variations of the invention, the tool may provide guidance on how to meet deadlines and fulfill the to-do events, such as by presenting locations that the user must visit, identifying procedures or action necessary to complete the task, and linking to forms or documents, as required. In certain embodiments, the tool preferably provides reminders, which are communicated to the user for upcoming events, and notices and/or confirmation of their completion.

It is intended that the tool will grow with the student, beyond initial intake and onboarding, and be useful throughout the student's tenure with the institution. In accordance with embodiments of the invention, information displayed to the user will be current and relevant in real-time or substantially real-time. For example, the tool may update and keep track and of milestones, such as when a certain amount of credits are completed, or when the student becomes eligible for a program, incentive or award. The tool may provide real-time (or substantially real-time) tracking and guidance on how to achieve the milestone and what to do after the milestone is reached. In some embodiments, the tool may provide term-by-term goals or more granular day-to-day goals. The tool may request additional input or confirmation, from time-to-time (e.g., each semester). The tool may process the newly received information and generate content responsive to such information.

The tool may also facilitate interaction by the user or another party. For example, if an event is deemed complete, through user input or input by the office requiring the event, as shown in 701, and SIS information, as shown in step 703, and in turn, processes the information using a rules engine, as shown in step 705. In some embodiments, the tool may evaluate a combination of student factors selected from academic performance, non-academic experiences, areas of interest, and developmental status. In variations of this illustration, additional data sources may also be factored. The tool may use information, such as aggregated statistical information (e.g., job placement rates, transfer rates, etc.) to create recommendations and matches (e.g., matching users to jobs, four-year institutions, etc.). In certain embodiments, the tool creates a student academic profile, as shown in step 707, which encompasses or generates best fits or recommendations for program(s) of study, and a corresponding academic planner. The tool may accordingly suggest classes or the number of classes per term, shown in step 711, and provide degree completion or transfer timelines, as represented in step 709. The number of classes per term 711 may be paced, such as by a certain number of courses per time period. The number of classes per term 711 may act as guard rails to a student, and may be based on academic requirements to graduate by a certain time, and/or student goals. In some embodiments, the tool may incorporate or reference an articulation database, which may suggest which courses articulate to four-year schools. In some embodiments, the tool may provide guard rails regarding the classes recommended per term based on academic requirements (e.g., graduation) or student goals.

The tool may also identify job-related interests, as shown in step 713. Embodiments of the tool may receive and process employment information from various sources regarding job opportunities, job and salary trends, job demand, and general career-related information, through a corresponding data feed for example to provide empirically driven program matches for the user. The employment information may be stratified by location, such as the institution's local geography (e.g., metropolitan statistical area) or national geography. The tool may further provide a meta major taxonomy, which acts as a bucket that connects to specific programs. Students may be able to pick one or more interests and academic fields that correspond to meta major. The student may select a field of study, create a custom taxonomy, and may identify interests that may be mapped to one or more existing programs or custom program. Students may pick more than one meta major to find the best program fit.

As shown in step 715, the tool may identify or consider job placement opportunities. For example, the tool may also identify and recommend job placement opportunities and features that employers are demanding from their employees based on a proprietary rules engine processing student specific data and job data.

In some variations, the tool may create a meta major taxonomy that connects students to specific programs at the institution and/or areas of study based on selected or observed interests and academics. In some additional variations, the students may have more than one meta major.

Figure 7A:
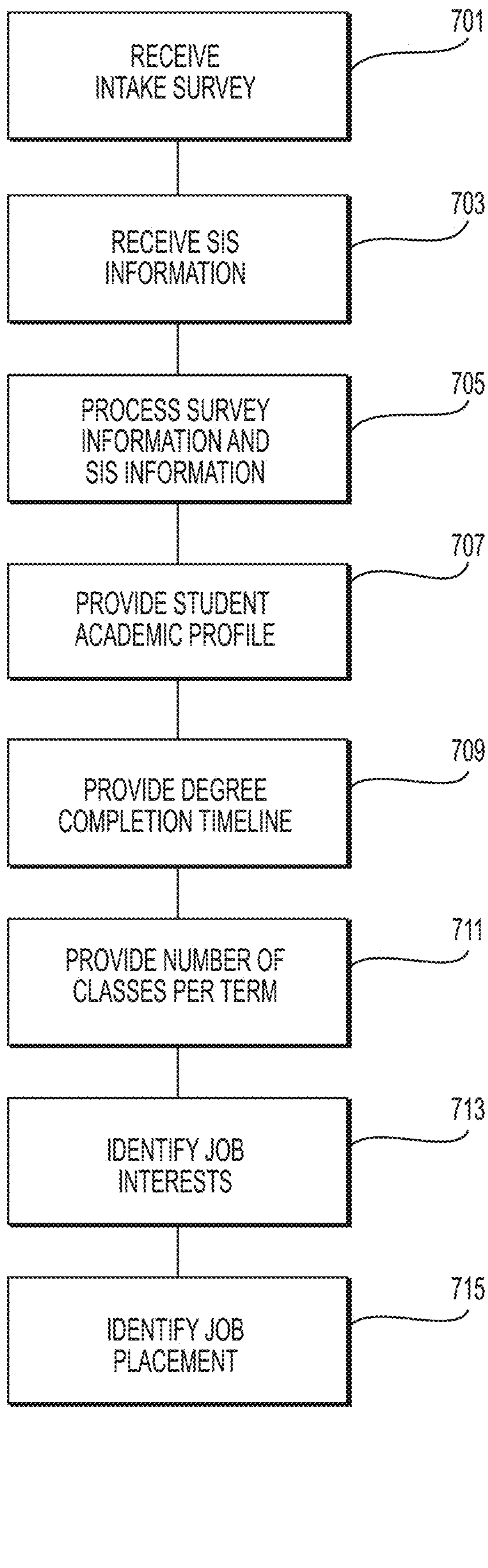
FIG. 7A illustrates an exemplary flow diagram for a module to evaluate student academic and career pathways, in accordance with one or more embodiments of the present invention.
Figure 7B:
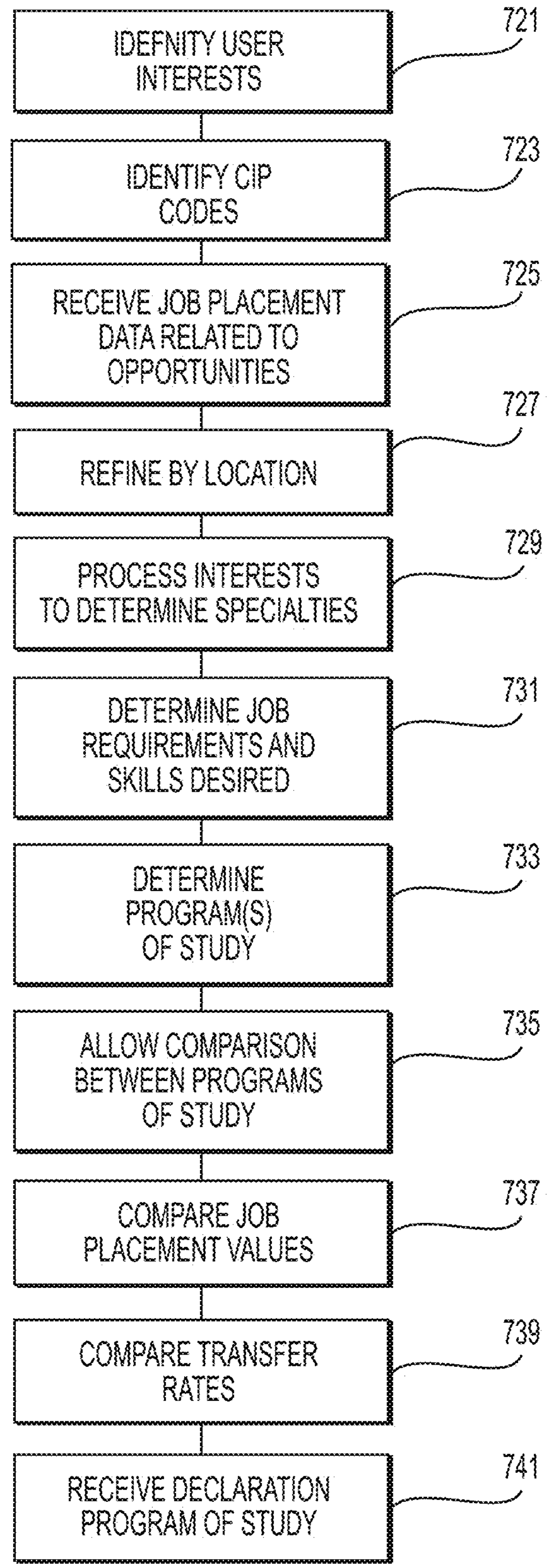
FIG. 7B illustrates another exemplary flow diagram for a module to evaluate student academic and career pathways, in accordance with one or more embodiments of the present invention.

FIG. 7B provides another exemplary embodiment in which the tool identifies and processes user interests, shown in step 721, and correlates them to a classification of instructional programs (CIP) codes, as set forth by national and/or state education departments (e.g., the U.S. Department of Education's classifications, "CIP codes"), as shown in step 723. An extern al source can provide the tool with job placement information, shown in step 725, which can be refined by location, for example, as shown in step 727. The tool may process received information to generate relevant career or academic specialties, as shown in step 729, and determine requirements and skills, for corresponding jobs, as shown in step 731. The tool may use information to identify a program of study, as shown in 733. The student may be able to identify and select from a taxonomy of programs on a display. As shown in step 735, the tool may allow the user to compare programs of study. As shown in steps 737 and 739, the tool can compare other job and transfer outcomes. For example, for a given program of study, students may be able to view degree success rates, job placement rates, employment rates a predetermined time period after graduation, where the majority of past students are with the given degree, etc. Some variations may allow the user to declare his/her program of study, as shown in step 714.

Moreover, the tool may determine an academic plan for the user, which may include factors such as required and suggested classes, number of classes per term, and a schedule. In some embodiments of the invention, the tool may determine a use r's sub-interests based on the data collected and analyzed, to provide greater specificity for the user.

In a variation, the tool may include a module that ranks its recommendations. The tool may compare a selected program of study with any other program of study, to provide comparison information on the programs, the costs, and potential outcomes (e.g., transfer rate, job placement, salary level). The tool may functionally communicate with one or more internal and/or external databases, such as the National Student Clearinghouse (NSC). The tool may communicate with, or receive data from, third party labor force databases, which may include job, career and employment information, and may preferably include data related to the type and frequency of job postings for associated occupations, skills, employers, salary across geographic areas, such as the local, metropolitan, region, state and national levels. Courses and/or majors may be recommended by aggregating labor market data, and/or aligning student interests to skills and job opportunities.

In yet additional embodiments of the invention, the tool may consider and factor the user's availability and obligations, particularly those outside of the academic schedule. The tool may request the user to provide times when the user is available, or conversely not available. The tool may also request information on professional obligations, like unavailability due a scheduled job, internship, volunteer assignment, or the like. The tool may collect commuting characteristics (e.g., distance, time, public transportation, and parking) and general location information (e.g., the user's place of residence and the user's geographical relationship to the institution's campus). The tool can electronically process this information to provide user-specific insights for the students (e.g., whether an in-person or virtual class better fits a user's schedule), and suggestions on institutional resources in which the user may be interested.

Another module of the tool may assist the user with financial aid, loans, and institution related financial obligations (collectively, referred to herein as "financial aid"). The tool may communicate current, or substantially current, financial aid to the user. In variations, the tool can tie together a plurality of financial aid systems to provide a unified view of financial aid. In one variation, the tool may provide status information, such as where the student is in the financial aid process, when the application for financial aid was submitted or reviewed, and what the disbursements amounts are. In another variation, the tool may functionally integrate with the financial aid process, allowing the user to complete the financial aid process through the tool. In some variations, the system may estimate the cost of text books and course materials and factor such information into a financial aid analysis. In other variations, the tool may survey the user on financial aid issues to assist with the formal student aid process (e.g., Free Application for Federal Student Aid (FAFSA), state-based financial aid programs, university assistance, and private scholarships), and it may accordingly provide general or step-by-step guidance or a wizard on how to complete and/or submit the relevant financial aid forms.

Figure 8A:
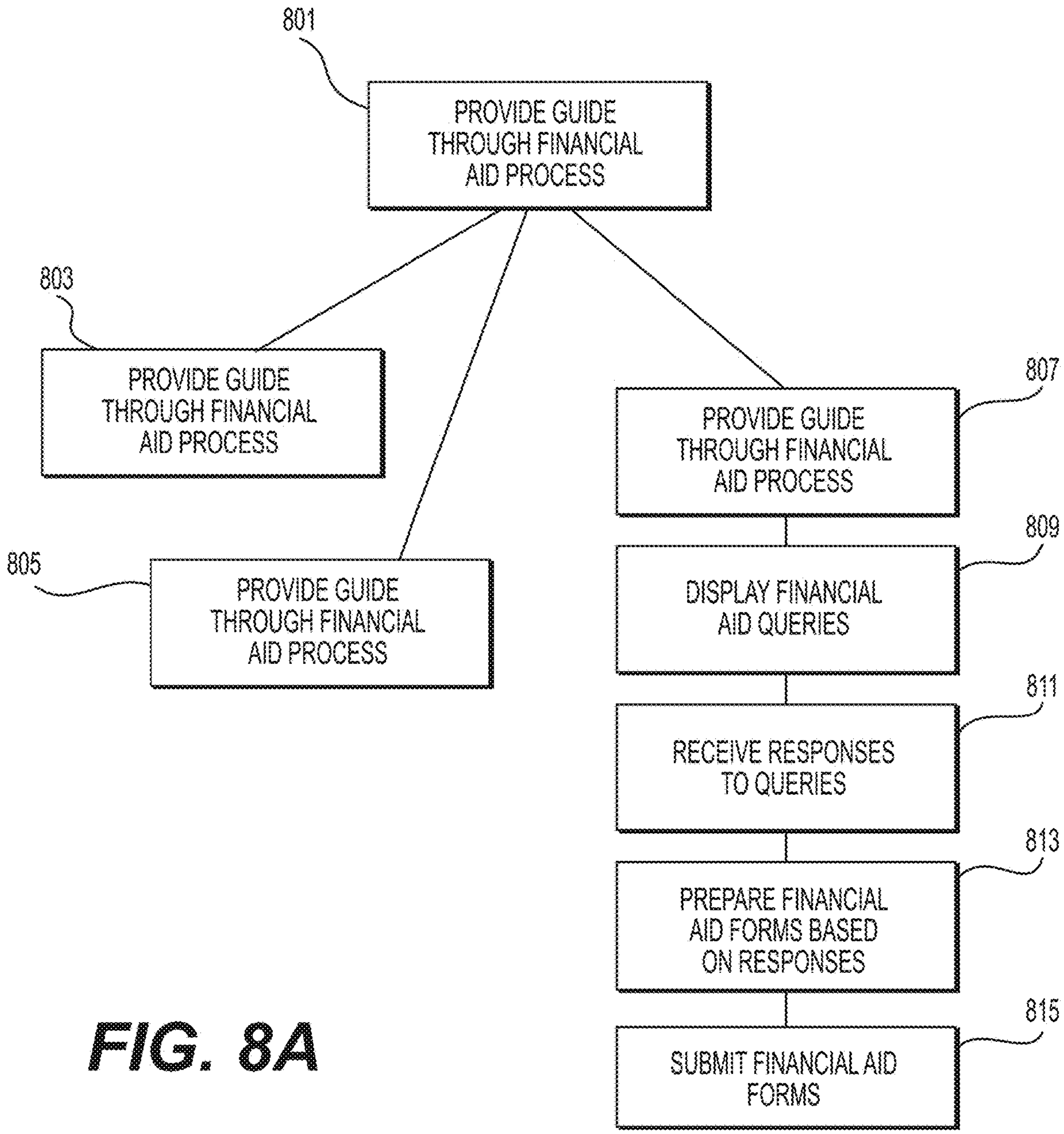
FIG. 8A illustrates an exemplary flow diagram for a financial aid module, in accordance with one or more embodiments of the present invention.

FIG. 8A provides an exemplary illustration of the financial aid module. The tool may provide access, as shown in step 801, by way of a hyperlink for example, as represented in step 803, to the institution's or third party's financial aid system. In preferred instances, access is provided through the tool's unified view, or through the intake and onboarding module, as shown in step 805. In some variations, the tool may provide a guide that walks through the process, as shown in 807. In such a variation, the tool may display financial aid queries, as shown in 809, which relate to, or correspond to, the questions and information desired by financial aid forms and officers. The tool may receive responses, as shown in 811. The tool may record responses, or otherwise complete financial aid forms, as shown in 813, and submit required documentation and forms on behalf of the student, as shown in 815.

Figure 8B:
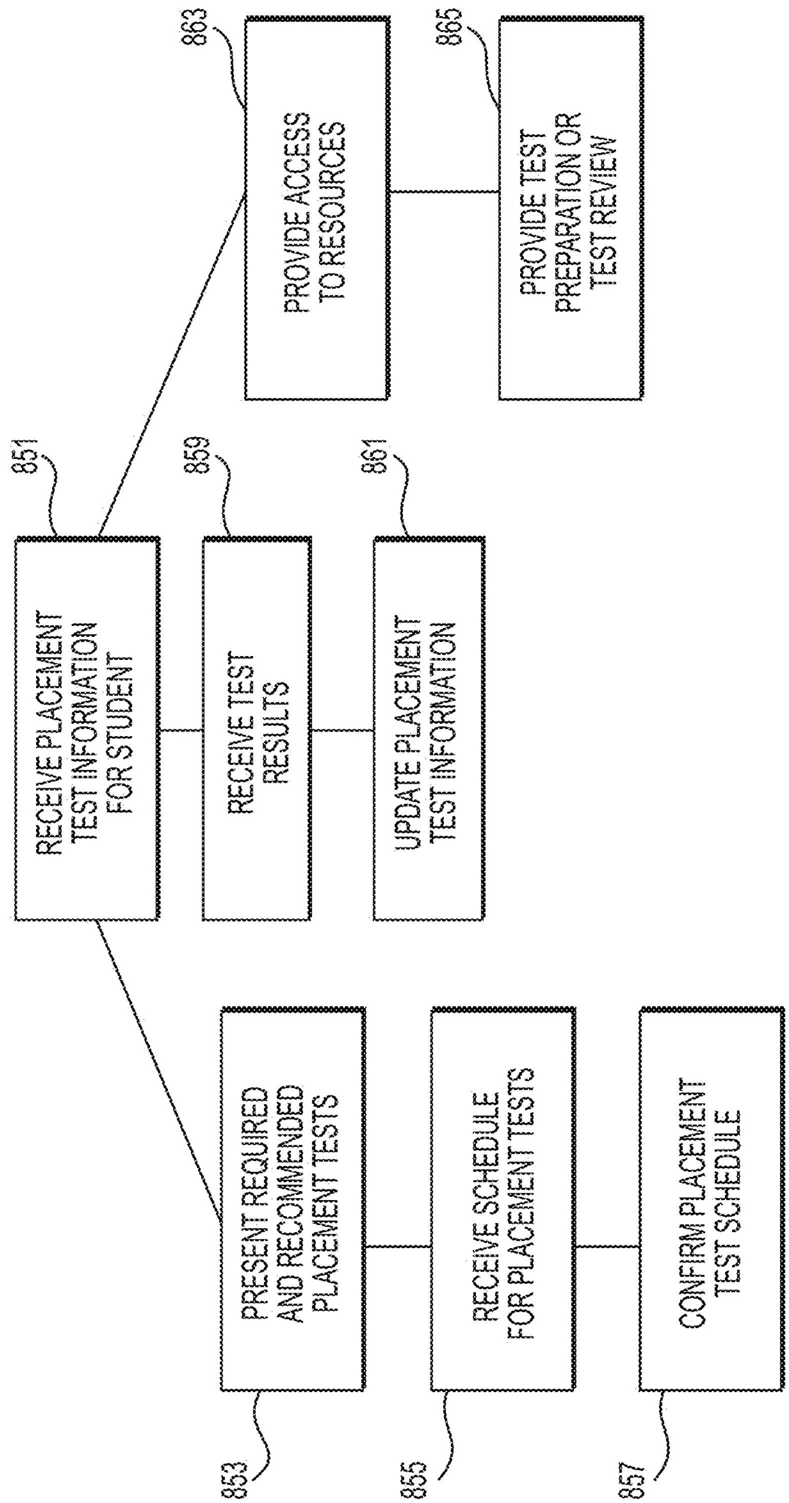
FIG. 8B illustrates an exemplary flow diagram for a placement exam module, in accordance with one or more embodiments of the present invention.

An additional module of the present invention may provide the user with information and recommendations regarding placement tests, which are required in many institutions, to qualify for classes or programs. The tool may identify placement tests that the user should take and provide user with registration information, as represented in step 851 in FIG. 8B. In variations, the tool may allow the user to register to take the placement test, preferably after considering user's conflicts, time availability, and qualifications. Steps 853, 855, and 857 illustrate a registration workflow. Steps 863 and 865 illustrate a basic test preparation workflow. The tool may provide an explanation or walk through of the placement exam and test preparation resources. Steps 859 and 861 illustrate the tool's ability to receive and update information accordingly. For users who have taken a placement test but were deemed unsuccessful, the tool may reschedule the test and/or provide information or guidance on how to improve their score. The tool may coordinate or direct the user to test preparation offered by third parties or provide the relevant coursework/test preparation. In some variations, the tool may direct or recommend classes or coursework to improve test scores or avoid retesting by creating alternative paths.

The tool may also recommend placement tests and provide scores, and may cue students to retest as needed. The tool may further provide deltas for qualifying for a placement test. Developmental courses may be provided. A new path may be calculated and displayed in a user interface, which may display other routes or paths to avoid having to retest.

In some embodiments, the tool may include, preferably in its program picker module, a rules engine, algorithm, or process to take into account a student's placement test results when generating recommendations for programs of study. This program picker module may also consider other measures, such as entrance exam (e.g., the SAT® by The College Board, New York, N.Y. or the ACT® by ACT, Inc., Iowa City, Iowa) scores, existing college credit, high school GPA, high school course grades, alone or in any combination, to determine the type, level, and sequence of courses appropriate for an incoming student.

Figure 9A:
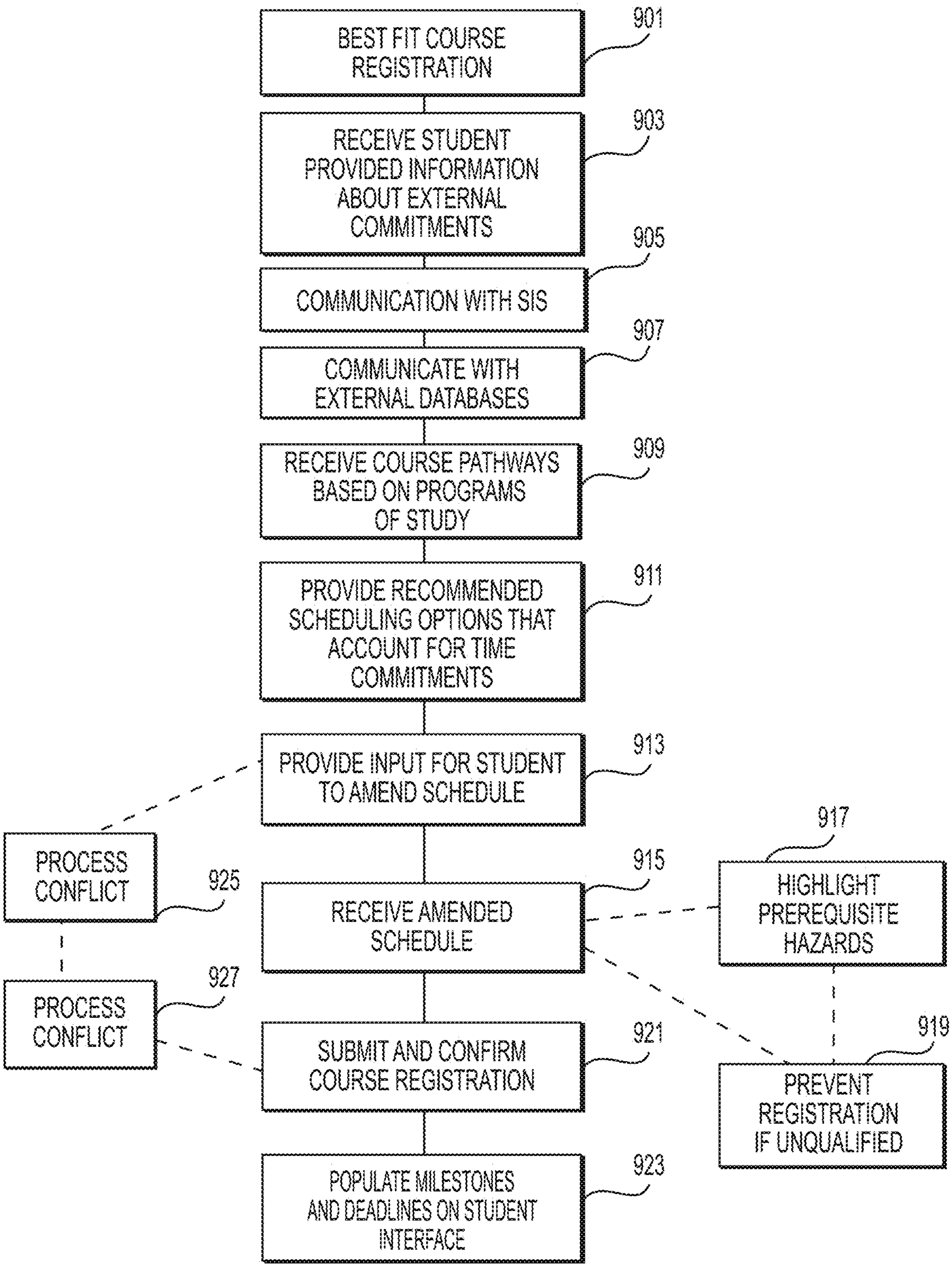
FIG. 9A illustrates an exemplary flow diagram of a course registration module, in accordance with one or more embodiments of the present invention.

In a third pillar of this tool, the tool can enhance the course registration and registration process by creating a flexible and automated pathway for academic planning and course registration, as represented by 901 in FIG. 9A. The tool essentially eliminates the need for the cumbersome course catalogue and manual course selection by allowing the tool to determine a best fit schedule. More specifically, the tool may process the user's program of study as well as program requirements, and may additionally consider a number of factors additional course registration sources, including for example, (a) the course catalogue, for the current term, past term and future terms; (b) course prerequisites or co-requisites; (c) user results on placement tests; (d) student interests; and (e) non-cognitive factors, which may include the intensity of the course (time required, difficulty, etc.), skills required to succeed, and student peer recommendations.

The tool provides a schedule, as shown in step 911. In one variation, the tool may present a selection of courses, identified as required courses, recommended courses, and available courses. Required courses are those that a user must take to complete the program of study. Recommended courses are those courses that a user should take to complement the program of study, as may be determined by advice provided by the tool's rules engine, institution's counselors and advisors, literature, or user's self-identified interests and goals. Available courses are those courses that the user can take, because they are offered and available. These available courses may be suggested because they reflect the user's availability, interests, or personal choice; however, they may not necessarily accrue credit towards the program of study, graduation requirements, or transfer requirements. The tool may allow the user to take such courses, but variations of the tool may notify or otherwise make clear to the user the limitations of such courses. Certain variations of the tool will highlight courses deemed as important, and provide information on why they are important.

For courses associated with a prerequisite, the tool can note such courses with an alert, such as a "prerequisite hazard" or other restriction. The tool may cross-reference user's academic history and placement exam history to determine whether the user meets the prerequisite. If user does not qualify for the course, the tool generates a prerequisite notice or alarm.

As shown in FIG. 9A, steps 901, 903, 905, 907, 909, and 911, the tool can create a course schedule for the user, and allow a student to register. In embodiments, the course register module queries factors relevant to the user's course selection, such as prerequisites, required classes, recommended classes, and available classes. Additionally, this module may query additional factors such as the user's interests and profile, commute, obligations and unavailability, in addition to the factors above, in determining a feasible and/or recommended course selection. In variations, the user may approve the recommended courses prior to finalization. As shown in step 913, the user may also manually amend the selected courses by substituting, adding, or delete courses. As shown in steps 917 and 919, the system may prompt the user if: (a) course requirements (e.g., prerequisites and placement exams) are not met, (b) a course does not fit within user's designated completion time (e.g., expected transfer or graduation dates); and (c) a course do not fit the user's chosen program of study.

Further aspects of the tool of FIG. 9A, in relation to student scheduling and registration, may provide advisors or administrators with the ability to create general or customized academic plans, which may be based on historical student data. Substitute classes may be identified, which may be based on student types. Educational courses may be determined, as well as the ordering.

In step 909 and 917, course pathways may have developmental education requirements. Course registration may be broken into sub-parts. Advisors may be able to create academic plants on their own based on historical student data. Substitute classes may also be determined, which may be based on student types, such as if the student is an athlete. The tool may determine the classes, and recommend an ordering of the classes. Criteria may be changed on what students would look at in the analysis. The tool might not be customizing the academic plan for each student to complete a given degree. Rather, students may require a custom plan for what to do before they enroll in the degree program, such as prerequisite requirements.

In some variations, the course registration module may include functionality to identify and resolve scheduling conflicts. For example, the tool may recommend a course that conflicts with user's schedule. In such instances, the tool may provide an explanation of the conflict and the basis for recommending the course. The tool may flag this conflict for resolution by the user, such as by allowing user to manually amend the selected courses. The system may also create a pathway to alert an institution advisor.

The course registration module may also identify a recommended or optimal selection of courses, and allow the user to register such courses with the institution. In preferred embodiments, the course registration module may communicate with the institution's registration system, via the SIS, for example, and finalize the user's registration, as shown in step 921. In the event that the user cannot register for the selected courses, for example, because the course is full or becomes otherwise unavailable, the course registration module can notify the user and/or resolve the conflict in real-time or substantially real-time, by conducting queries as described above, as shown in steps 925 and 927. In variations, the user may amend the selected courses before finalizing the registration. For example, the tool may generate a schedule and communicate it to the institution's schedule registration system, where it is selectable by a user for finalization. In a more specific embodiment, the tool the user to complete the registration process in the SIS self-service module after the tool identifies and/or creates a proposed schedule, wherein the tool in variations of the embodiment may pre-populate fields for in the SIS. In preferred embodiments, the course registration module receives up-to-date information from the institution's course registration system. In some embodiments, the tool may receive course milestones (test dates, paper requirements, etc.) and populate such information on the unified view, as shown in step 923.

Figure 9B:
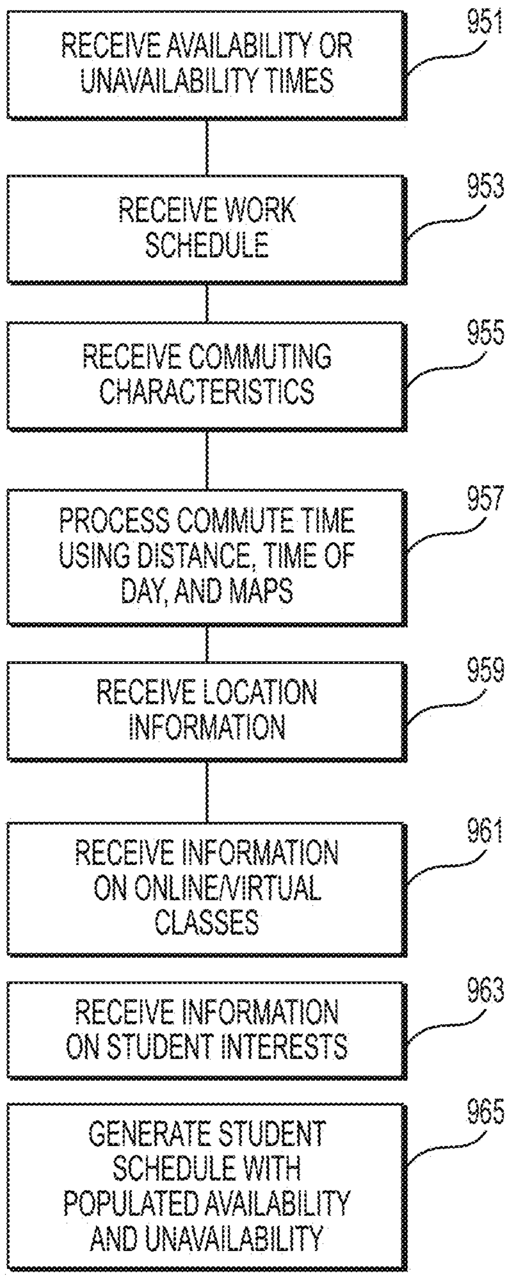
FIG. 9B illustrates an exemplary flow diagram or another course registration module, in accordance with one or more embodiments of the present invention.

FIG. 9B provides an illustration of the scheduling and course registration functionality, in accordance with one embodiment of the invention. The tool receives student availability, as shown in step 951, and the student's work schedule, as shown in step 953. Additionally, the tool receives the student's commuting characteristics (e.g., distance, time of day, routes), as shown in step 955, which can further be processed into applicable information (e.g., how long will the commute take at any given time of day), as shown in step 957. When determining courses and/or suggesting a schedule, the tool may consider distance between classes, and from the student's home to class, and factor it into a conflicts algorithm. Distance may mean spatial and/or temporal distance. The student's location information (e.g., location of student's job, residence, and other physical locations may also be collected, as shown in step 959. The tool may process such information in view of additional institution information, such as course catalogue information on class availability, times, locations, format (e.g., online versus in-person), as shown in step 961. The tool may also receive information from the SIS regarding institutional requirements, and from the student profile, as shown in 963. The tool may aggregate aspects of the received data to generate a student schedule that may fit the student's overall schedule and reflect student's academic plans, as shown in step 965. Real-time courses availability may be presented based on information from the Student Information System (SIS). The schedule function may populate a best fit schedule that satisfied certain requirements, such as conflicts and time constraints. However, the schedules may be dynamic. Educational courses may be changed or locked in. The types of optional schedules presented may be able to be filtered. For example, a user may be able to filter such that a schedule is recommended that does not contain back-to-back classes, or that does not have classes on Tuesdays, or that does not have classes after 6 pm, etc.

The tool may also block study time. A student may be able to enter a desired study time. An estimated number of study hours may also be determined.

Figure 10:
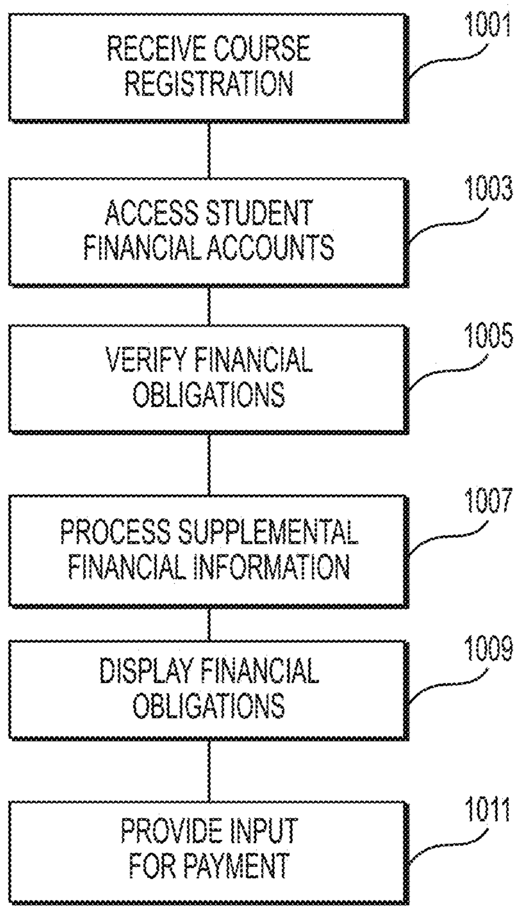
FIG. 10 illustrates an exemplary flow diagram of a financial obligation module, in accordance with one or more embodiments of the present invention.
Figure 11:
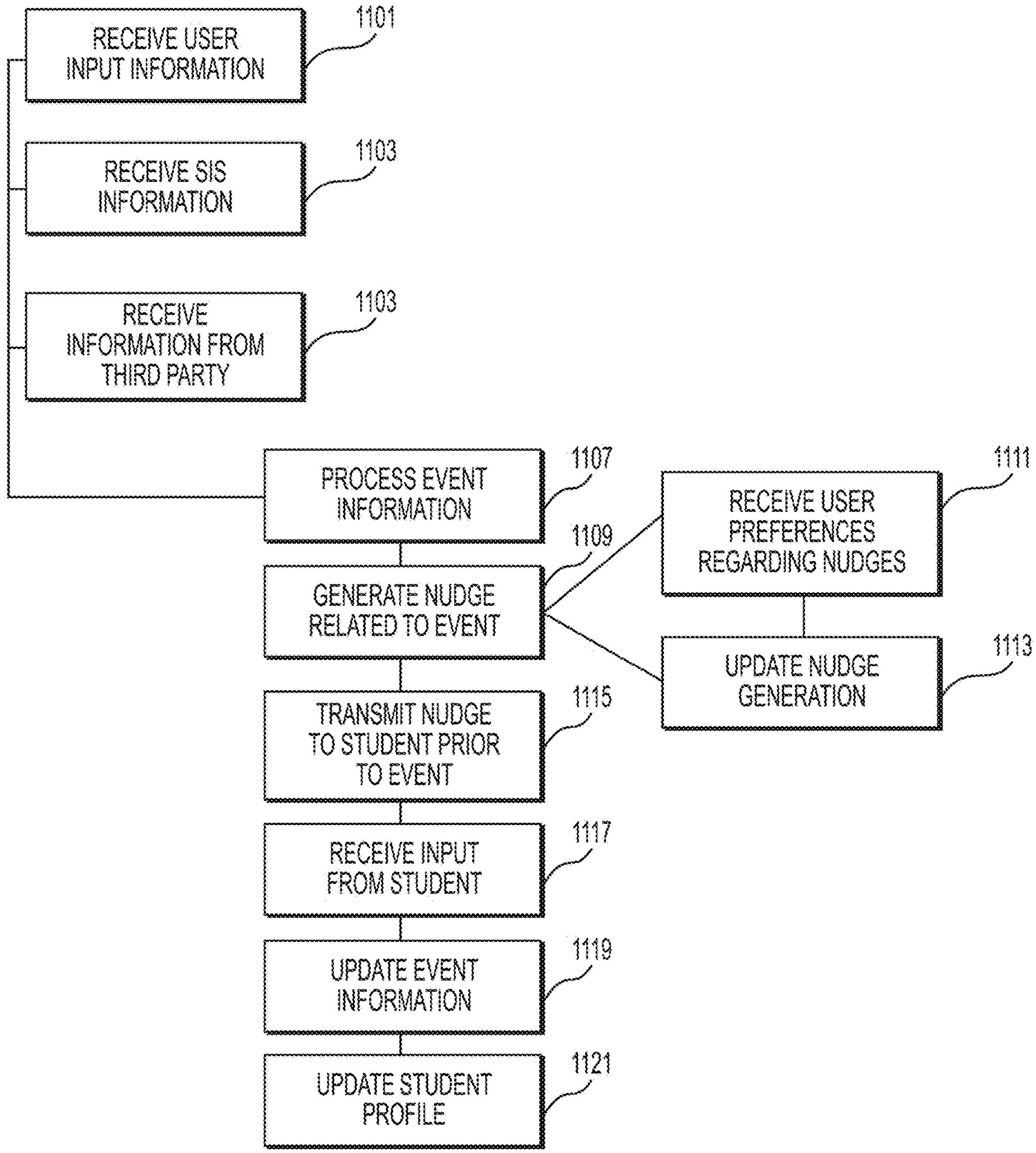
FIG. 11 illustrates an exemplary flow diagram of a nudge notification module, in accordance with one or more embodiments of the present invention.

Upon registration, variations of the tool will present, or even reconcile, the user's institution-related financial obligations, as shown in FIG. 10. For example, a course at the institution is assigned a cost, perhaps associated with the credit hour metric. Upon registration, or at a date after registration, the tool may query the institution's finance department or the student's academic profile to obtain the total cost of the registered classes may be presented to the user through the graphical interface of the tool, as shown in steps 1001 and 1003. The tool may provide gross costs, or net costs that reflect financial aid, scholarships, and other financial adjustments, as represented by steps 1005, 1007 and 1009. Preferred embodiments may present a breakdown of costs. The tool may also provide for payment pathways, as shown in step 1011. Although it is contemplated that the tool may be integrated with payment processing services, through the institution's bursar's office or through a third party bank, for example, preferred embodiments direct the user to third-party payment processing services through API's or functional links.

In other embodiments of the invention, the tool has an "advisor" module, which allows one or more of the modules of the tool, or data therefrom, to be transferred or displayed to a third party, such as an advisor. In variations, the advisor receives student-specific information, without having to have access to the tool through the students' credentials. In one variation, this module creates a summary, or a manageable portion, of the one or more modules. In certain variations, the modules to be summarized or presented can be selected by the user, the advisor, or a combination thereof. The modules may prepare an electronic copy, such as in PDF format, that may be transferable through conventional means such as email, messenger, cloud sharing, or network transfer, for example, or a hard copy.

One additional pillar of the present invention is notification module (or alternatively, the "nudge module"), which provides scheduled and timely notifications to the user. This "nudge" module prompts the student prior to deadlines, milestones and other events, already collected, as shown in operations 1101, 1103, 1105, and 1107, to remind a user of impending decision points or to prompt user to take certain action. By providing such notifications in advance, this module assists user with tracking and making decisions. The nudge module may be populated with items created by the user, institution, or a combination thereof. For example, the content, frequency, and subject matter of nudges may be adjusted by institution to target its students. For example, the user may adjust the types and frequency of notifications received, as shown in operations 1111 and 1113. A generated nudge, as shown in operation 1109, may be stored by, transmitted to, or displayed for the user at a predetermined time prior to the event, as shown in operation 1115. Nudges are preferably push notifications, but may also be pull notifications, as would be understood by one skilled in the art. Nudges may be sent via any communication means, including email, text message, short message service (SMS), multimedia messaging service (MMS), messenger (e.g., Gchat® by Google, Mountain View, Calif., BlackBerry Messenger® by BlackBerry, Waterloo, ON, CA), in app messaging, and website-specific messaging.

In embodiments of the nudge module, nudges can be personalized to the recipient user, by presenting user-specific information. In certain embodiments, and where applicable, notifications shall be compliant with applicable laws, such as security and privacy laws. Certain variations of the nudge module prompt or request responses from the recipient. A request may be presented in the form of questions and/or associated prompts or hyperlink in the original notification. In such variations, the tool may receive and process responses, as shown in operation 1117, and update the information provided by the tool accordingly, as shown in operations 1119 and 1121. For example, information received from the user may be incorporated into the user's profile and used to update existing information. The tool may be refreshed accordingly to provide current information. Nudges may be automatically generated based on predetermined rules in the tool. Nudges may further be provided in the user interface of the tool, so as to avoid spamming the student with email and other direct forms of communication.

Figure 12:
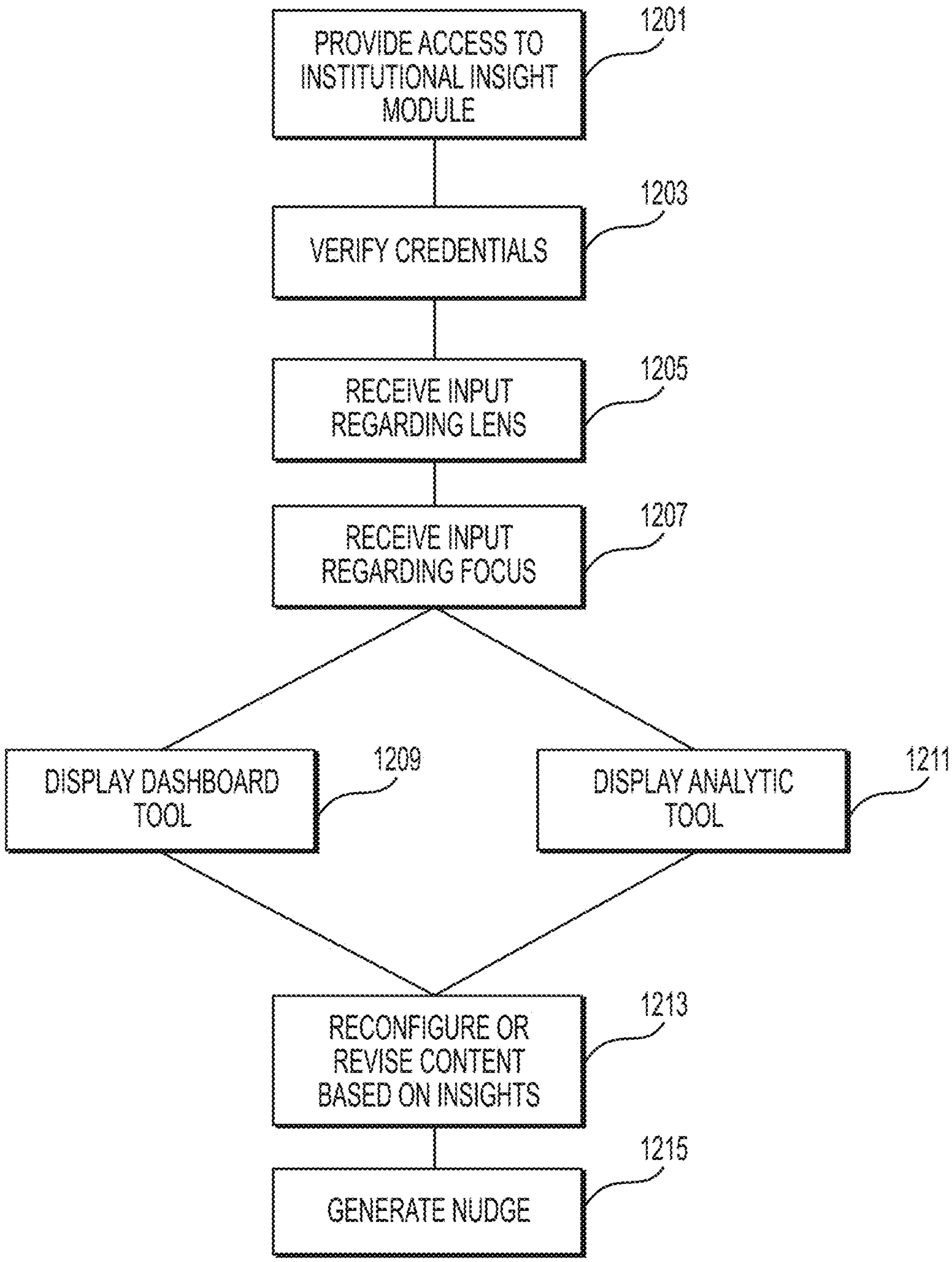
FIG. 12 illustrates an exemplary flow diagram of an analytics module corresponding to an advisor dashboard, in accordance with one or more embodiments of the present invention.

In yet other embodiments of the present invention, the institution may collect data and insights from the tool, as shown in operation 1201 in FIG. 12. Preferably each institution and its representative(s) may access the tool, as shown in operation 1203, to obtain aggregated institutional data, or aggregated data related to peer schools, schools in a particular geography (state, national, etc.). Data may be used for analytics of the tool and aggregate user population. The data may be stratified and manipulated using a lens function, which allows selection or de-selection of variables, and a focus function, which allows analysis of particular sets and/or subsets of data, as shown in operations 1205 and 1207. For example, the data collected across institutions may be aggregated preferably anonymized and used for analytics of the cross-institution user population. The data may be presented in conventional means, such as a graphical user interface "advisor" dashboard, as shown in operation 1209, or other analytic format, as shown in 1211. The institution may make changes based on the analytical information, as shown in operations 1213. In some variations, the institution may develop additional institution events to display to a population of users and corresponding nudges, as shown in operation 1215. In some variations, the tool may be functionally integrated with an advisor workflow tool (e.g., GradesFirst™, The Advisory Board Company, Washington, D.C.).

Additional tools may be connected to the dashboard. For example, alerts and flags for students may pop up on the tool user interface as students pass or miss milestones. Students may be groups into campaigns, and advisors may be shown a run-down of a sub group of students. Data may be shared, along with any analyses thereof, with other platforms. Risk scores for certain students may be generated and shared. The dashboard may also allow resource planning and allocation. An incoming class may be analyzed, for example, and may be more veteran heavy than previous years. Staff may be moved around accordingly. The dashboard may also allow administrators to analyze data for recruitment purposes. Advisor users may be able to see where students are coming from, and look at high school conversion rate and yield rate (e.g., students that show up on day one).

FIG. 13 depicts an admissions letter from an academic institution to an applicant, according to exemplary embodiments of the present disclosure. An admissions letter according to exemplary embodiments of the present disclosure may include a web site address and student ID to log in to "My Path." An admissions letter such as the admissions letter of FIG. 13 may be presented, for example, as a document, in an application, on a web page, or on a mobile device, etc.

Figure 14:
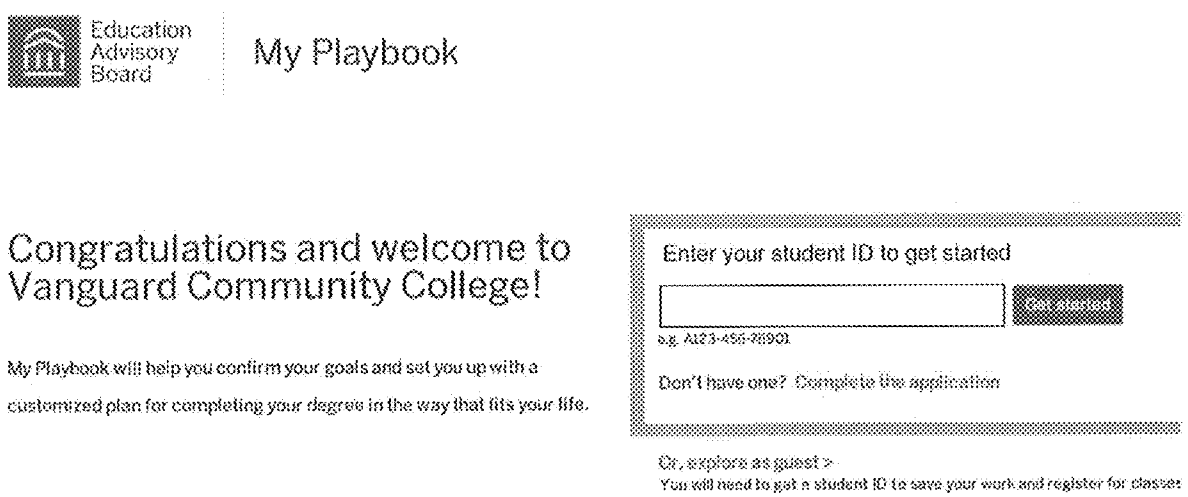
FIG. 14 depicts a form for logging in to "My Playbook" for an academic institution, according to exemplary embodiments of the present disclosure.

FIG. 14 depicts a form for logging in to "My Playbook" for an academic institution, according to exemplary embodiments of the present disclosure. A form according to exemplary embodiments of the present disclosure may include a form for entering a student ID.

Figure 15:
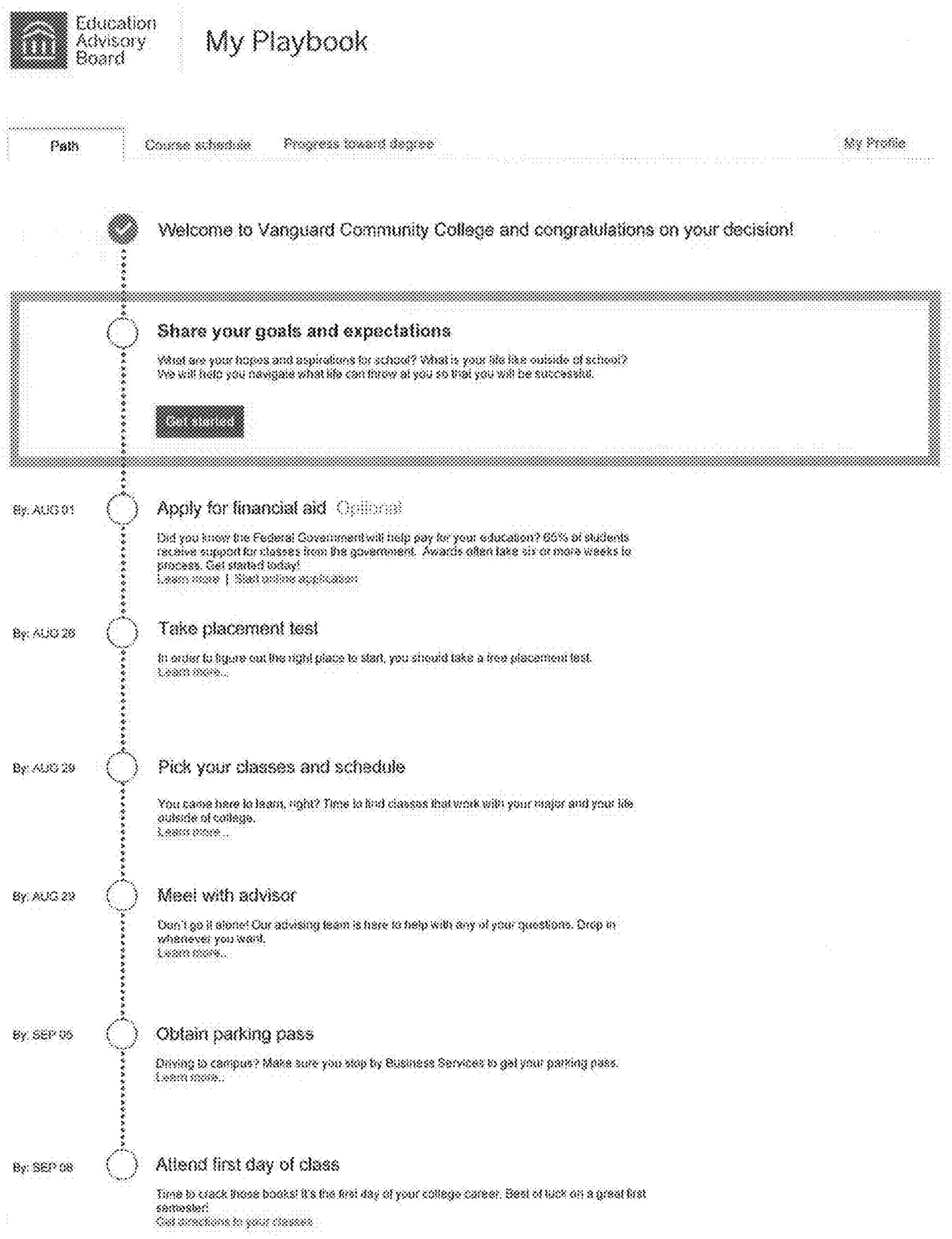
FIG. 15 depicts a "My Playbook" form, according to exemplary embodiments of the present disclosure.

FIG. 15 depicts a "My Playbook" form, according to exemplary embodiments of the present disclosure. A "My Playbook" form according to exemplary embodiments of the present disclosure may include a plurality of tasks to be completed by the user. Each task may include a target completion date. In FIG. 15, for example, the first task, "Share your goals and expectations" is selected. A "Get Started" button for initiating the selected task may be provided. Other tasks presented with a "My Playbook" form according to exemplary embodiments of the present disclosure may include, for example, "Apply for financial aid," "Take a placement test," "Pick your classes and schedule," "Meet with an advisor," "Obtain parking pass," and "Attend first day of class," etc.

A "My Playbook" form, according to exemplary embodiments of the present disclosure such as the "My Playbook" form of FIG. 15 may be presented, for example, in an application, on a web page, or on a mobile device, etc.

Figure 16:
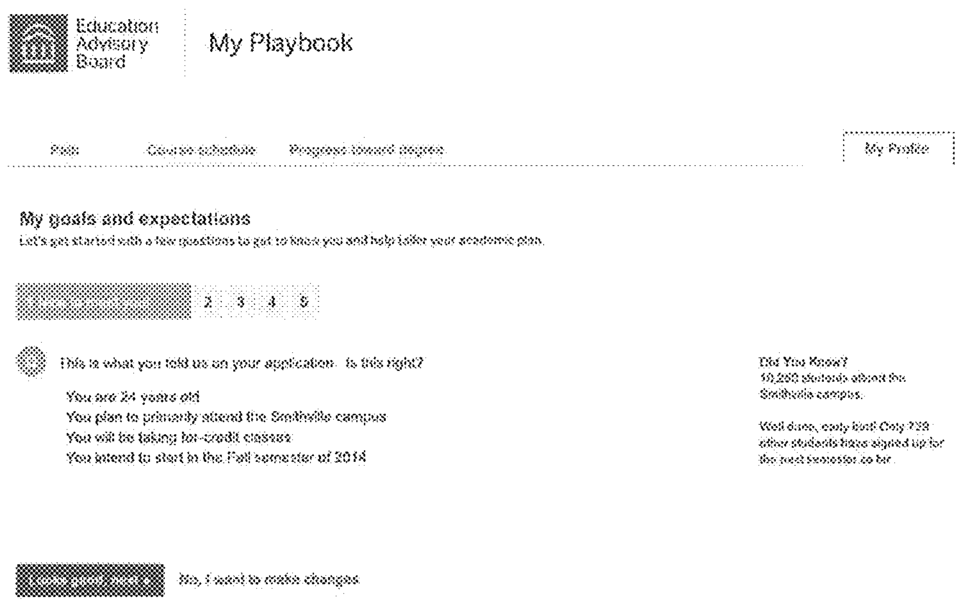
FIG. 16 depicts a profile editing form for completing a "My goals and expectations" task, according to exemplary embodiments of the present disclosure.

FIG. 16 depicts a profile editing form for completing a "My goals and expectations" task, according to exemplary embodiments of the present disclosure. A profile editing form according to exemplary embodiments of the present disclosure may display, for example, profile information and may include buttons to accept or modify the displayed profile information.

Figure 17:
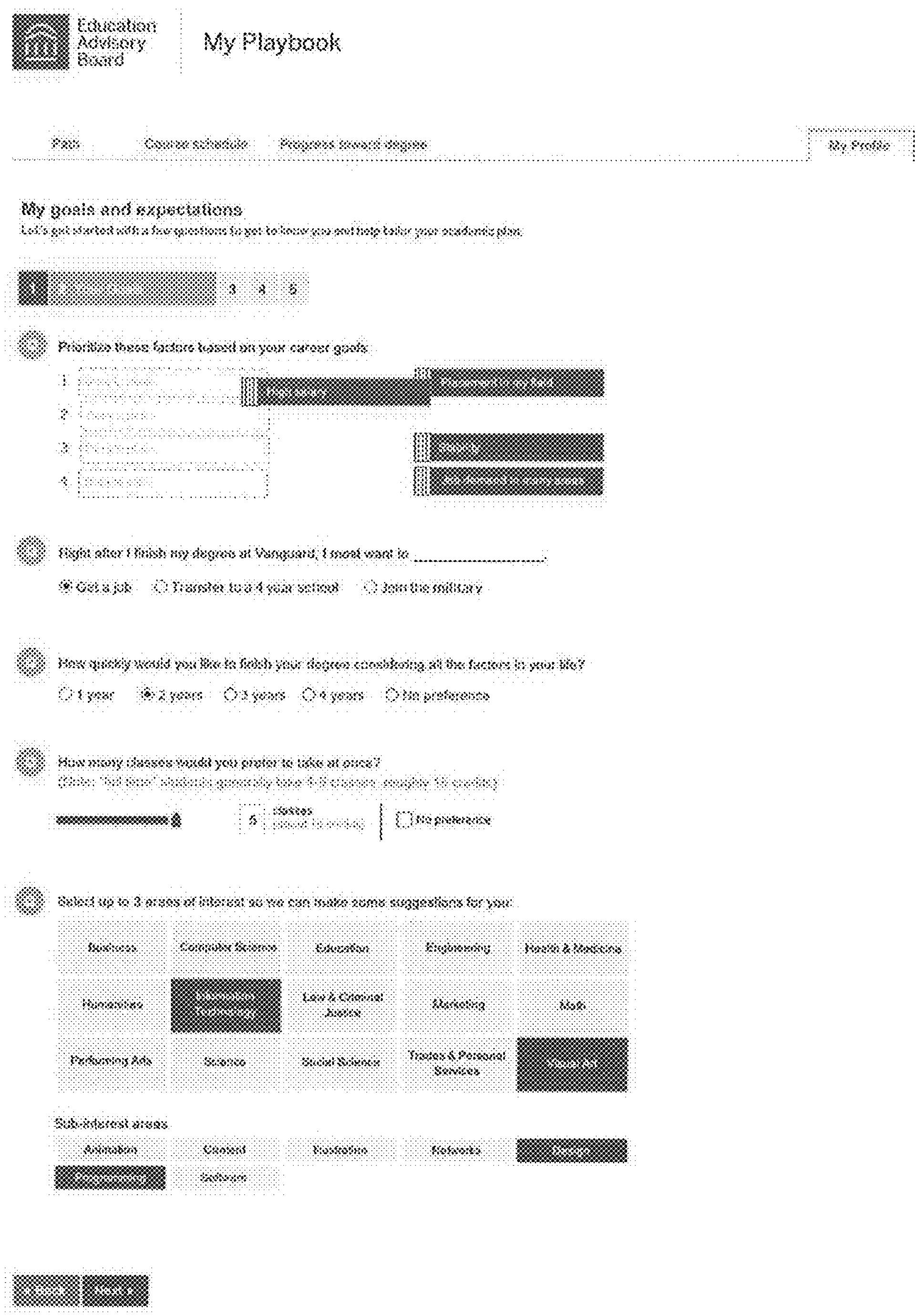
FIG. 17 depicts a form defining goals for completing a "My goals and expectations" task, according to exemplary embodiments of the present disclosure.

FIG. 17 depicts a form defining goals for completing a "My goals and expectations" task, according to exemplary embodiments of the present disclosure. A form defining goals according to exemplary embodiments of the present disclosure may include, for example, elements for prioritizing factors, defining future plans, setting parameters for degree completion and class scheduling and selecting one or more areas of interest. The form may further include buttons to move to a next or previous form.

Figure 18:
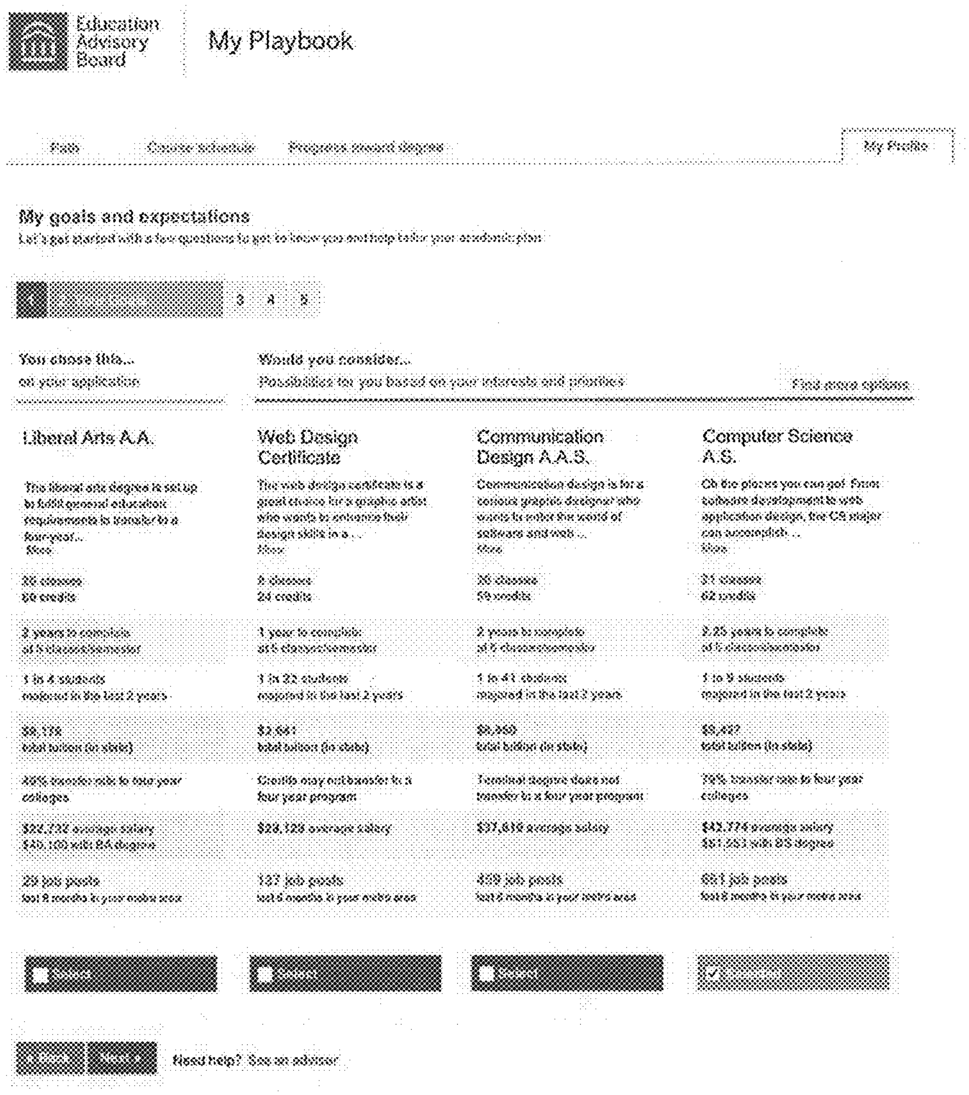
FIG. 18 depicts a form for selecting a course of study for completing a "My goals and expectations" task, according to exemplary embodiments of the present disclosure.

FIG. 18 depicts a form for selecting a course of study for completing a "My goals and expectations" task, according to exemplary embodiments of the present disclosure. A form for selecting a course of study according to exemplary embodiments of the present disclosure may include, for example, information related to one or more academic courses of study. For each course of study, the form may include a check box for selecting that course of study.

Figure 19:
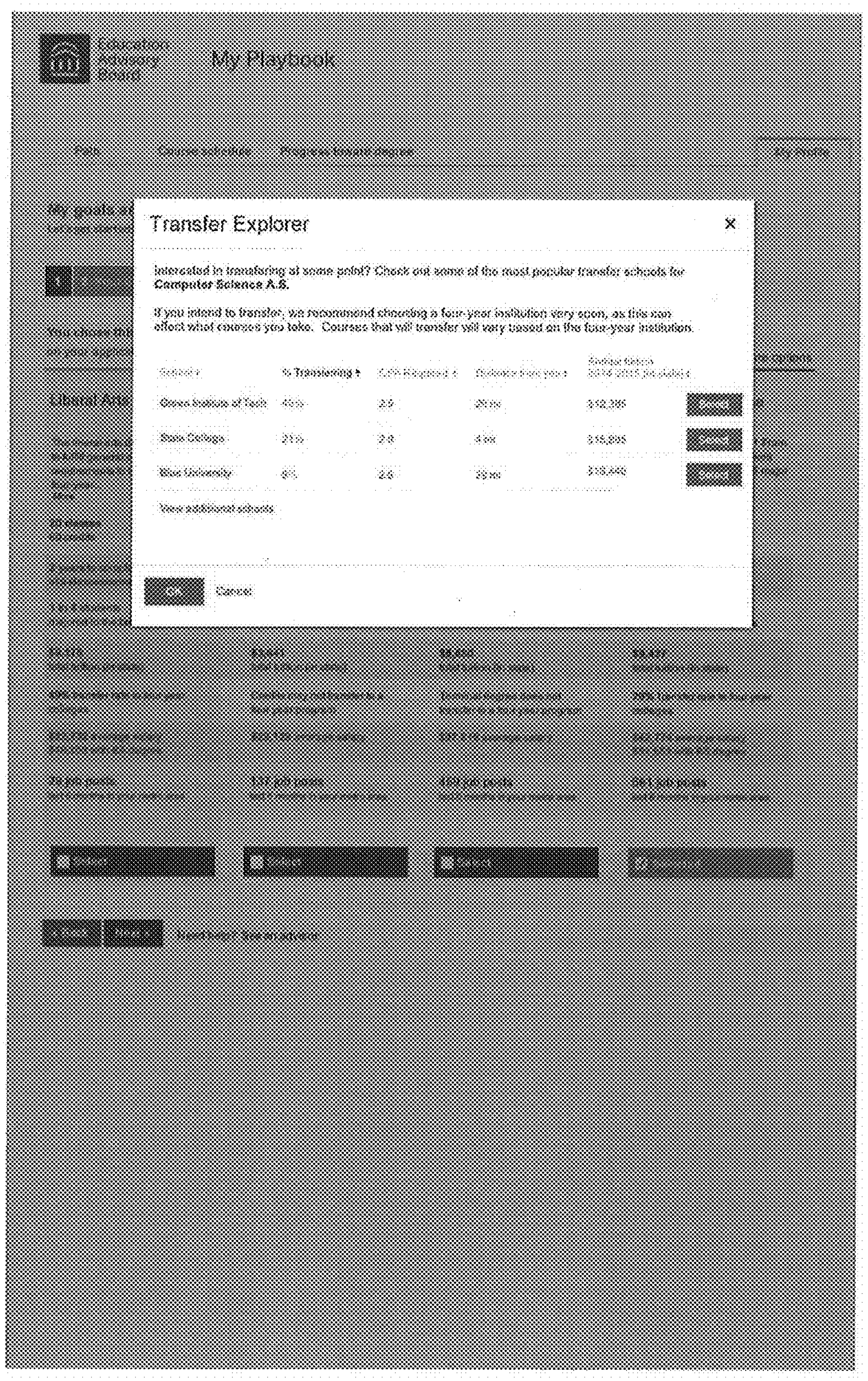
FIG. 19 depicts a form to display information related to transfer to one or more academic institutions, according to exemplary embodiments of the present disclosure.

FIG. 19 depicts a form to display information related to transfer to one or more academic institutions, according to exemplary embodiments of the present disclosure. A form to display information related to transfer to one or more academic institutions may include, for each academic institution displayed, detailed information about the institution. The form may further include buttons to select each listed institution. The form may further include an option to view additional institutions, accept the current selection or cancel the current selection.

Figure 20:
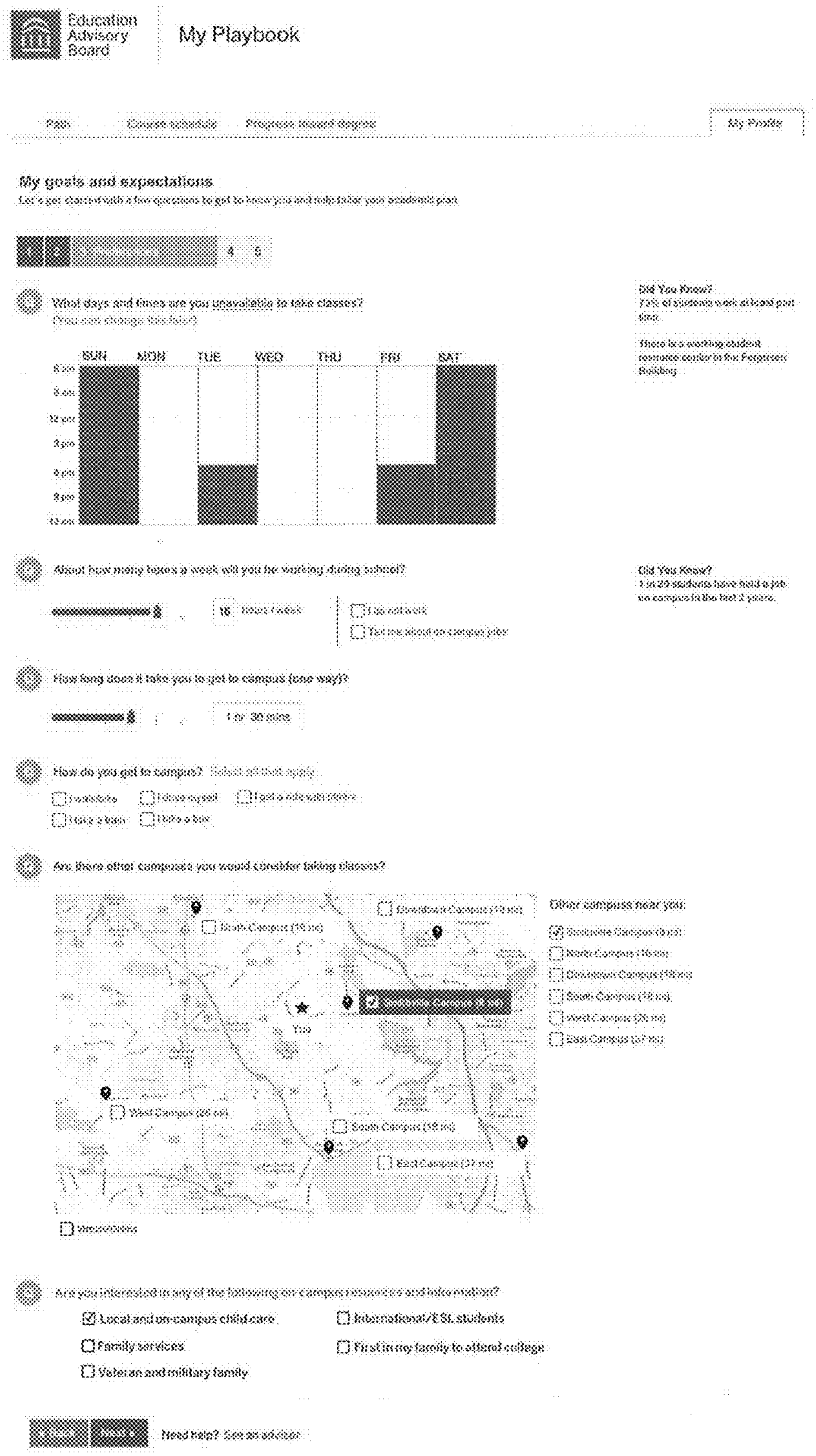
FIG. 20 depicts a form for setting preferences for completing a "My goals and expectations" task, according to exemplary embodiments of the present disclosure.

FIG. 20 depicts a form for setting preferences for completing a "My goals and expectations" task, according to exemplary embodiments of the present disclosure. A form for setting preferences according to exemplary embodiments of the present disclosure may include, for example, elements for defining day and time availability, setting a number of work hours outside of school, commuting information and campus resources. The form may further include information about alternative locations for enrollment.

Figure 21:
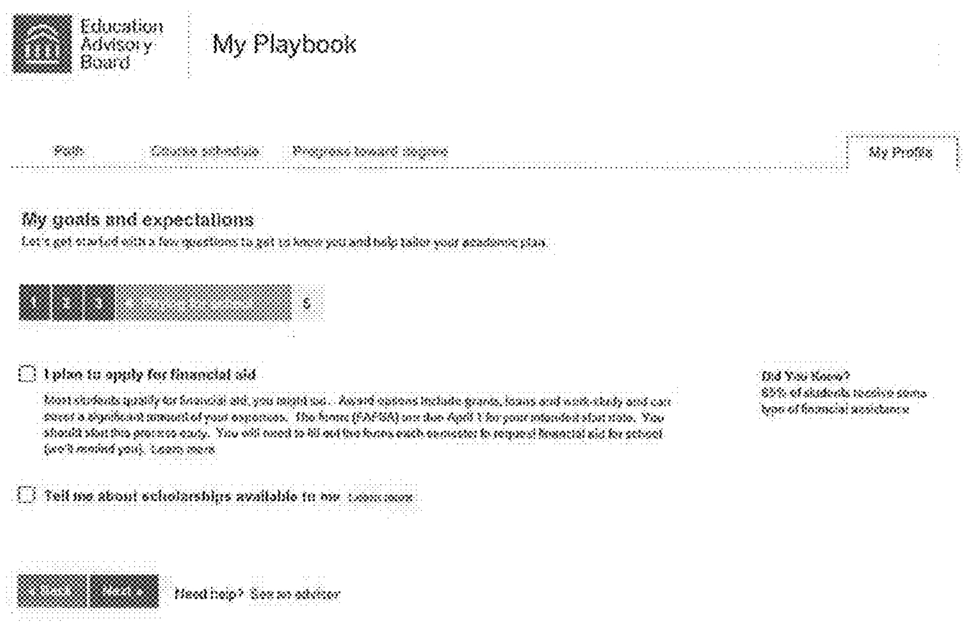
FIG. 21 depicts a form for financial planning for completing a "My goals and expectations" task, according to exemplary embodiments of the present disclosure.

FIG. 21 depicts a form for financial planning for completing a "My goals and expectations" task, according to exemplary embodiments of the present disclosure. A form for financial planning according to exemplary embodiments of the present disclosure may include, for example, elements to indicate that a student plans to apply for financial aid or to request information about scholarships.

Figure 22:
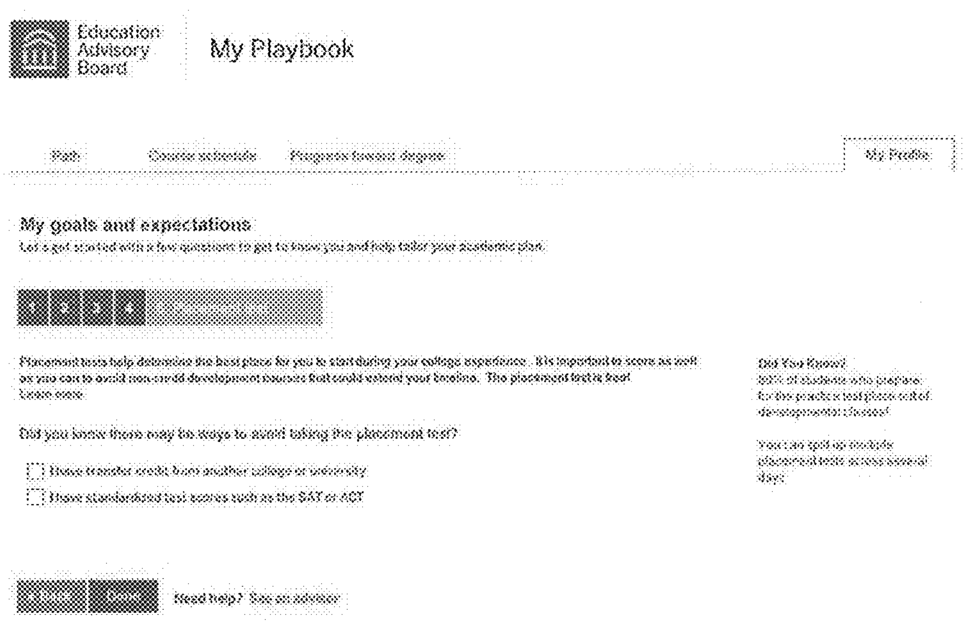
FIG. 22 depicts a form for entering testing information for completing a "My goals and expectations" task, according to exemplary embodiments of the present disclosure.

FIG. 22 depicts a form for entering testing information for completing a "My goals and expectations" task, according to exemplary embodiments of the present disclosure. A form for entering testing information according to exemplary embodiments of the present disclosure may include, for example, elements to enter information about transfer credits and standardized tests.

Figure 23:
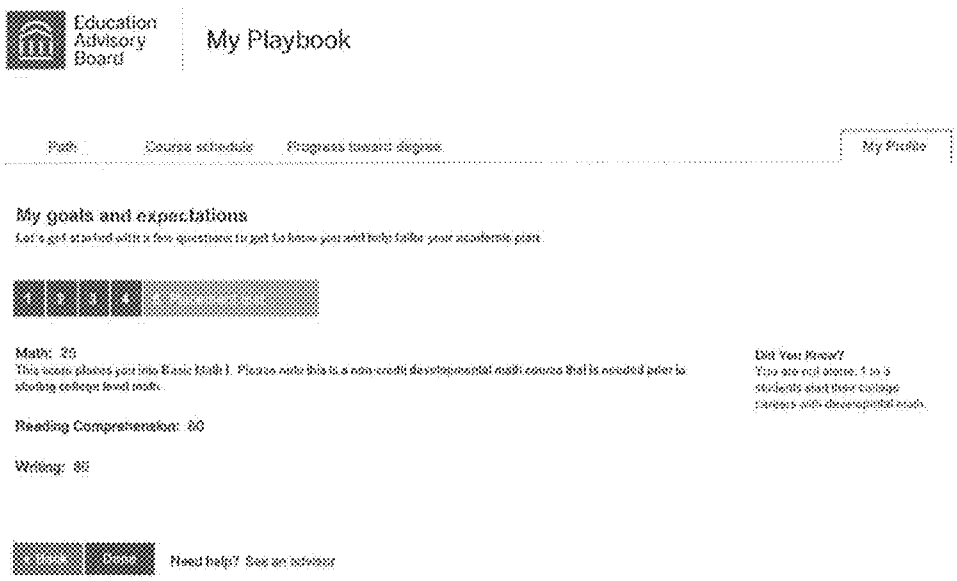
FIG. 23 depicts a form for displaying testing information for completing a "My goals and expectations" task, according to exemplary embodiments of the present disclosure.

FIG. 23 depicts a form for displaying testing information for completing a "My goals and expectations" task, according to exemplary embodiments of the present disclosure. A form for displaying testing information according to exemplary embodiments of the present disclosure may include, for example, information displaying test scores in one or more academic areas. The form may further include detailed information for interpreting one or more of the displayed test scores.

Figure 24:
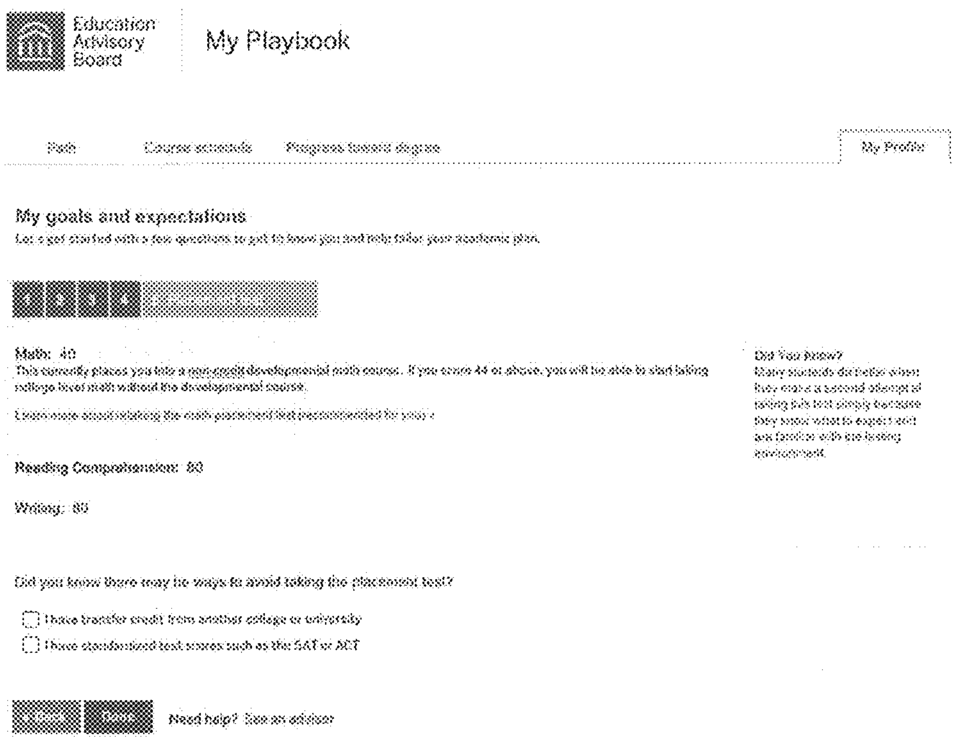
FIG. 24 depicts a form for entering testing information and displaying testing information for completing a "My goals and expectations" task, according to exemplary embodiments of the present disclosure.

FIG. 24 depicts a form for entering testing information and displaying testing information for completing a "My goals and expectations" task, according to exemplary embodiments of the present disclosure. A form for entering testing information and displaying testing information according to exemplary embodiments of the present disclosure may include, for example, information displaying test scores in one or more academic areas. The form may further include detailed information for interpreting one or more of the displayed test scores. The form may also include, for example, elements to enter information about transfer credits and standardized tests.

Figure 25:
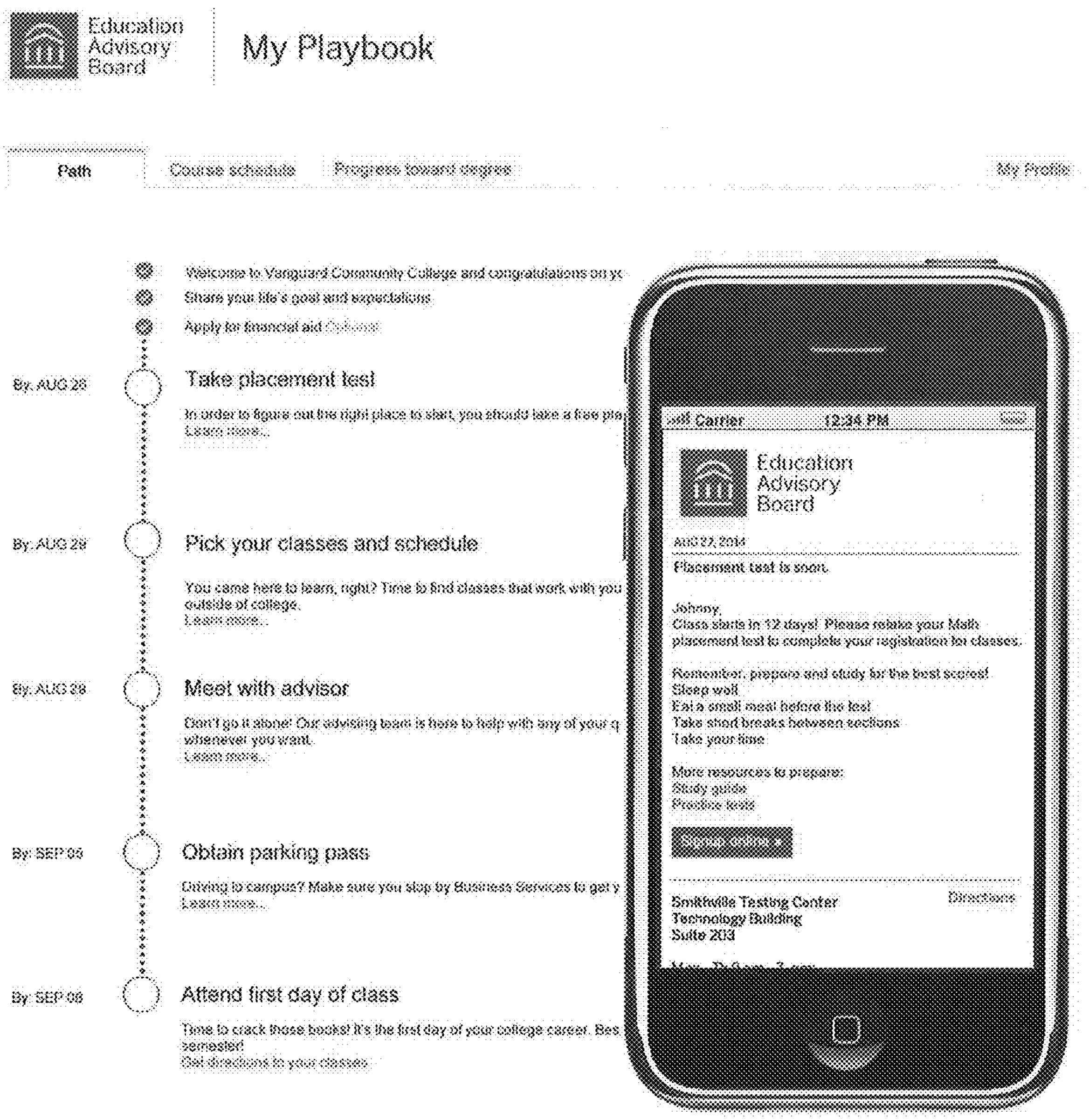
FIG. 25 depicts a "My Playbook" form and a communication related to a current task displayed on a mobile device, according to exemplary embodiments of the present disclosure.

FIG. 25 depicts a "My Playbook" form and a communication related to a current task displayed on a mobile device, according to exemplary embodiments of the present disclosure. A "My Playbook" form according to exemplary embodiments of the present disclosure may include a plurality of tasks to be completed by the user. In FIG. 25, for example, the task "Take placement test" is to be completed. A communication related to the "Take placement test" task such as an e-mail, or the like, may be displayed on a user's mobile device.

Figure 26:
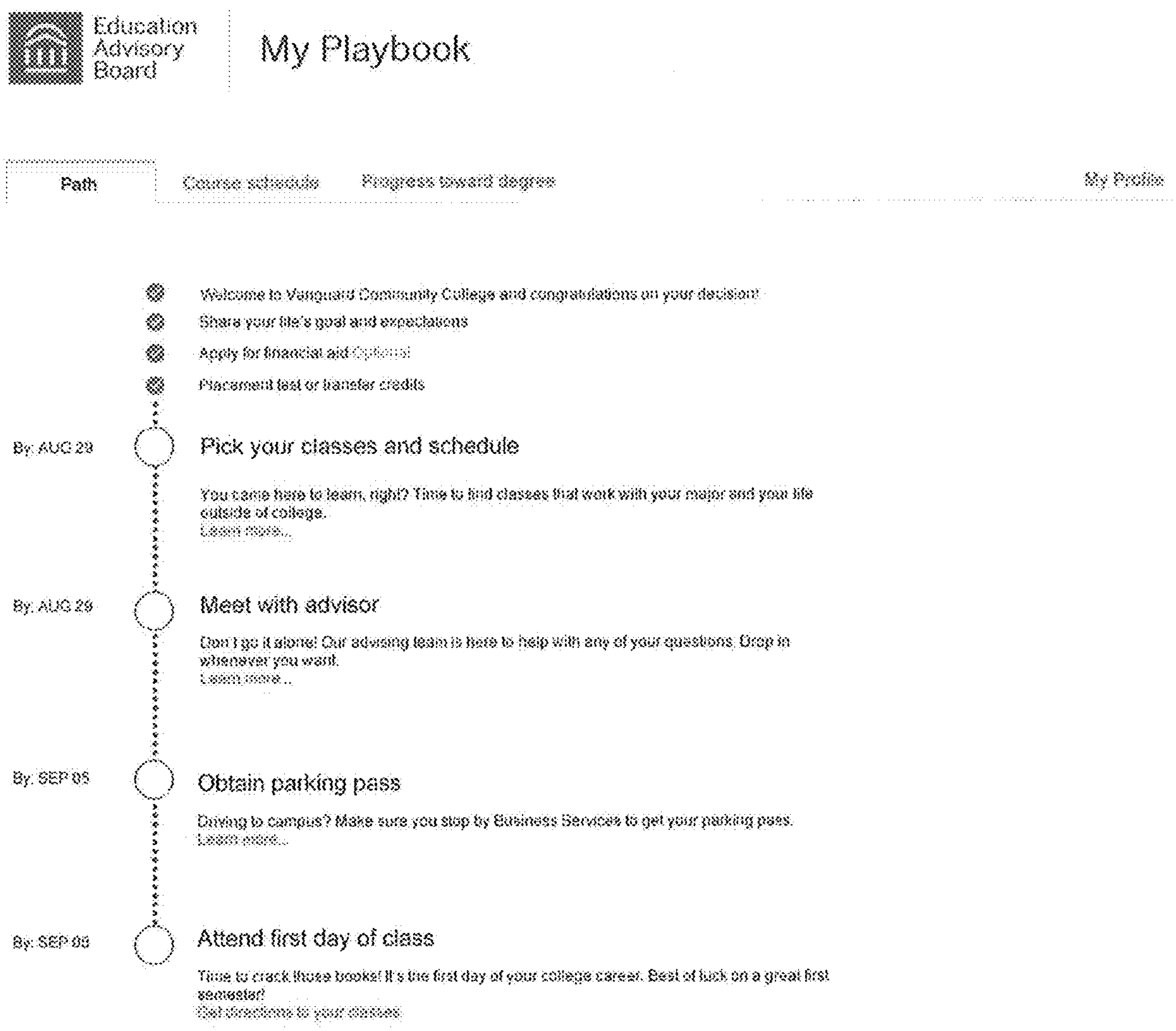
FIG. 26 depicts a "My Playbook" form, according to exemplary embodiments of the present disclosure.

FIG. 26 depicts a "My Playbook" form, according to exemplary embodiments of the present disclosure. A "My Playbook" form according to exemplary embodiments of the present disclosure may include a plurality of tasks to be completed by the user. In FIG. 26, for example, the task "Pick your classes and schedule" is to be completed.

Figure 27:
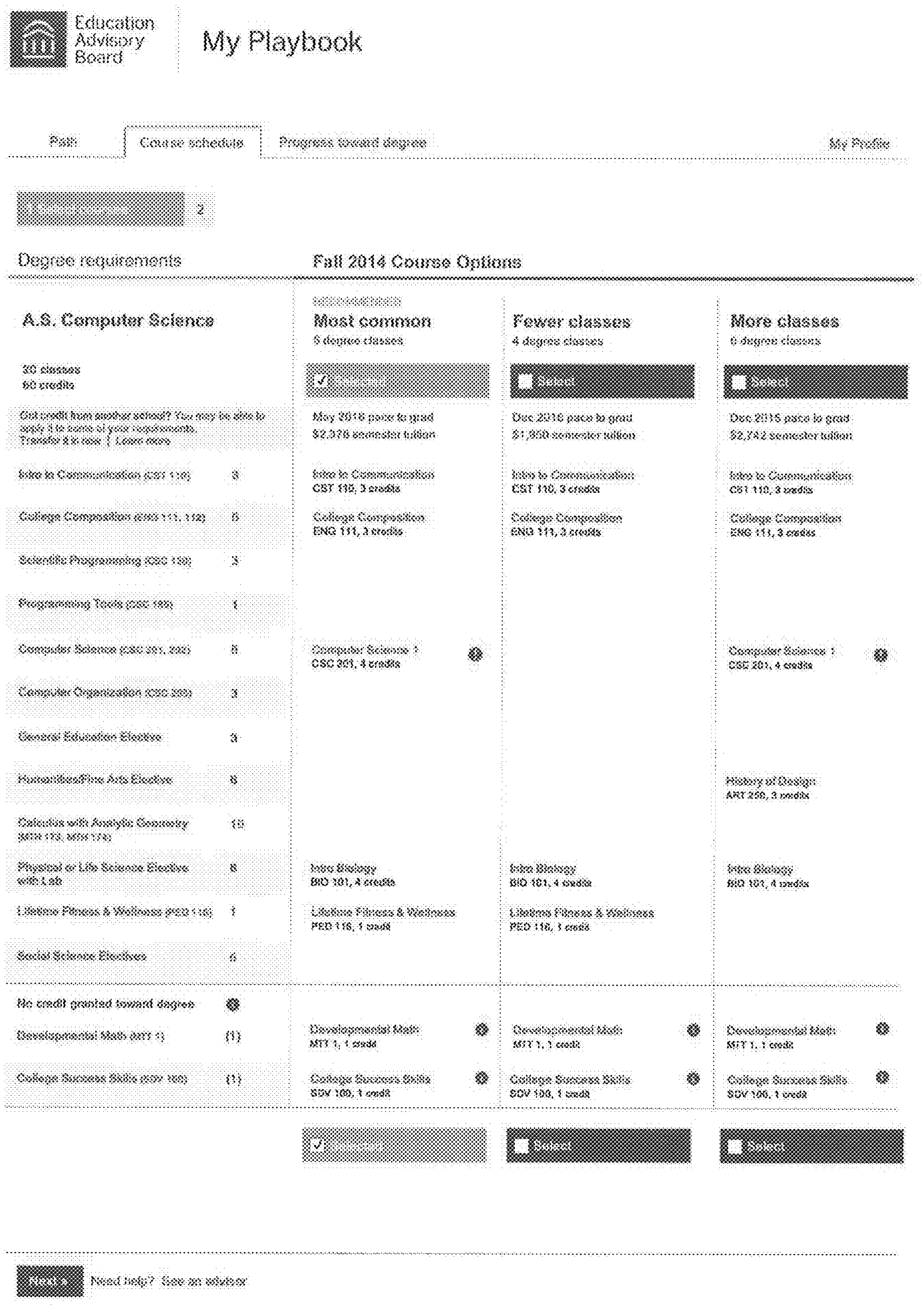
FIG. 27 depicts a form for selecting academic course options for completing a "Pick your classes and schedule" task, according to exemplary embodiments of the present disclosure.

FIG. 27 depicts a form for selecting academic course options for completing a "Pick your classes and schedule" task, according to exemplary embodiments of the present disclosure. A form for selecting academic course options according to exemplary embodiments of the present disclosure may include, for example, information about one or more for a number or types of classes to be taken in a semester. The form may also include information about the total number of courses required in each of one or more areas of study. An icon indicating additional information for one or more of the listed courses may be displayed with the listed course.

Figure 28:
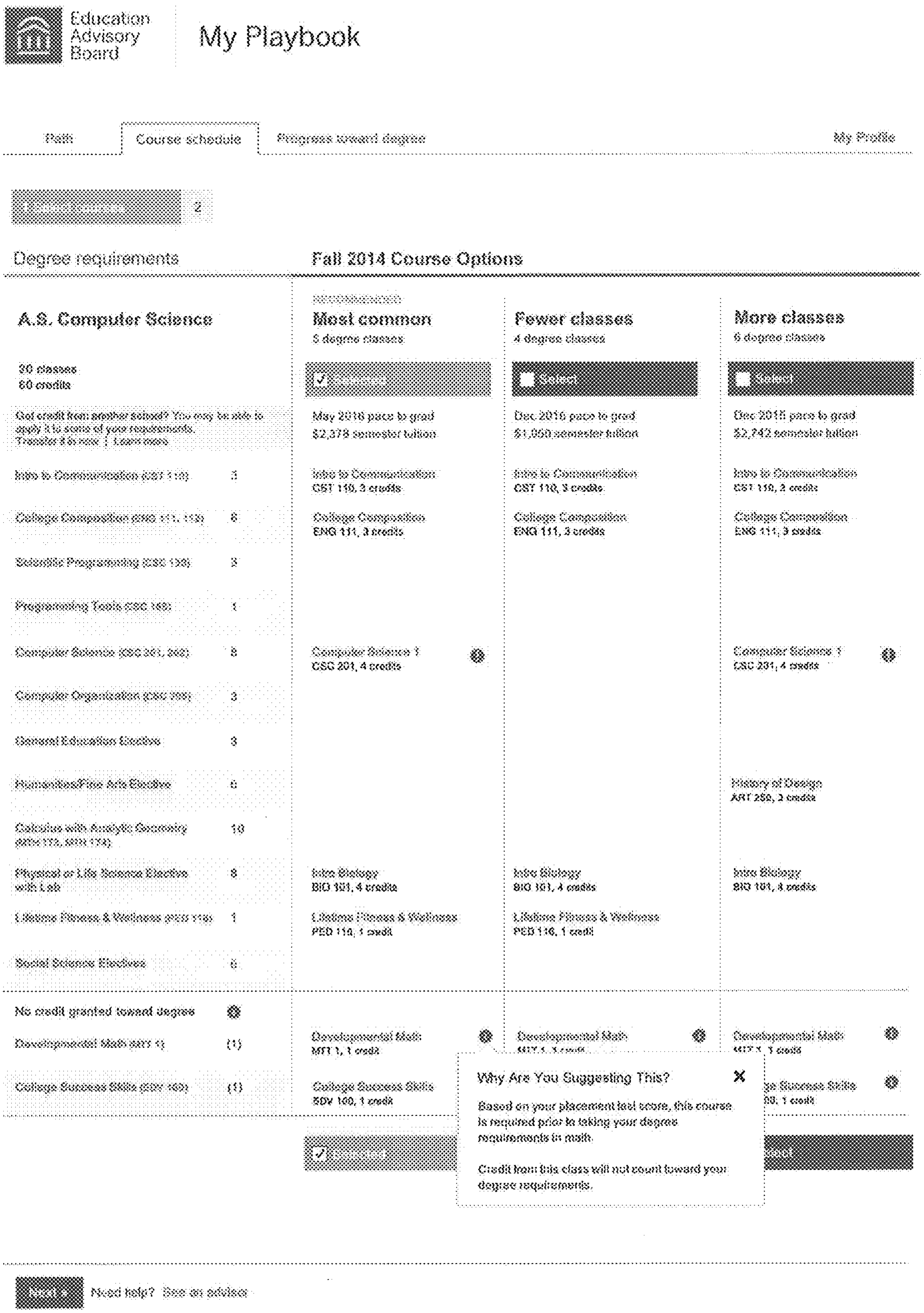
FIG. 28 depicts a form for selecting academic course options for completing a "Pick your classes and schedule" task, according to exemplary embodiments of the present disclosure.

FIG. 28 depicts a form for selecting academic course options for completing a "Pick your classes and schedule" task, according to exemplary embodiments of the present disclosure. A form for selecting academic course options according to exemplary embodiments of the present disclosure may include, for example, an icon indicating additional information for one or more of the listed courses may be displayed with the listed course. If a user selects a displayed icon, additional information about the course may be displayed, for example, overlaying the form. The displayed information may include, for example, a description of one or more reasons the course is displayed on the student's schedule.

Figure 29:
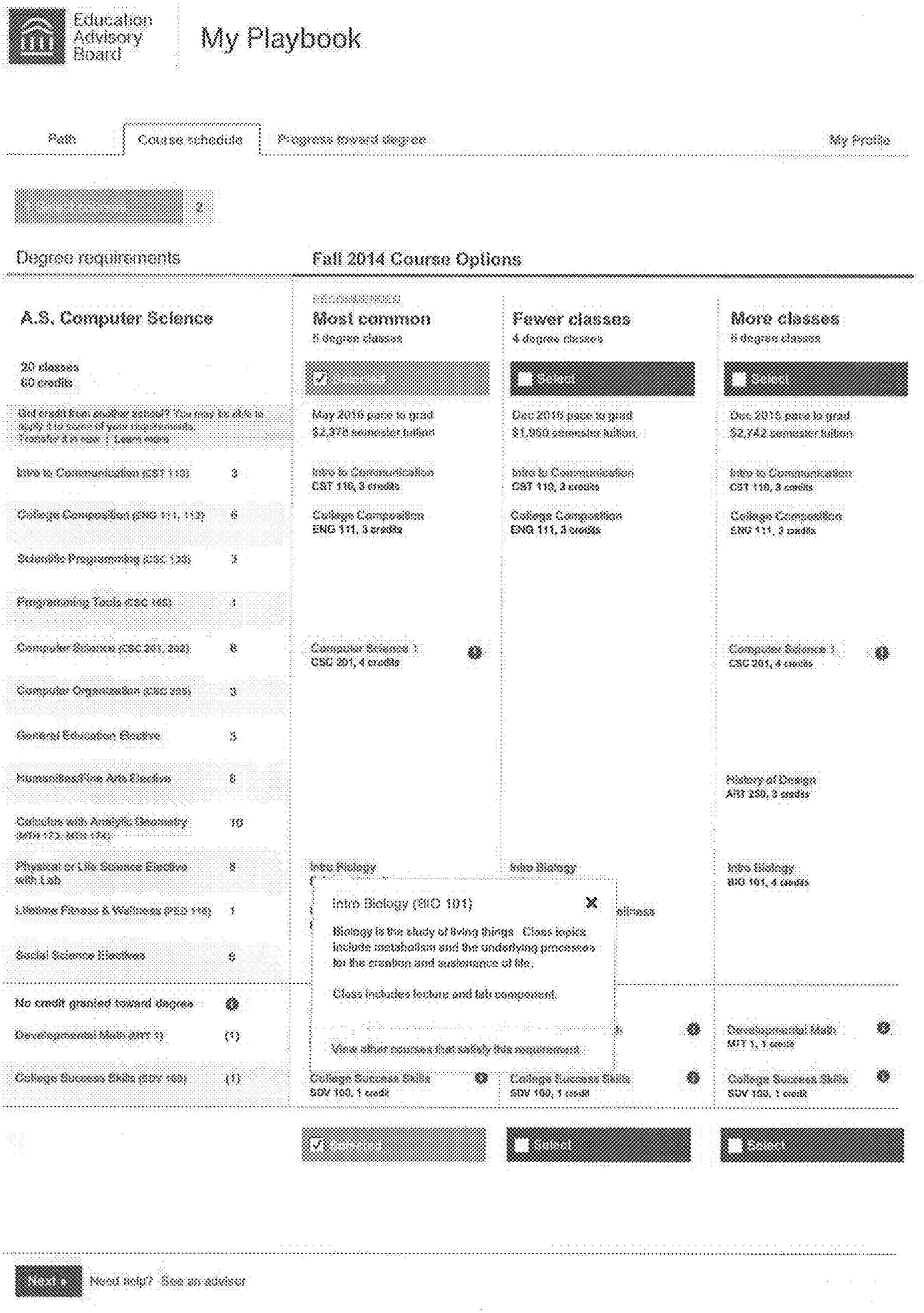
FIG. 29 depicts a form for selecting academic course options for completing a "Pick your classes and schedule" task, according to exemplary embodiments of the present disclosure.

FIG. 29 depicts a form for selecting academic course options for completing a "Pick your classes and schedule" task, according to exemplary embodiments of the present disclosure. A form for selecting academic course options according to exemplary embodiments of the present disclosure may include, for example, an icon indicating additional information for one or more of the listed courses may be displayed with the listed course. If a user selects a displayed icon, additional information about the course may be displayed, for example, overlaying the form. The displayed information may include, for example, a description of the course content of the selected course.

Figure 30:
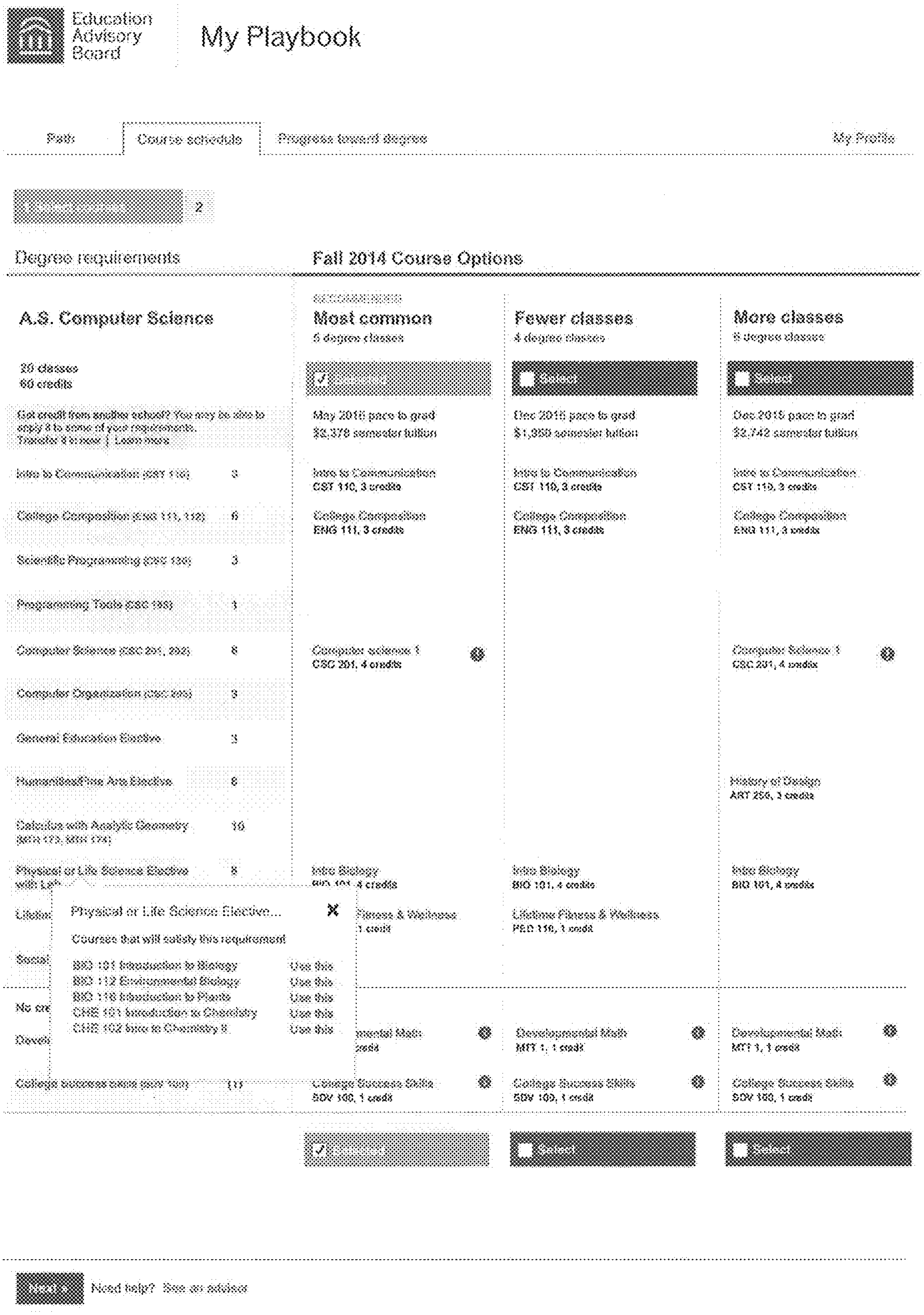
FIG. 30 depicts a form for selecting academic course options for completing a "Pick your classes and schedule" task, according to exemplary embodiments of the present disclosure.

FIG. 30 depicts a form for selecting academic course options for completing a "Pick your classes and schedule" task, according to exemplary embodiments of the present disclosure. A form for selecting academic course options according to exemplary embodiments of the present disclosure may include, for example information about the total number of courses required in each of one or more areas of study. As shown in FIG. 30, if a user selects one of the listed areas of study, a list of classes satisfying the related course requirements may be displayed, for example, overlaying the form.

Figure 31:
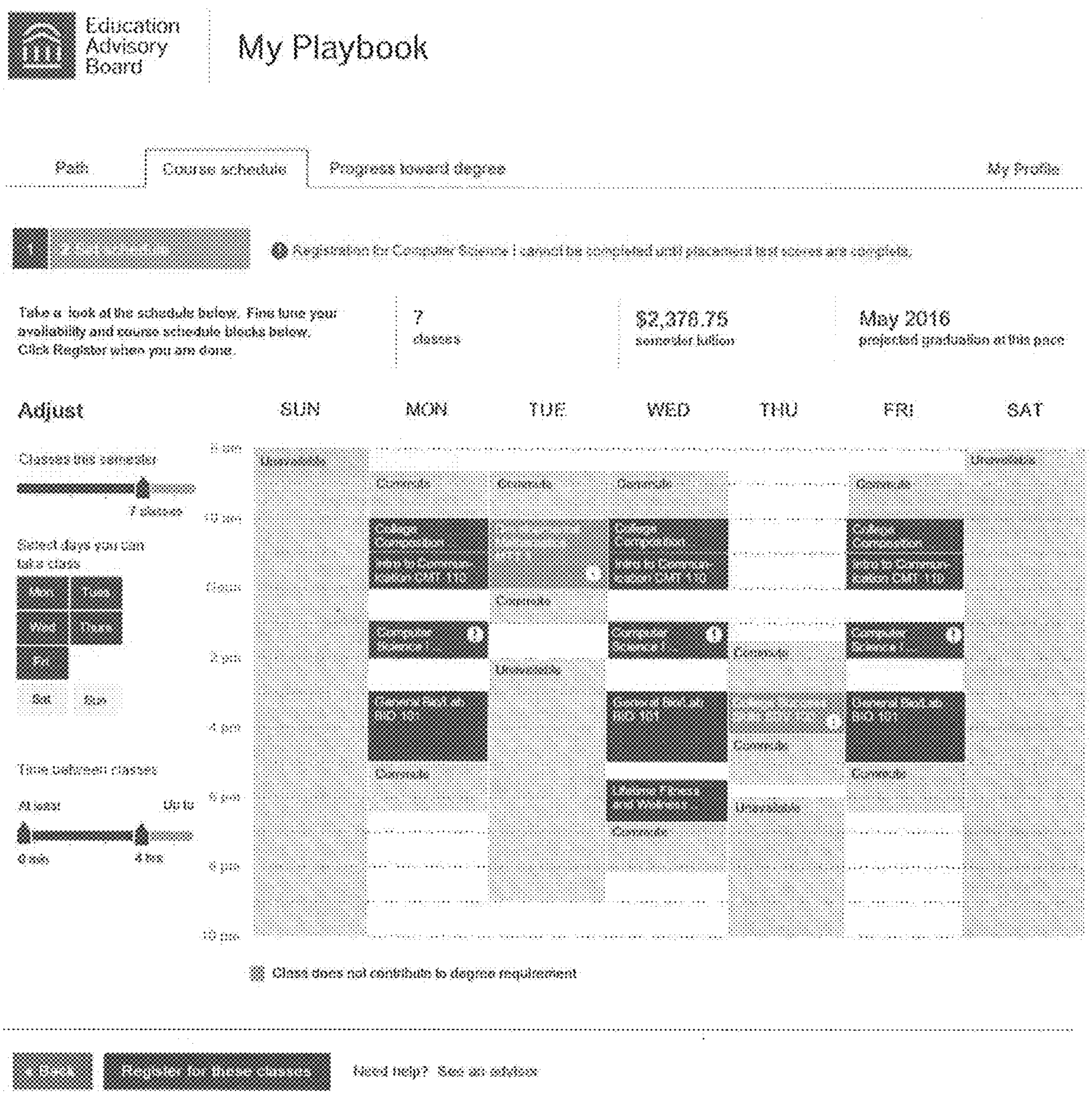
FIGS. 31-33 depict a form for arranging selected courses on a calendar grid, according to exemplary embodiments of the present disclosure.
Figure 32:
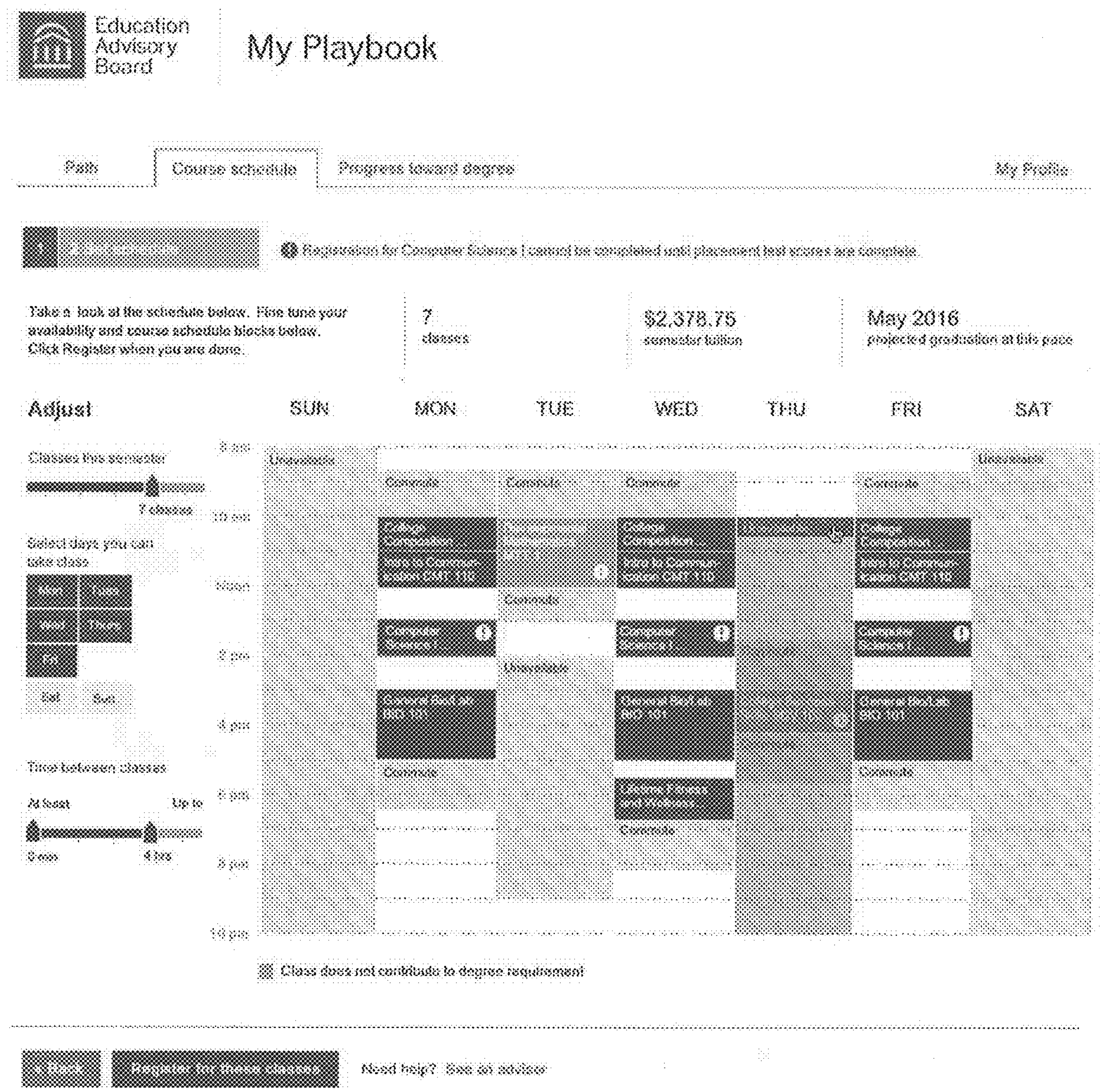
Figure 33:

FIGS. 31-33 depict a form for arranging selected courses on a calendar grid, according to exemplary embodiments of the present disclosure. The form for arranging selected courses on a calendar grid, according to exemplary embodiments of the present disclosure may include a grid of days of the week and times of day on which selected courses may be displayed. The form may also include, for example, elements to set a preferred number of classes per semester, preferred days on which to attend classes and a preferred amount of time between classes. Informational notices about selected classes may be displayed. The form may also display, for example, information about semester tuition costs for the selected courses and a projected graduation date.

As depicted in FIG. 32, a user may select a range of days and times on the grid to, for example, change the student's availability for the selected days and times. As shown in FIG. 32, a user may set the availability for the selected days and time to "Unavailable." As shown in FIG. 33, upon setting the availability for the selected days and times to "Unavailable" the previously scheduled classes for the selected days and times may be removed from the schedule.

FIG. 34 depicts a form confirming completion of a course schedule, according to exemplary embodiments of the present disclosure. A form confirming completion of a course schedule according to exemplary embodiments of the present disclosure may include, for example, a listing of the enrolled courses. The form may also include a summary of degree and total credits for the enrolled term and the tuition information for the enrolled term. The form may also include information about additional tasks to be completed, such as, for example, the completion of placement tests.

Figure 35:
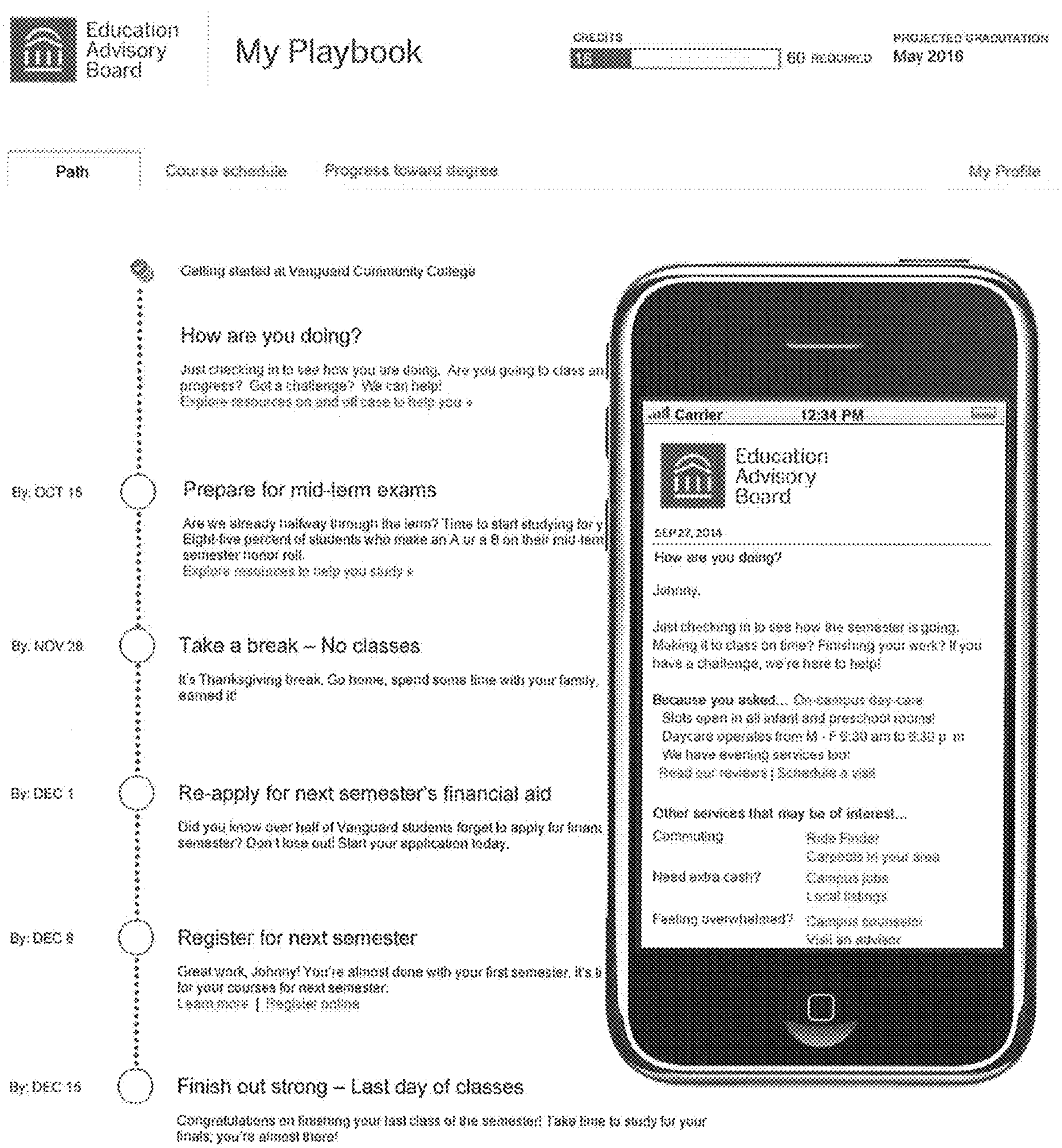
FIG. 35 depicts a "My Playbook" form and a communication related to a current task displayed on a mobile device, according to exemplary embodiments of the present disclosure.

FIG. 35 depicts a "My Playbook" form and a communication related to a current task displayed on a mobile device, according to exemplary embodiments of the present disclosure. A "My Playbook" form according to exemplary embodiments of the present disclosure may include a plurality of tasks to be completed by the user. In FIG. 35, for example, the task "Prepare for mid-term exams" is to be completed. A communication related to the "Prepare for mid-term exams" task such as an e-mail, or the like, may be displayed on a user's mobile device, according to exemplary embodiments of the present disclosure.

Other tasks presented with a "My Playbook" form according to exemplary embodiments of the present disclosure may include, for example, "Take a break—no classes," "Re-apply for next semester's financial aid," "Register for next semester," and "Finish out strong—Last day of classes," etc.

Figure 36:
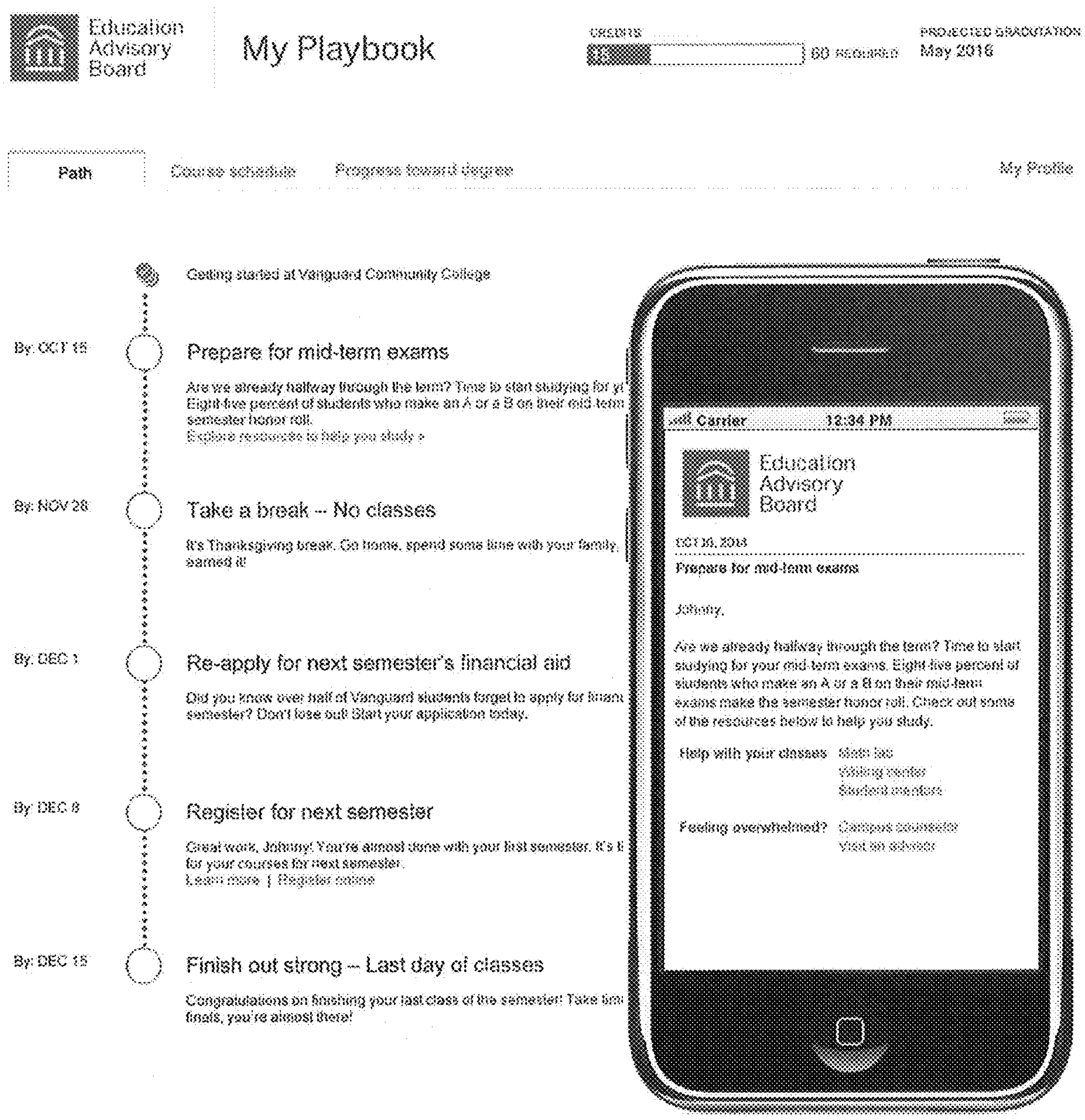
FIG. 36 depicts a "My Playbook" form and a communication related to a current task displayed on a mobile device, according to exemplary embodiments of the present disclosure.

FIG. 36 depicts a "My Playbook" form and a communication related to a current task displayed on a mobile device, according to exemplary embodiments of the present disclosure. A "My Playbook" form according to exemplary embodiments of the present disclosure may include a plurality of tasks to be completed by the user. In FIG. 36, for example, the task "Prepare for mid-term exams" is to be completed. A communication related to the "Prepare for mid-term exams" task such as an e-mail, or the like, may be displayed on a user's mobile device, according to exemplary embodiments of the present disclosure.

Figure 37:
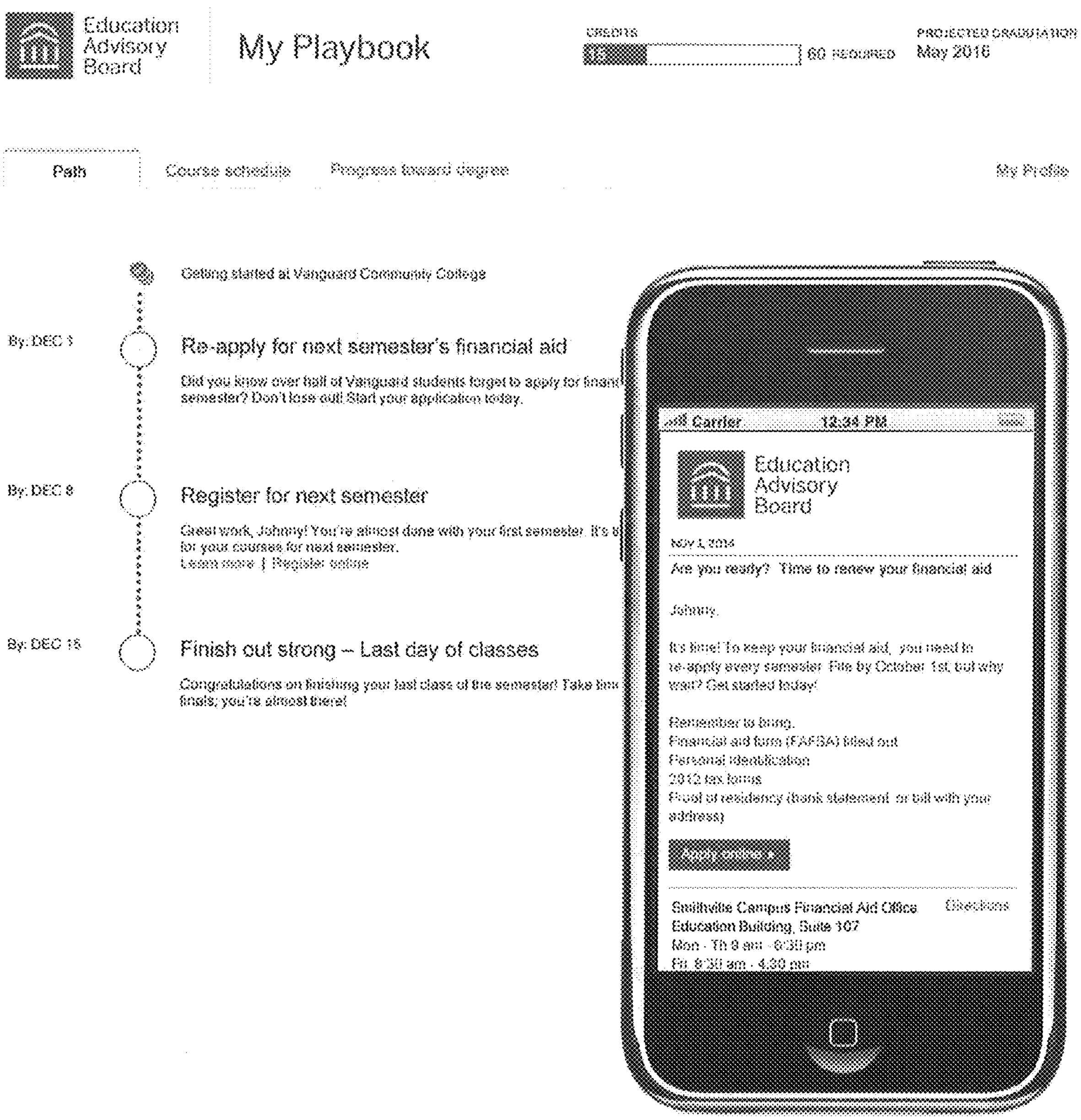
FIG. 37 depicts a "My Playbook" form and a communication related to a current task displayed on a mobile device, according to exemplary embodiments of the present disclosure.

FIG. 37 depicts a "My Playbook" form and a communication related to a current task displayed on a mobile device, according to exemplary embodiments of the present disclosure. A "My Playbook" form according to exemplary embodiments of the present disclosure may include a plurality of tasks to be completed by the user. In FIG. 37, for example, the task "Re-apply for next semester's financial aid" is to be completed. A communication related to the "Re-apply for next semester's financial aid" task such as an e-mail, or the like, may be displayed on a user's mobile device, according to exemplary embodiments of the present disclosure.

Figure 38:
FIG. 38 depicts a "My Playbook" form and a communication related to a current task displayed on a mobile device, according to exemplary embodiments of the present disclosure.

FIG. 38 depicts a "My Playbook" form and a communication related to a current task displayed on a mobile device, according to exemplary embodiments of the present disclosure. A "My Playbook" form according to exemplary embodiments of the present disclosure may include a plurality of tasks to be completed by the user. In FIG. 38, for example, the task "Register for next semester" is to be completed. A communication related to the "Register for next semester" task such as an e-mail, or the like, may be displayed on a user's mobile device.

FIG. 39 depicts an admissions letter from an academic institution to an applicant, according to exemplary embodiments of the present disclosure. An admissions letter according to exemplary embodiments of the present disclosure may include a web site address and student ID to log in to "My Path."

Figure 40:
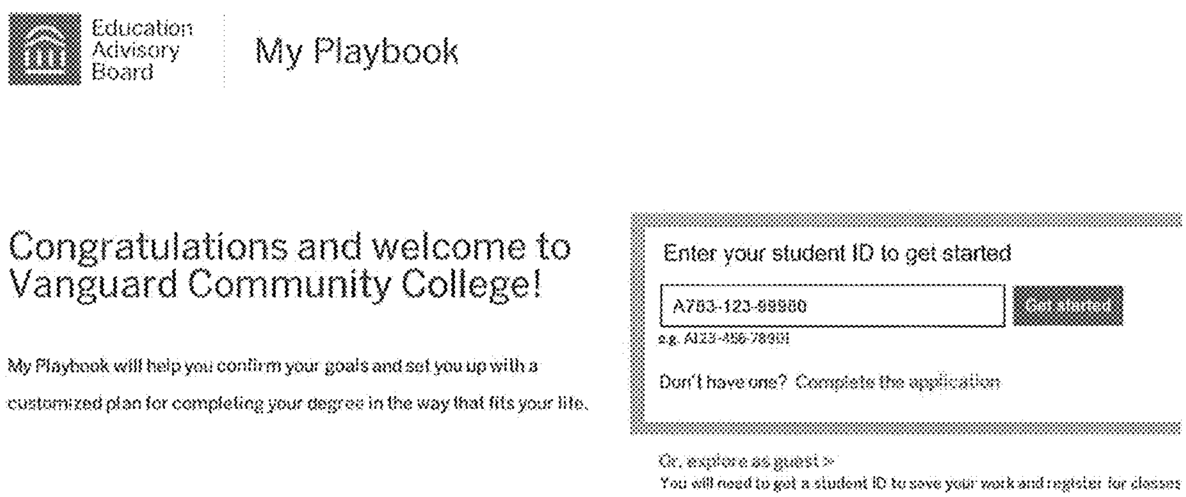
FIG. 40 depicts a form for logging in to "My Playbook" for an academic institution, according to exemplary embodiments of the present disclosure.

FIG. 40 depicts a form for logging in to "My Playbook" for an academic institution, according to exemplary embodiments of the present disclosure. A form according to exemplary embodiments of the present disclosure may include a form for entering a student ID.

Figure 41:
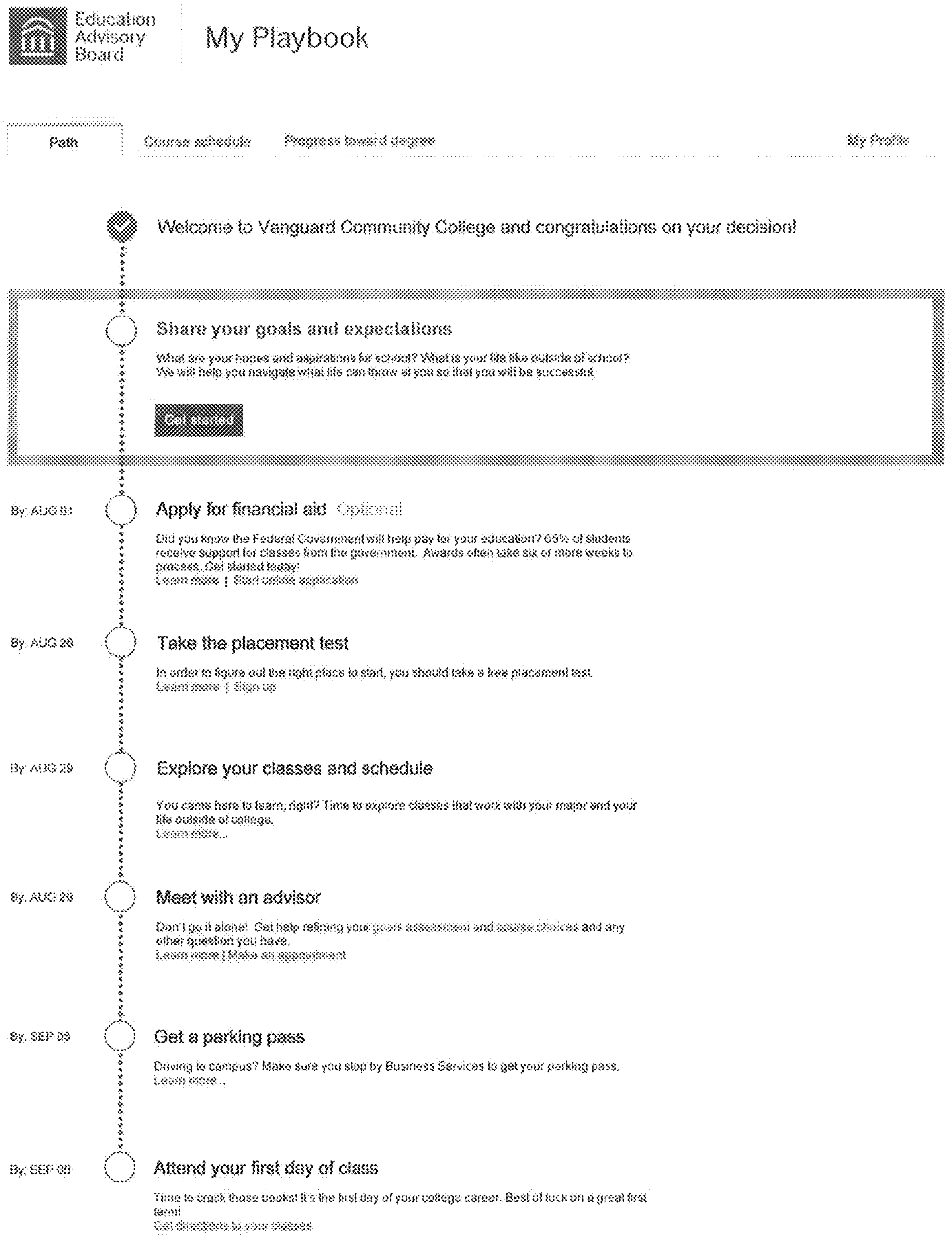
FIG. 41 depicts a "My Playbook" form, according to exemplary embodiments of the present disclosure.

FIG. 41 depicts a "My Playbook" form, according to exemplary embodiments of the present disclosure. A "My Playbook" form according to exemplary embodiments of the present disclosure may include a plurality of tasks to be completed by the user. In FIG. 41, for example, the first task, "Share your goals and expectations" is selected. A "Get Started" button for initiating the selected task may be provided.

Other tasks presented with a "My Playbook" form according to exemplary embodiments of the present disclosure may include, for example, "Explore your classes and schedule," "Meet with an advisor," "Get a parking pass," and "Attend your first day of class," etc.

Figure 42:
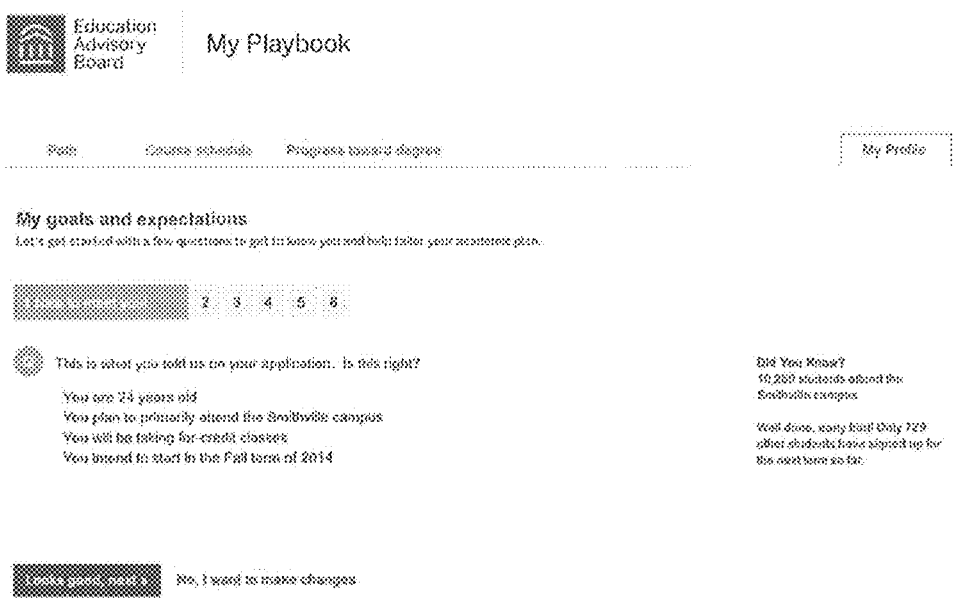
FIG. 42 depicts a profile editing form for completing a "My goals and expectations" task, according to exemplary embodiments of the present disclosure.

FIG. 42 depicts a profile editing form for completing a "My goals and expectations" task, according to exemplary embodiments of the present disclosure. A profile editing form according to exemplary embodiments of the present disclosure may display, for example, profile information and may include buttons to accept or modify the displayed profile information.

Figure 43:
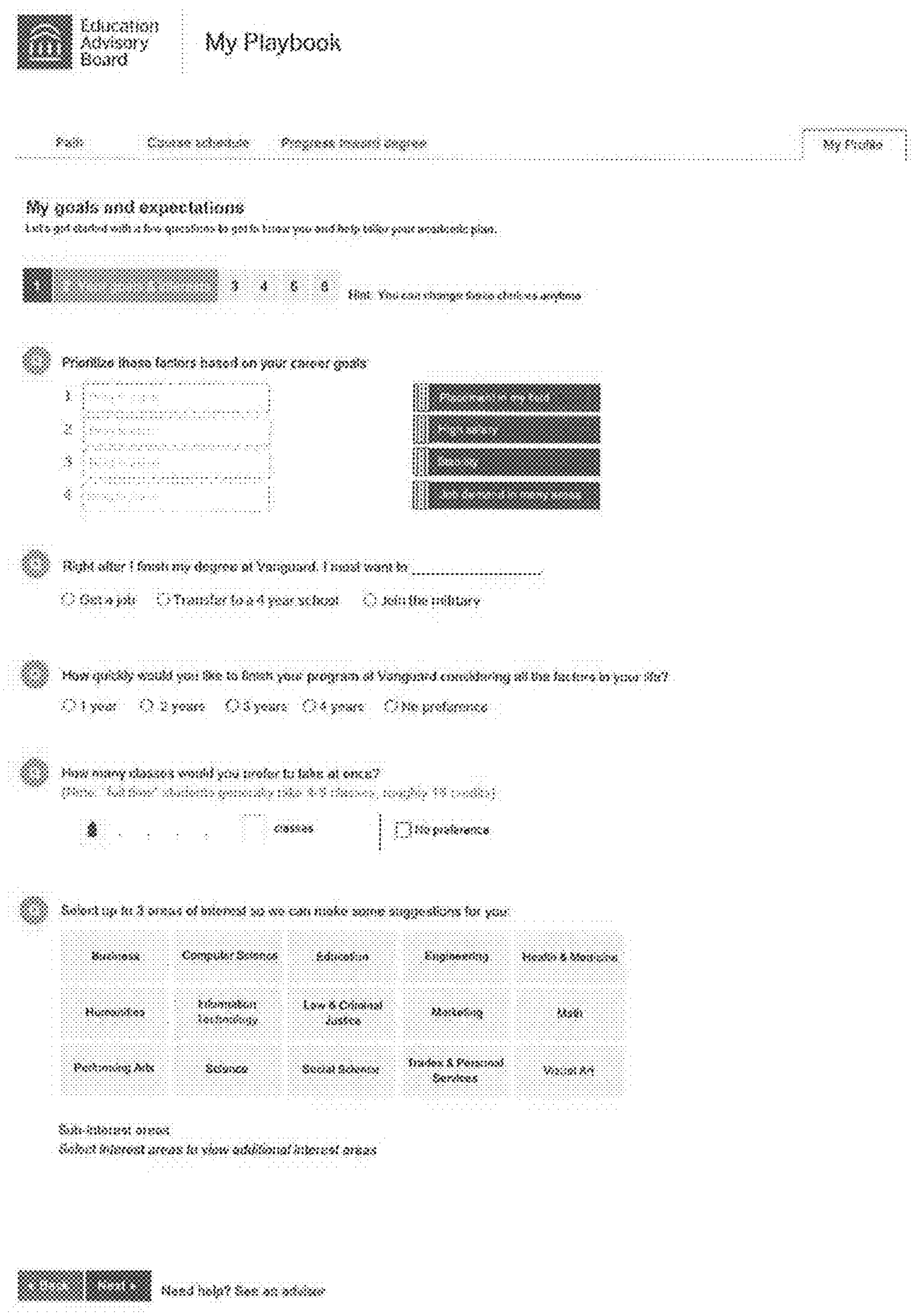
FIG. 43 depicts a form defining goals for completing a "My goals and expectations" task, according to exemplary embodiments of the present disclosure.

FIG. 43 depicts a form defining goals for completing a "My goals and expectations" task, according to exemplary embodiments of the present disclosure. A form defining goals according to exemplary embodiments of the present disclosure may include, for example, elements for prioritizing factors, defining future plans, setting parameters for degree completion and class scheduling and selecting one or more areas of interest. The form may further include buttons to move to a next or previous form. As shown in FIG. 43, the user has not made any selections.

Figure 44:
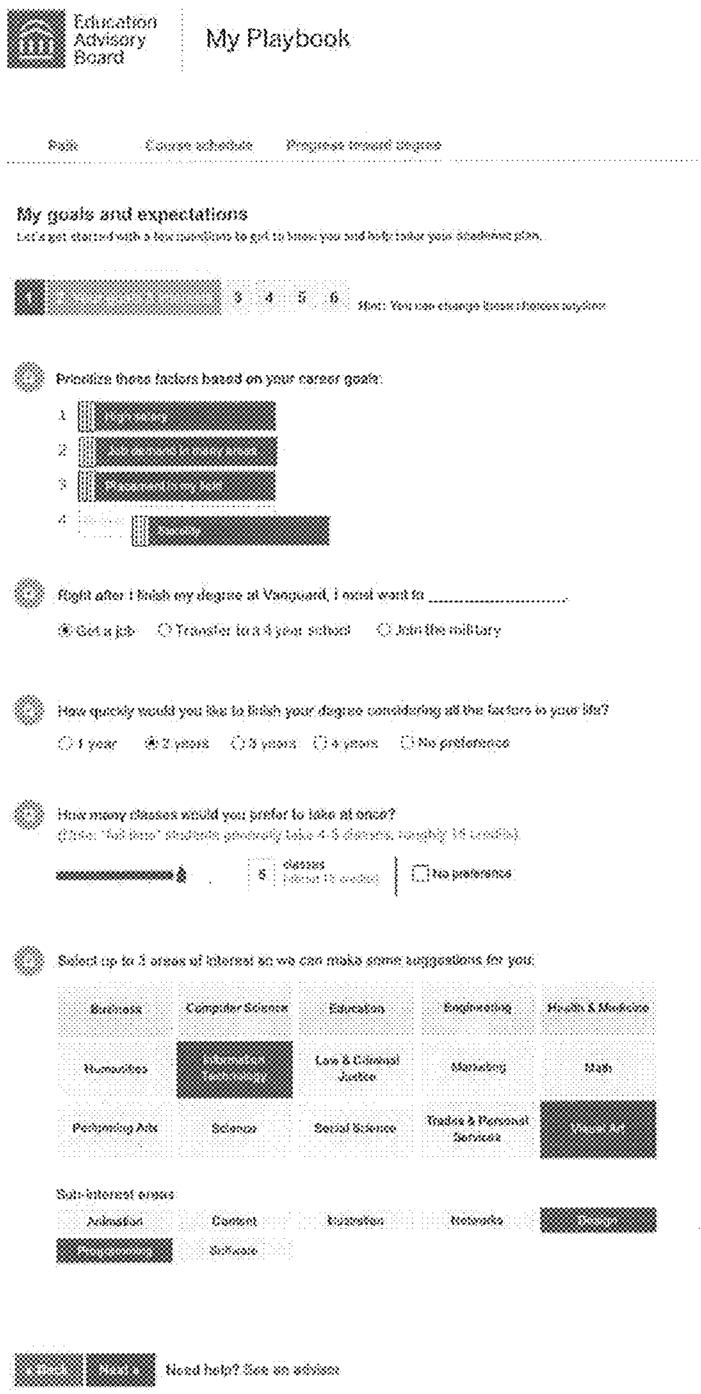
FIG. 44 depicts a form defining goals for completing a "My goals and expectations" task, according to exemplary embodiments of the present disclosure.

FIG. 44 depicts a form defining goals for completing a "My goals and expectations" task, according to exemplary embodiments of the present disclosure. A form defining goals according to exemplary embodiments of the present disclosure may include, for example, elements for prioritizing factors, defining future plans, setting parameters for degree completion and class scheduling and selecting one or more areas of interest. The form may further include buttons to move to a next or previous form. As shown in FIG. 44, the user has made selections priorities, academic goals, and areas of interest.

Figure 45:
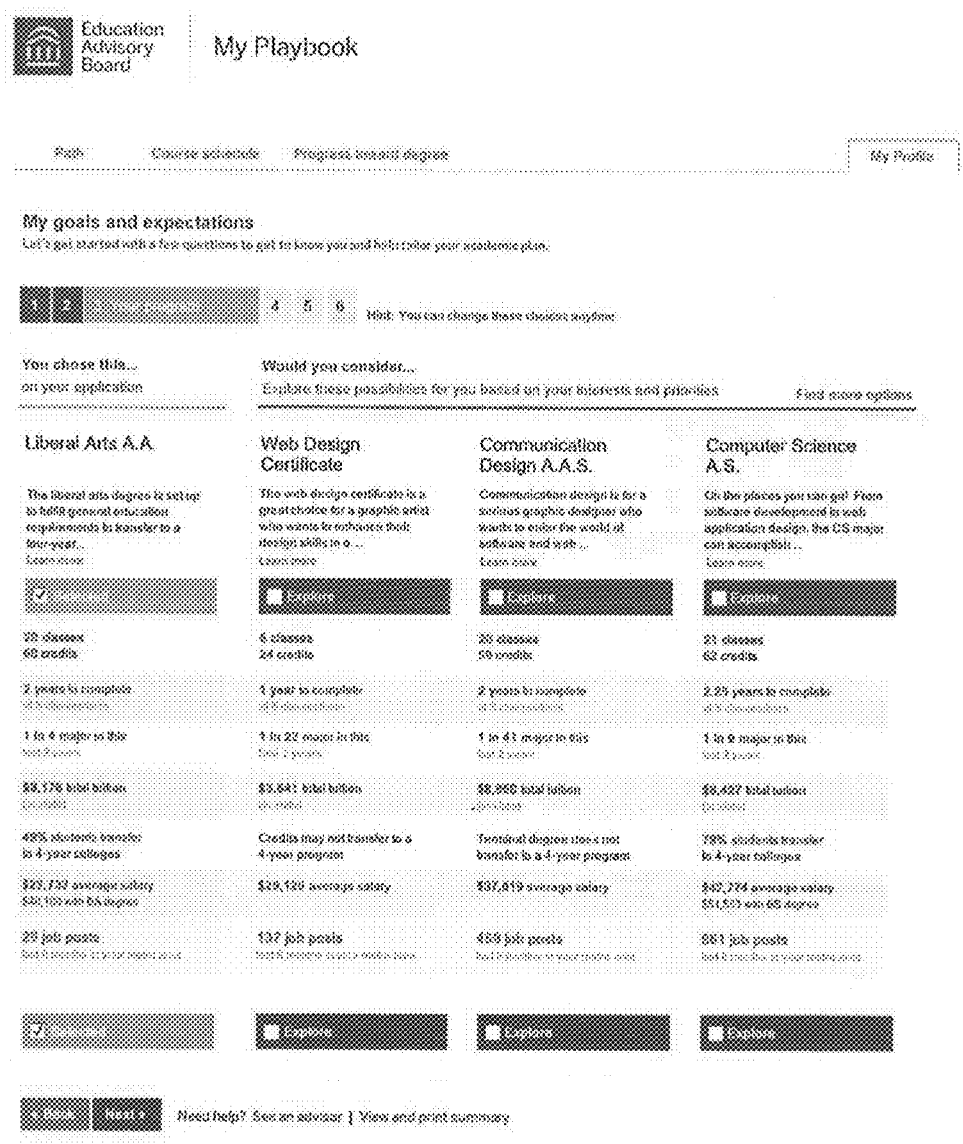
FIG. 45 depicts a form for defining goals for completing a "My goals and expectations" task, according to exemplary embodiments of the present disclosure.

FIG. 45 depicts a form for defining goals for completing a "My goals and expectations" task, according to exemplary embodiments of the present disclosure. A form for defining goals according to exemplary embodiments of the present disclosure may include, for example, information related to one or more academic courses of study. For each course of study, the form may include a check box for selecting that course of study. As shown in FIG. 45, the course of study may be set by default to a previously indicated course of study.

Figure 46:
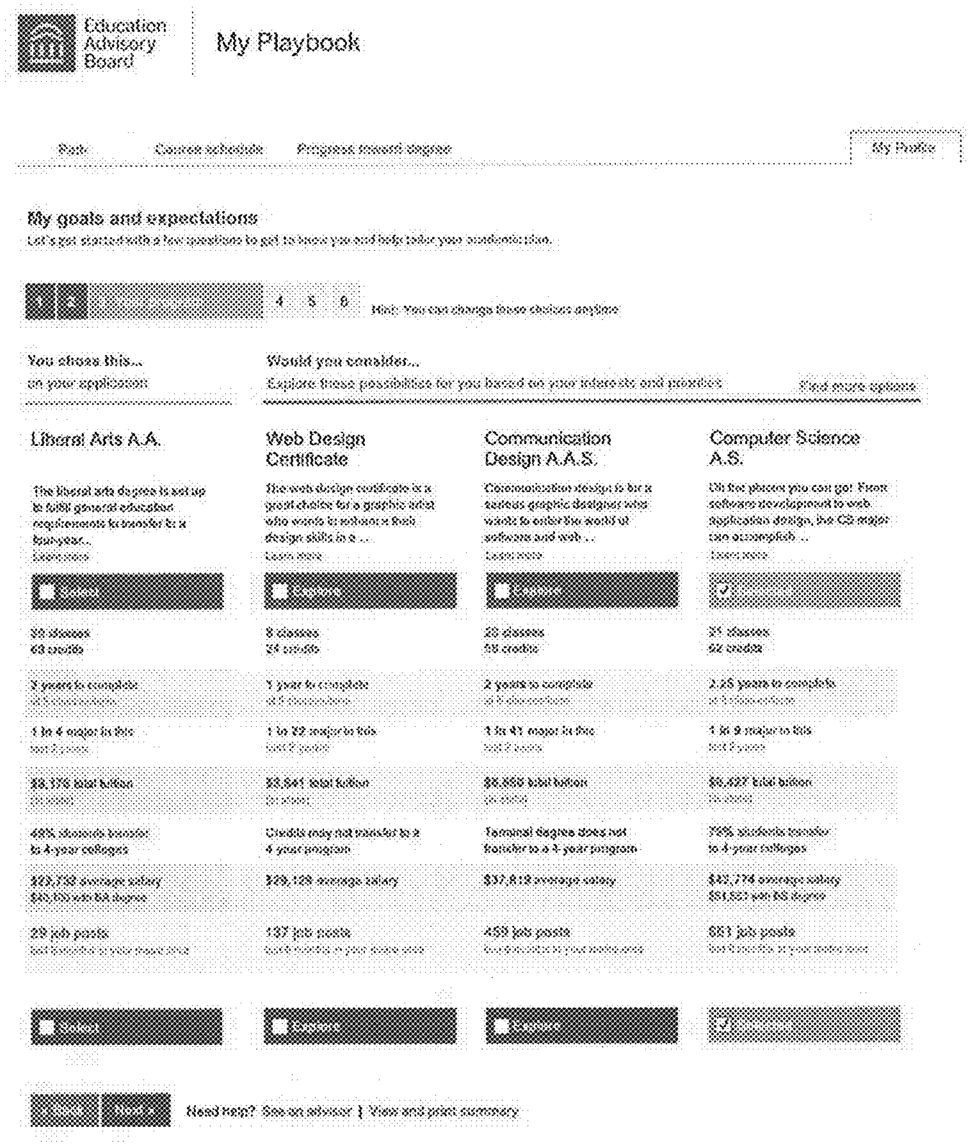
FIG. 46 depicts a form for selecting a course of study for completing a "My goals and expectations" task, according to exemplary embodiments of the present disclosure.

FIG. 46 depicts a form for selecting a course of study for completing a "My goals and expectations" task, according to exemplary embodiments of the present disclosure. A form for selecting a course of study according to exemplary embodiments of the present disclosure may include, for example, information related to one or more academic courses of study. For each course of study, the form may include a check box for selecting that course of study. As shown in FIG. 46, the user may change the selected course of study by selecting an alternative course of study.

Figure 47:
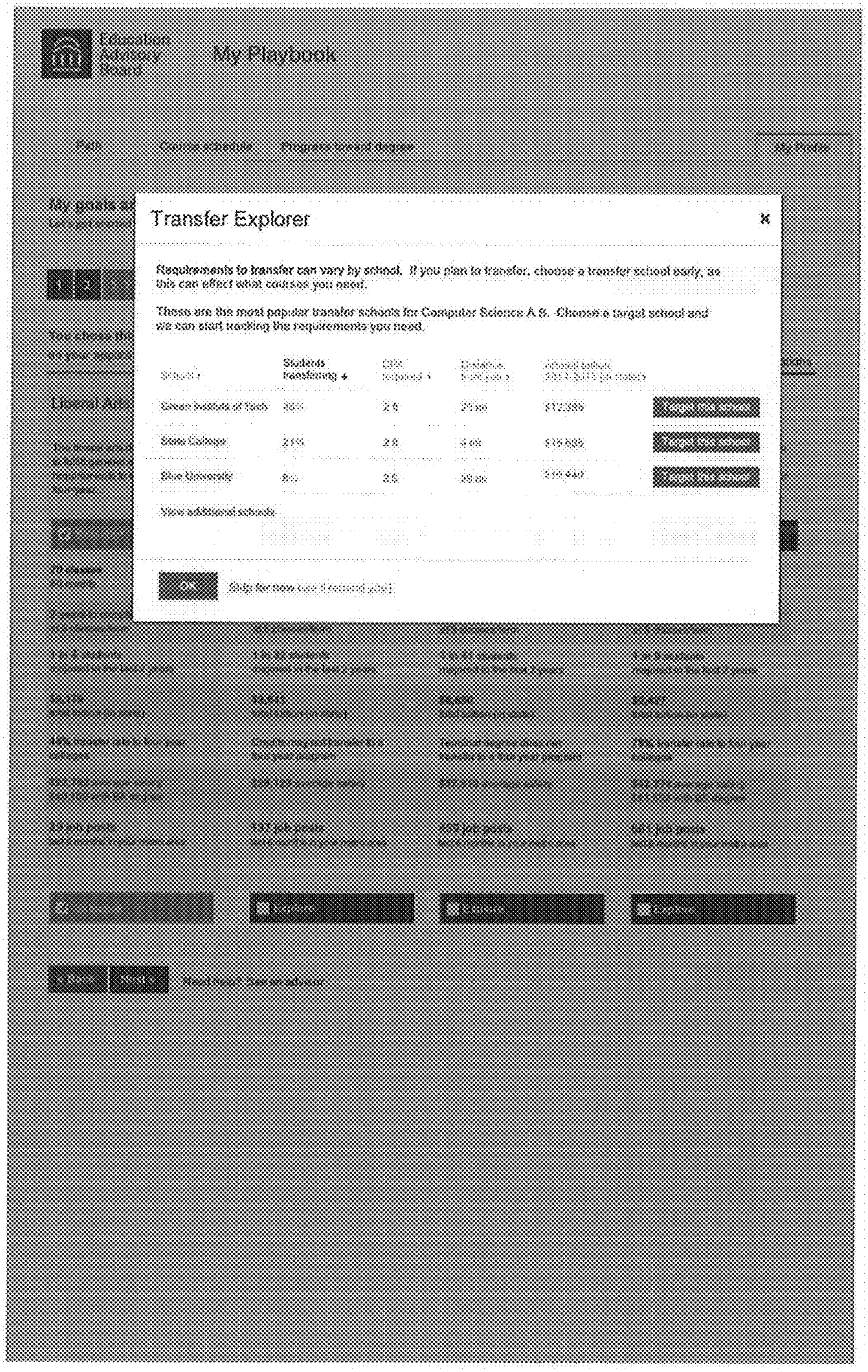
FIG. 47 depicts a form to display information related to transfer to one or more academic institutions, according to exemplary embodiments of the present disclosure.

FIG. 47 depicts a form to display information related to transfer to one or more academic institutions, according to exemplary embodiments of the present disclosure. A form to display information related to transfer to one or more academic institutions may include, for each academic institution displayed, detailed information about the institution. The form may further include buttons to select each listed institution. The form may further include an option to view additional institutions, accept the current selection, or cancel the current selection.

Figure 48:
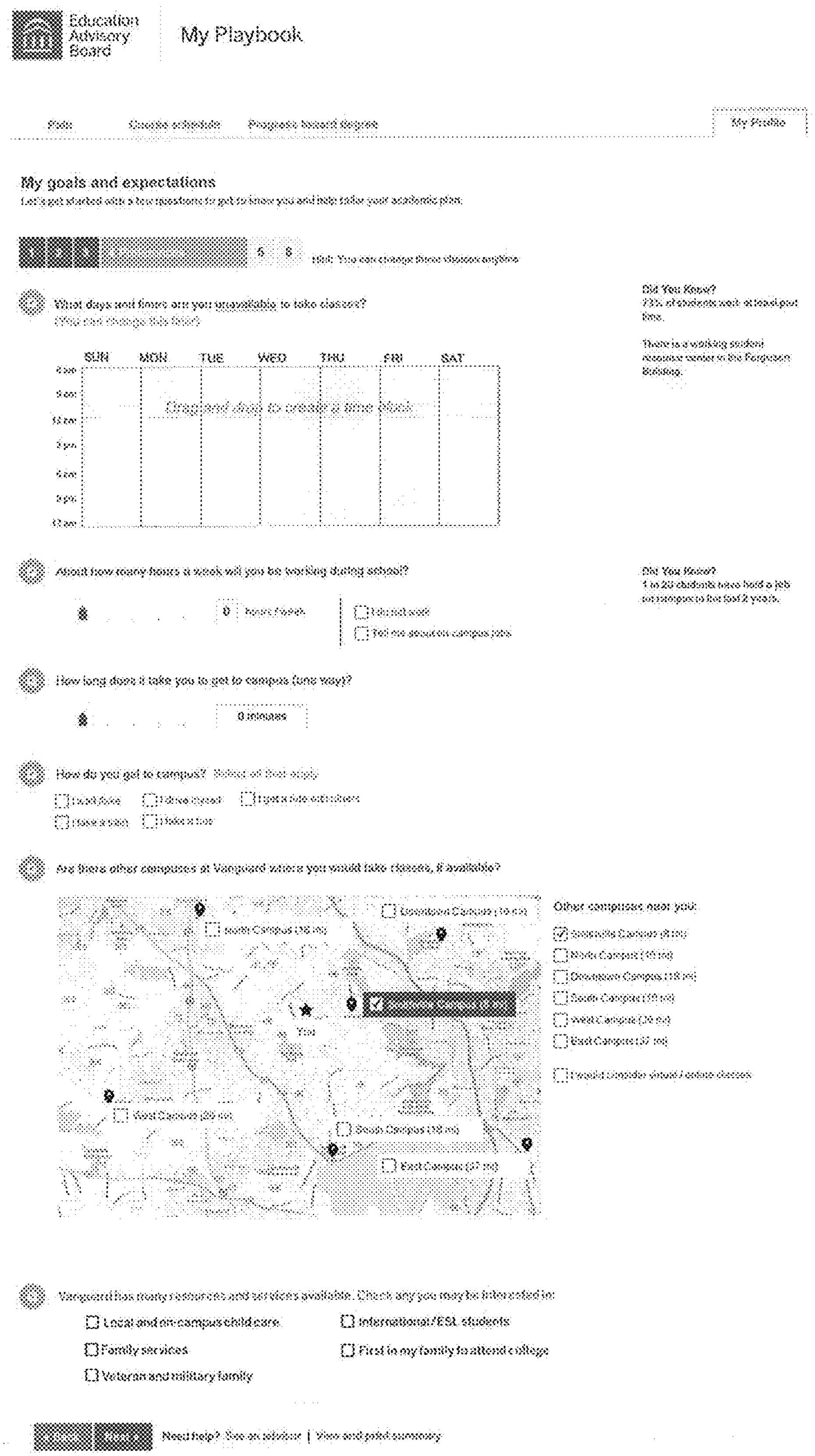
FIG. 48 depicts a form for setting preferences for completing a "My goals and expectations" task, according to exemplary embodiments of the present disclosure.

FIG. 48 depicts a form for setting preferences for completing a "My goals and expectations" task, according to exemplary embodiments of the present disclosure. A form for setting preferences according to exemplary embodiments of the present disclosure may include, for example, elements for defining day and time availability, setting a number of work hours outside of school, commuting information and campus resources. The form may further include information about alternative locations for enrollment. As shown in FIG. 48, the user has not made any selections.

Figure 49:
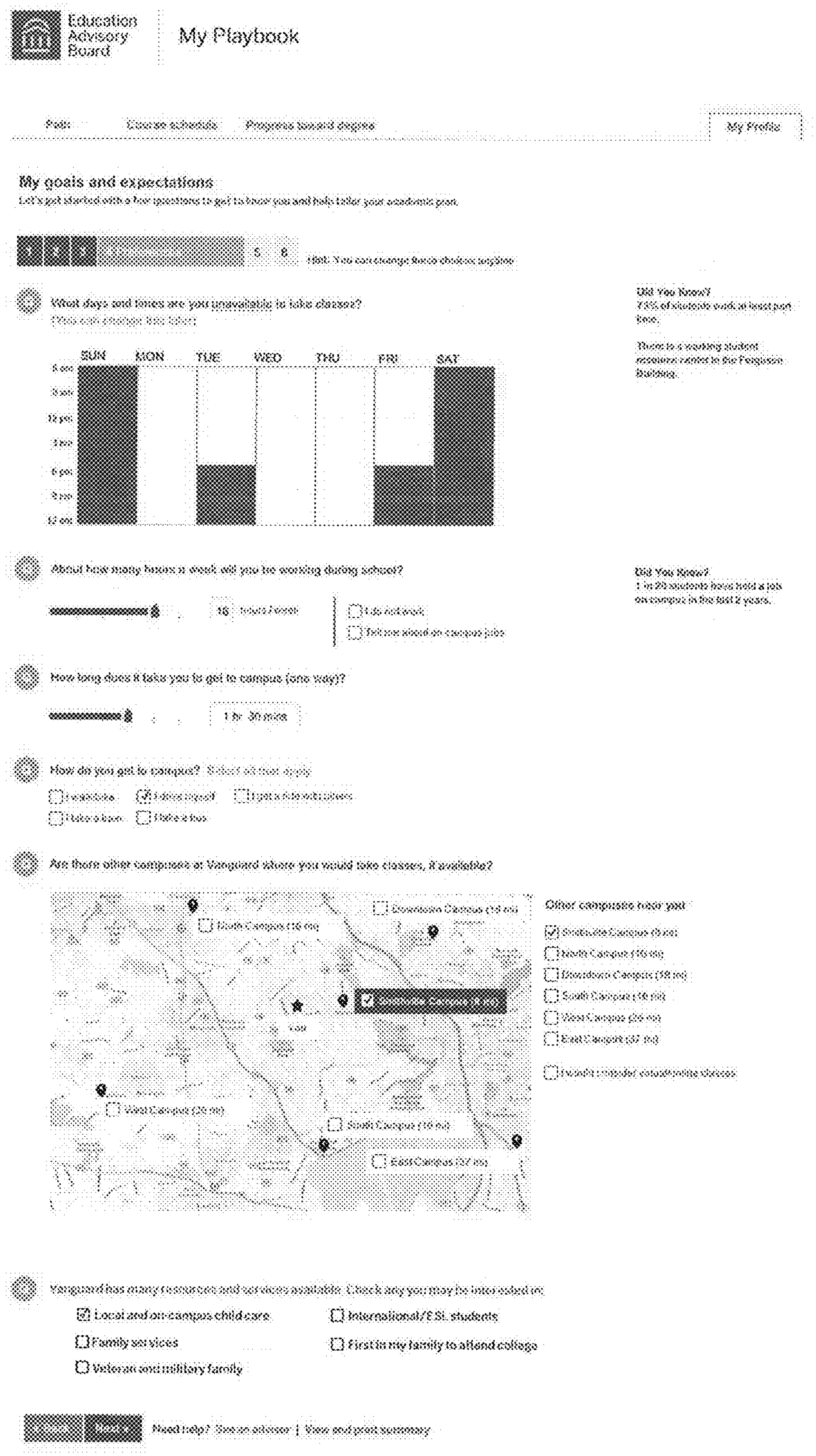
FIG. 49 depicts a form for setting preferences for completing a "My goals and expectations" task, according to exemplary embodiments of the present disclosure.

FIG. 49 depicts a form for setting preferences for completing a "My goals and expectations" task, according to exemplary embodiments of the present disclosure. A form for setting preferences according to exemplary embodiments of the present disclosure may include, for example, elements for defining day and time availability, setting a number of work hours outside of school, commuting information and campus resources. The form may further include information about alternative locations for enrollment. As shown in FIG. 49, the user has made selections for day and time availability, a number of work hours outside of school and commuting information.

Figure 50:
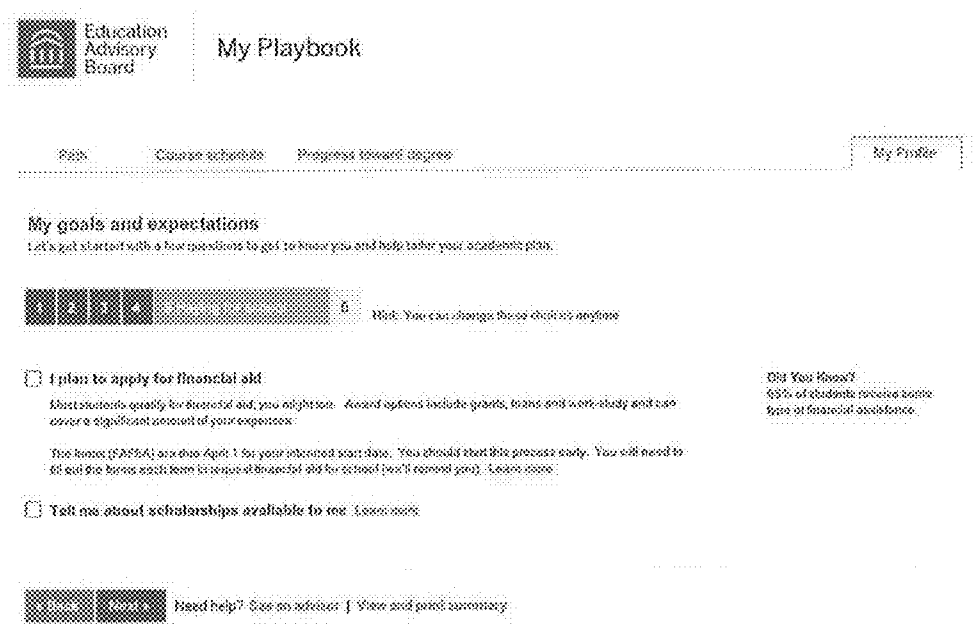
FIG. 50 depicts a form for financial planning for completing a "My goals and expectations" task, according to exemplary embodiments of the present disclosure.

FIG. 50 depicts a form for financial planning for completing a "My goals and expectations" task, according to exemplary embodiments of the present disclosure. A form for financial planning according to exemplary embodiments of the present disclosure may include, for example, elements to indicate that a student plans to apply for financial aid or to request information about scholarships.

Figure 51:
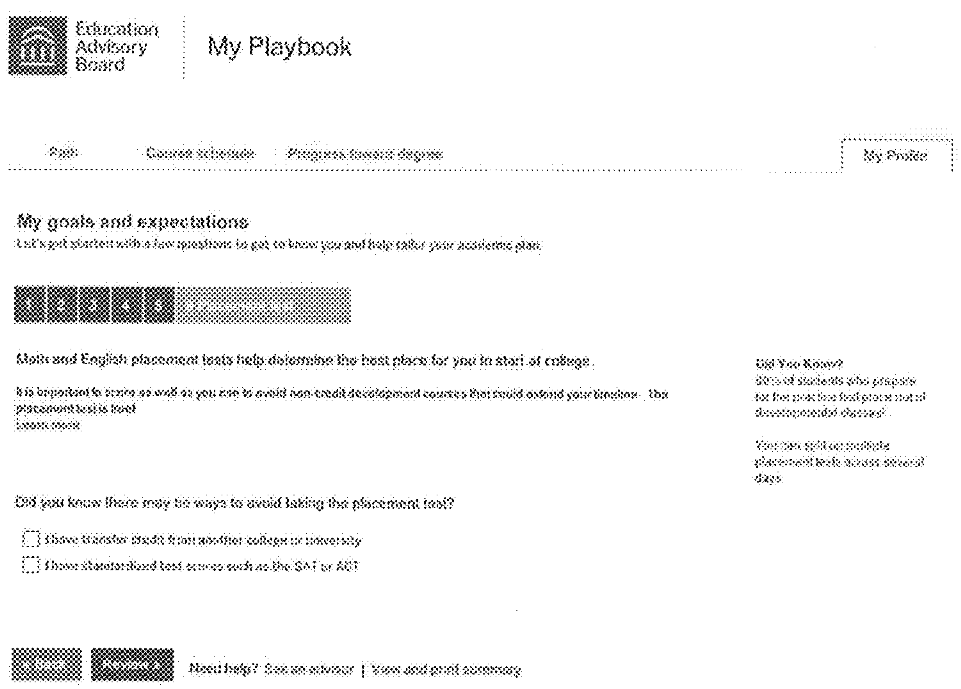
FIG. 51 depicts a form for entering testing information for completing a "My goals and expectations" task, according to exemplary embodiments of the present disclosure.

FIG. 51 depicts a form for entering testing information for completing a "My goals and expectations" task, according to exemplary embodiments of the present disclosure. A form for entering testing information according to exemplary embodiments of the present disclosure may include, for example, elements to enter information about transfer credits and standardized tests.

Figure 52:
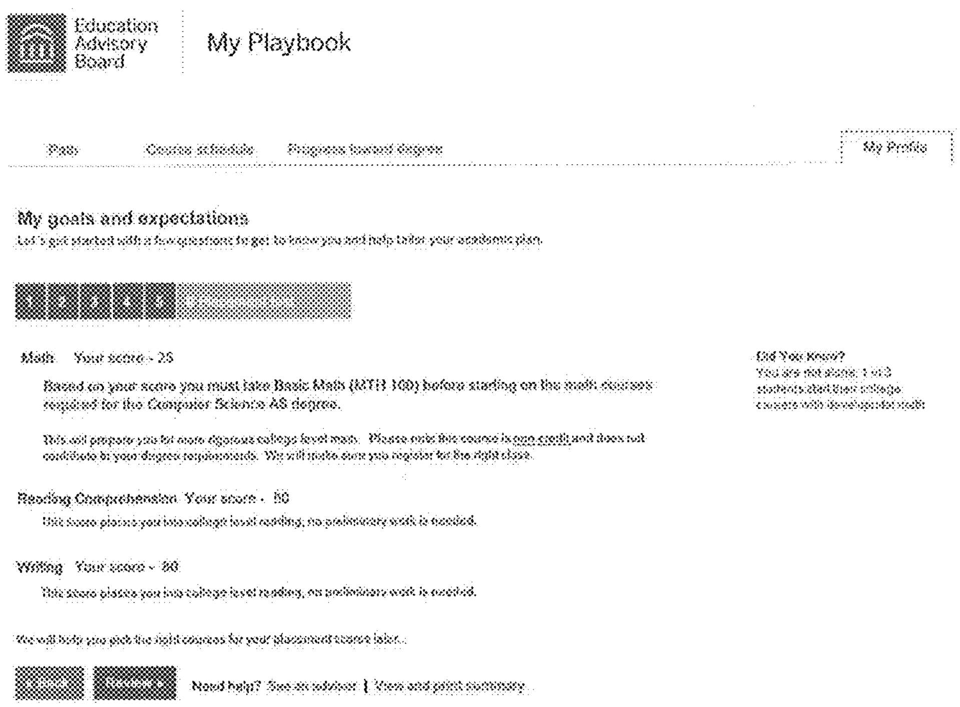
FIG. 52 depicts a form for displaying testing information for completing a "My goals and expectations" task, according to exemplary embodiments of the present disclosure.

FIG. 52 depicts a form for displaying testing information for completing a "My goals and expectations" task, according to exemplary embodiments of the present disclosure. A form for displaying testing information according to exemplary embodiments of the present disclosure may include, for example, information displaying test scores in one or more academic areas. The form may further include detailed information for interpreting one or more of the displayed test scores.

Figure 53:
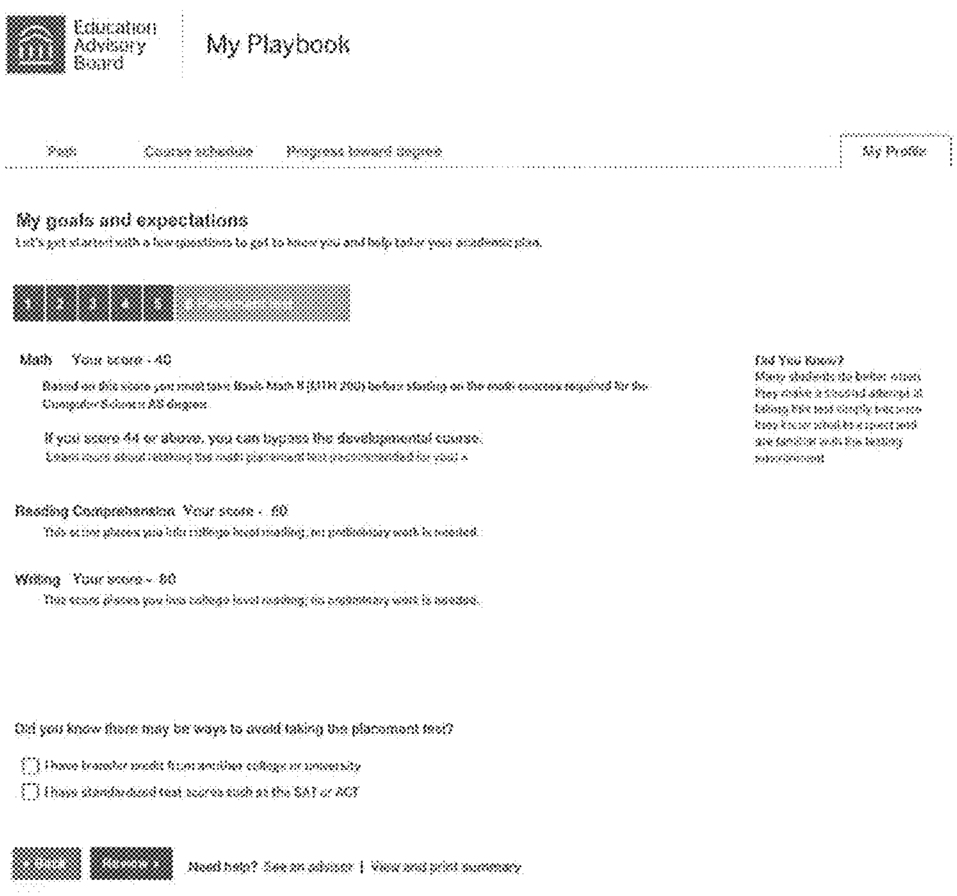
FIG. 53 depicts a form for entering testing information and displaying testing information for completing a "My goals and expectations" task, according to exemplary embodiments of the present disclosure.

FIG. 53 depicts a form for entering testing information and displaying testing information for completing a "My goals and expectations" task, according to exemplary embodiments of the present disclosure. A form for entering testing information and displaying testing information according to exemplary embodiments of the present disclosure may include, for example, information displaying test scores in one or more academic areas. The form may further include detailed information for interpreting one or more of the displayed test scores. The form may also include, for example, elements to enter information about transfer credits and standardized tests.

Figure 54:
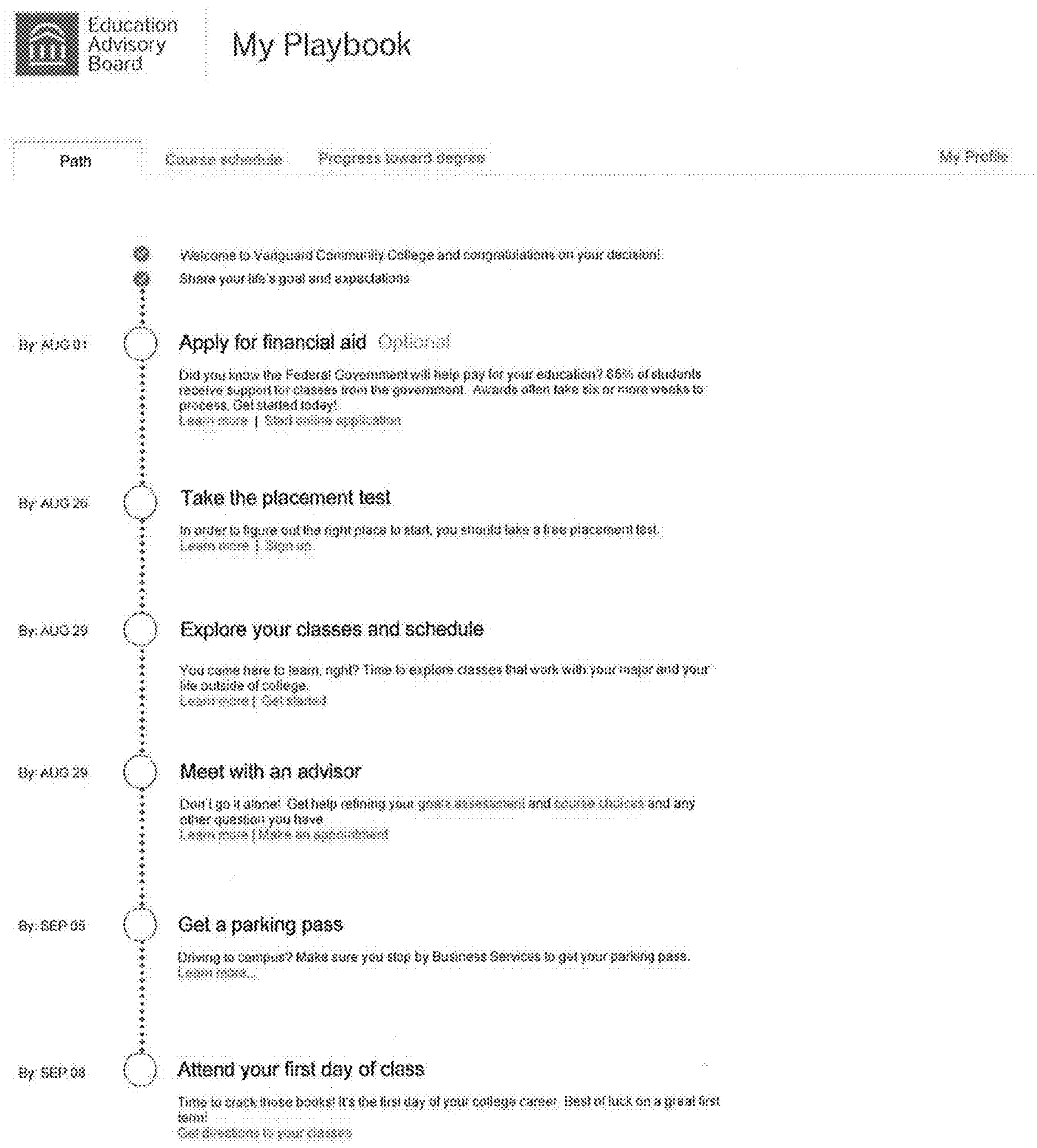
FIG. 54 depicts a "My Playbook" form, according to exemplary embodiments of the present disclosure.

FIG. 54 depicts a "My Playbook" form, according to exemplary embodiments of the present disclosure. A "My Playbook" form according to exemplary embodiments of the present disclosure may include a plurality of tasks to be completed by the user. In FIG. 54, for example, the task "Apply for financial aid" is to be completed.

Figure 55:
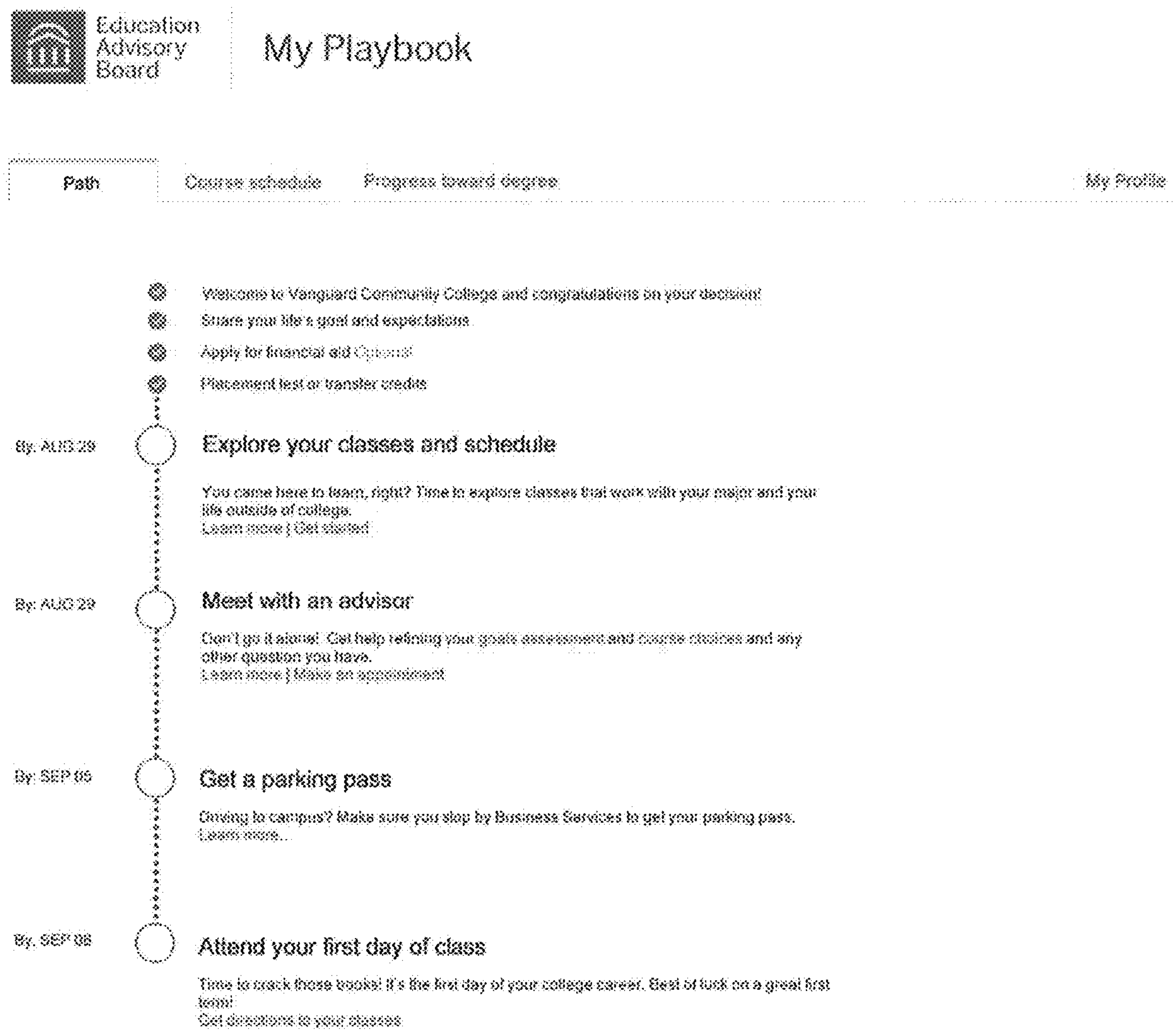
FIG. 55 depicts a "My Playbook" form, according to exemplary embodiments of the present disclosure.
Figure 56:
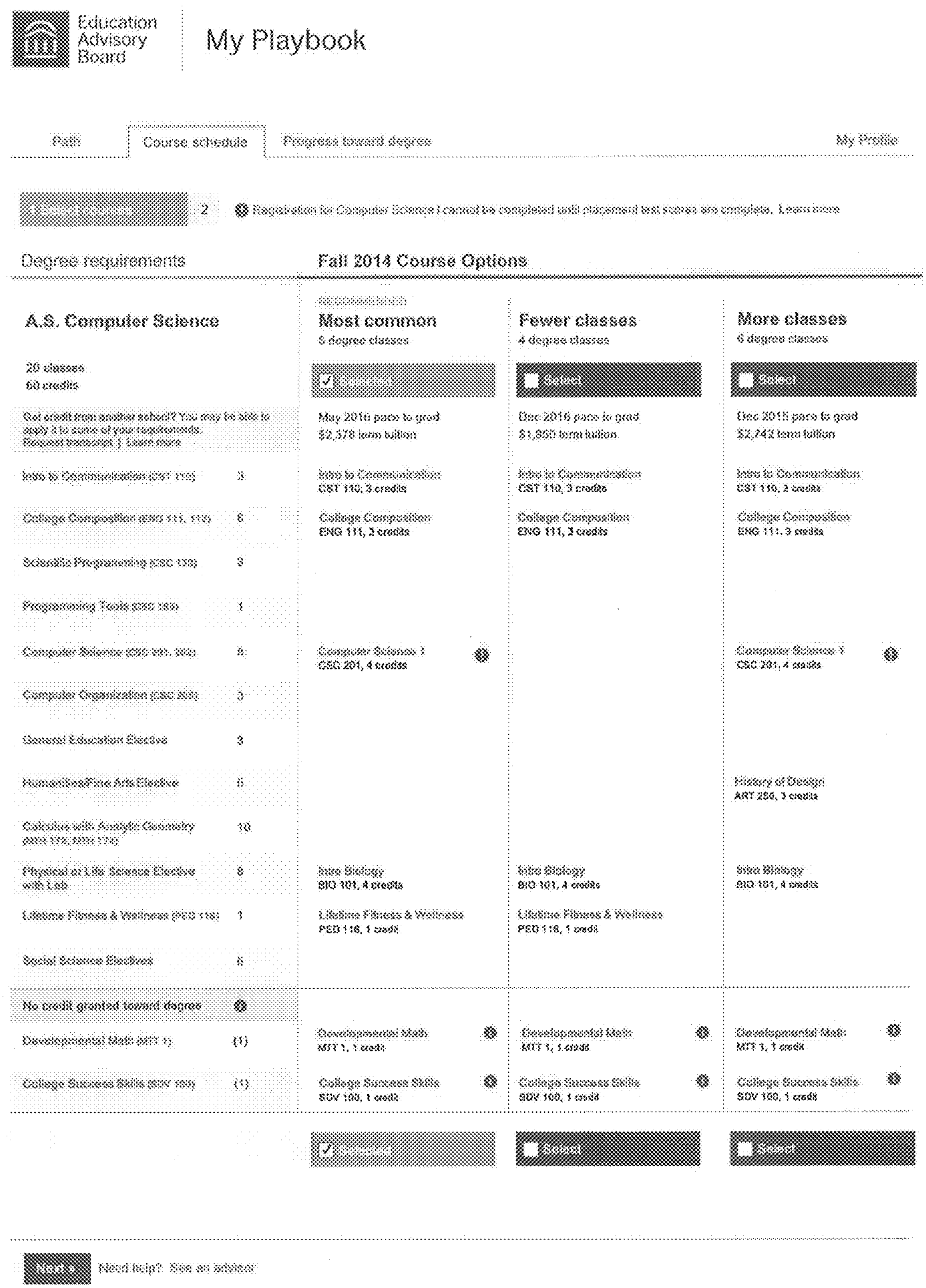
FIGS. 56-60 depict a form for selecting academic course options for completing an "Explore your classes and schedule" task, according to exemplary embodiments of the present disclosure.

FIG. 55 depicts a "My Playbook" form, according to exemplary embodiments of the present disclosure. A "My Playbook" form according to exemplary embodiments of the present disclosure may include a plurality of tasks to be completed by the user. In FIG. 55, for example, the task "Explore your classes and schedule" is to be completed.

FIGS. 56-60 depict a form for selecting academic course options for completing an "Explore your classes and schedule" task, according to exemplary embodiments of the present disclosure. A form for selecting academic course options according to exemplary embodiments of the present disclosure may include, for example, information about one or more for a number or types of classes to be taken in a semester. The form may also include information about the total number of courses required in each of one or more areas of study. An icon indicating additional information for one or more of the listed courses may be displayed with the listed course.

Figure 57:
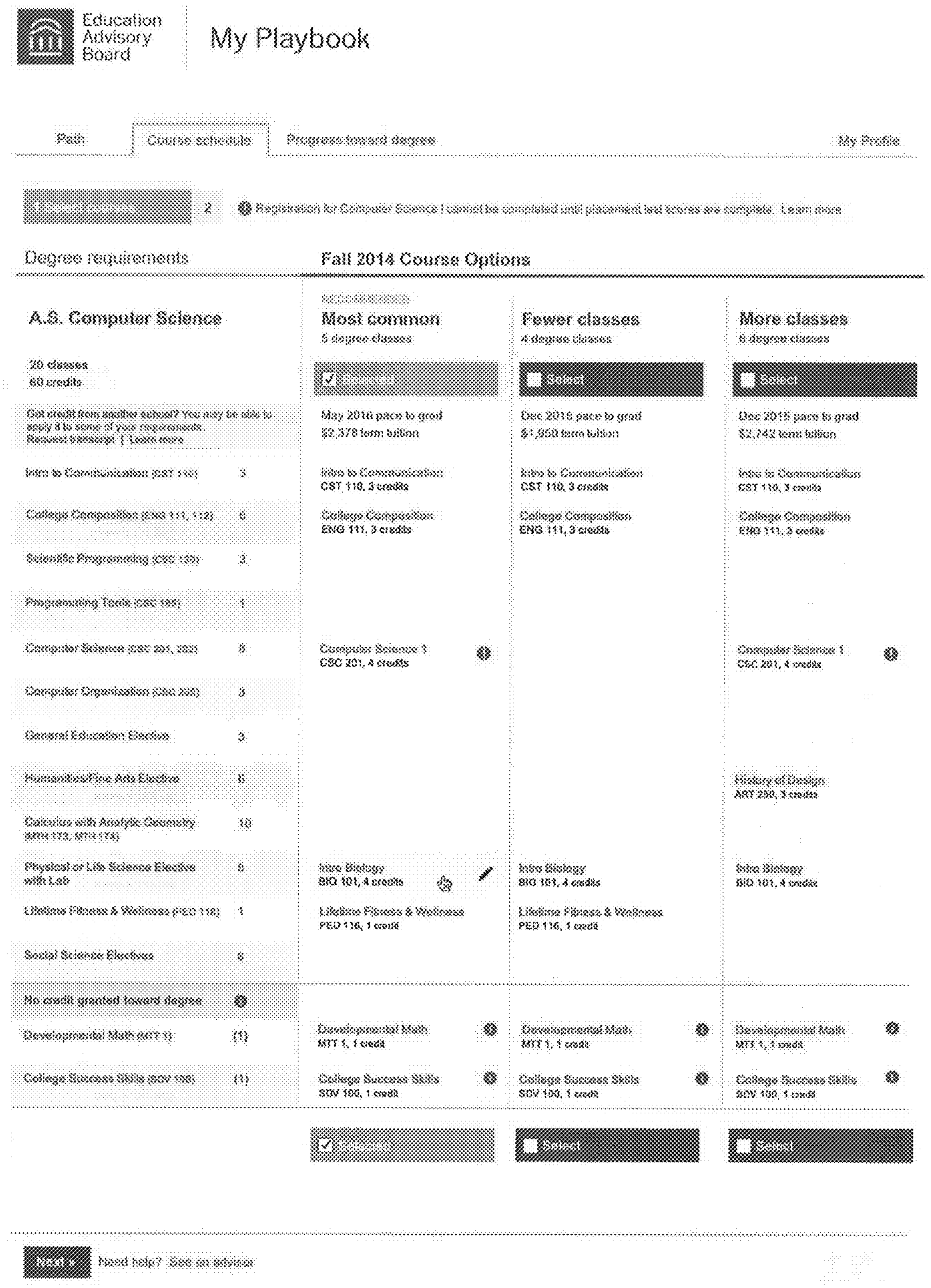

As depicted in FIG. 57, the user may place a pointer, which may be depicted as a hand or other object, over "Intro Biology." This may display an icon indicating that the course selection may be edited or that additional information related to the course may be available.

Figure 58:
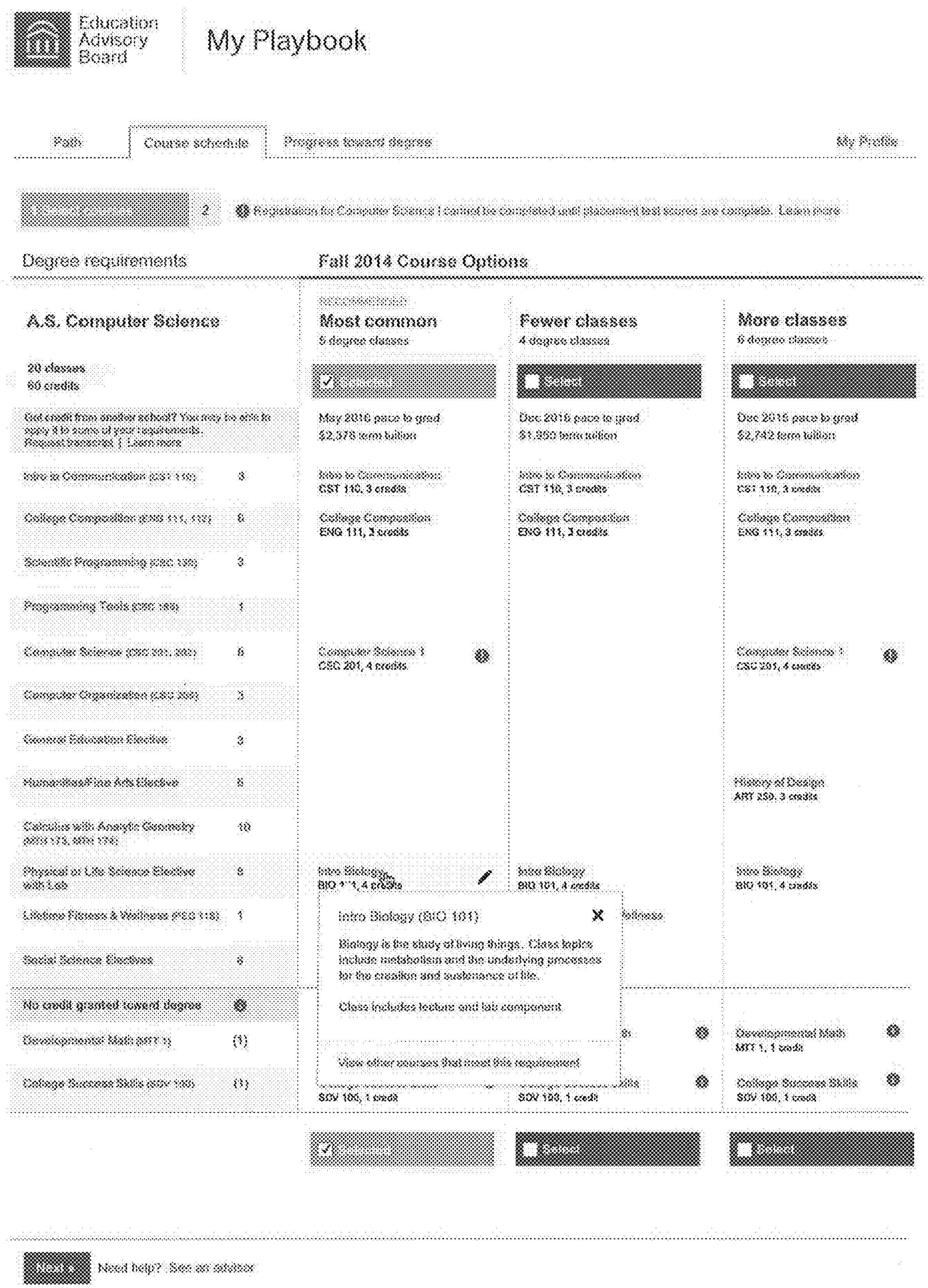

As depicted in FIG. 58, the user may select "Intro Biology." This may cause additional information about the course may be displayed, for example, overlaying the form. The displayed information may include, for example, a description of the course content of the selected course.

Figure 59:

As depicted in FIG. 59, a form for selecting academic course options according to exemplary embodiments of the present disclosure may include, for example, information about the total number of courses required in each of one or more areas of study. As shown in FIG. 59, if a user selects one of the listed areas of study, a list of classes satisfying the related course requirements may be displayed, for example, overlaying the form.

Figure 60:
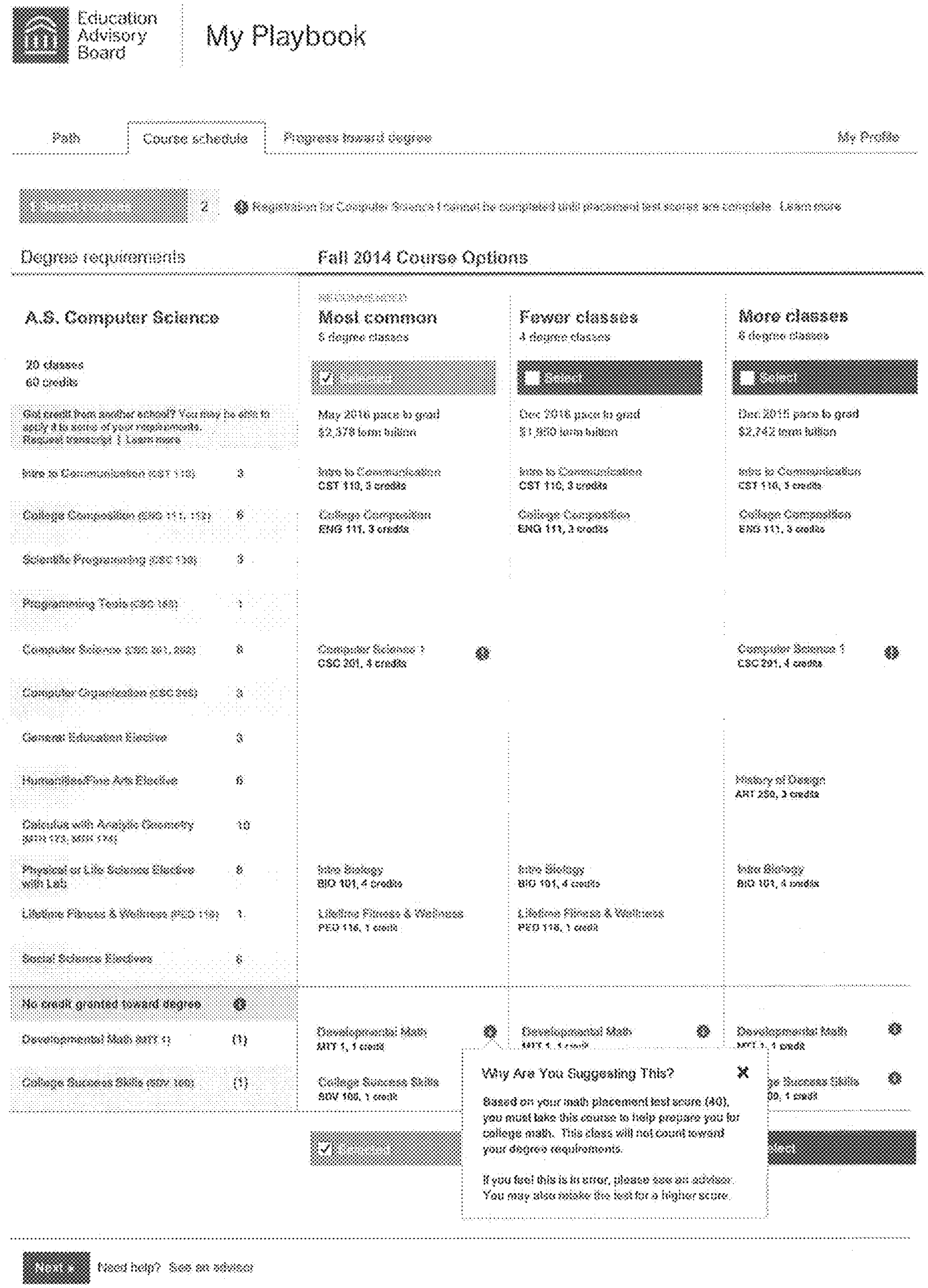

As depicted in FIG. 60, a form for selecting academic course options according to exemplary embodiments of the present disclosure may include, for example, an icon indicating additional information for one or more of the listed courses may be displayed with the listed course. If a user selects a displayed icon, additional information about the course may be displayed, for example, overlaying the form. The displayed information may include, for example, a description of one or more reasons the course is displayed on the student's schedule.

Figure 61:
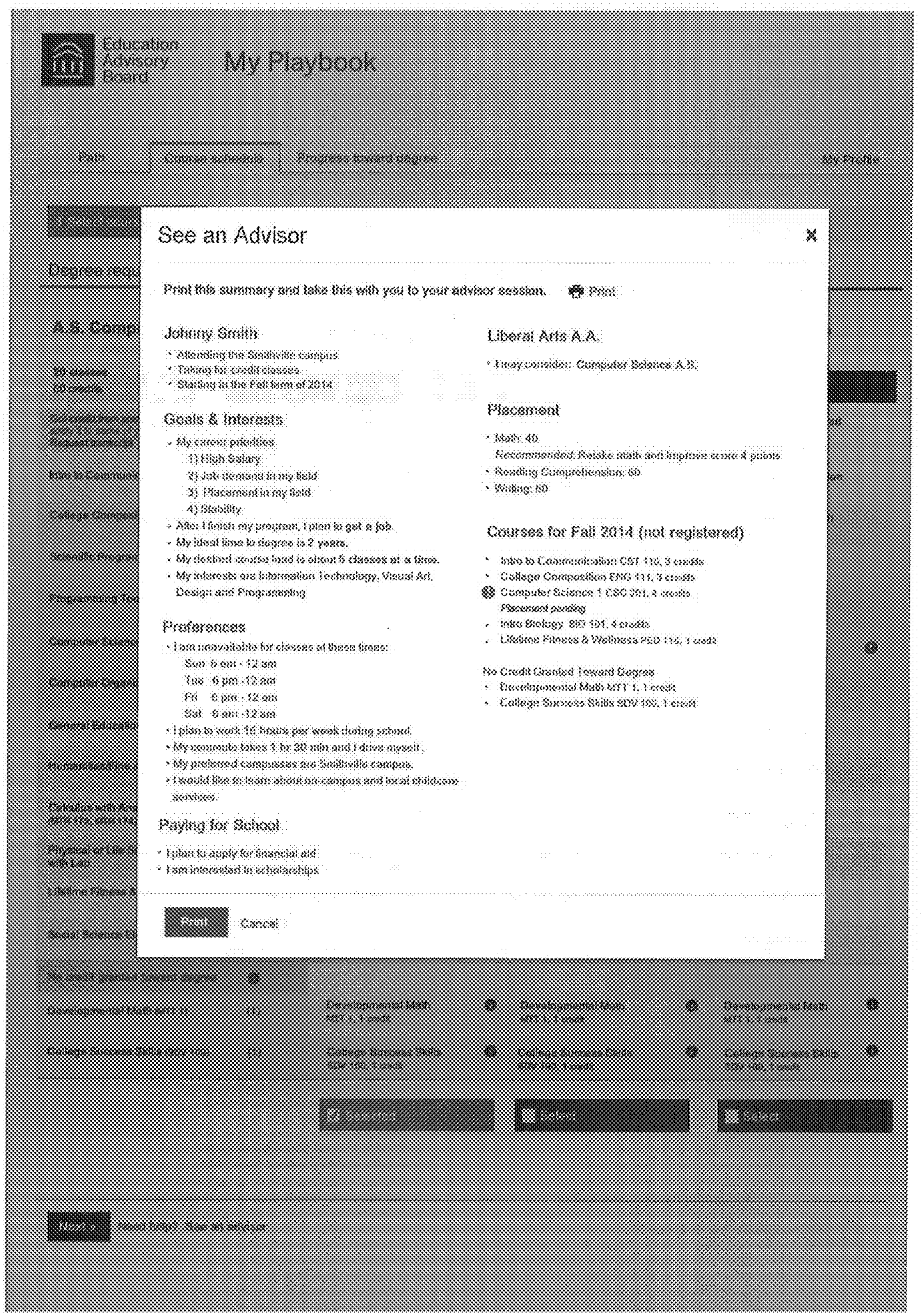
FIG. 61 depicts a summary page that may be displayed according to exemplary embodiments of the present disclosure, for example after completion of the "Explore your classes and schedule" task.

FIG. 61 depicts a summary page that may be displayed according to exemplary embodiments of the present disclosure, for example after completion of the "Explore your classes and schedule" task. The summary page may include information provided by the user in completing the "Explore your classes and schedule" task and may be displayed as overlaid over an "Explore your classes and schedule," for example.

Figure 62:
FIGS. 62-64 depict a form for arranging selected courses on a calendar grid, according to exemplary embodiments of the present disclosure.
Figure 63:
Figure 64:

FIGS. 62-64 depict a form for arranging selected courses on a calendar grid, according to exemplary embodiments of the present disclosure. The form for arranging selected courses on a calendar grid, according to exemplary embodiments of the present disclosure may include a grid of days of the week and times of day on which selected courses may be displayed. The form may also include, for example, elements to set a preferred number of classes per semester, preferred days on which to attend classes and a preferred amount of time between classes. Informational notices about selected classes may be displayed. The form may also display, for example, information about semester tuition costs for the selected courses and a projected graduation date. The form may include elements to register for the selected classes and/or to save the current selections and exit.

As depicted in FIG. 63, a user may select a range of days and times on the grid to, for example, change the student's availability for the selected days and times. As shown in FIG. 63, a user may set the availability for the selected days and time to "Unavailable." As shown in FIG. 64, upon setting the availability for the selected days and times to "Unavailable" the previously scheduled classes for the selected days and times may be removed from the schedule.

FIG. 65 depicts a form confirming completion of a course schedule, according to exemplary embodiments of the present disclosure. A form confirming completion of a course schedule according to exemplary embodiments of the present disclosure may include, for example, a listing of the enrolled courses. The form may also include a summary of degree and total credits for the enrolled term and the tuition information for the enrolled term. The form may also include information about additional tasks to be completed, such as, for example, the completion of placement tests.

Figure 66:
FIG. 66 depicts a communication related to a current task displayed on a mobile device, according to exemplary embodiments of the present disclosure.

FIG. 66 depicts a communication related to a current task displayed on a mobile device, according to exemplary embodiments of the present disclosure. Such communications may be related, for example, to available campus services such as day care, carpools, employment and counseling, etc.

Figure 67:
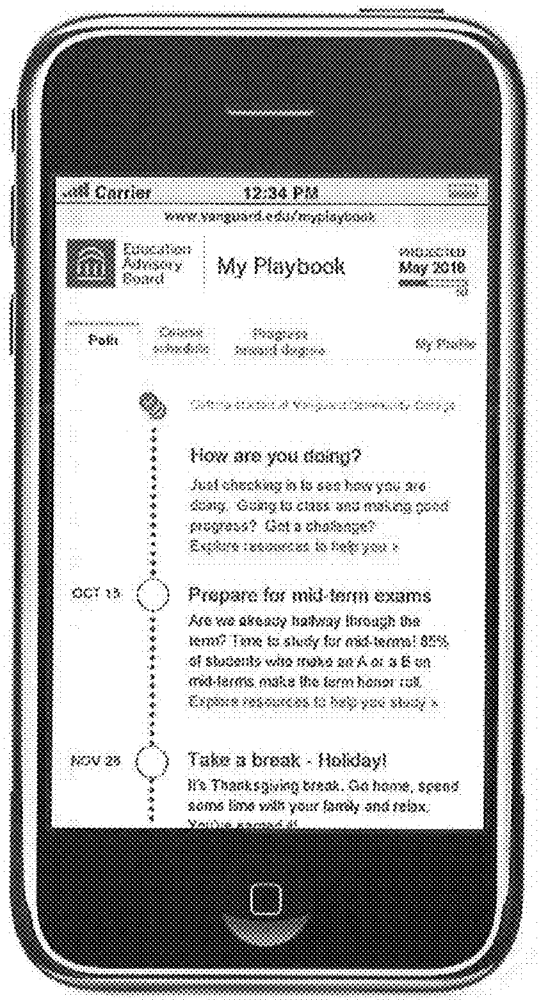
FIG. 67 depicts a "My Playbook" form displayed on a mobile device, according to exemplary embodiments of the present disclosure.

FIG. 67 depicts a "My Playbook" form displayed on a mobile device, according to exemplary embodiments of the present disclosure. A "My Playbook" form according to exemplary embodiments of the present disclosure may include a plurality of tasks to be completed by the user. In FIG. 67, for example, the task "Prepare for mid-term exams" is to be completed.

Figure 68:
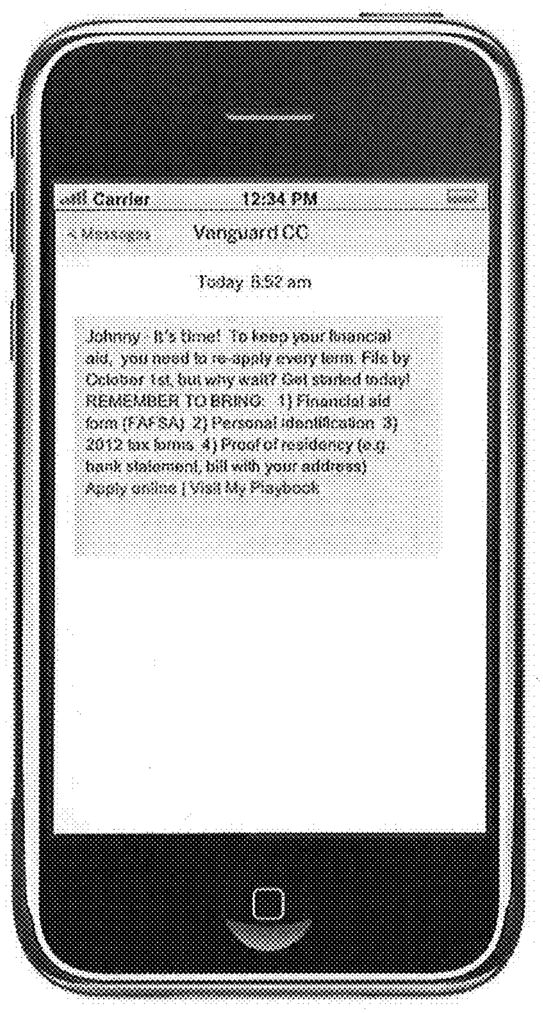
FIG. 68 depicts a communication related to a current task displayed on a mobile device, according to exemplary embodiments of the present disclosure.

FIG. 68 depicts a communication related to a current task displayed on a mobile device, according to exemplary embodiments of the present disclosure. Such communications may be related, for example, to applications for financial aid. The displayed communication may include selectable links for taking further action related to the task, such as, for example applying for financial aid or to visit a My Playbook form.

Figure 69:
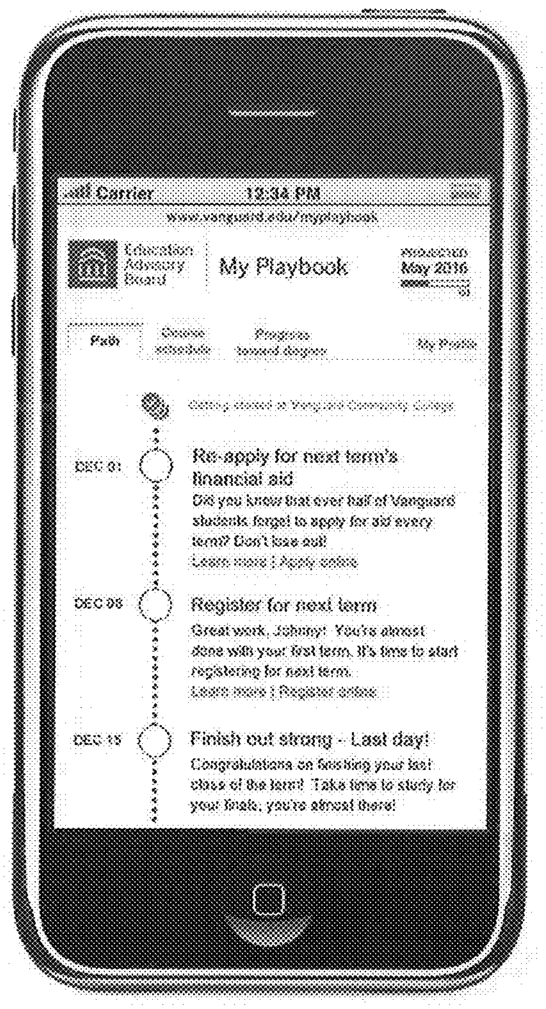
FIG. 69 depicts a "My Playbook" form displayed on a mobile device, according to exemplary embodiments of the present disclosure.

FIG. 69 depicts a "My Playbook" form displayed on a mobile device, according to exemplary embodiments of the present disclosure. A "My Playbook" form according to exemplary embodiments of the present disclosure may include a plurality of tasks to be completed by the user. In FIG. 69, for example, the task "Re-apply for next term's financial aid" is to be completed.

Figure 70:
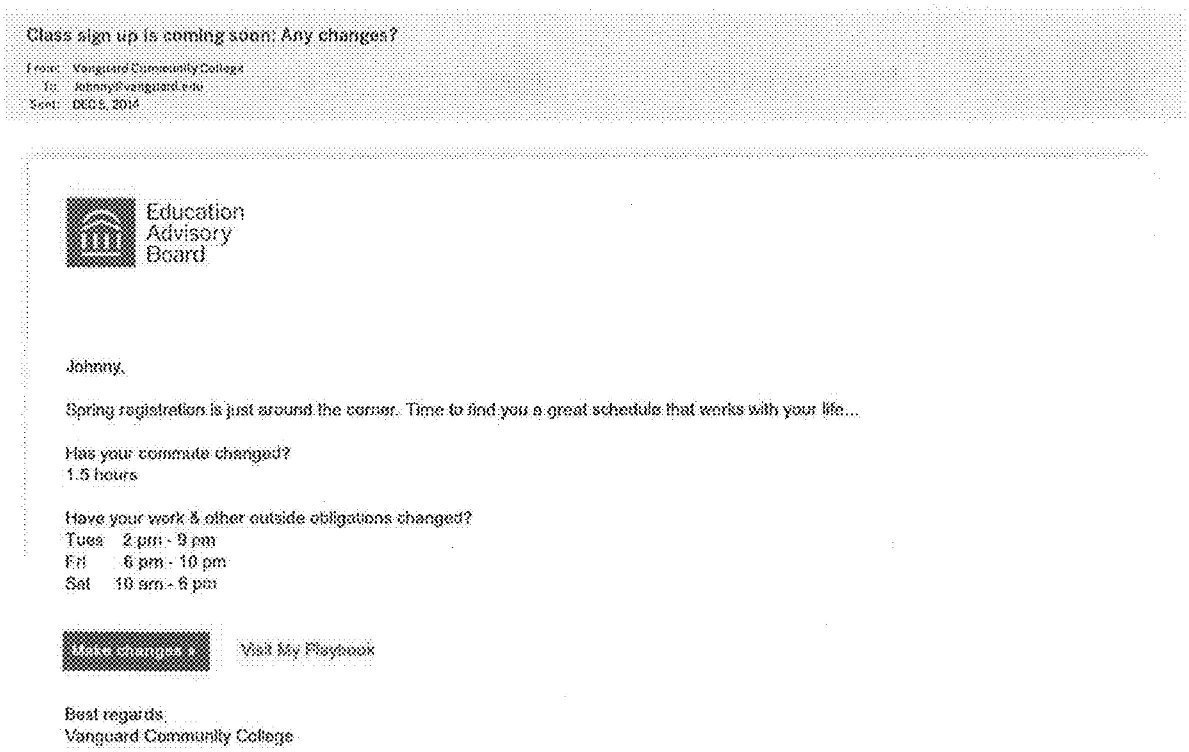
FIG. 70 depicts a communication to a user of My Playbook, according to exemplary embodiments of the present disclosure.

FIG. 70 depicts a communication to a user of My Playbook, according to exemplary embodiments of the present disclosure. Such communications may prompt the user to update one or more pieces of profile or preference communication in advance of an upcoming task. For example, as depicted in FIG. 70, the communication may prompt the user to update information related to commuting or a work schedule in advance of registration for the next term's courses.

Figure 71:
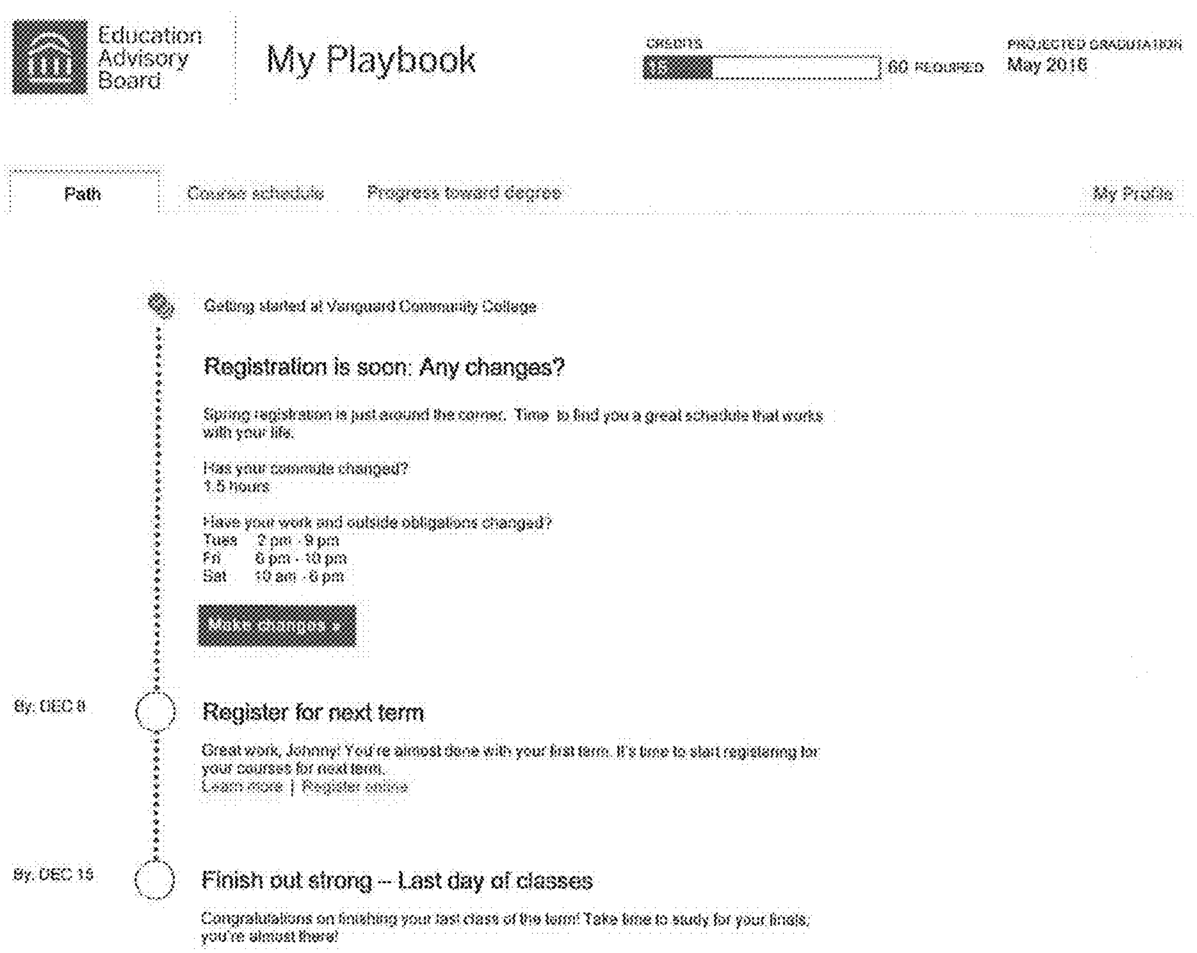
FIG. 71 depicts a task prompting a user of My Playbook to update one or more pieces of profile or preference communication in advance of an upcoming task, according to exemplary embodiments of the present disclosure.

FIG. 71 depicts a task prompting a user of My Playbook to update one or more pieces of profile or preference communication in advance of an upcoming task, according to exemplary embodiments of the present disclosure. For example, as depicted in FIG. 71, the task "Registration is soon: Any changes?" may prompt the user to update information related to commuting or a work schedule in advance of the task "Register for next term."

Figure 72:
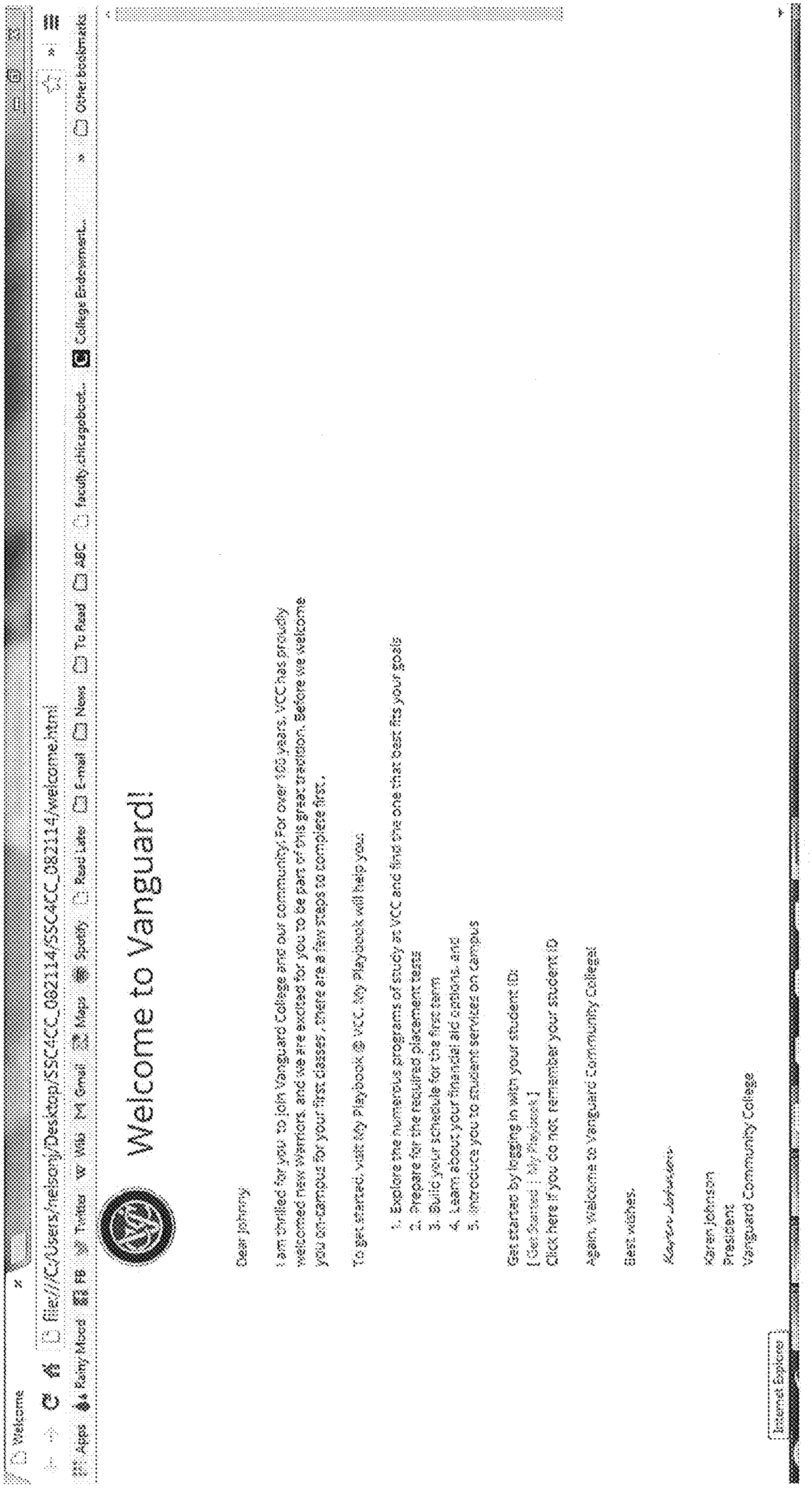
FIG. 72 depicts an admissions letter from an academic institution to an applicant as displayed in a web browser, according to exemplary embodiments of the present disclosure.

FIG. 72 depicts an admissions letter from an academic institution to an applicant as displayed in a web browser, according to exemplary embodiments of the present disclosure. An admissions letter according to exemplary embodiments of the present disclosure may include a web site address and student ID to log in to "My Path."

Figure 73:
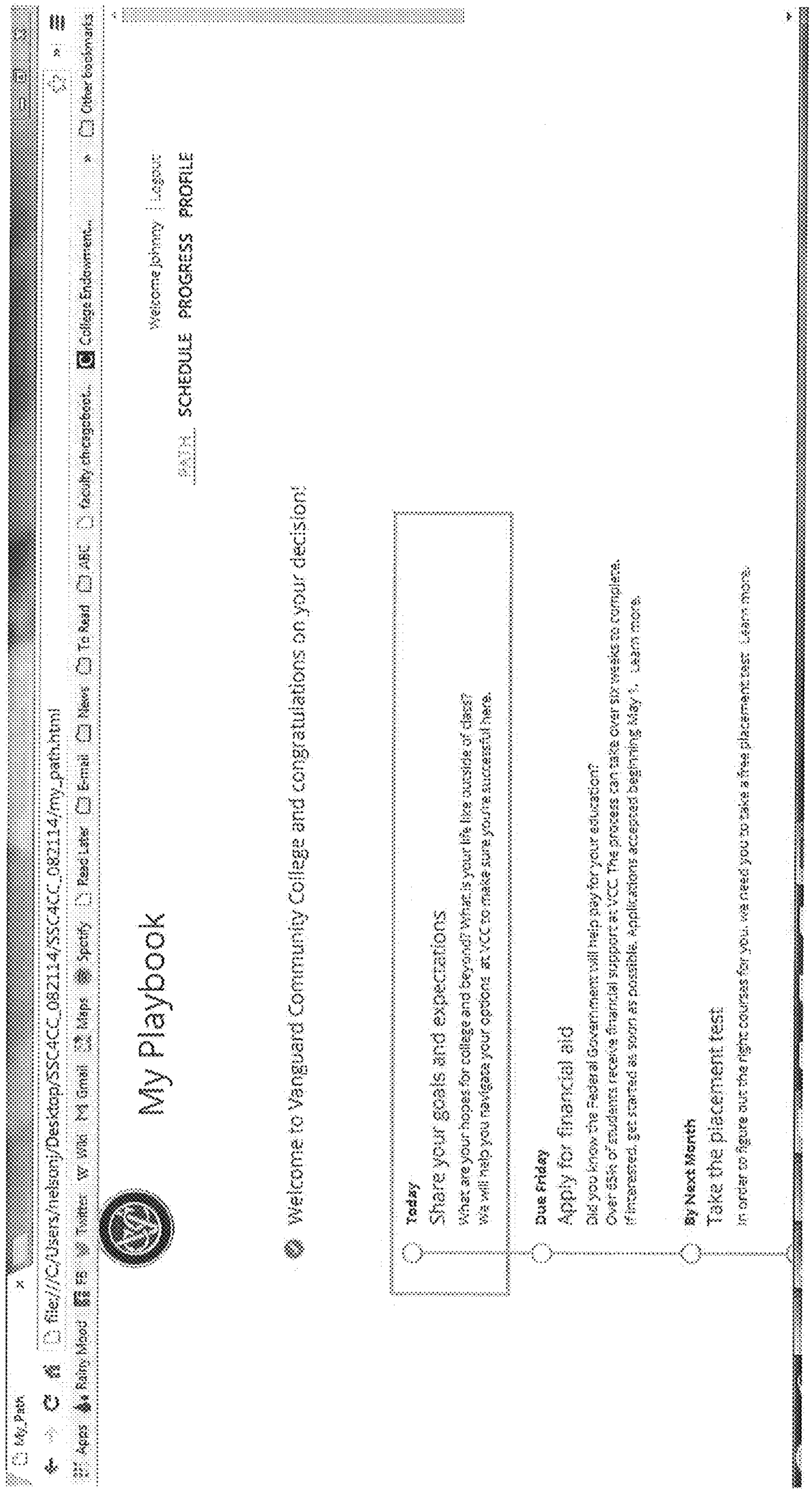
FIGS. 73 and 74 depict a "My Playbook" form as displayed in a web browser, according to exemplary embodiments of the present disclosure.
Figure 74:
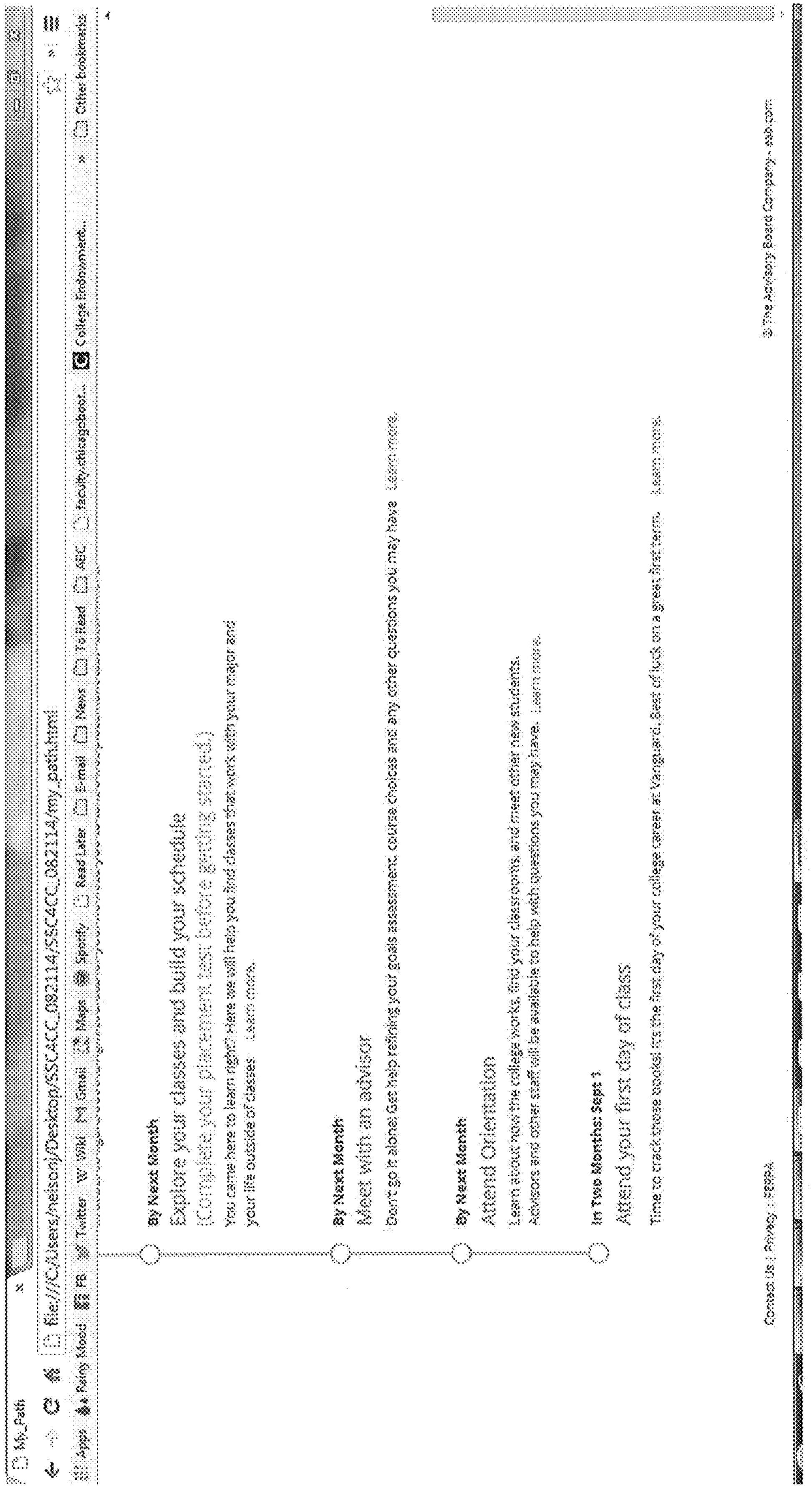

FIGS. 73 and 74 depict a "My Playbook" form as displayed in a web browser, according to exemplary embodiments of the present disclosure. A "My Playbook" form according to exemplary embodiments of the present disclosure may include a plurality of tasks to be completed by the user. Each task may include a target completion date. In FIG. 73, for example, the first task, "Share your goals and expectations" is selected. A "Get Started" button for initiating the selected task may be provided.

Figure 75:
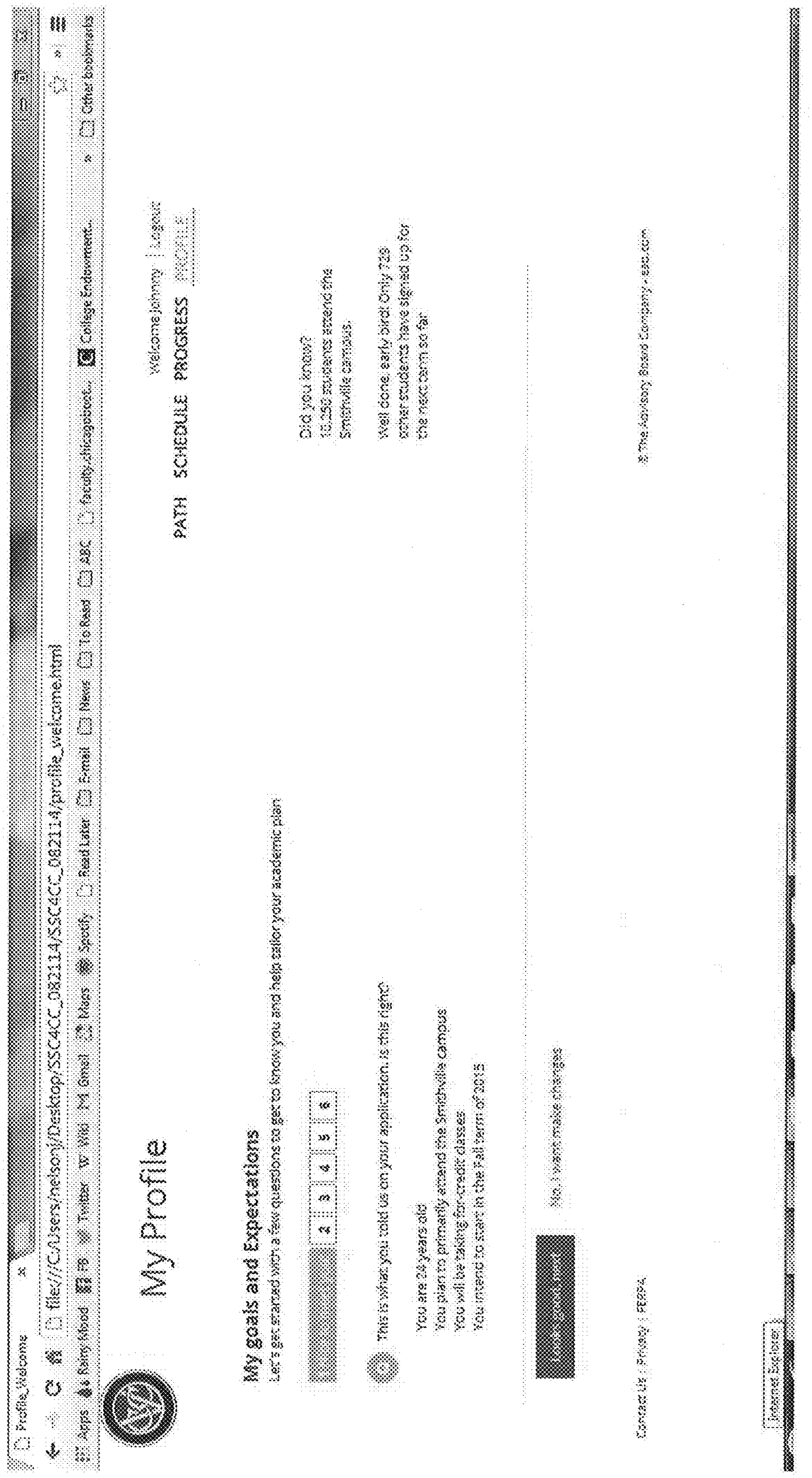
FIG. 75 depicts a profile editing form for completing a "My goals and expectations" task as displayed in a web browser, according to exemplary embodiments of the present disclosure.

FIG. 75 depicts a profile editing form for completing a "My goals and expectations" task as displayed in a web browser, according to exemplary embodiments of the present disclosure. A profile editing form according to exemplary embodiments of the present disclosure may display, for example, profile information and may include buttons to accept or modify the displayed profile information.

Figure 76:
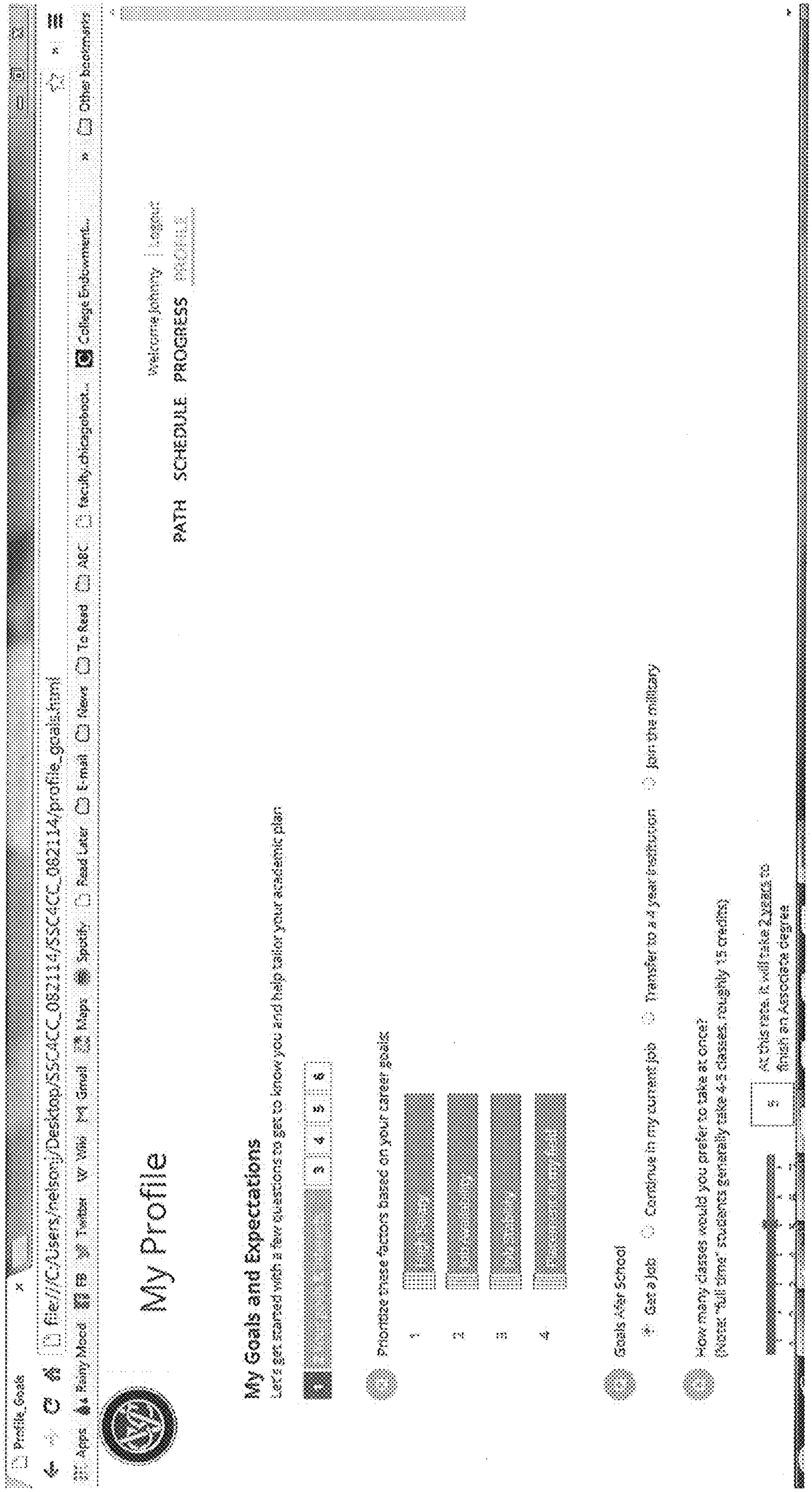
FIGS. 76 and 77 depict a form defining goals for completing a "My goals and expectations" task as displayed in a web browser, according to exemplary embodiments of the present disclosure.
Figure 77:
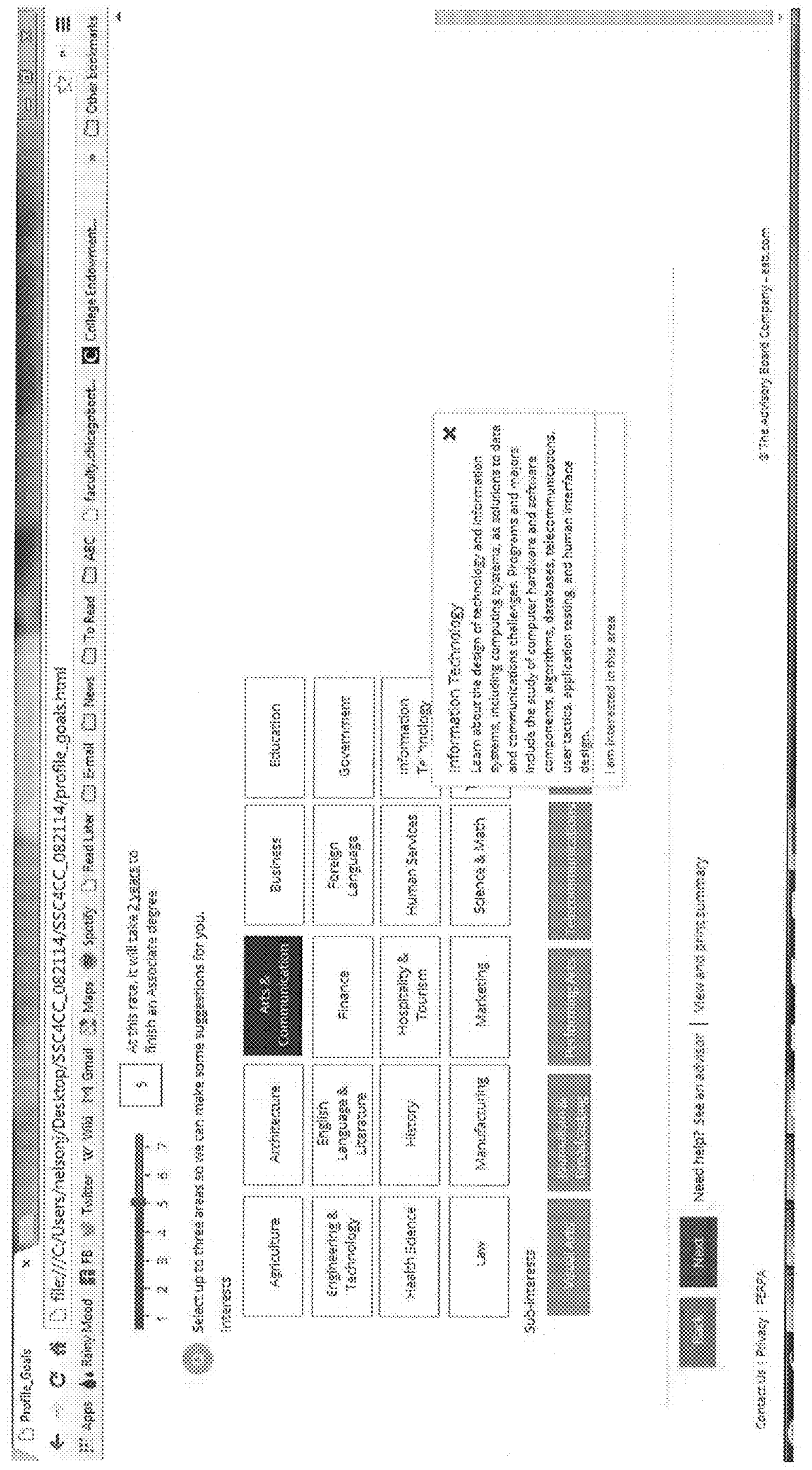

FIGS. 76 and 77 depict a form defining goals for completing a "My goals and expectations" task as displayed in a web browser, according to exemplary embodiments of the present disclosure. A form defining goals according to exemplary embodiments of the present disclosure may include, for example, elements for prioritizing factors, defining future plans, setting parameters for degree completion and class scheduling and selecting one or more areas of interest. The form may further include buttons to move to a next or previous form.

Figure 78:
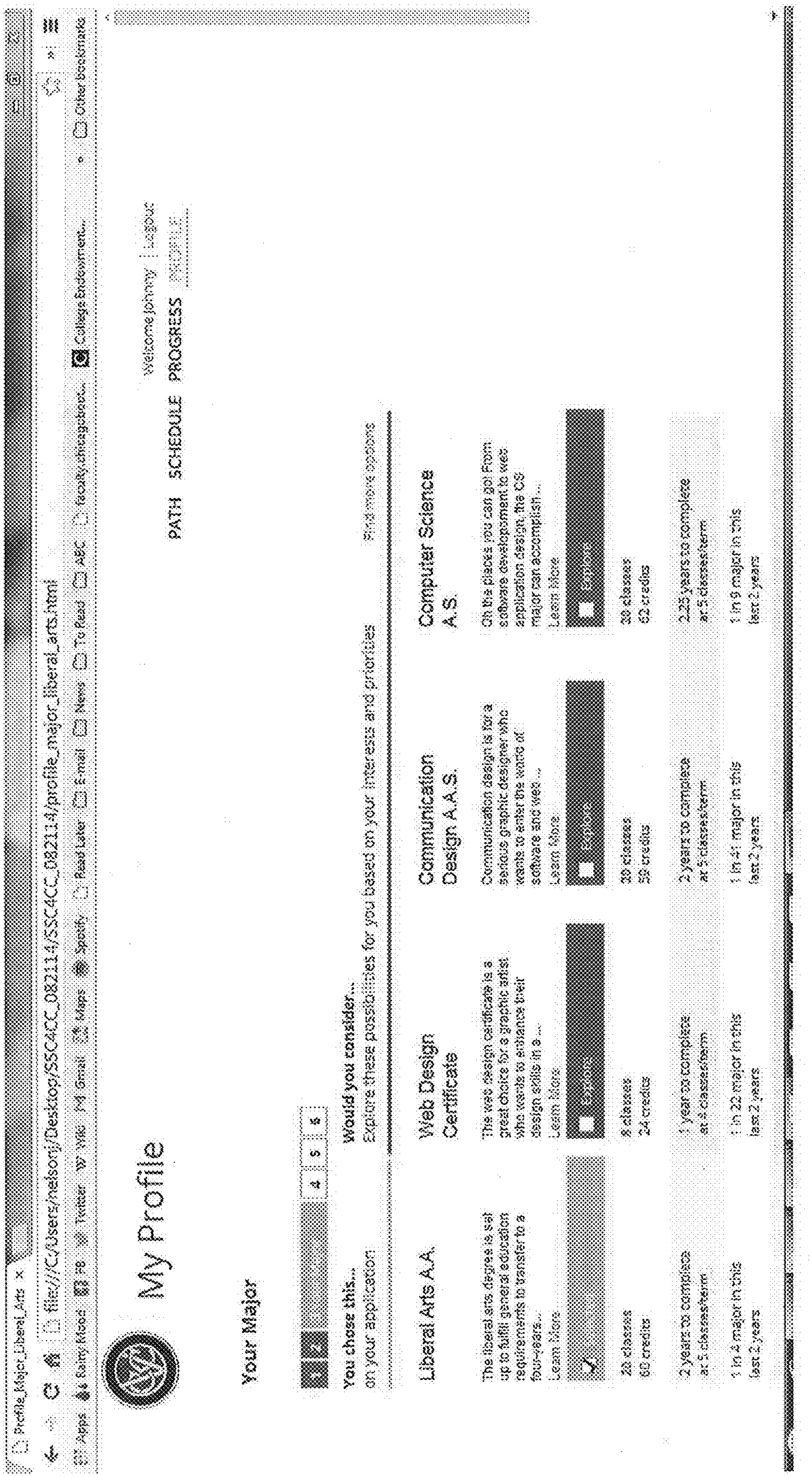
FIGS. 78 and 79 depict a form for selecting a course of study for completing a "My goals and expectations" task as displayed in a web browser, according to exemplary embodiments of the present disclosure.
Figure 79:
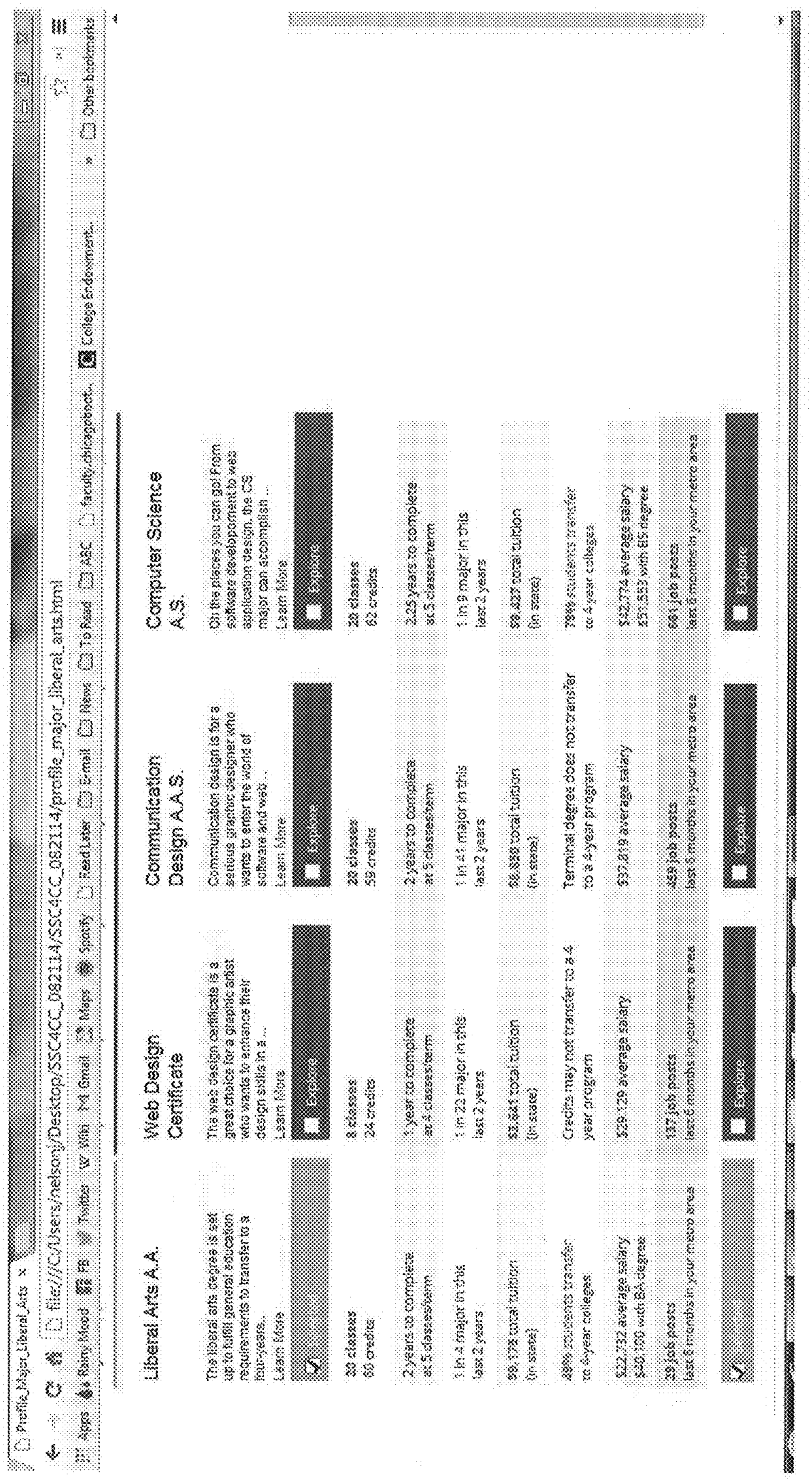

FIGS. 78 and 79 depict a form for selecting a course of study for completing a "My goals and expectations" task as displayed in a web browser, according to exemplary embodiments of the present disclosure. A form for selecting a course of study according to exemplary embodiments of the present disclosure may include, for example, information related to one or more academic courses of study. For each course of study, the form may include a check box for selecting that course of study.

Figure 80:
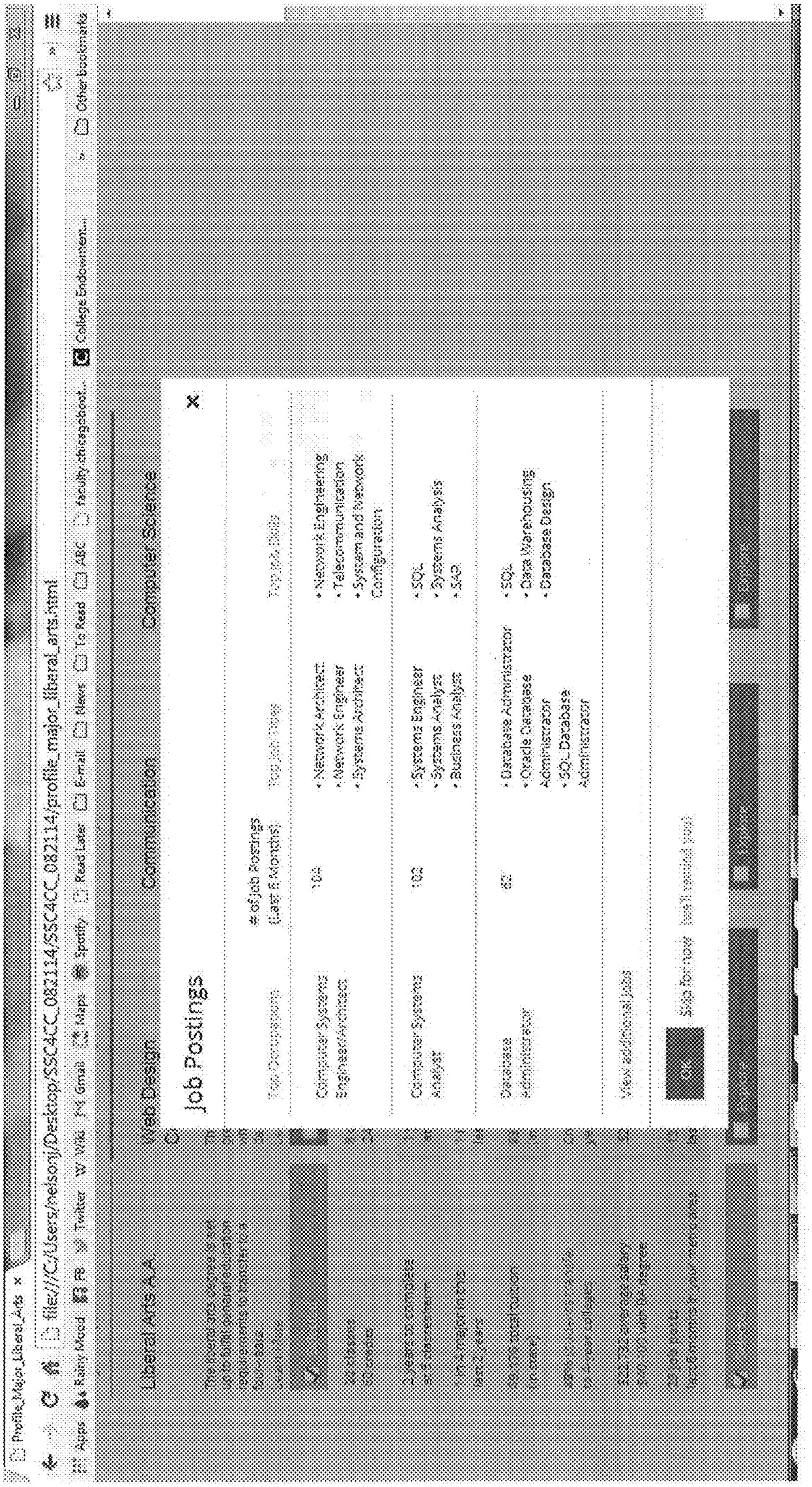
FIG. 80 depicts a listing of available employment opportunities related to a selected course of study as displayed in a web browser, according to exemplary embodiments of the present disclosure.

FIG. 80 depicts a listing of available employment opportunities related to a selected course of study as displayed in a web browser, according to exemplary embodiments of the present disclosure. The available employment opportunities may be displayed, for example, overlaying the form for selecting a course of study.

Figure 81:
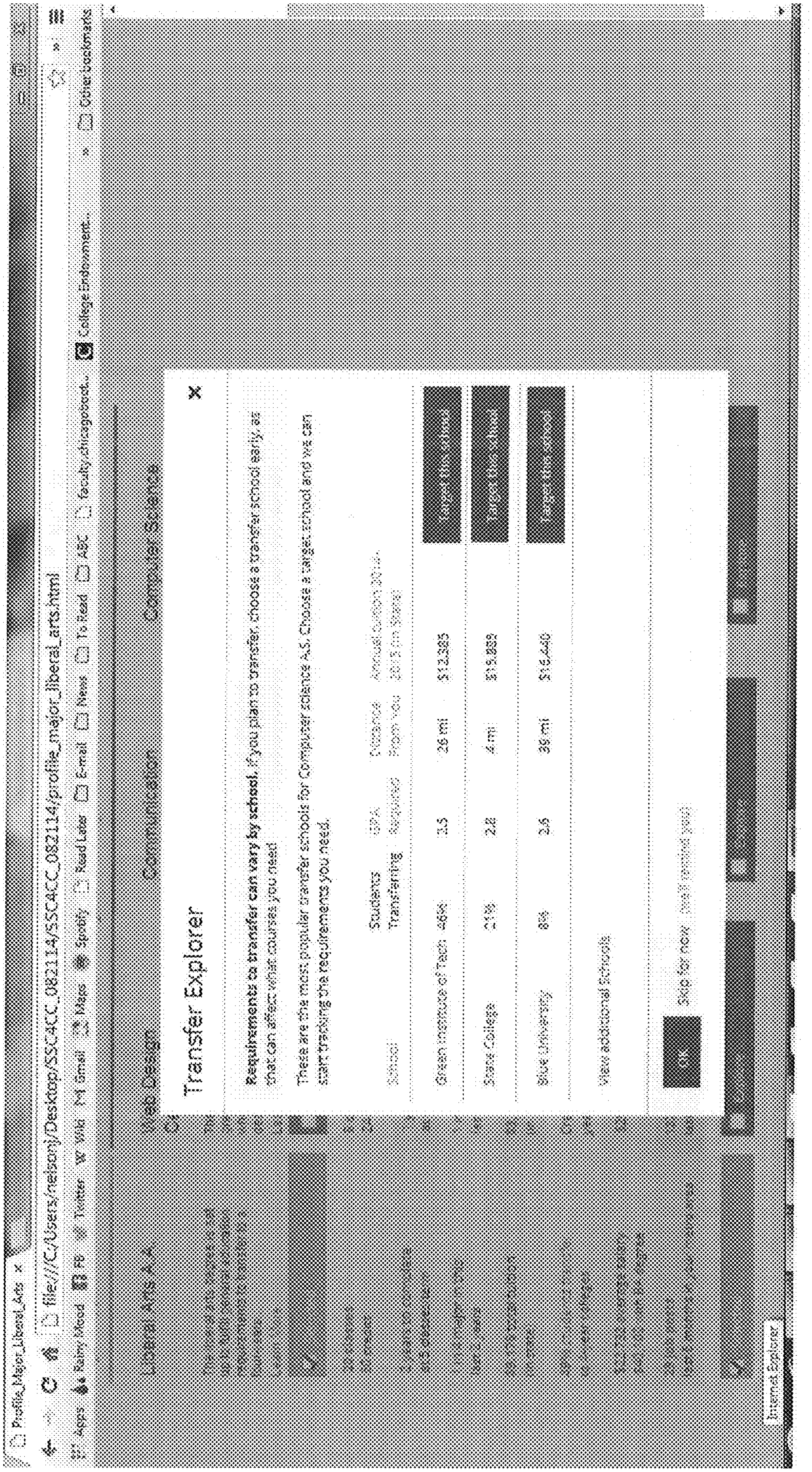
FIG. 81 depicts a form to display information related to transfer to one or more academic institutions as displayed in a web browser, according to exemplary embodiments of the present disclosure.

FIG. 81 depicts a form to display information related to transfer to one or more academic institutions as displayed in a web browser, according to exemplary embodiments of the present disclosure. A form to display information related to transfer to one or more academic institutions may include, for each academic institution displayed, detailed information about the institution. The form may further include buttons to select each listed institution. The form may further include an option to view additional institutions, accept the current selection, or cancel the current selection.

Figure 82:
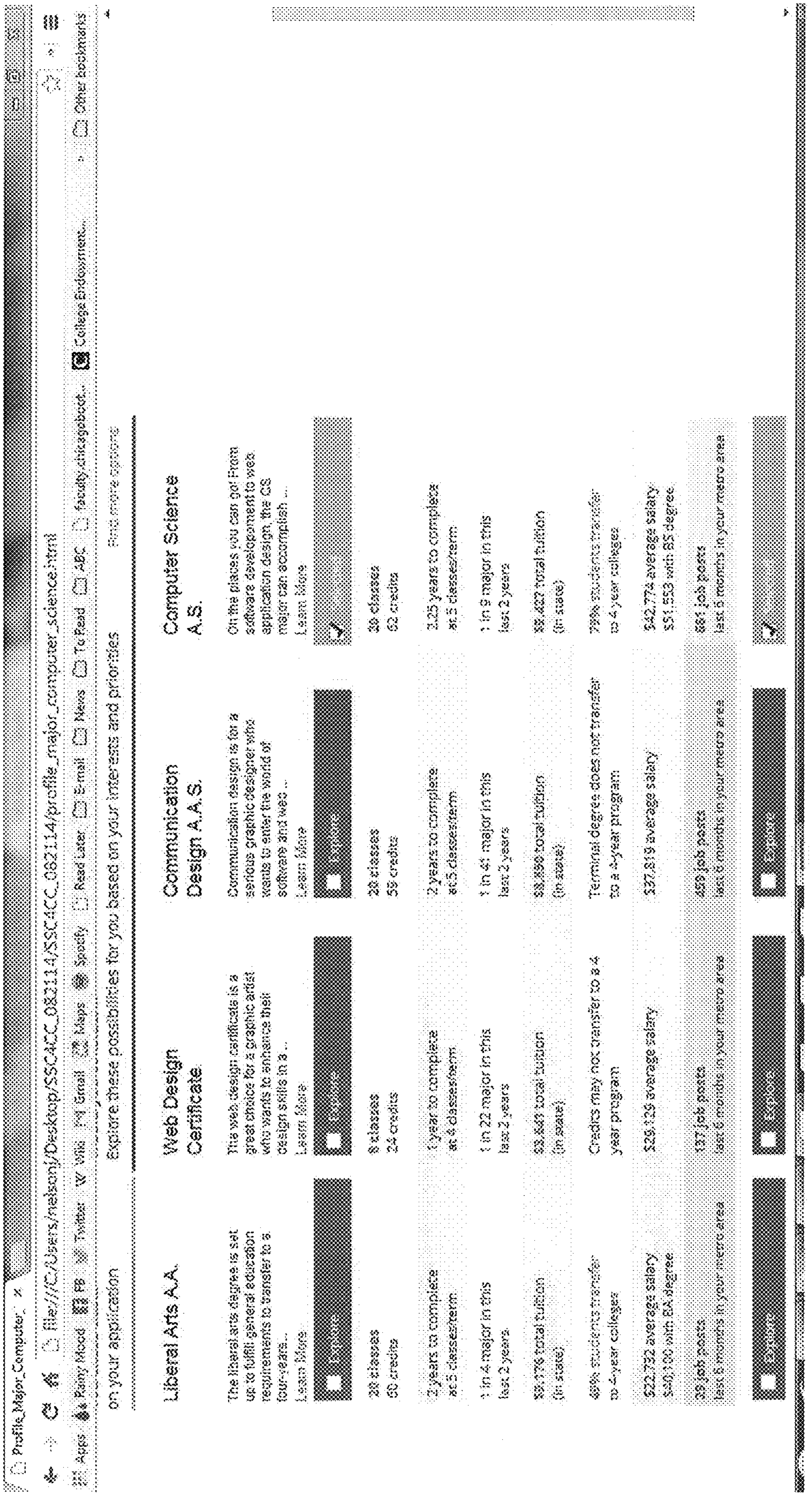
FIG. 82 depicts a form for selecting a course of study for completing a "My goals and expectations" task as displayed in a web browser, according to exemplary embodiments of the present disclosure.

FIG. 82 depicts a form for selecting a course of study for completing a "My goals and expectations" task as displayed in a web browser, according to exemplary embodiments of the present disclosure. A form for selecting a course of study according to exemplary embodiments of the present disclosure may include, for example, information related to one or more academic courses of study. For each course of study, the form may include a check box for selecting that course of study.

Figure 83:
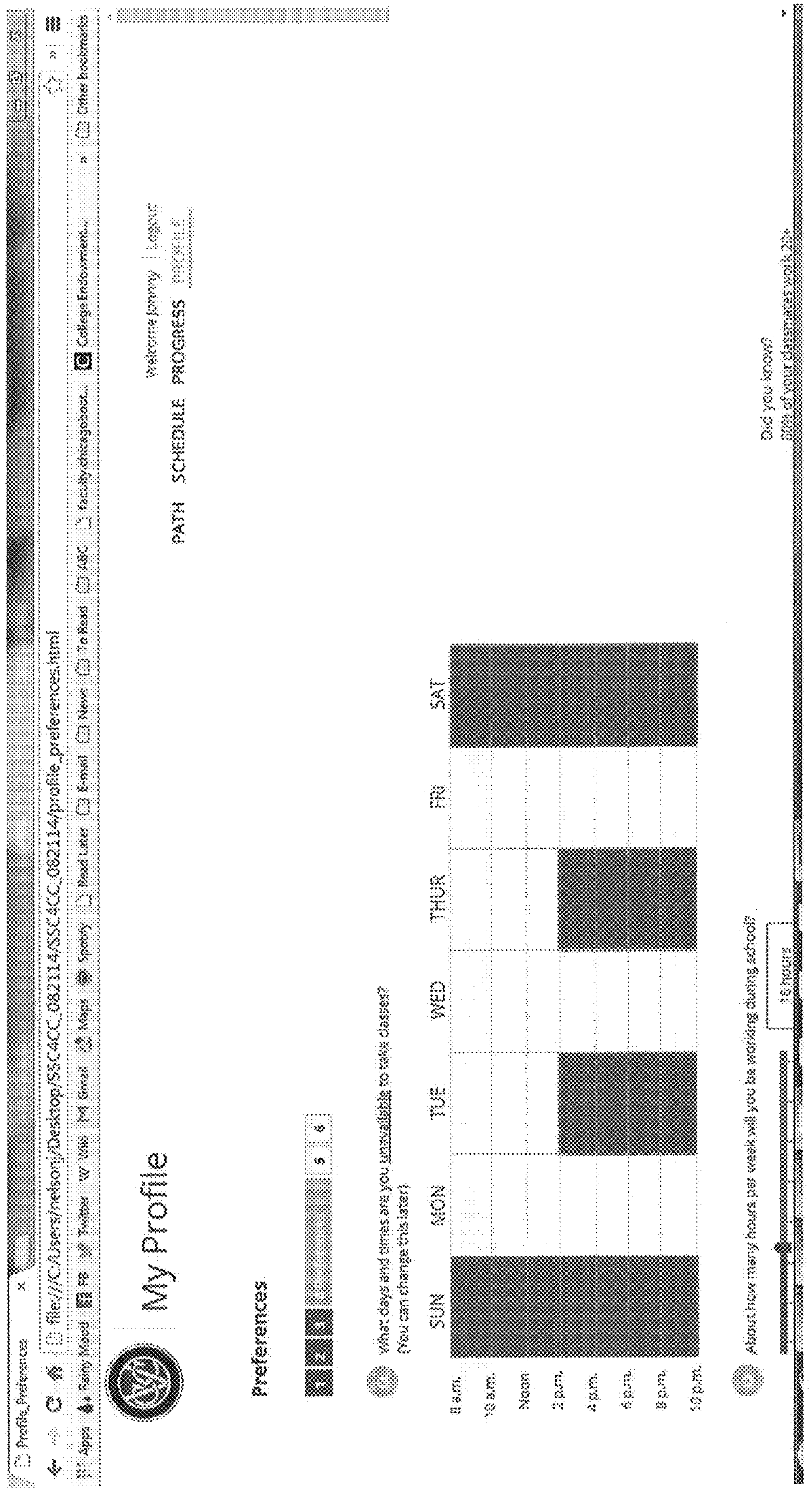
FIGS. 83-85 depict a form for setting preferences for completing a "My goals and expectations" task as displayed in a web browser, according to exemplary embodiments of the present disclosure.
Figure 84:
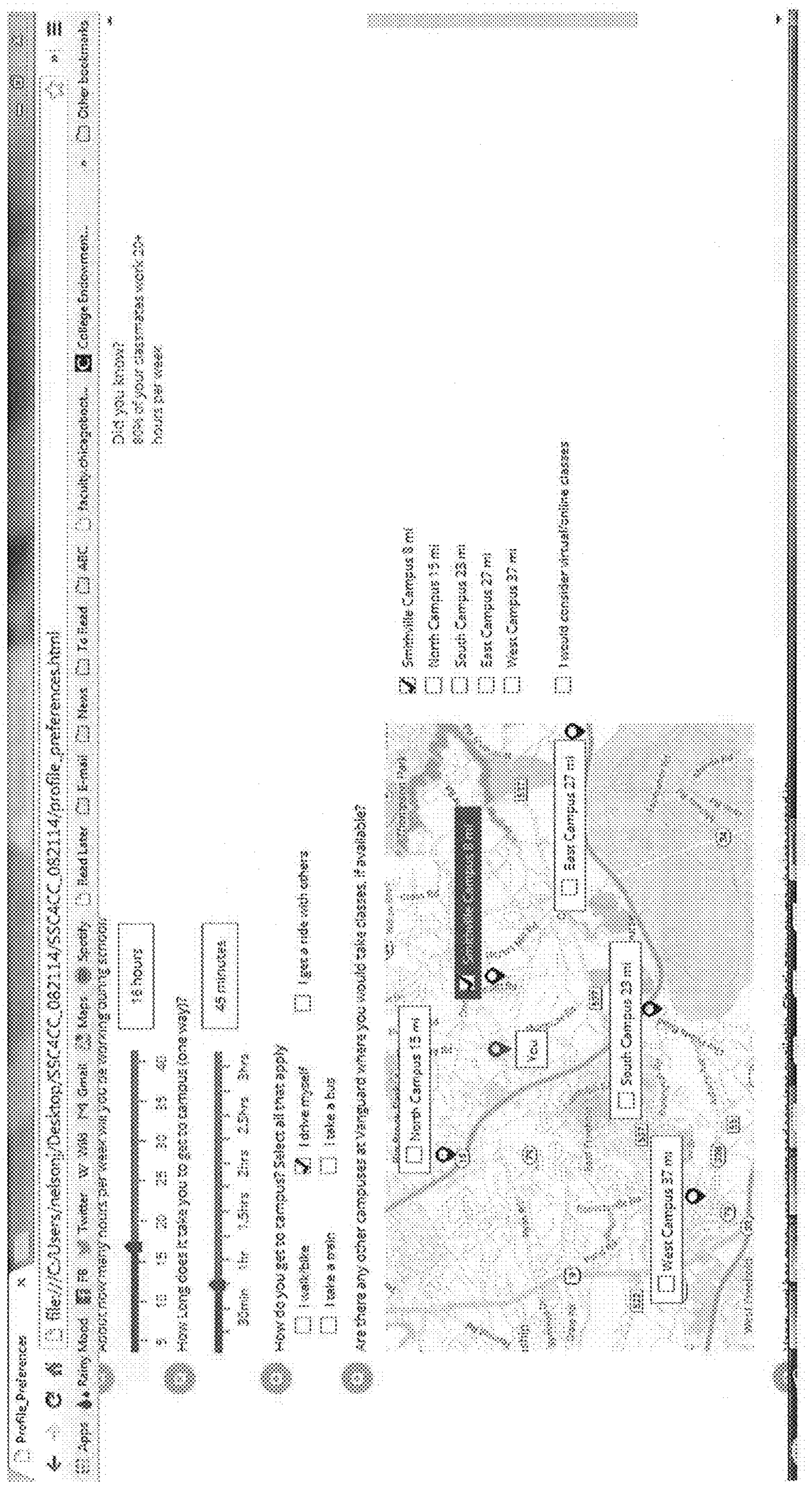
Figure 85:
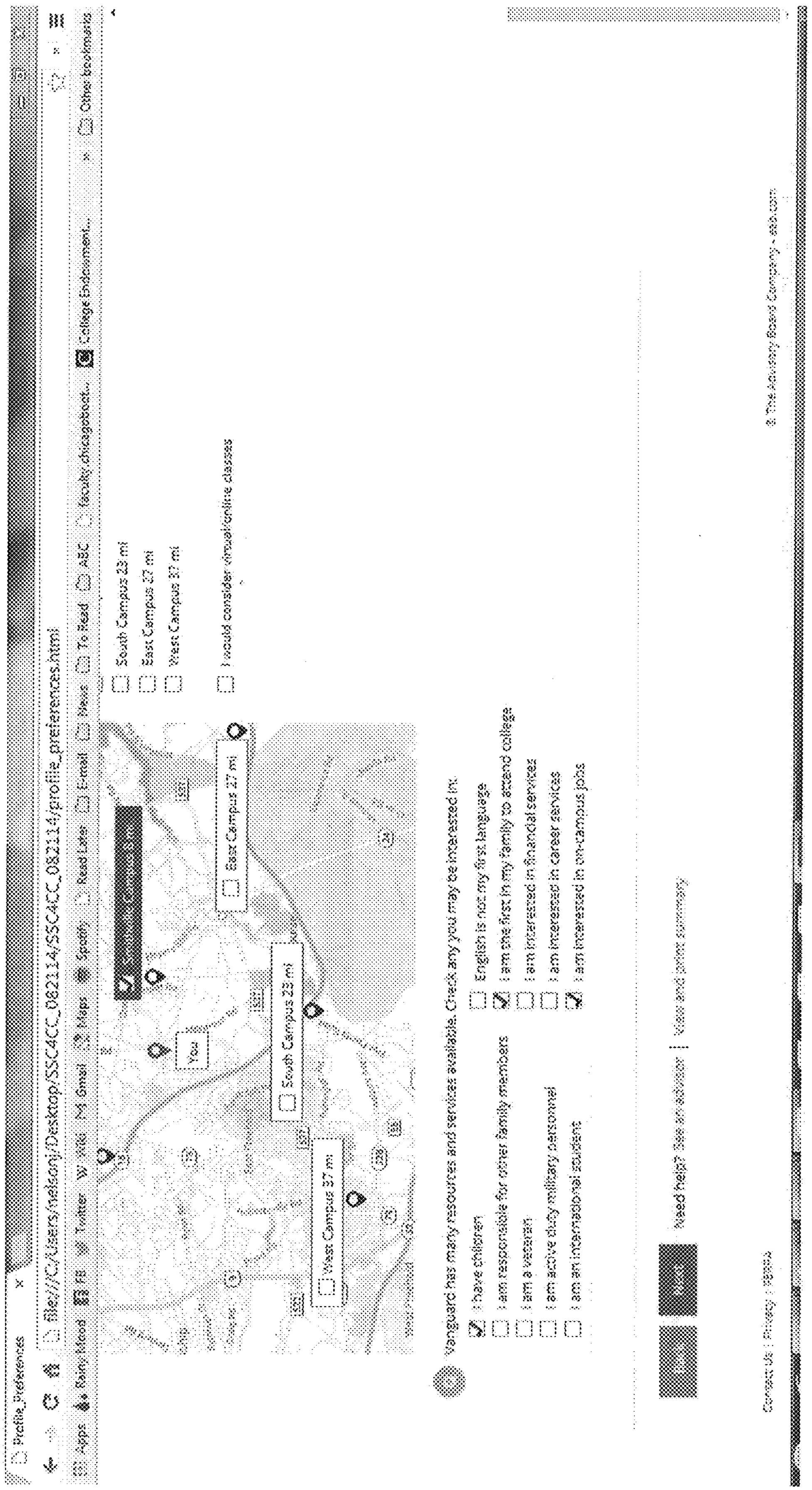

FIGS. 83-85 depict a form for setting preferences for completing a "My goals and expectations" task as displayed in a web browser, according to exemplary embodiments of the present disclosure. A form for setting preferences according to exemplary embodiments of the present disclosure may include, for example, elements for defining day and time availability, setting a number of work hours outside of school, commuting information and campus resources. The form may further include information about alternative locations for enrollment.

Figure 86:
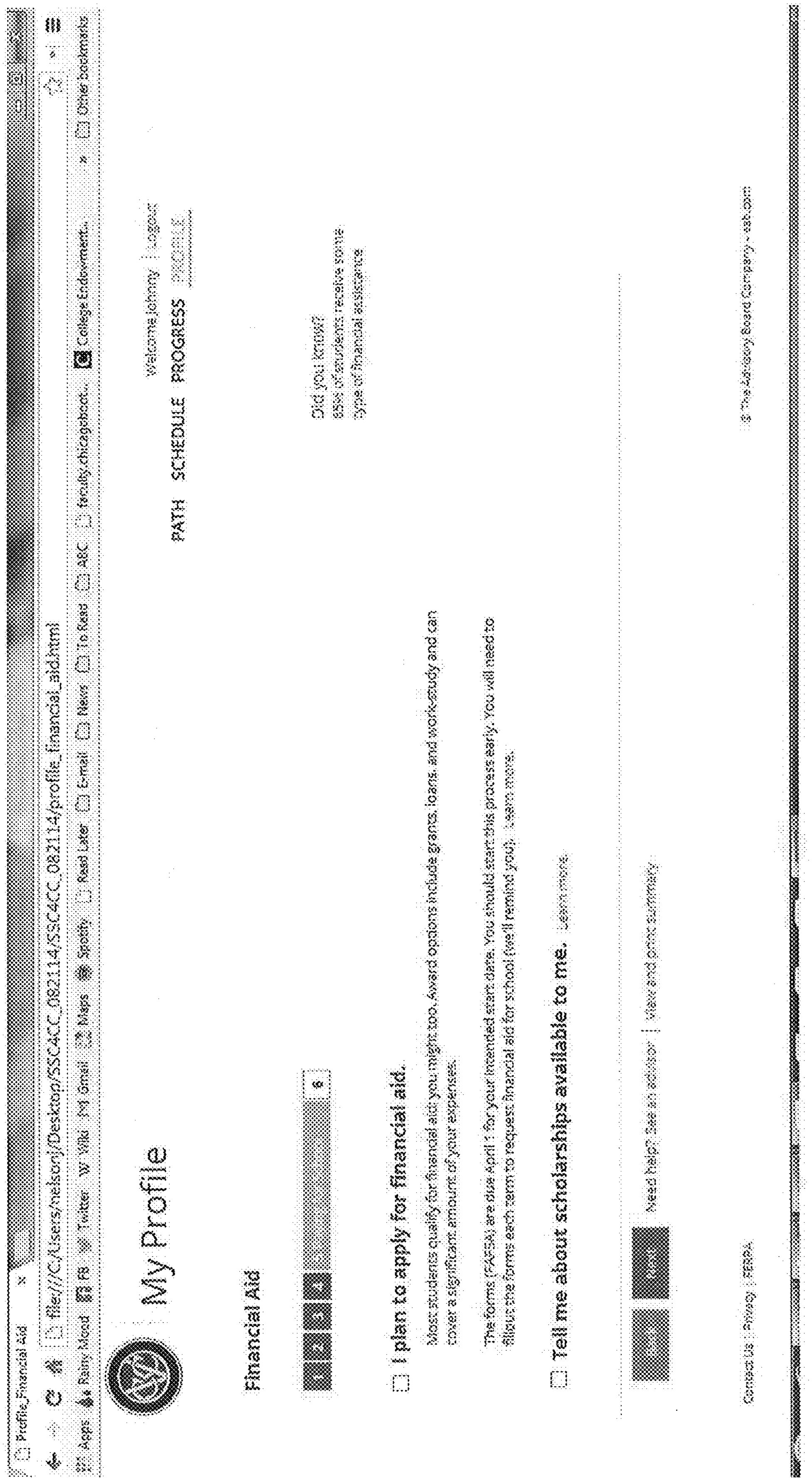
FIG. 86 depicts a form for financial planning for completing a "My goals and expectations" task as displayed in a web browser, according to exemplary embodiments of the present disclosure.

FIG. 86 depicts a form for financial planning for completing a "My goals and expectations" task as displayed in a web browser, according to exemplary embodiments of the present disclosure. A form for financial planning according to exemplary embodiments of the present disclosure may include, for example, elements to indicate that a student plans to apply for financial aid or to request information about scholarships.

Figure 87:
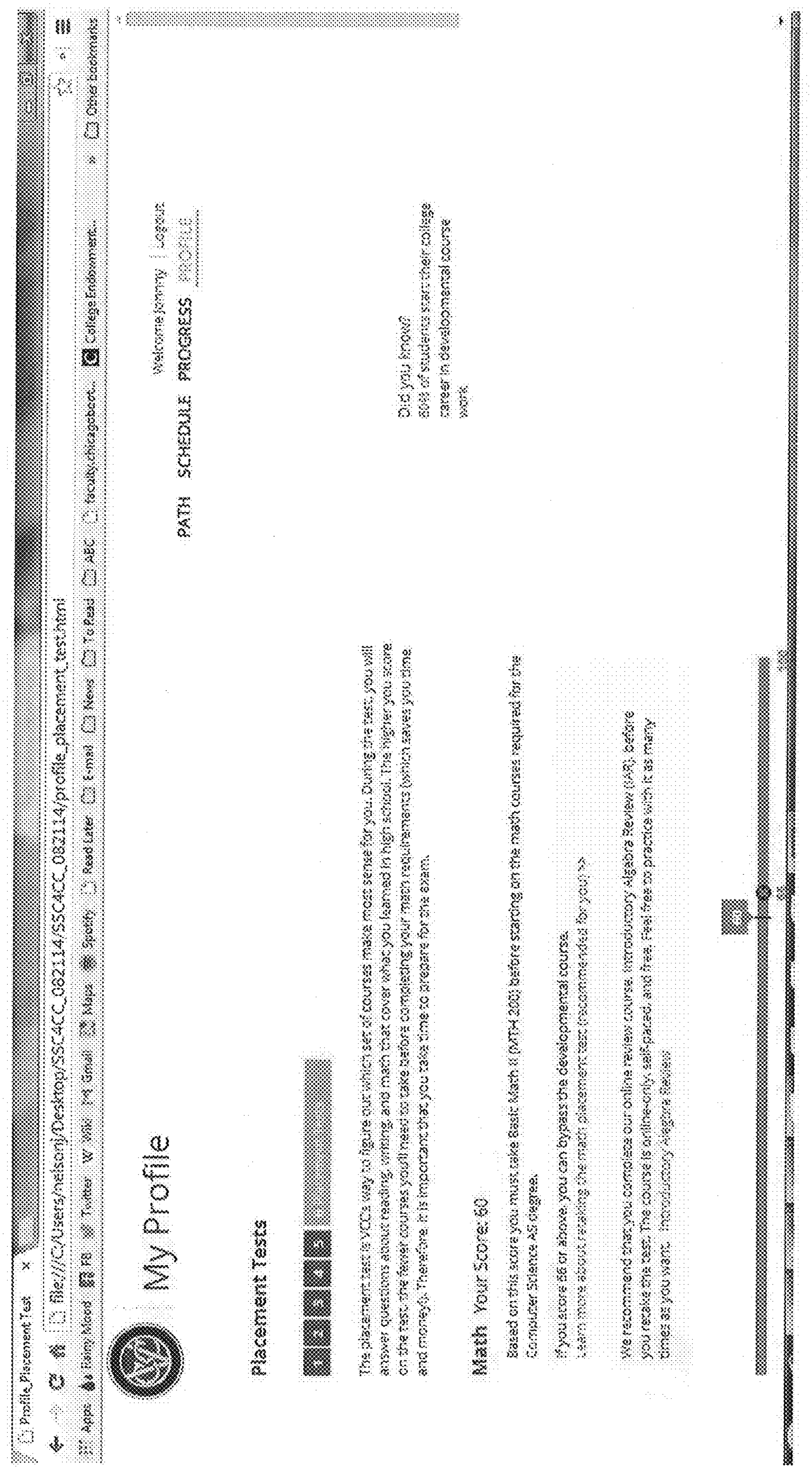
FIGS. 87 and 88 depict a form for displaying testing information for completing a "My goals and expectations"
Figure 88:
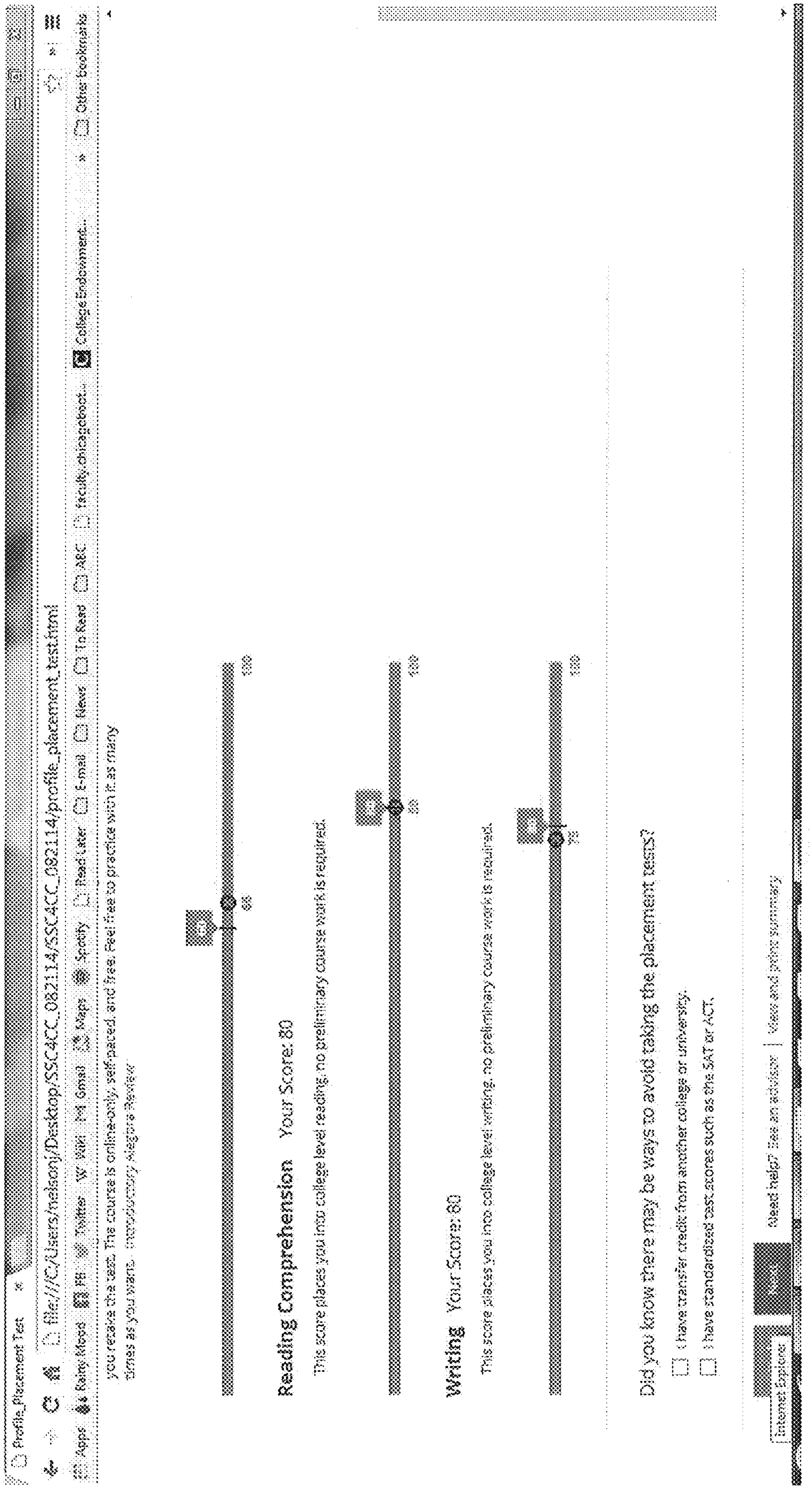

FIGS. 87 and 88 depict a form for displaying testing information for completing a "My goals and expectations" task as displayed in a web browser, according to exemplary embodiments of the present disclosure. A form for displaying testing information according to exemplary embodiments of the present disclosure may include, for example, information displaying test scores in one or more academic areas. The form may further include detailed information for interpreting one or more of the displayed test scores. As shown in FIG. 88, a test score in each academic area may be depicted in graphical form, such as on a number line, and may include information about comparison values. Test scores depicted in graphical form may include further information such as colors, icons, etc.

FIG. 89 depicts a "My Playbook" form as displayed in a web browser, according to exemplary embodiments of the present disclosure. A "My Playbook" form according to exemplary embodiments of the present disclosure may include a plurality of tasks to be completed by the user. In FIG. 89, for example, the task "Explore your classes and schedule" is to be completed.

FIG. 90 depicts a form to display an exemplary course schedule as displayed in a web browser, according to exemplary embodiments of the present disclosure. A form to display an exemplary course schedule according to exemplary embodiments of the present disclosure may include, for example, information about one or more for a number or types of classes to be taken in a semester. The form may also include information about the total number of courses required in each of one or more areas of study.

A form to display an exemplary course schedule according to exemplary embodiments of the present disclosure may include, for example, a list of recommended classes in a particular semester in one or more areas of study. The form may display additional information for one or more of the listed courses such as, for example, prerequisites or other holds on registration.

FIG. 91 depicts a form to display an exemplary course schedule as displayed in a web browser, according to exemplary embodiments of the present disclosure. A form to display an exemplary course schedule according to exemplary embodiments of the present disclosure may include, for example, an icon indicating additional information for one or more of the listed courses may be displayed with the listed course. If a user selects a displayed icon, additional information about the course may be displayed, for example, overlaying the form. The displayed information may include, for example, a description of the course content of the selected course.

FIG. 92 depicts a form to display an exemplary course schedule, according to exemplary embodiments of the present disclosure as displayed in a web browser. A form to display an exemplary course schedule according to exemplary embodiments of the present disclosure may include, for example, information about the total number of courses required in each of one or more areas of study. As shown in FIG. 91, if a user selects one of the listed areas of study, a list of classes satisfying the related course requirements may be displayed, for example, overlaying the form.

FIG. 93 depicts a summary page that may be displayed according to exemplary embodiments of the present disclosure as displayed in a web browser, for example in combination with a form to display an exemplary course schedule. The summary page may include information provided by the user and may be displayed as overlaid over a form to display an exemplary course schedule, for example.

FIGS. 94-97 depict a form for arranging selected courses on a calendar grid as displayed in a web browser, according to exemplary embodiments of the present disclosure. The form for arranging selected courses on a calendar grid, according to exemplary embodiments of the present disclosure may include a grid of days of the week and times of day on which selected courses may be displayed. The form may also include, for example, elements to set a preferred number of classes per semester, preferred days on which to attend classes and a preferred amount of time between classes. Informational notices about selected classes may be displayed. The form may also display, for example, information about semester tuition costs for the selected courses and a projected graduation date. The form may include elements to register for the selected classes and/or to save the current selections and exit.

Figure 95:
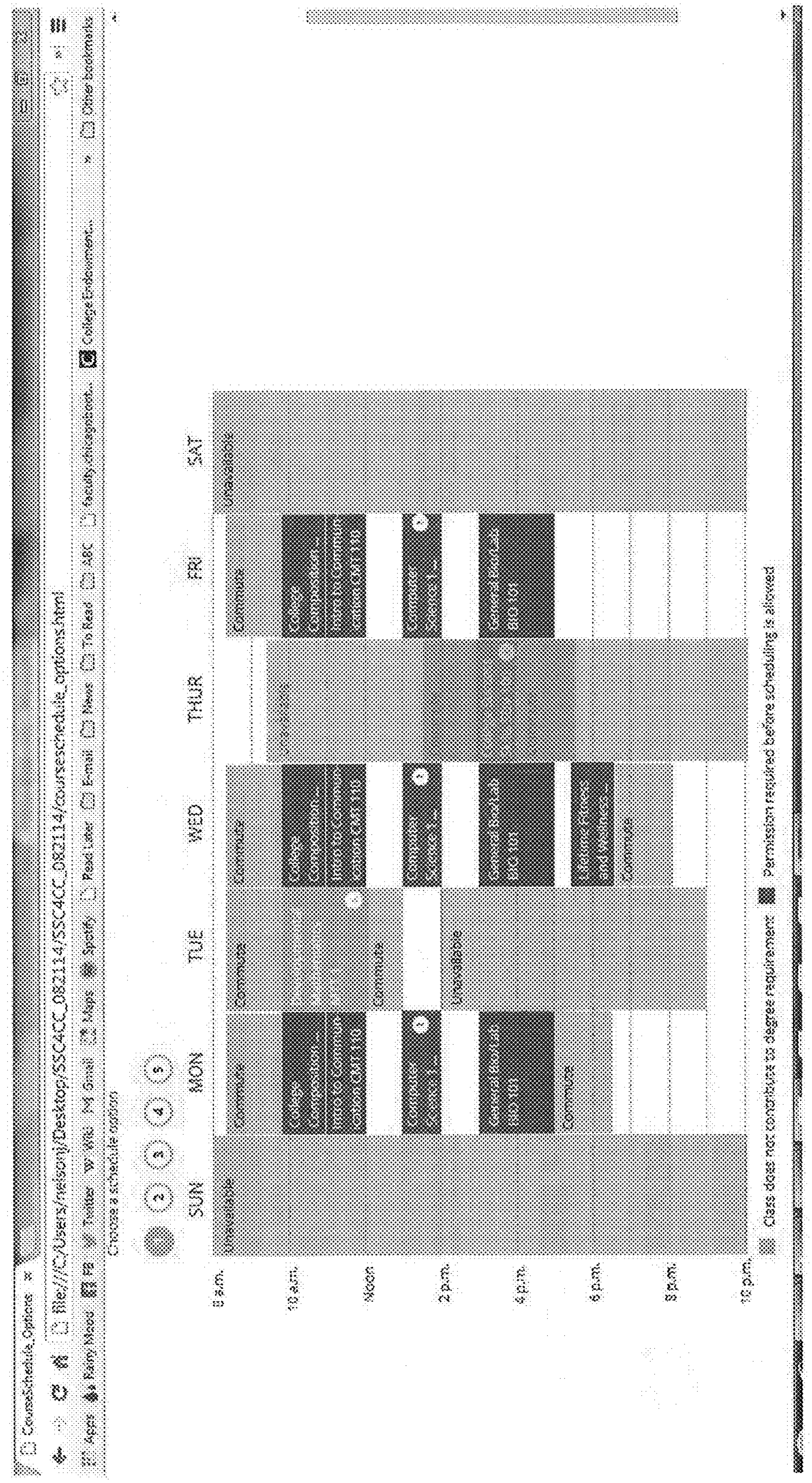
Figure 96:
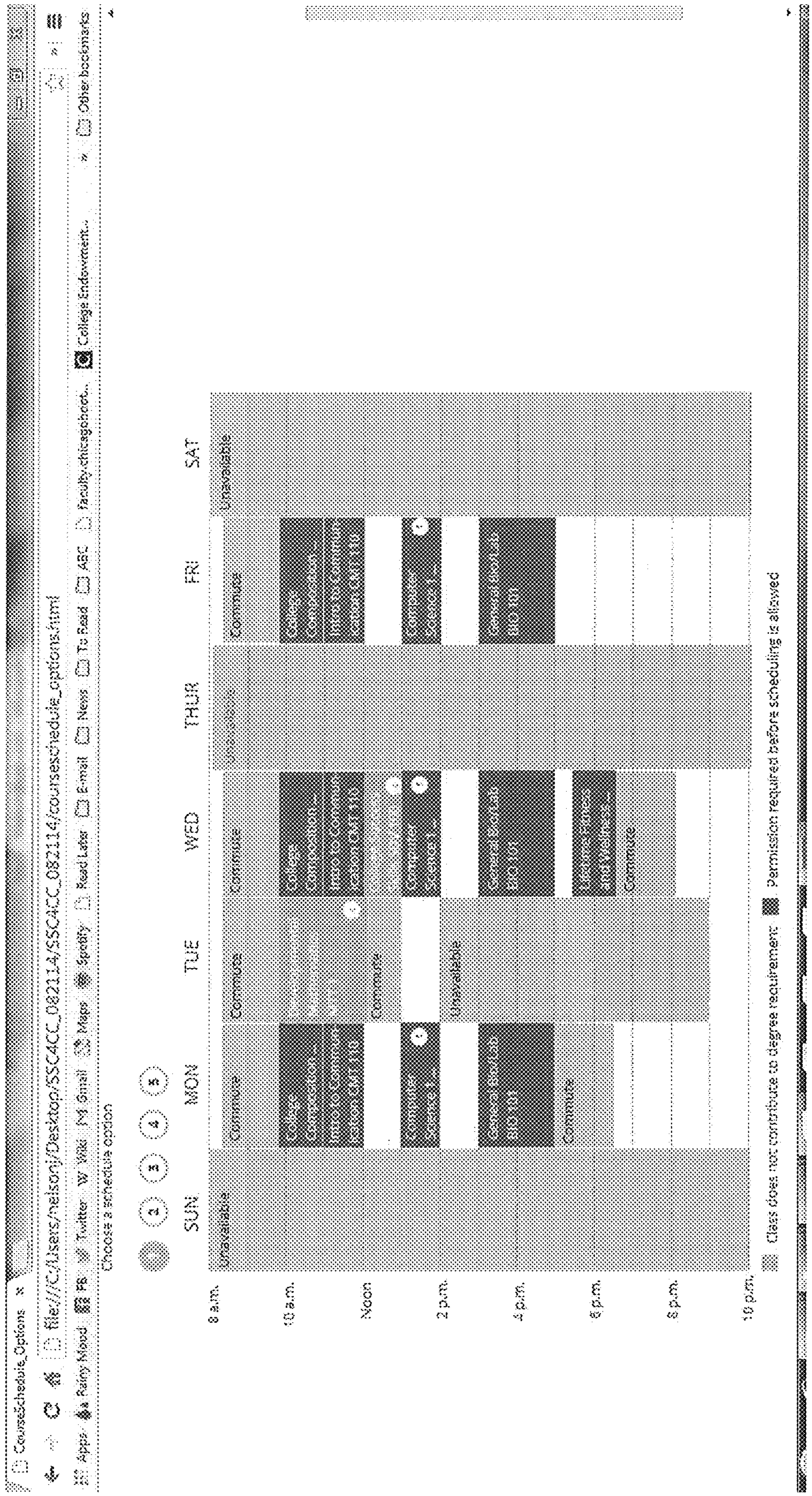
Figure 97:
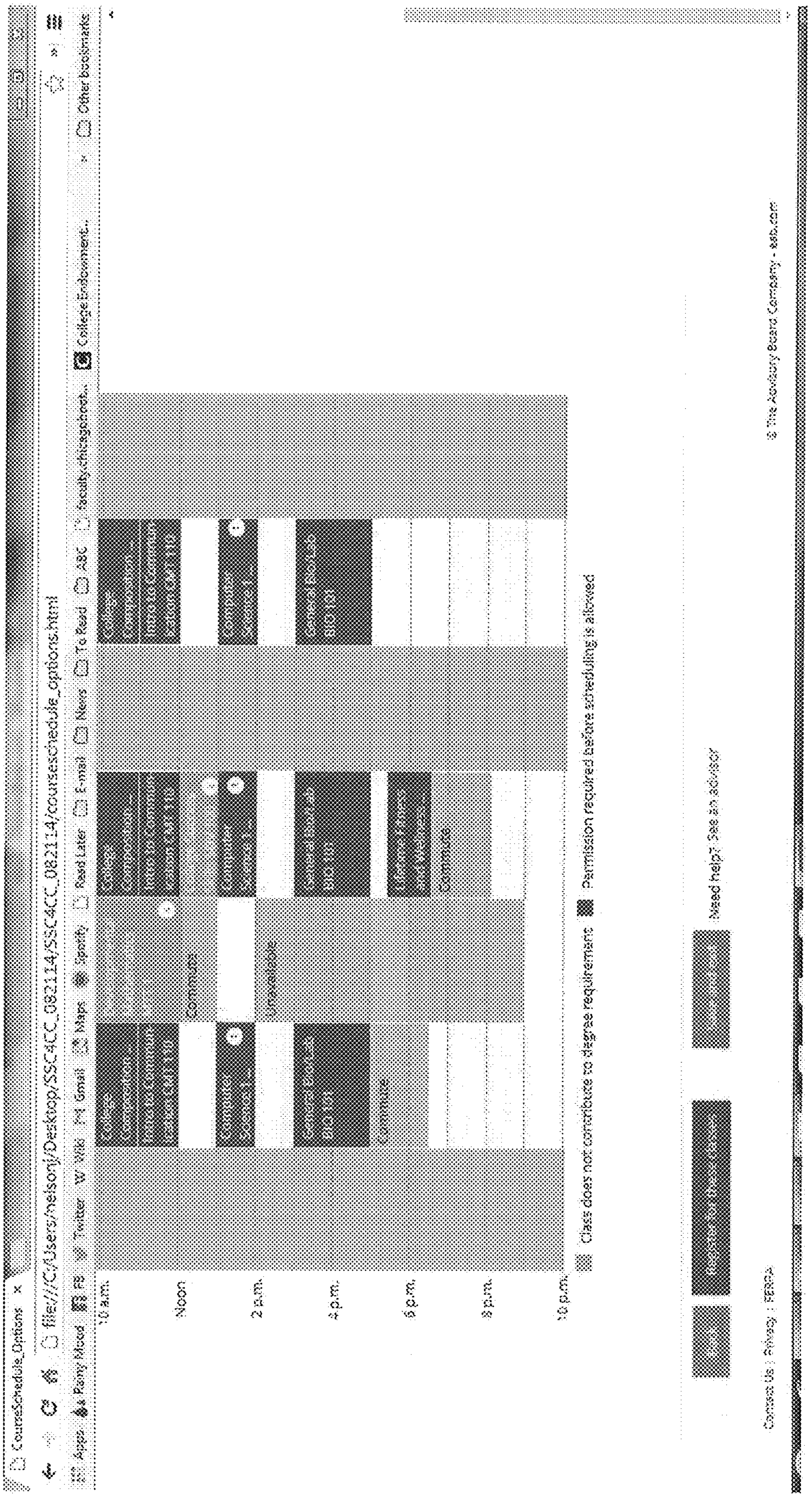

As depicted in FIG. 95, a user may select a range of days and times on the grid to, for example, change the student's availability for the selected days and times. As shown in FIG. 95, a user may set the availability for the selected days and time to "Unavailable." As shown in FIGS. 96 and 97, upon setting the availability for the selected days and times to "Unavailable" the previously scheduled classes for the selected days and times may be removed from the schedule.

FIGS. 98 and 99 depict a form confirming completion of a course schedule as displayed in a web browser, according to exemplary embodiments of the present disclosure. A form confirming completion of a course schedule according to exemplary embodiments of the present disclosure may include, for example, a listing of the enrolled courses. The form may also include a summary of degree and total credits for the enrolled term and the tuition information for the enrolled term. The form may also include information about additional tasks to be completed, such as, for example, the completion of placement tests.

FIG. 100 depicts depict a form for arranging selected courses on a calendar grid as displayed on a mobile device, according to exemplary embodiments of the present disclosure. The form for arranging selected courses on a calendar grid, according to exemplary embodiments of the present disclosure may include a grid of days of the week and times of day on which selected courses may be displayed. The form may also include a description of each scheduled course.

FIG. 101 depicts a communication related to a current task as displayed in an e-mail application on a mobile device, according to exemplary embodiments of the present disclosure. Such communications may be related, for example, to available campus services such as day care, carpools, employment and counseling, etc.

FIG. 102 depicts a communication to a user of My Playbook task as displayed in an e-mail application on a mobile device, according to exemplary embodiments of the present disclosure. Such communications may prompt the user to update one or more pieces of profile or preference communication in advance of an upcoming task. For example, as depicted in FIG. 102, the communication may prompt the user to update information related to commuting or a work schedule in advance of registration for the next term's courses.

FIG. 103 depicts a form for logging in to "My Playbook" for an academic institution as displayed on a mobile device, according to exemplary embodiments of the present disclosure. A form according to exemplary embodiments of the present disclosure may include a form for entering a student ID and a password, for example.

FIGS. 104-105 depict a form for selecting one or more course scheduling options as displayed on a mobile device, according to exemplary embodiments of the present disclosure. The form may include, for example, a grid of days of the week and times of day on which courses may be scheduled and an option for editing scheduling options. The form may also include a description of each scheduled course.

FIG. 106 depicts a "My Dashboard" form displaying statistics about students at an academic institution as displayed in a web browser, according to exemplary embodiments of the present disclosure. The form may include, for example, options to select items of information to be used as primary and secondary lenses, an option to select a focus area, and for filtering the displayed information. The form may also include an option to switch between one or more views for displaying the selected information, such as, for example, bar graph, table and list views, etc.

In FIG. 106, "Student Goals" is selected as the "Primary Lens" and is displayed on the vertical axis of a bar graph view and the data are filtered to include data for "Current Entering Cohort."

FIG. 107 depicts a "My Dashboard" form displaying statistics about students at an academic institution as displayed in a web browser, according to exemplary embodiments of the present disclosure. In FIG. 107, "Student Goals" is selected as the "Primary Lens" on the vertical axis "Service Needs" is selected as the "Secondary Lens" on the horizontal axis and of a table view.

FIG. 108 depicts a "My Dashboard" form displaying statistics about students at an academic institution as displayed in a web browser, according to exemplary embodiments of the present disclosure. The form may include, for example, tabs to select items of information to be displayed on a graphical view, such as a bar graph, and options for filtering the displayed information.

FIGS. 109 and 110 depict a "My Dashboard" form displaying information about courses satisfying one or more academic requirement in a selected course of study as displayed in a web browser, according to exemplary embodiments of the present disclosure.

As shown in FIG. 109, information about courses satisfying a "Physical & Life Science Elective" requirement may be displayed. The displayed information may include information about available seats, predicted demand for seats, and a gap between capacity and demand. Additional information in the form of, for example, icons or color may be displayed for courses having less capacity and an expected demand. As shown in FIG. 110, information for each available section of a course may be displayed.

FIGS. 111 and 112 depict a "My Dashboard" form displaying information about courses satisfying one or more academic requirement in a selected course of study as displayed in a web browser, according to exemplary embodiments of the present disclosure. As shown in FIG. 111, information about courses satisfying a "Physical & Life Science Elective" requirement may be displayed, for example, on a grid of days of the week and times of day. The "My Dashboard" form may include options to selects one or more courses to be displayed on the grid. Additional information such as, for example, color, or icons may be displayed for each course indicating additional information such as, for example, the available enrollment capacity of each course.

FIG. 113 depicts a form for selecting courses related to a student's course of study, according to exemplary embodiments of the present disclosure. As shown in FIG. 113, the form may include, for example, a list of currently scheduled courses for one or more academic terms, an option to add an additional term, a list of required courses and a list of courses associated with the student's course of study. The list of courses may be subdivided by one or more terms. The form may also include a currently scheduled number of credits, target number of credits per term, and a target completion date. The form may be presented, for example, as an application, on a web page or on a mobile device, etc.

Figure 114:
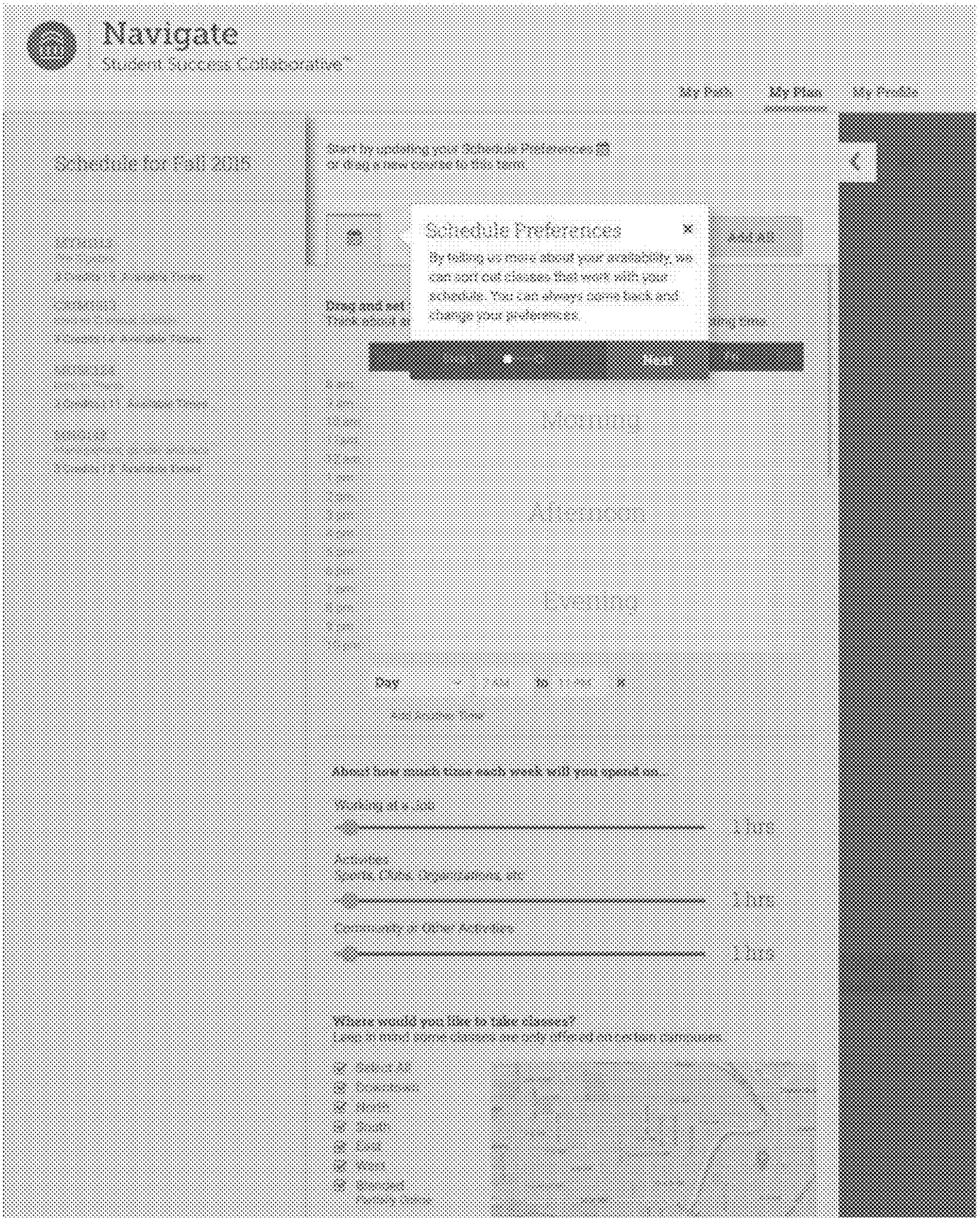

FIG. 114 depicts a form for scheduling courses within an academic term, according to exemplary embodiments of the present disclosure. As shown in FIG. 114, the form may display, possibly as an overlay over other portions of the form, a prompt related to setting course scheduling preferences. The prompt may display text instructions related to setting preferences and an indicator of progress towards completion of a current task.

Figure 115:
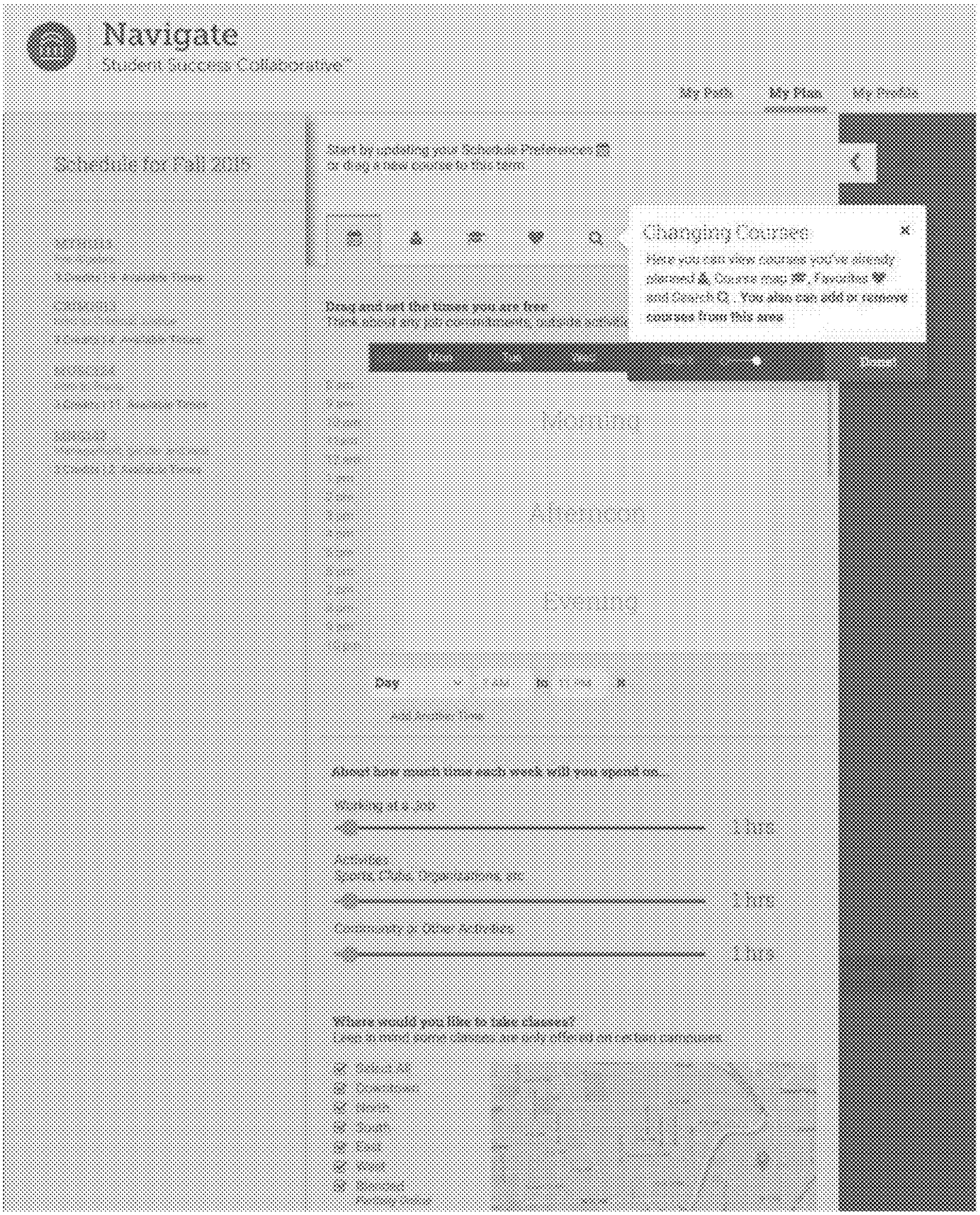

FIG. 115 depicts for scheduling courses within an academic term, according to exemplary embodiments of the present disclosure. As shown in FIG. 115, the form may display, possibly as an overlay over other portions of the form, a prompt related to changing course selections. The prompt may display text instructions related to changing course selections and an indicator of progress towards completion of a current task.

Figure 116:
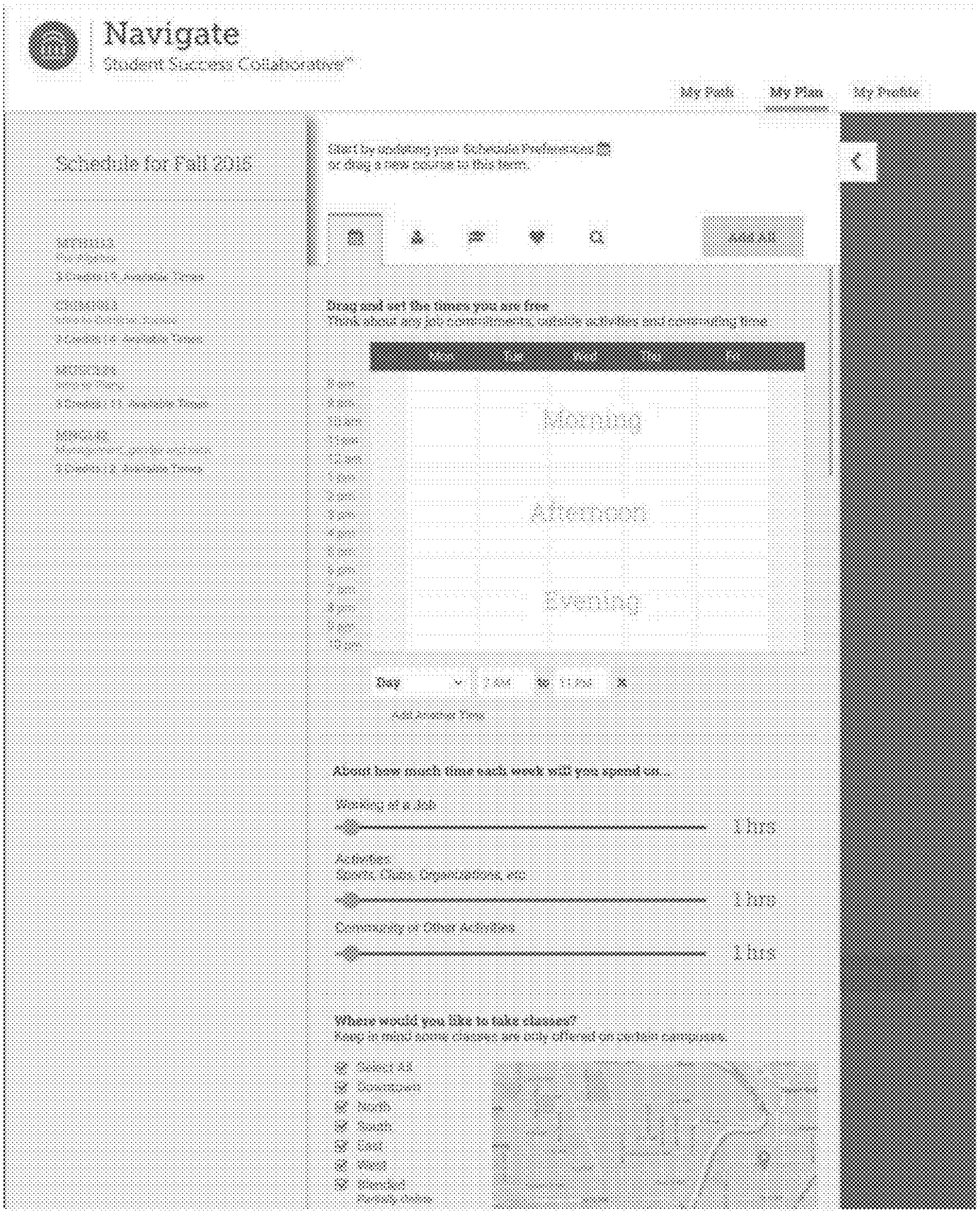

FIG. 116 depicts a form for scheduling courses within an academic term, according to exemplary embodiments of the present disclosure. As shown in FIG. 116, the form may include, for example, a list of currently selected courses, a calendar grid that may display scheduled courses by day and time, and one or more controls for setting course scheduling preferences. The controls for setting course scheduling preferences may include, for example, controls for specifying days and times that the student is free, setting hours per week that the student is engaged in non-academic activities, and a control to select one or more campus locations on which the student may attend classes.

Figure 117:
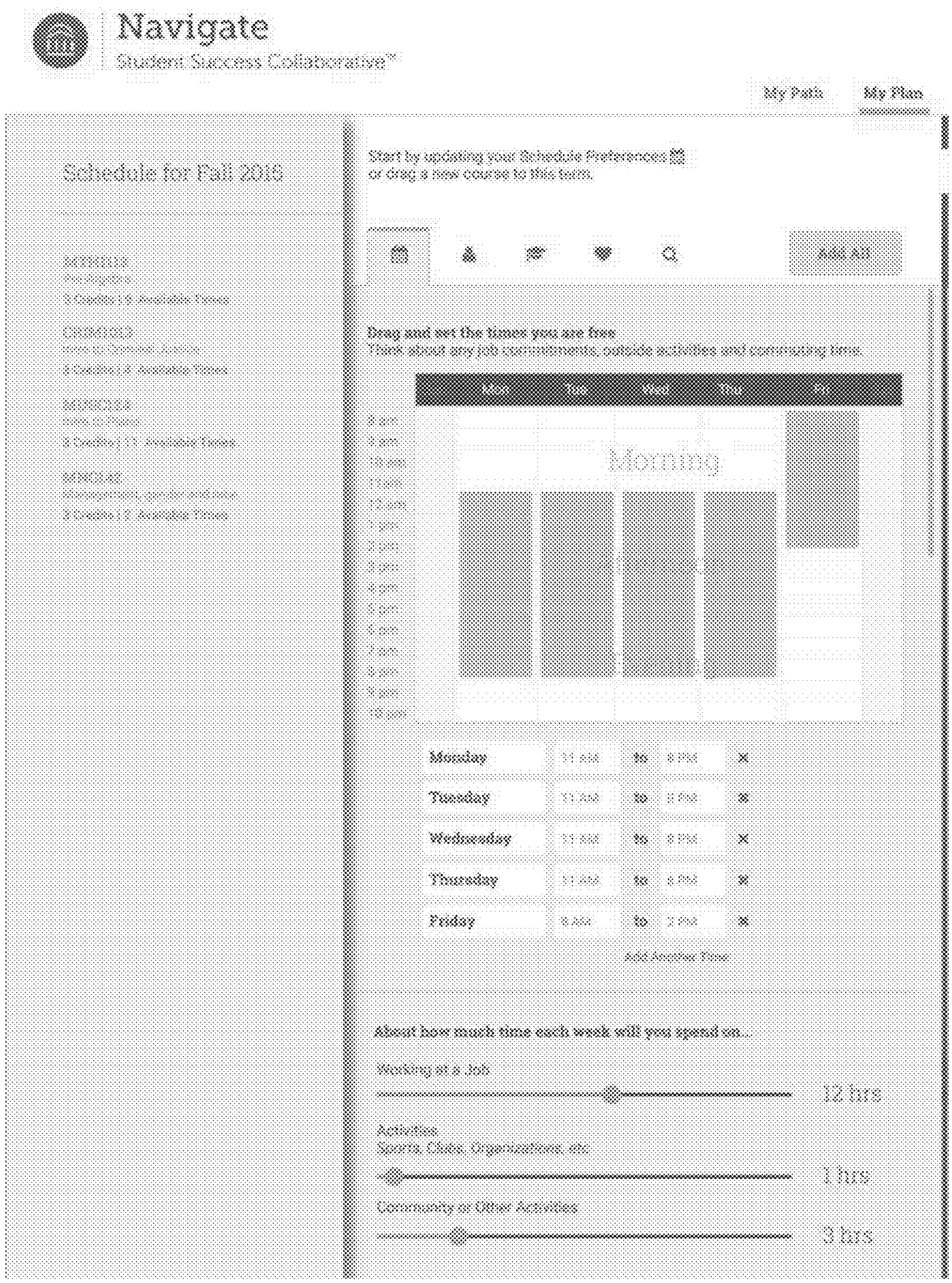

FIG. 117 depicts a form for scheduling courses within an academic term, according to exemplary embodiments of the present disclosure. As shown in FIG. 117, the form may display, on the calendar grid, one or more time periods when the student is free to attend classes. The one or more time periods when the student is free to attend classes may also be displayed as a list.

Figure 118:
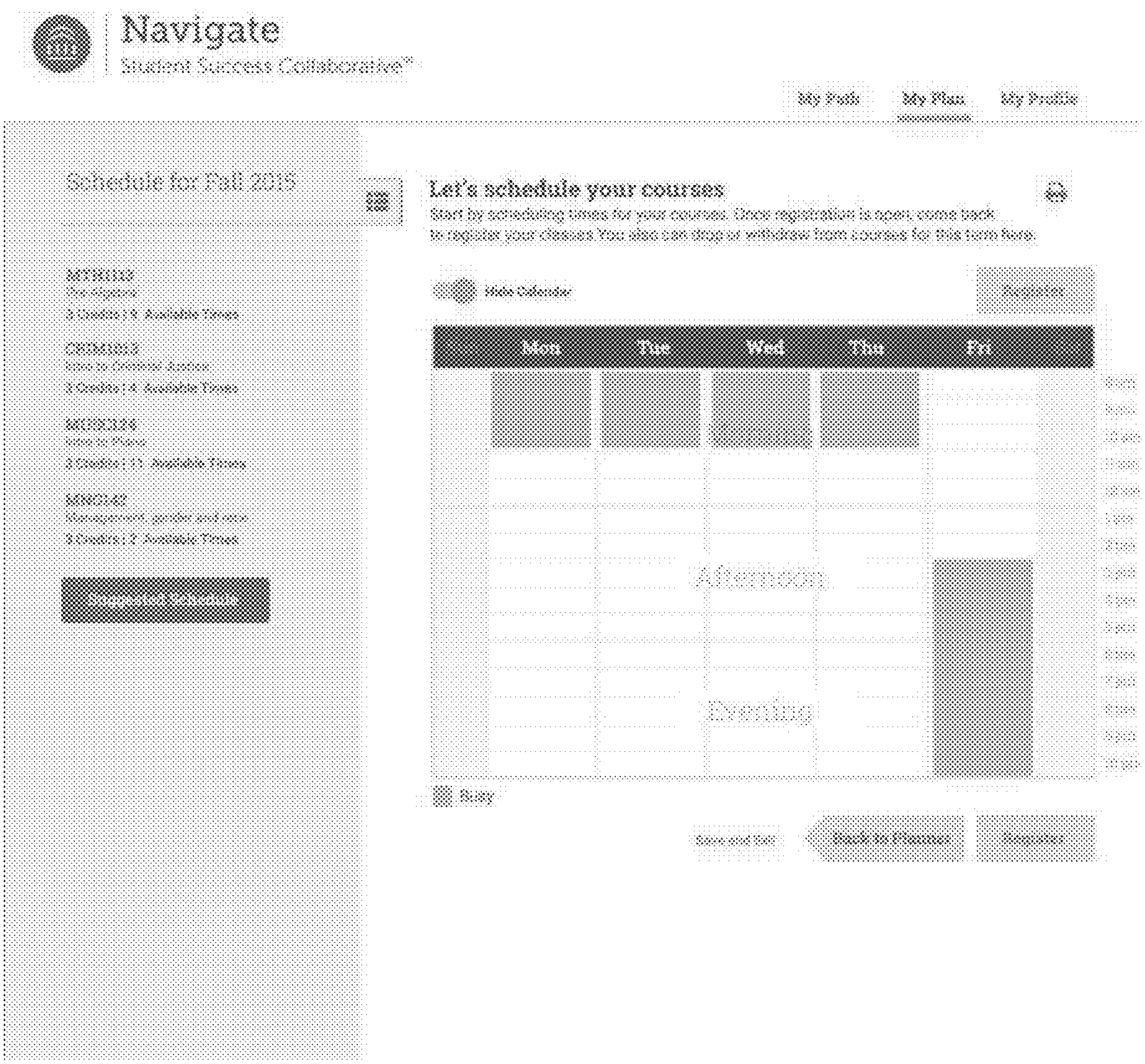

FIG. 118 depicts a form for scheduling courses within an academic term, according to exemplary embodiments of the present disclosure. As shown in FIG. 118, the form may display, on the calendar grid, times when a student is not available to attend classes. The form may also display a list of recommended classes, including a number of credits and a number of available meeting times. The form may include a control to display or hide the calendar grid.

Figure 119:
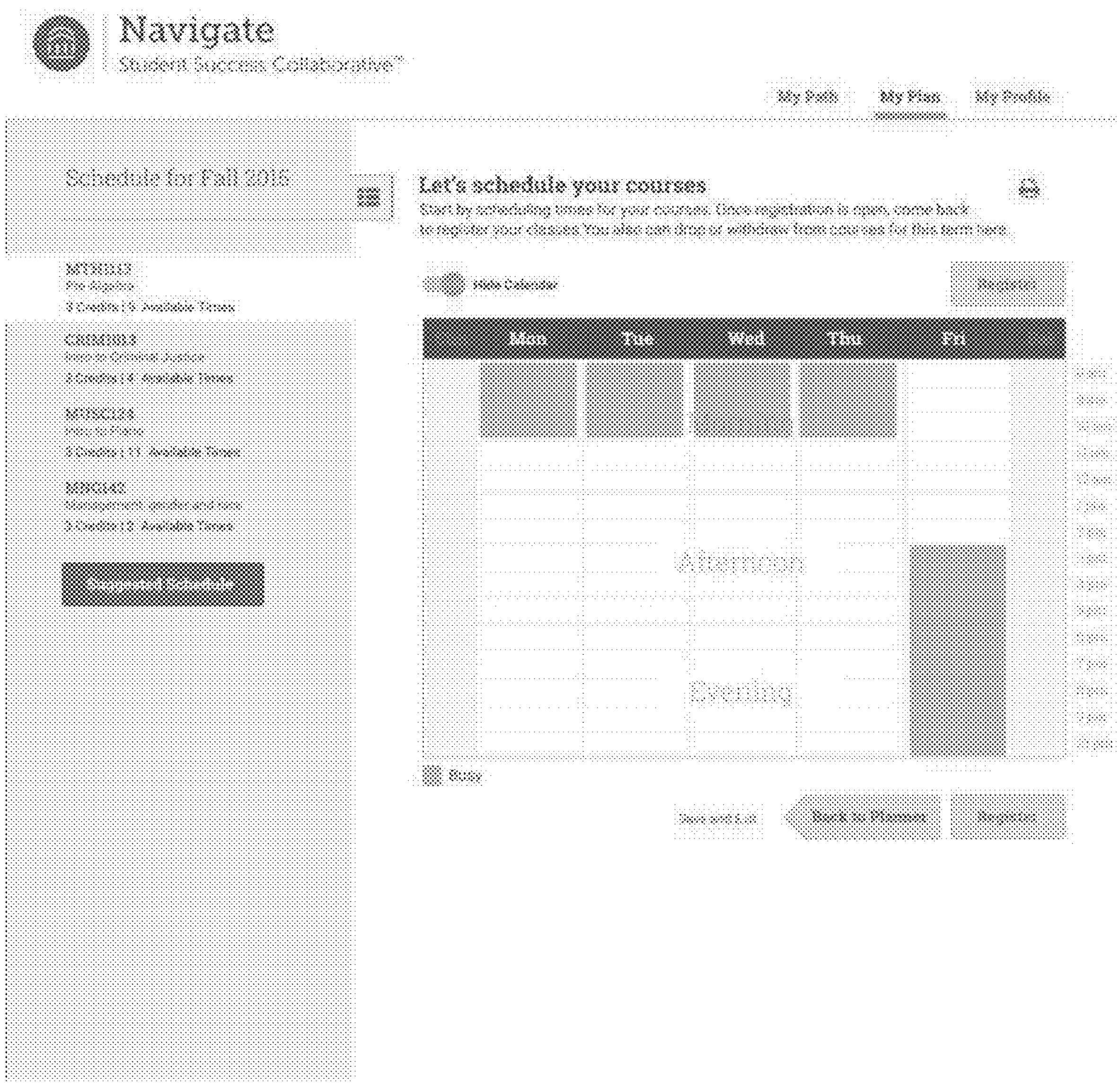

FIG. 119 depicts a form for scheduling courses within an academic term, according to exemplary embodiments of the present disclosure. As shown in FIG. 119, a user may select one of the suggested courses to begin a registration process.

Figure 120:
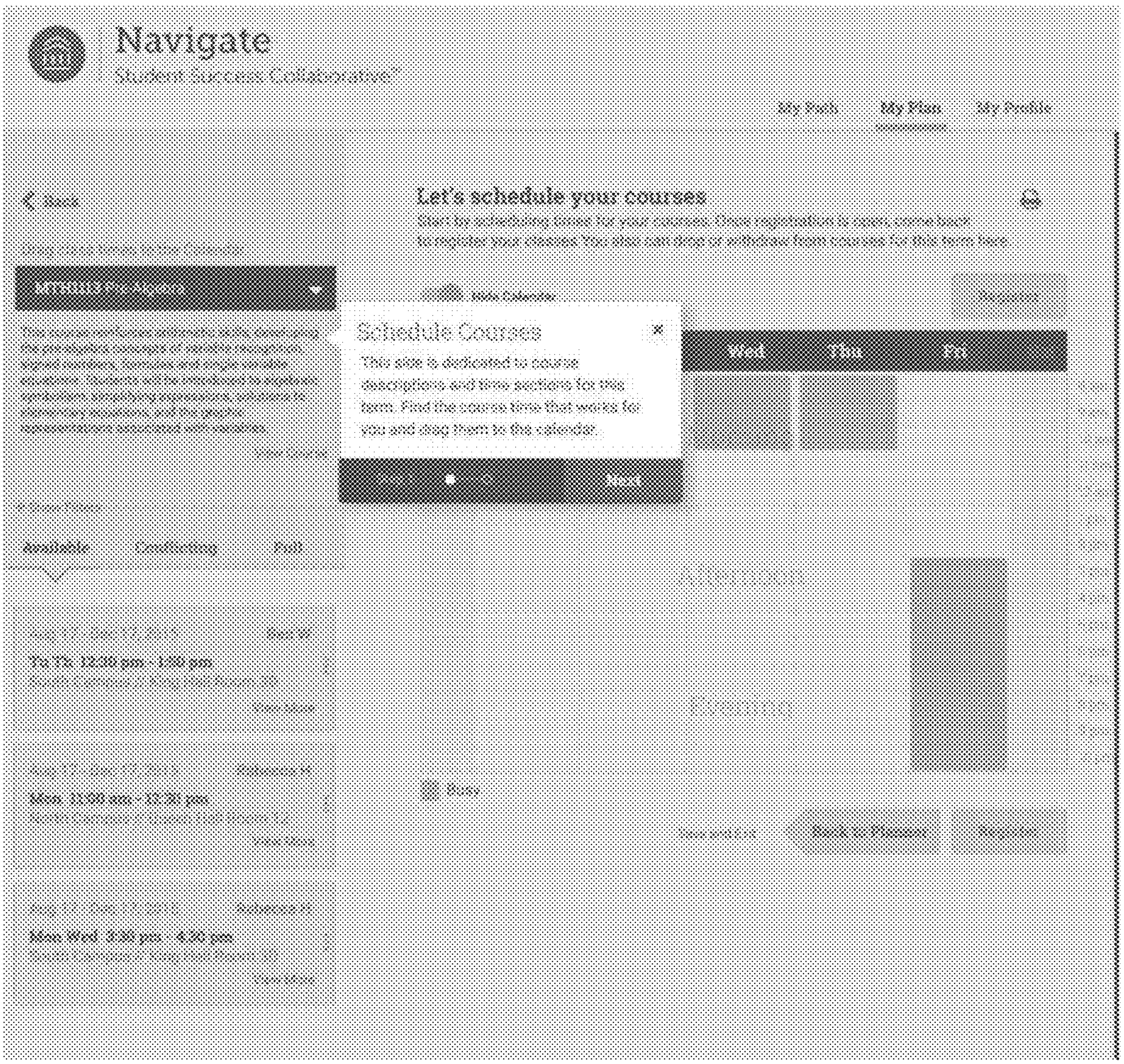

FIG. 120 depicts a form for scheduling courses within an academic term, according to exemplary embodiments of the present disclosure. As shown in FIG. 120, once a user has selected one of the suggested courses to begin a registration process, the form may display, for example, detailed information about the course and information about available meeting times for the course. The form may display, possibly as an overlay over other portions of the form, a prompt related to scheduling courses. The prompt may display text instructions related to scheduling courses and an indicator of progress towards completion of a current task.

Figure 121:
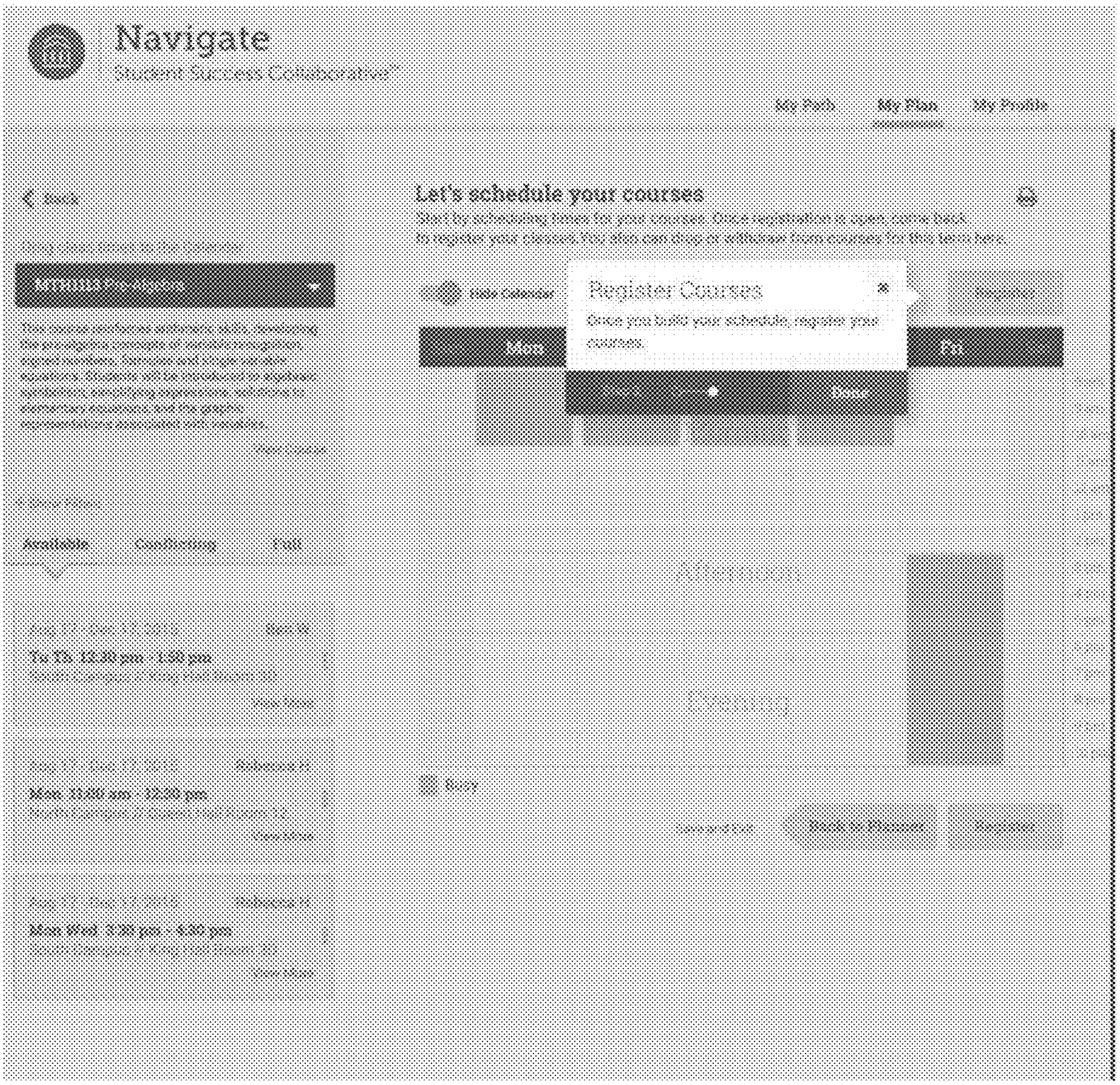

FIG. 121 depicts a form for scheduling courses within an academic term, according to exemplary embodiments of the present disclosure. As shown in FIG. 121, the form may display, possibly as an overlay over other portions of the form, a prompt related to registering courses. The prompt may display text instructions related to registering courses and an indicator of progress towards completion of a current task.

Figure 122:
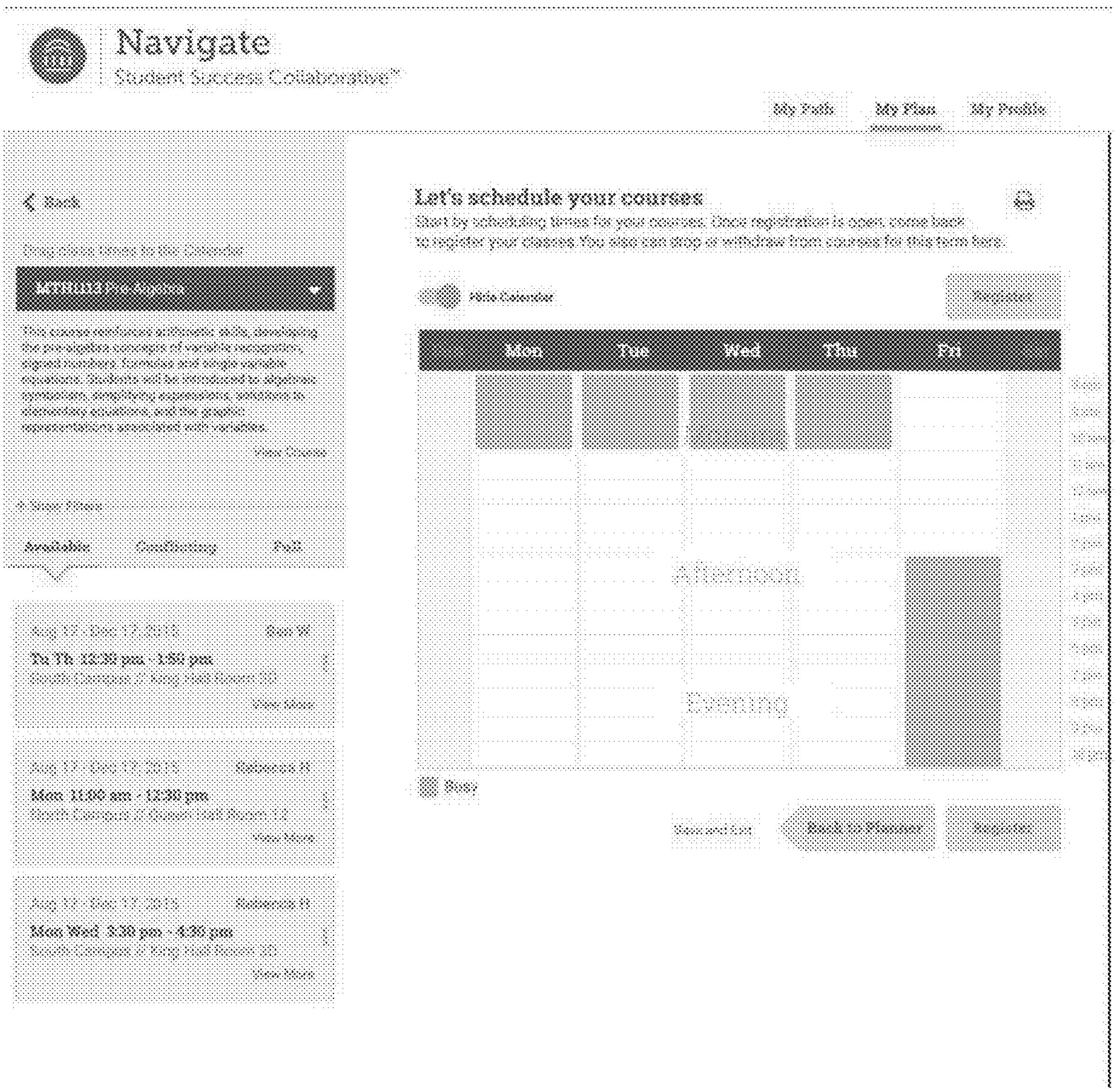

FIG. 122 depicts a form for scheduling courses within an academic term, according to exemplary embodiments of the present disclosure. As shown in FIG. 122, once a user has selected one of the suggested courses to begin a registration process, the form may display, for example, detailed information about the course and information about available meeting times for the course.

Figure 123:
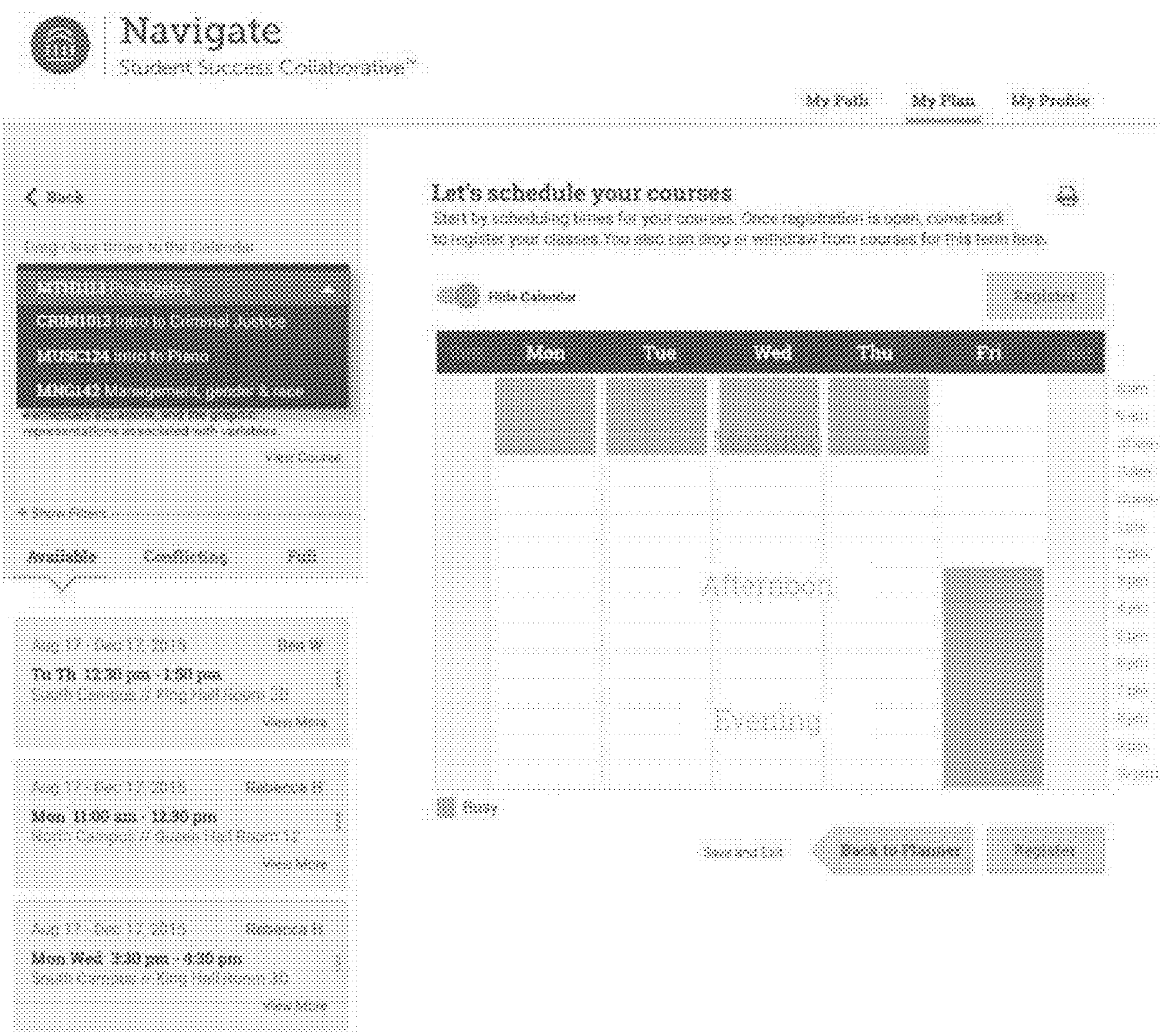

FIG. 123 depicts a form for scheduling courses within an academic term, according to exemplary embodiments of the present disclosure. As shown in FIG. 123, the form may display a list of suggested courses as an overlay over information for a particular course.

Figure 124:
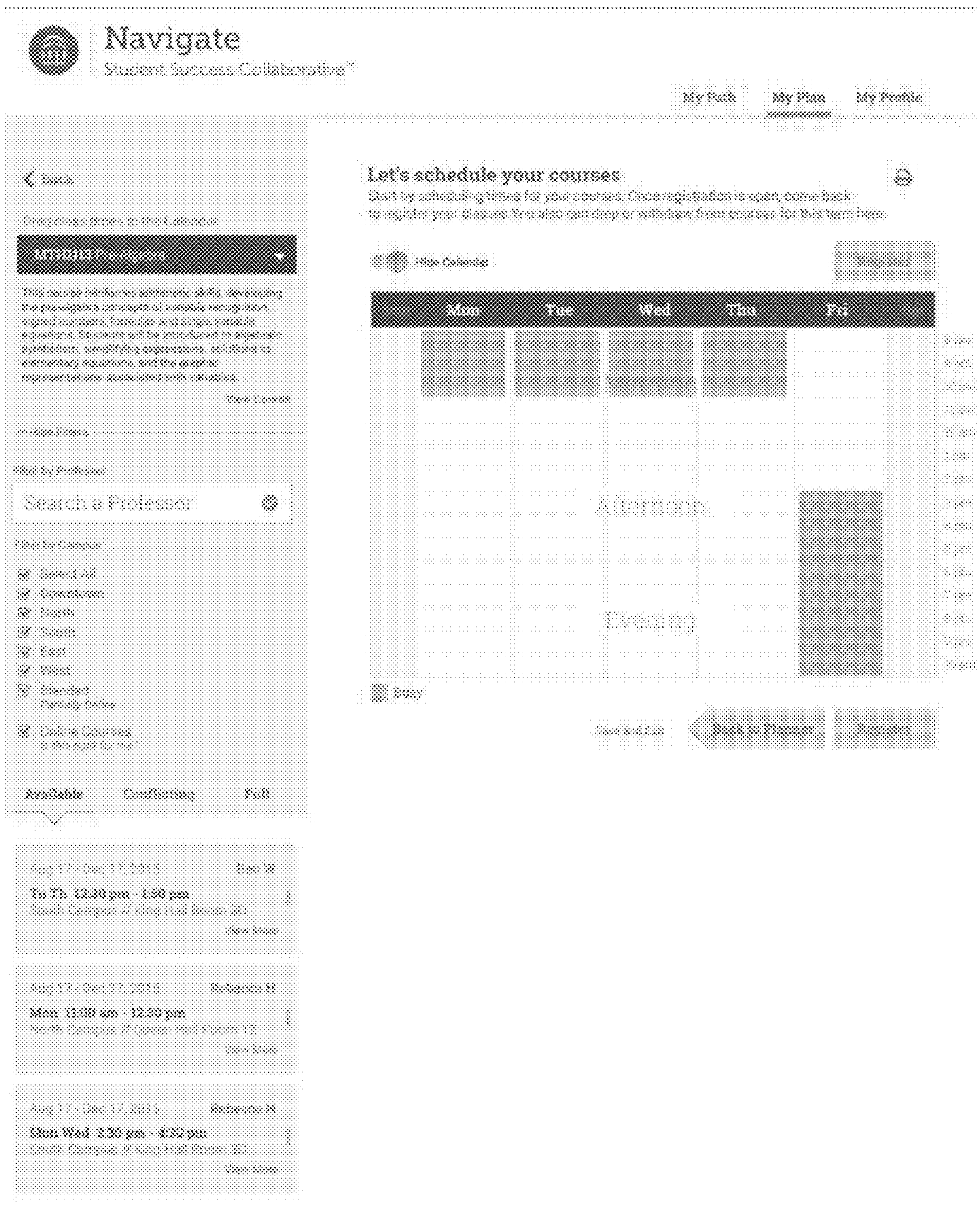

FIG. 124 depicts a form for scheduling courses within an academic term, according to exemplary embodiments of the present disclosure. As shown in FIG. 124, once a user has selected one of the suggested courses to begin a registration process, the form may display options for filtering the available courses, for example, by searching for information related to faculty teaching the course and selecting one or more campus locations.

Figure 125:
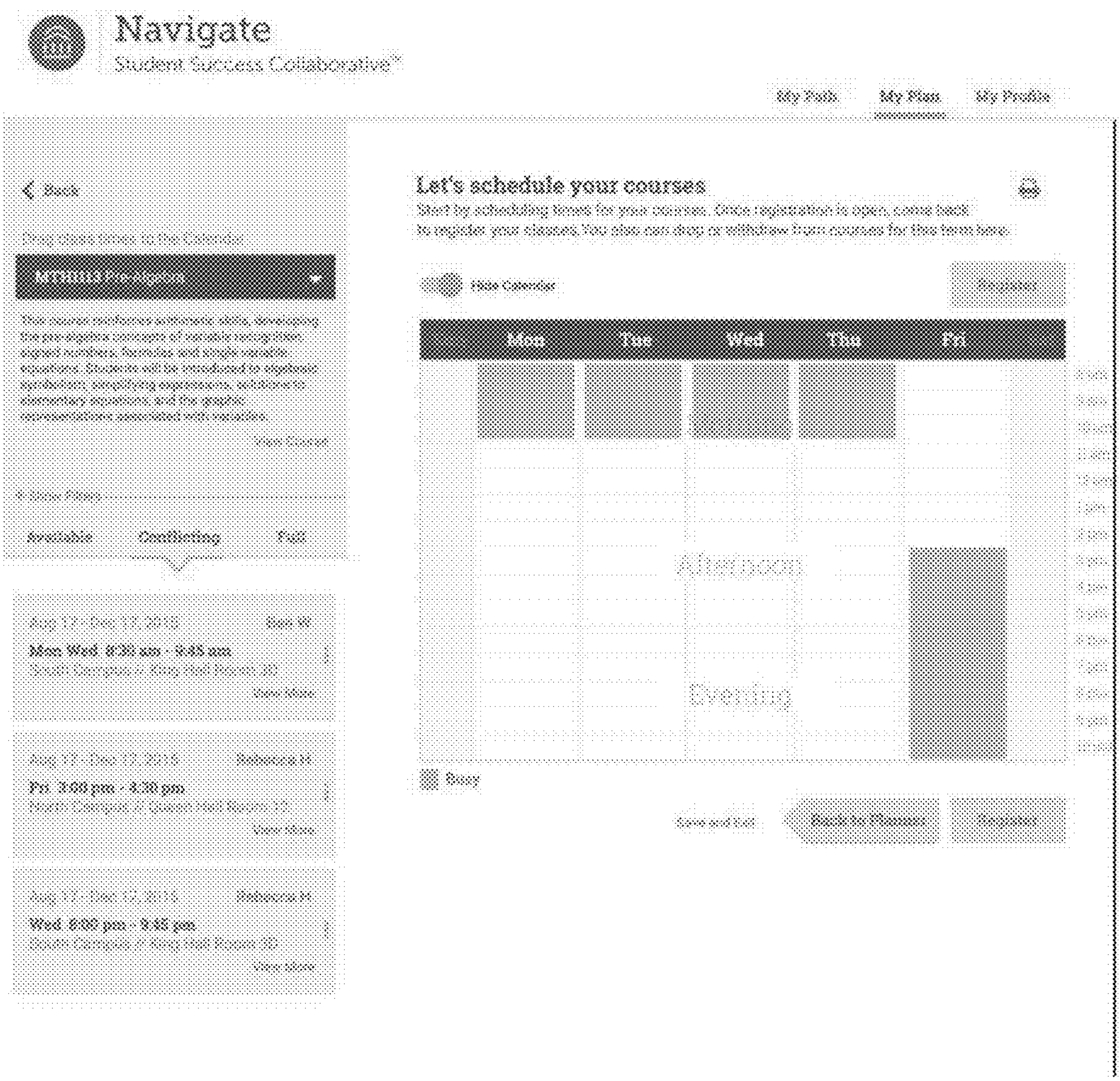

FIG. 125 depicts a form for scheduling courses within an academic term, according to exemplary embodiments of the present disclosure. As shown in FIG. 125, once a user has selected one of the suggested courses to begin a registration process, the form may display information related to courses in conflict with the selected course.

Figure 126:
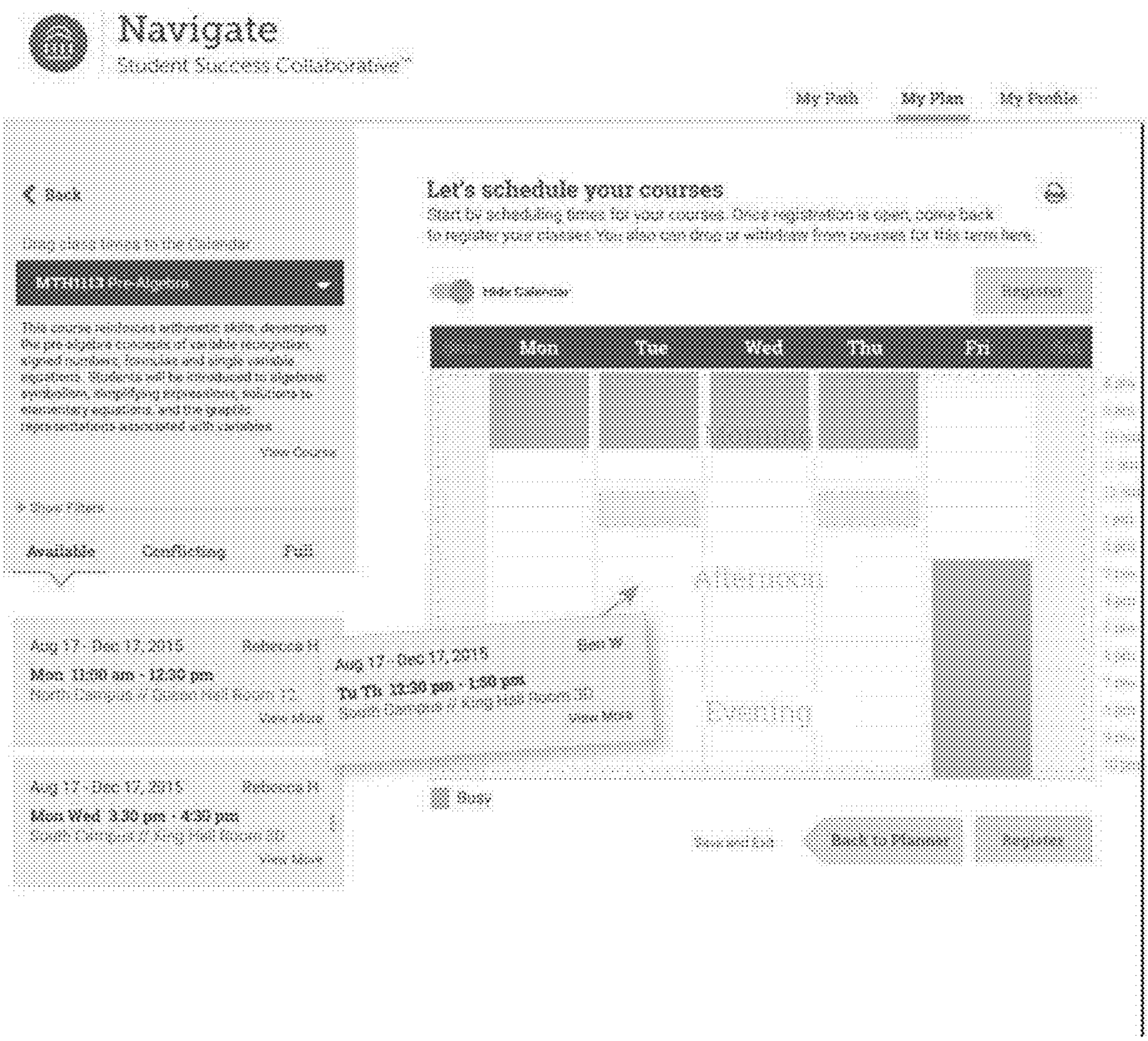

FIG. 126 depicts a form for scheduling courses within an academic term, according to exemplary embodiments of the present disclosure. As shown in FIG. 126, once a user has selected one of the suggested courses to begin a registration process, the form may display, for example, detailed information about the course and information about available meeting times for the course. The user may select one of the listed course meeting times and drag it to the calendar grid to continue the registration process.

Figure 127:
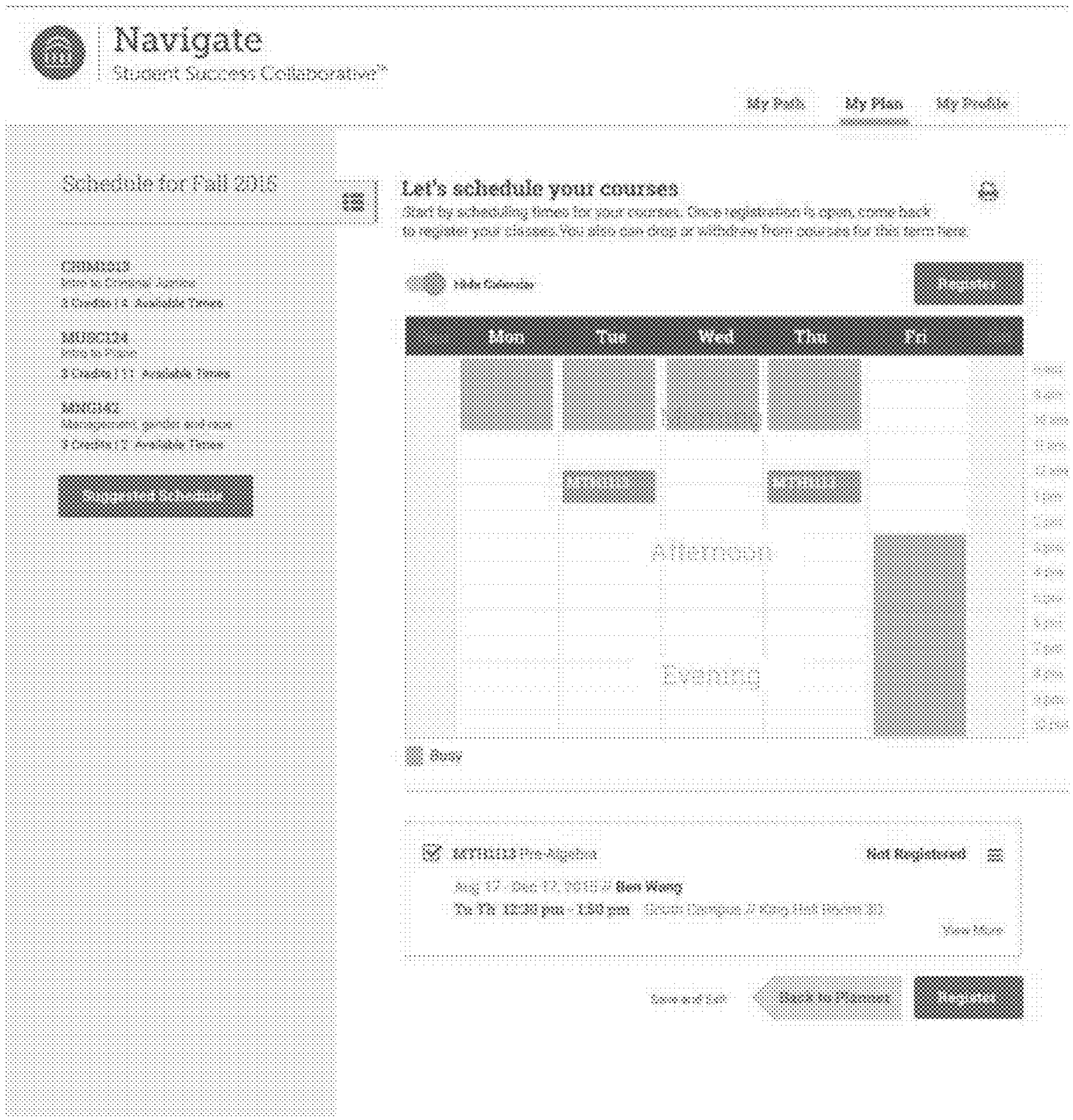

FIG. 127 depicts a form for scheduling courses within an academic term, according to exemplary embodiments of the present disclosure. As shown in FIG. 127, once a user has dragged one of the listed course meeting times to the calendar grid to continue the registration process, the form may display, for example, the course on the calendar grid at the meeting days and times and may add the course to a list of selected courses.

FIG. 128 depicts a form for initiating a process of academic planning, according to exemplary embodiments of the present disclosure. As shown in FIG. 128, the form may include information describing the academic planning process, a control to select a beginning academic term and tabs for displaying information about one or more academic terms or about one or more courses. The form may be personalized to a student beginning a course of study.

FIG. 129 depicts a form for initiating a process of academic planning, according to exemplary embodiments of the present disclosure. As shown in FIG. 129, a user may select a beginning academic term in order to initiate an academic planning process.

Figure 130:
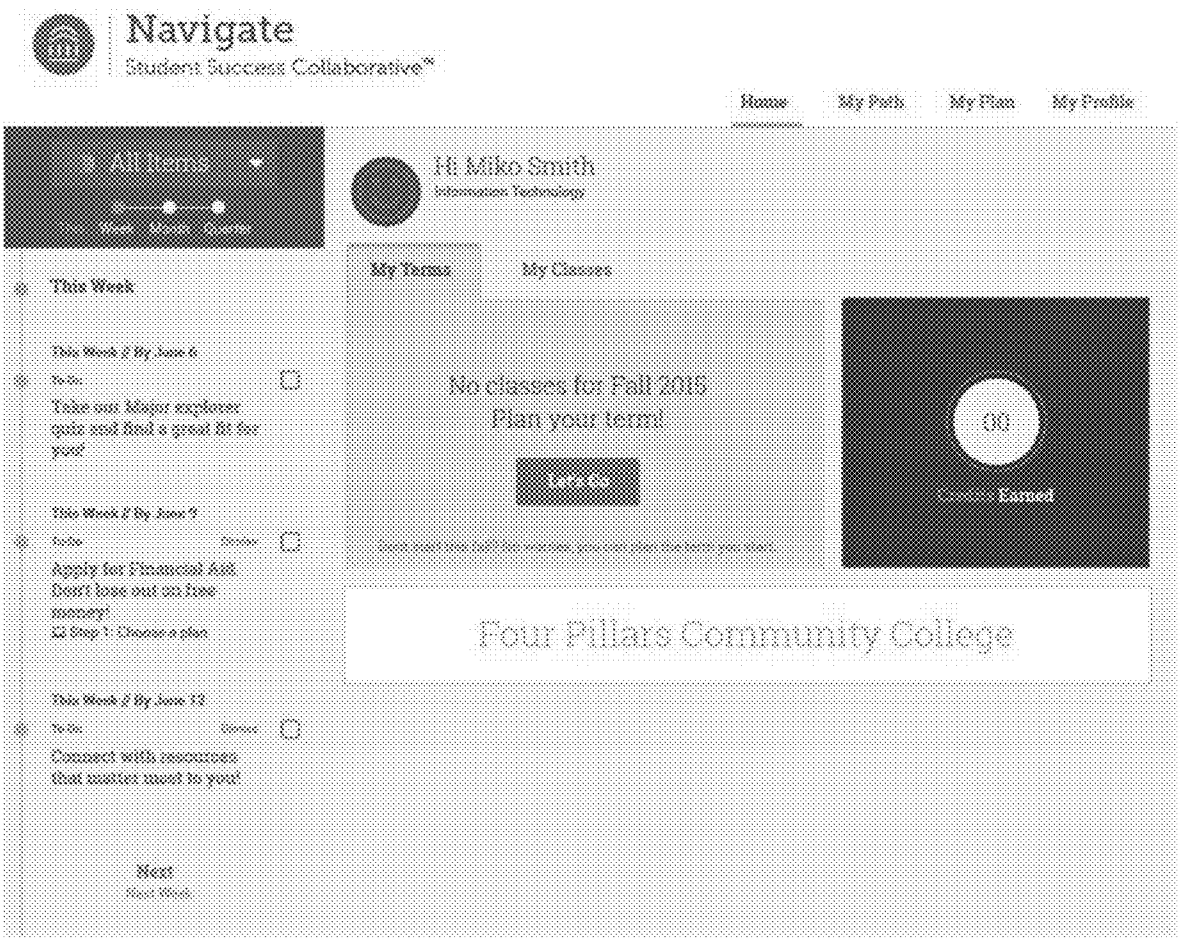

FIG. 130 depicts a form for managing a process of academic planning, according to exemplary embodiments of the present disclosure. As shown in FIG. 130, once a user has initiated an academic planning process, the form may display a list of tasks to be completed. The displayed tasks may be filtered, for example, by selecting tasks to be completed within a week, within a month or within a quarter, etc. The form may also include a control to display additional tasks to be completed within the next week, month or quarter, etc. For example, FIG. 130 shows tasks to be completed within one week.

Figure 131:
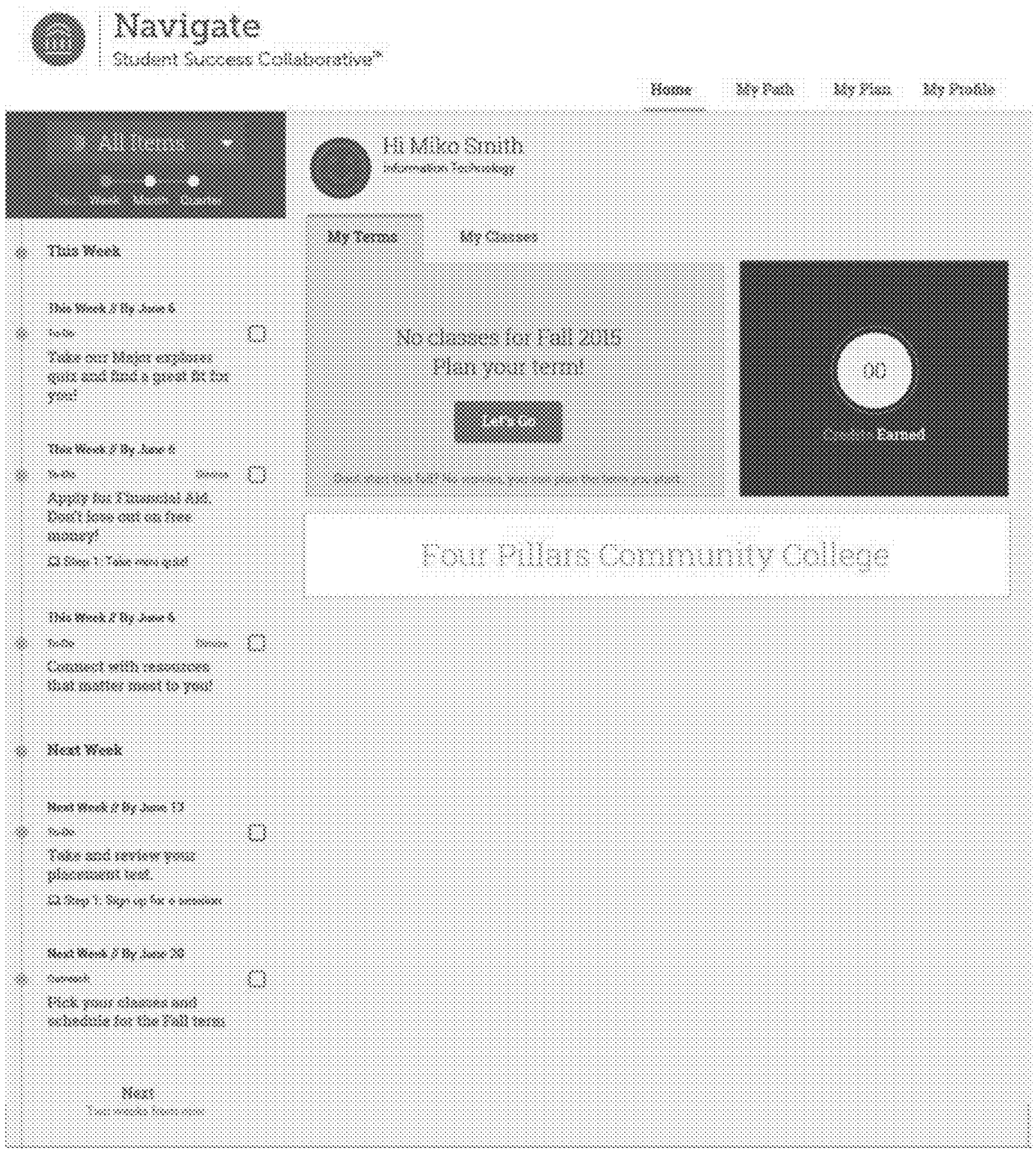

FIG. 131 depicts a form for managing a process of academic planning, according to exemplary embodiments of the present disclosure. As shown in FIG. 131, the form may display a list of tasks to be completed within two weeks, within two months or within two quarters, etc. For example, FIG. 131 shows tasks to be completed within two weeks.

Figure 132:
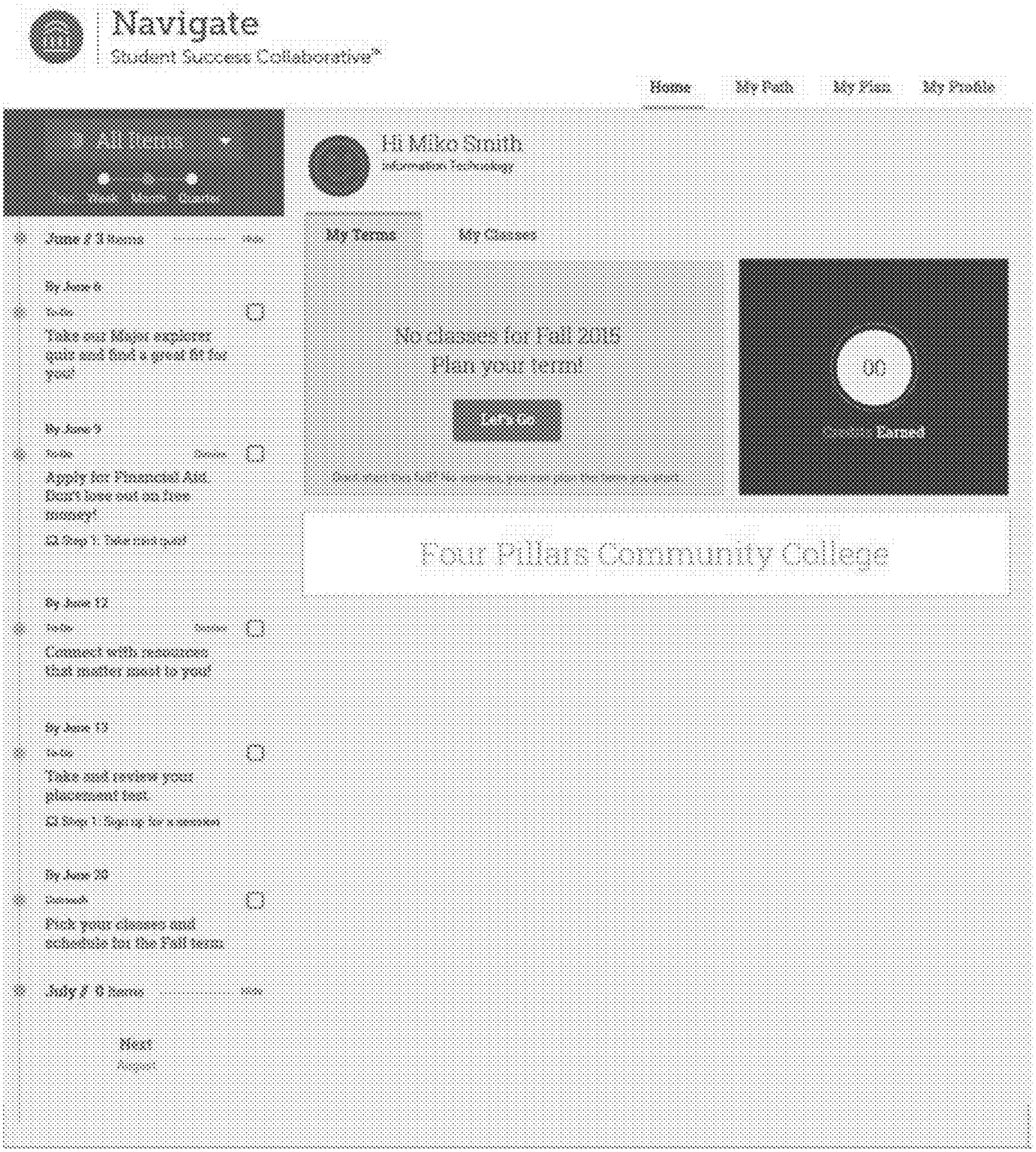

FIG. 132 depicts a form for managing a process of academic planning, according to exemplary embodiments of the present disclosure. As shown in FIG. 131, the form may display a list of tasks to be completed within one month.

Figure 133A:
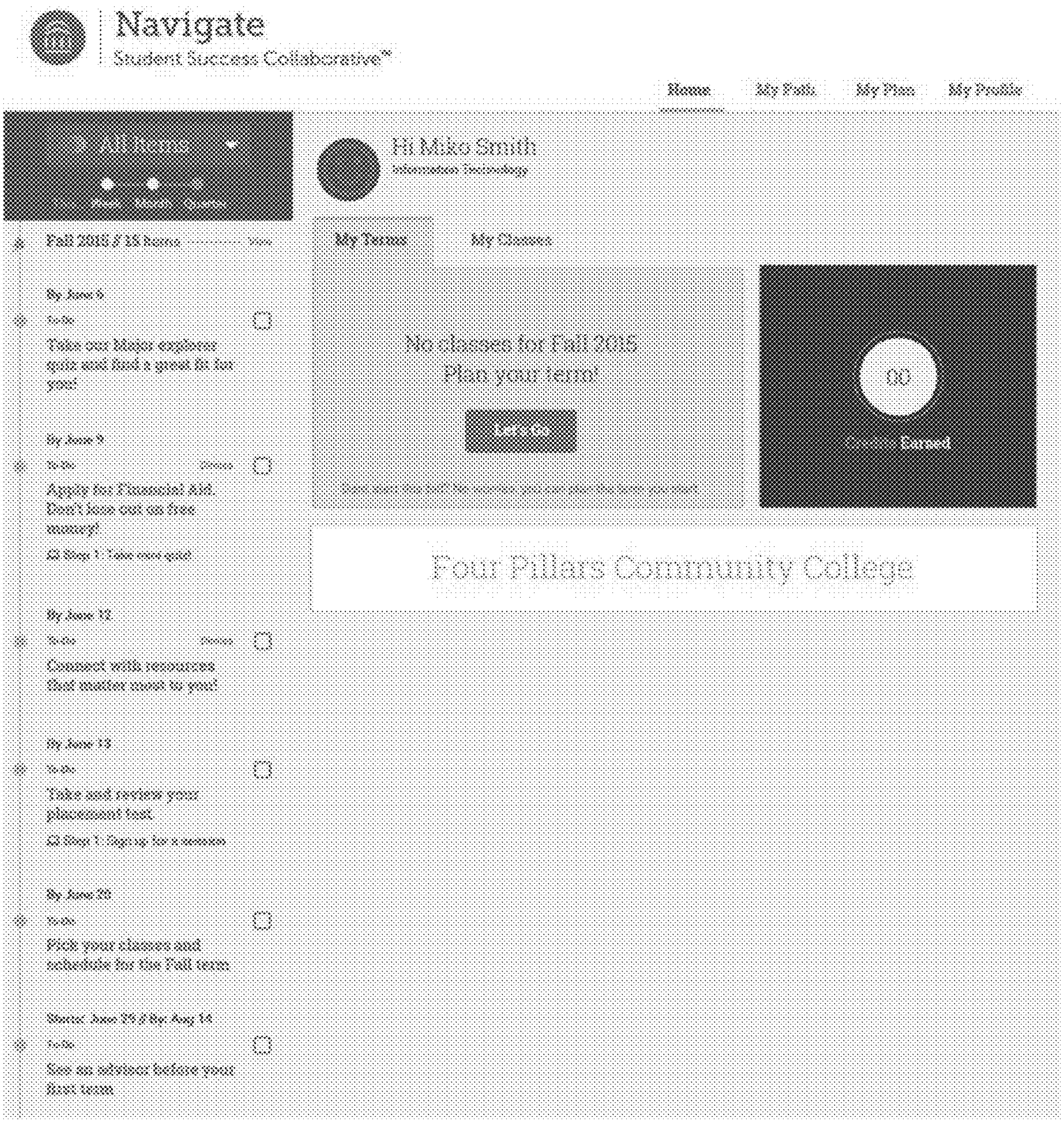
Figure 133B:

FIGS. 133A-133B depict a form for managing a process of academic planning, according to exemplary embodiments of the present disclosure. As shown in FIGS. 133A-133B, the form may display a list of tasks to be completed within one quarter.

Figure 134:
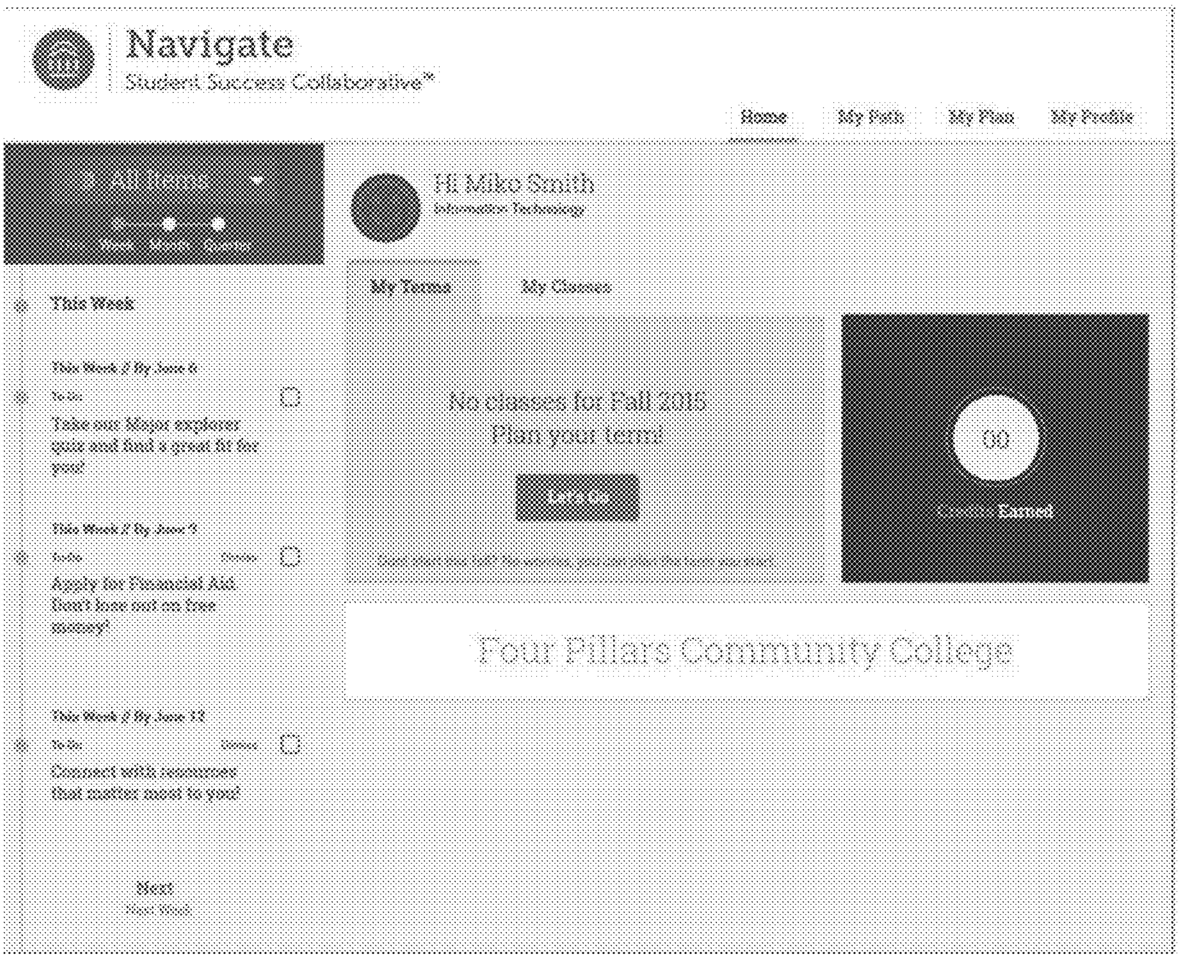

FIG. 134 depicts a form for managing a process of academic planning, according to exemplary embodiments of the present disclosure. As shown in FIG. 130, the form may display a list of tasks to be completed. For example, FIG. 134 shows tasks to be completed within one week.

Figure 135:
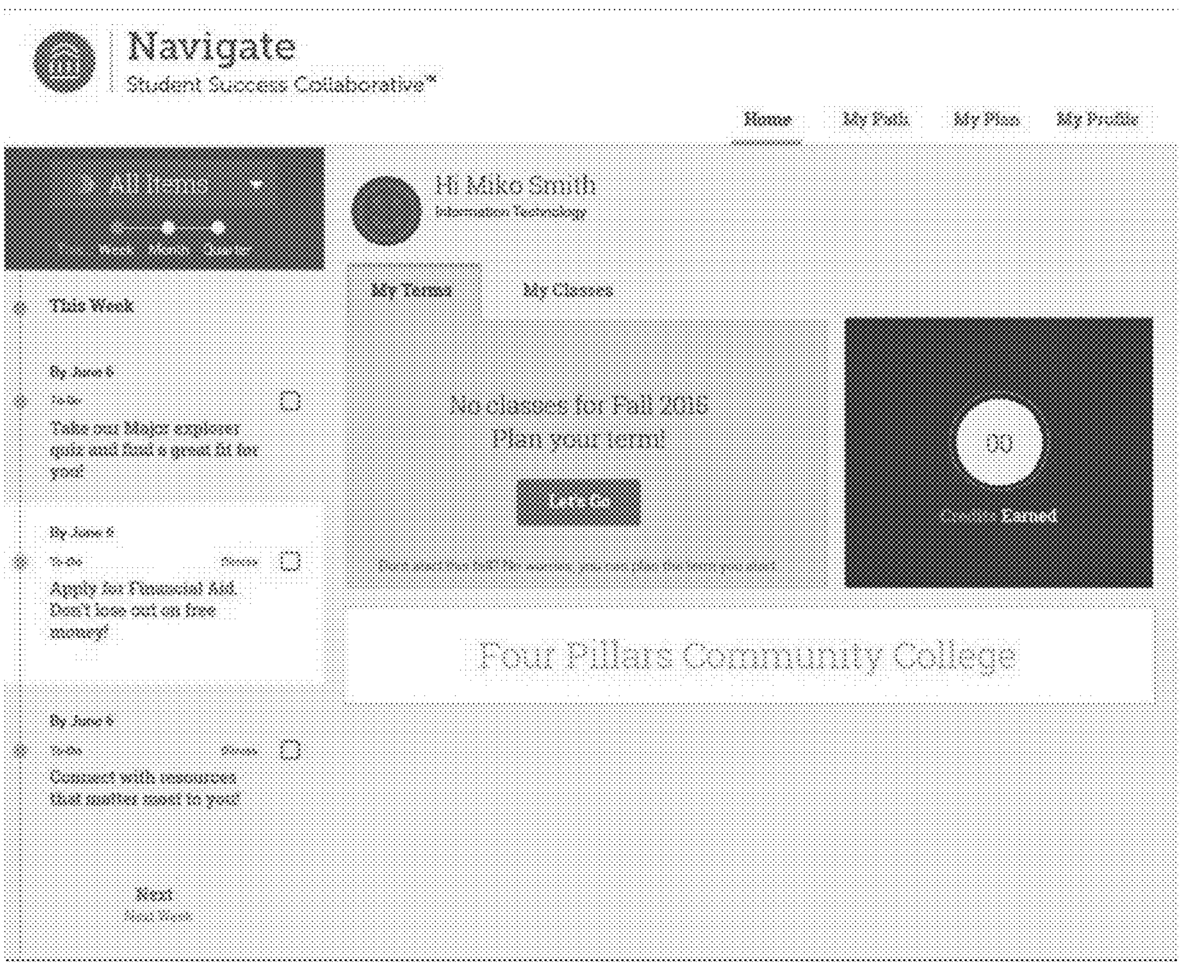

FIG. 135 depicts a form for managing a process of academic planning, according to exemplary embodiments of the present disclosure. As shown in FIG. 135, the user may select one of the tasks to be completed. As shown in FIG. 135, when a user selects a task the form may change how the task is presented, such as, for example, by changing the background color of the displayed task.

Figure 136:
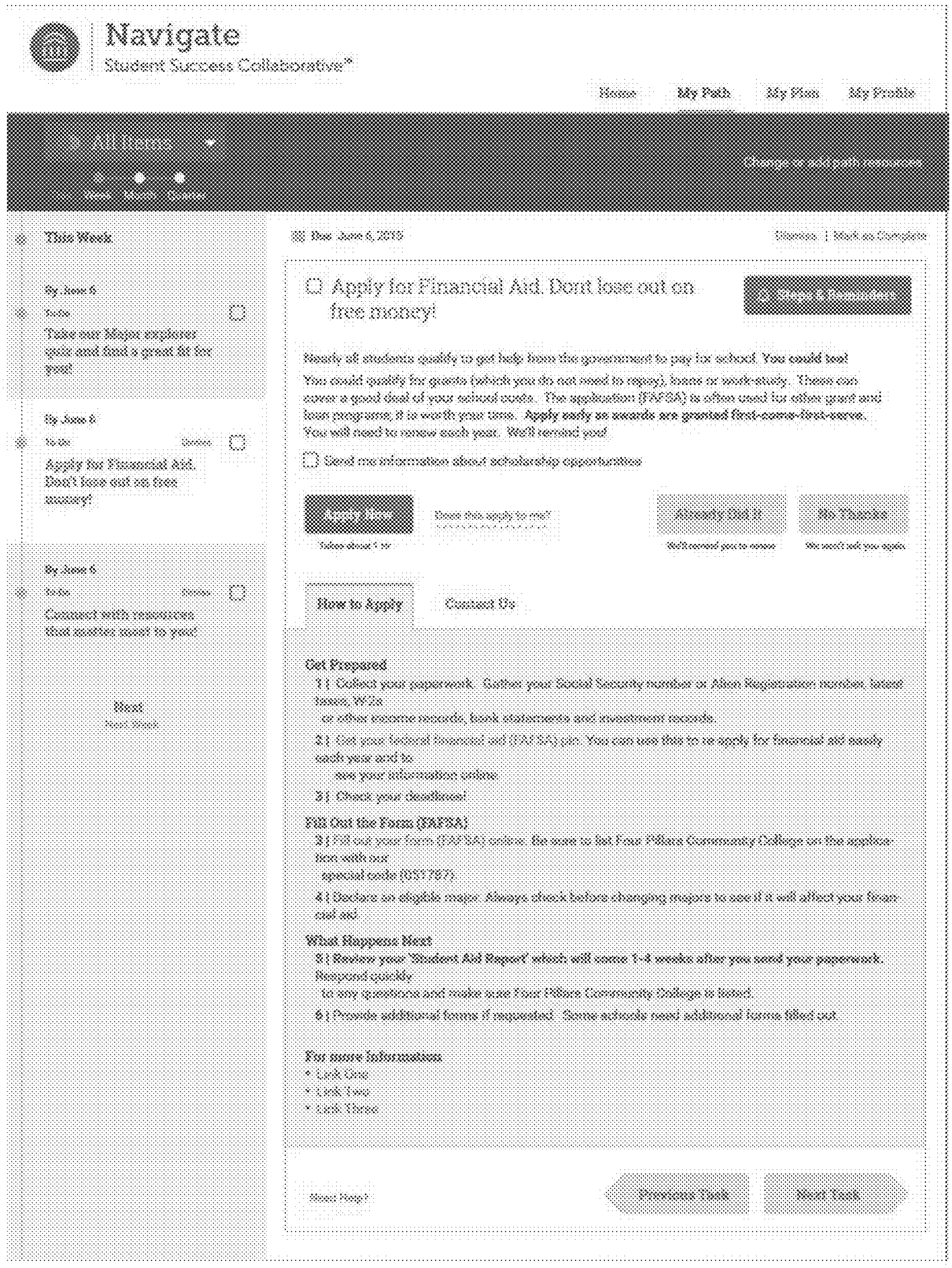

FIG. 136 depicts a form for managing a process of academic planning, according to exemplary embodiments of the present disclosure. As shown in FIG. 136, when a user has selected one of the tasks to be completed, the form may display information related to the selected task. For example, the form may display detailed information describing the task, controls to indicate that the task has been completed or is to be skipped, and a list of steps to be taken to complete the task. The form may also include a control to display a list of steps and reminders for completing the task.

Figure 137:
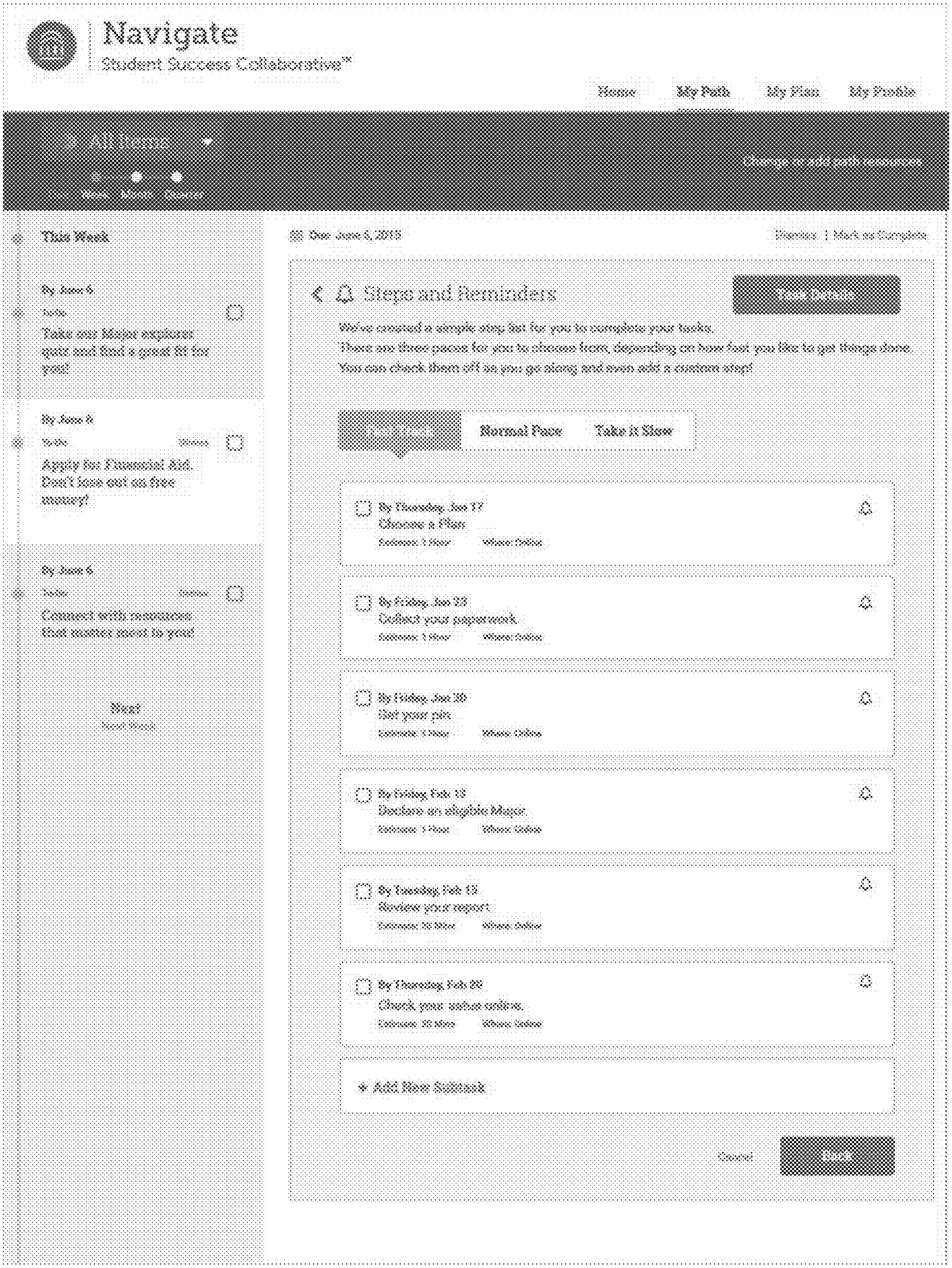

FIG. 137 depicts a form for managing a process of academic planning, according to exemplary embodiments of the present disclosure. As shown in FIG. 137, the form may display a list of steps and reminders for completing a selected task. The form may display the list of steps as a schedule and may allow selection of different paces for completing the steps, such as, for example, “Fast Track,” “Normal Pace” or “Take it Slow.” The form may include controls to indicate that step has been completed and may provide estimated time to complete each step.

Figure 138:
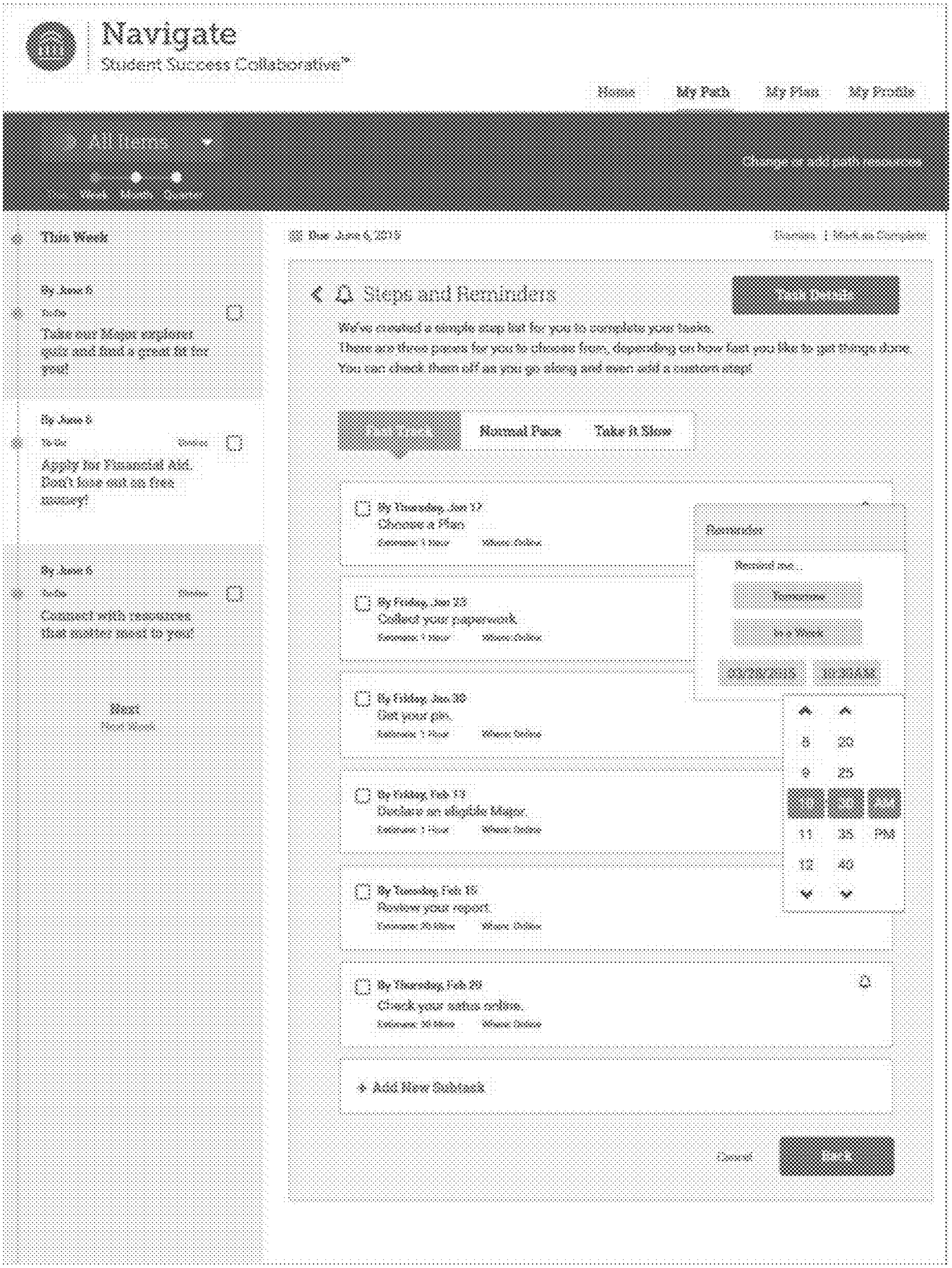

FIG. 138 depicts a form for managing a process of academic planning, according to exemplary embodiments of the present disclosure. As shown in FIG. 138, a user may select one step in a list of steps for completing a selected task to set a date and time for a reminder related to the selected step.

Figure 139:
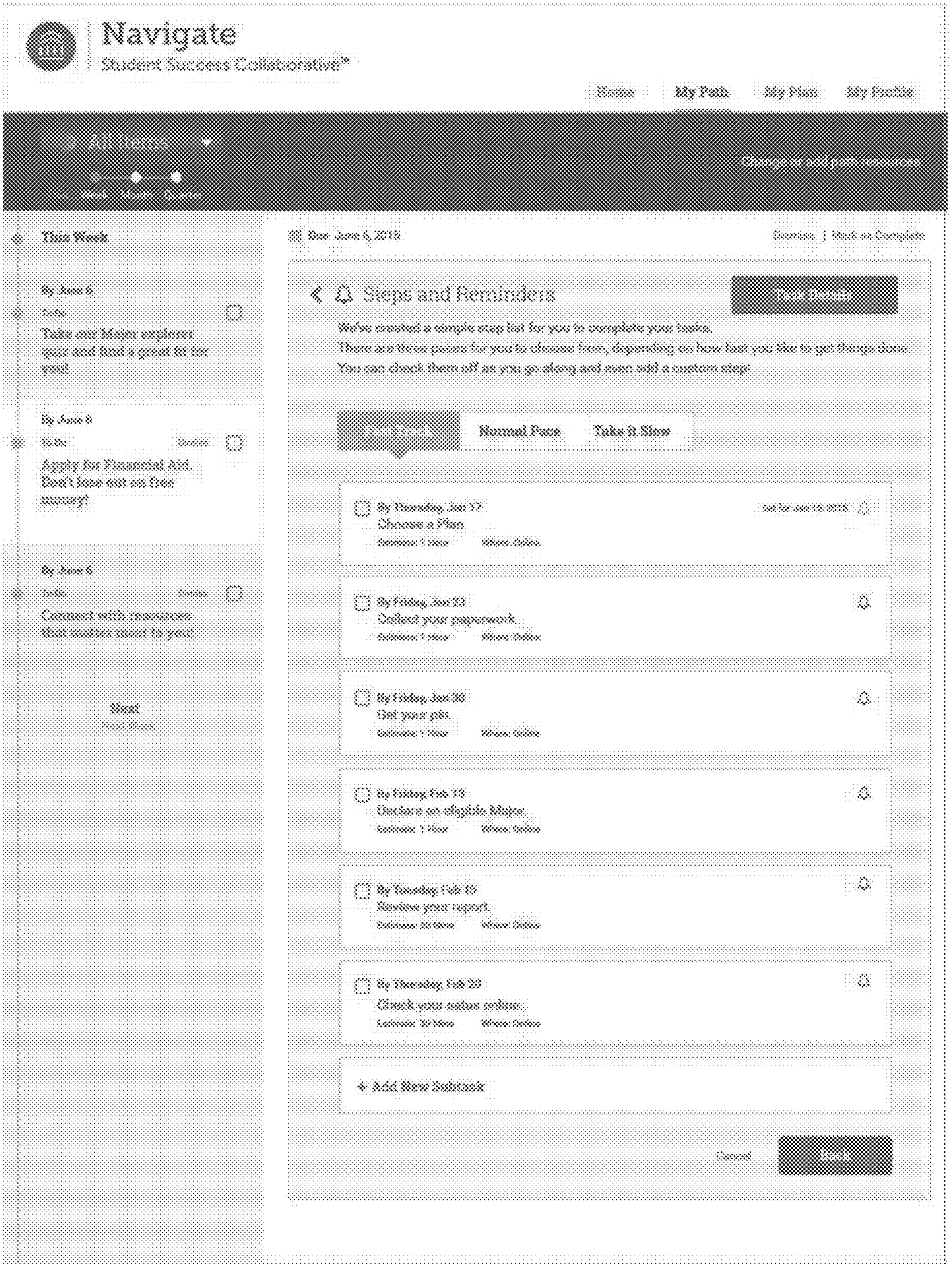

FIG. 139 depicts a form for managing a process of academic planning, according to exemplary embodiments of the present disclosure. As shown in FIG. 139, if a date and time for a reminder related to the selected step has been set, information indicating the reminder may be displayed with the selected step.

Figure 140:
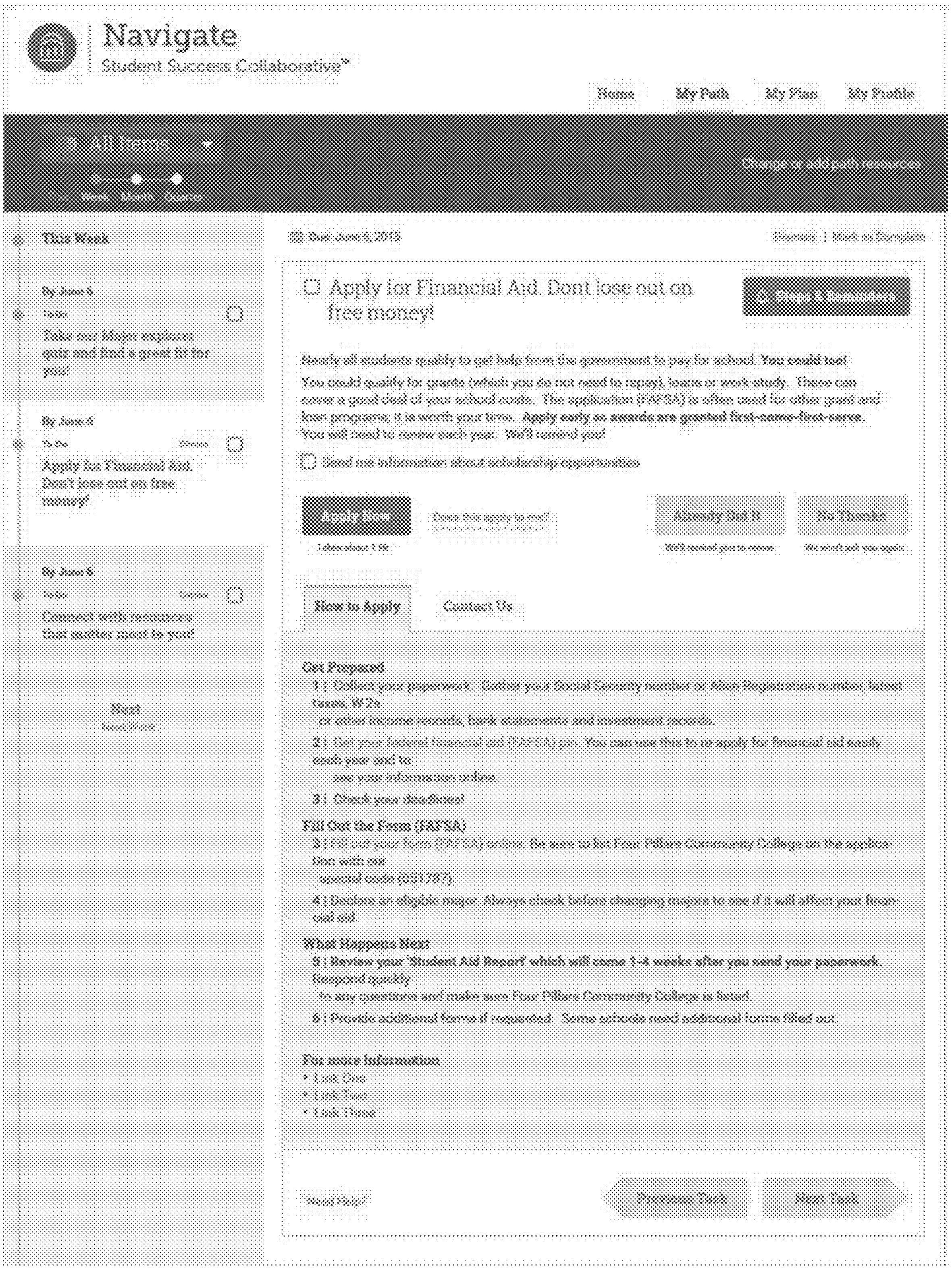

FIG. 140 depicts a form for managing a process of academic planning, according to exemplary embodiments of the present disclosure. As shown in FIG. 140, when a user has selected one of the tasks to be completed, the form may display information related to the selected task. For example, the form may display detailed information describing the task, controls to indicate that the task has been completed or is to be skipped, and a list of steps to be taken to complete the task. The form may also include a control to display a list of steps and reminders for completing the task.

For example, FIG. 140 shows information related to a task of applying for financial aid.

Figure 141:
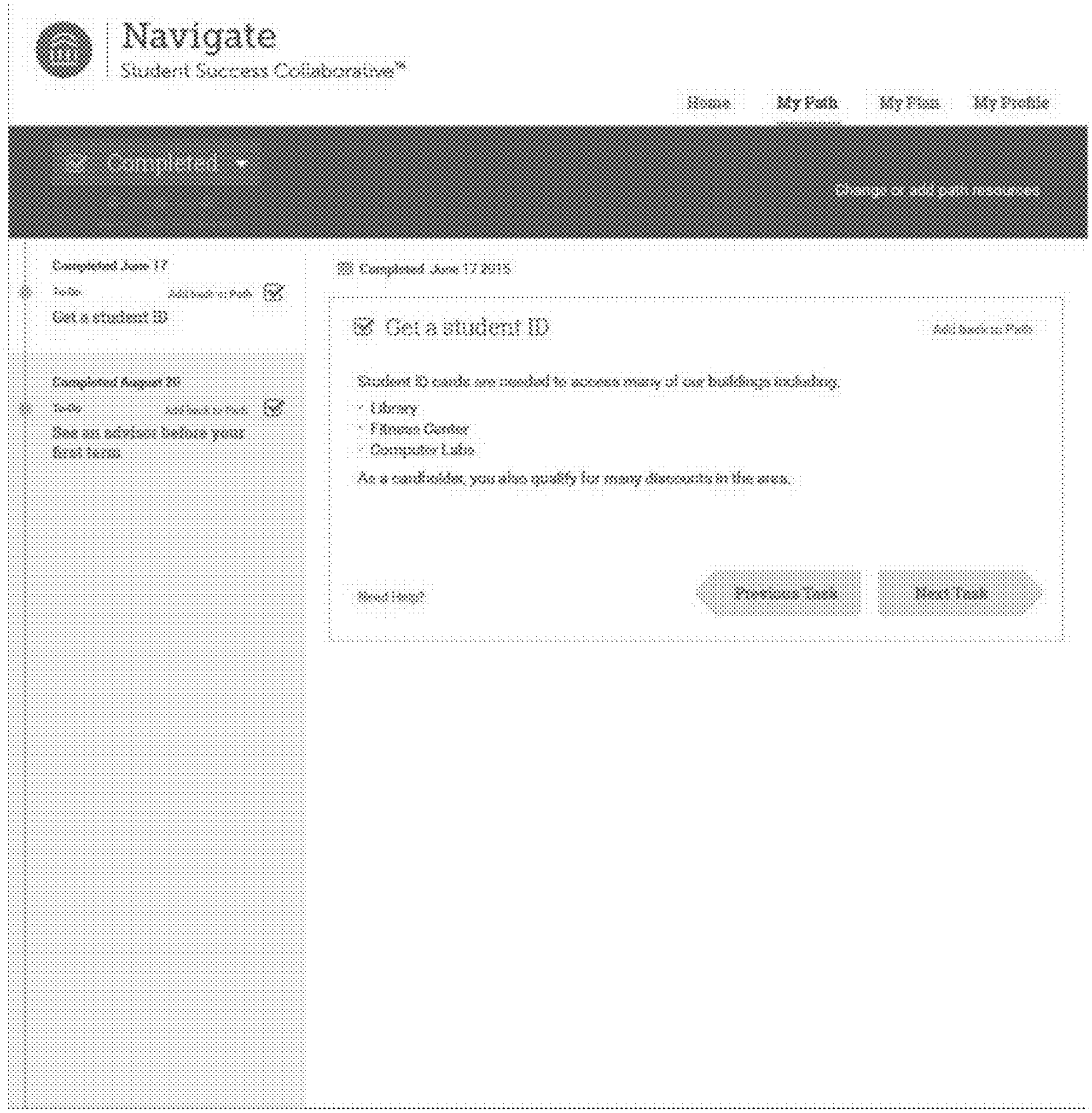

FIG. 141 depicts a form for managing a process of academic planning, according to exemplary embodiments of the present disclosure. As shown in FIG. 141, the form may include items such as check boxes or the like to indicate that a task has been completed. For example, FIG. 141 indicates that the tasks "Get a student ID" and "See an advisor before your first term" have been completed. The form may also display detailed information for a selected task and navigation buttons to go to a next task or a previous task.

Figure 142:
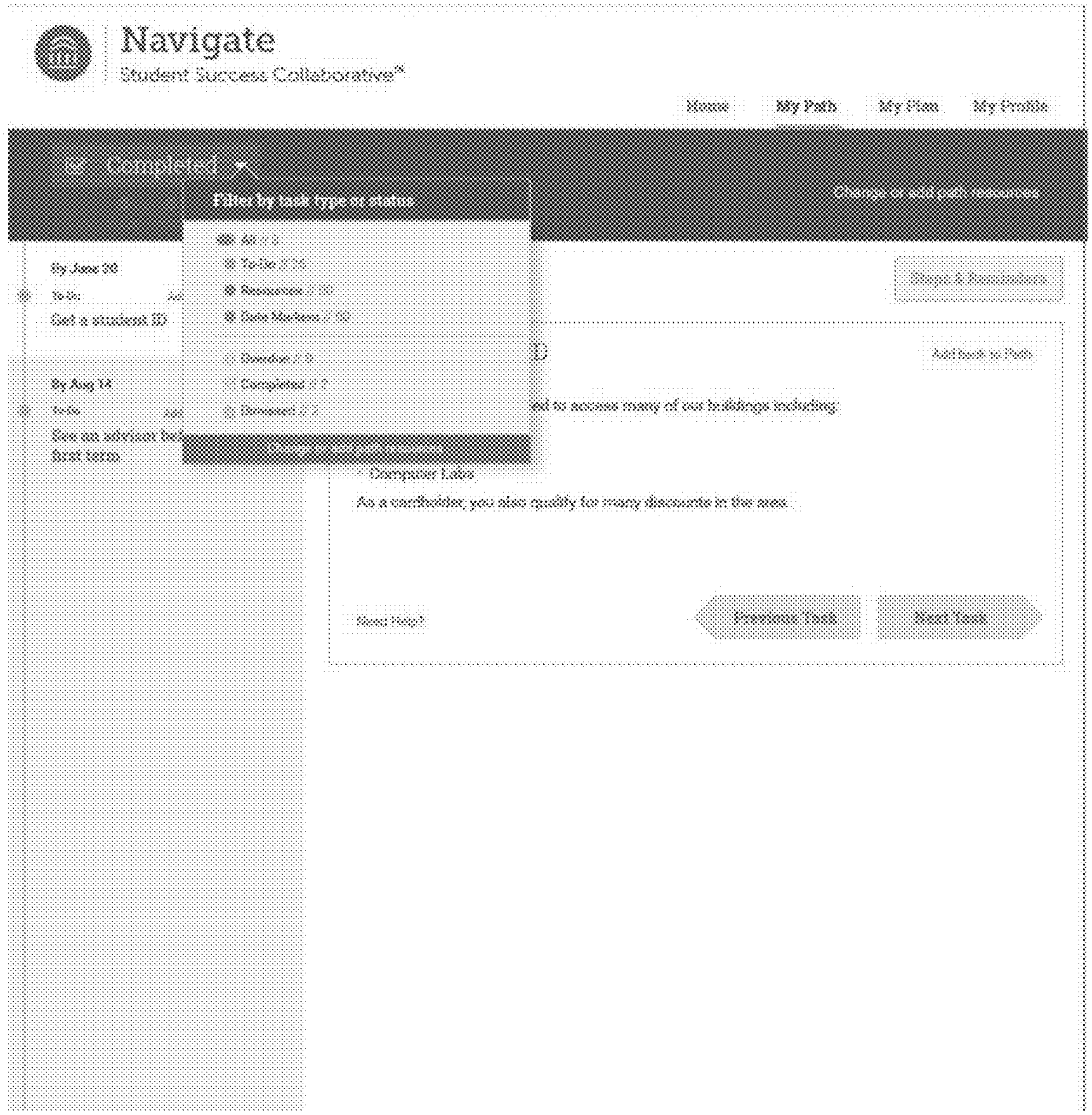

FIG. 142 depicts a form for managing a process of academic planning, according to exemplary embodiments of the present disclosure. As shown in FIG. 142, the form may provide controls to allow a list of displayed tasks to be filtered by one or more criteria. For example, in FIG. 142 completed tasks are listed. A control to change the task filtering may be displayed as an overlay on top of the form, as shown in FIG. 142.

Figure 143:
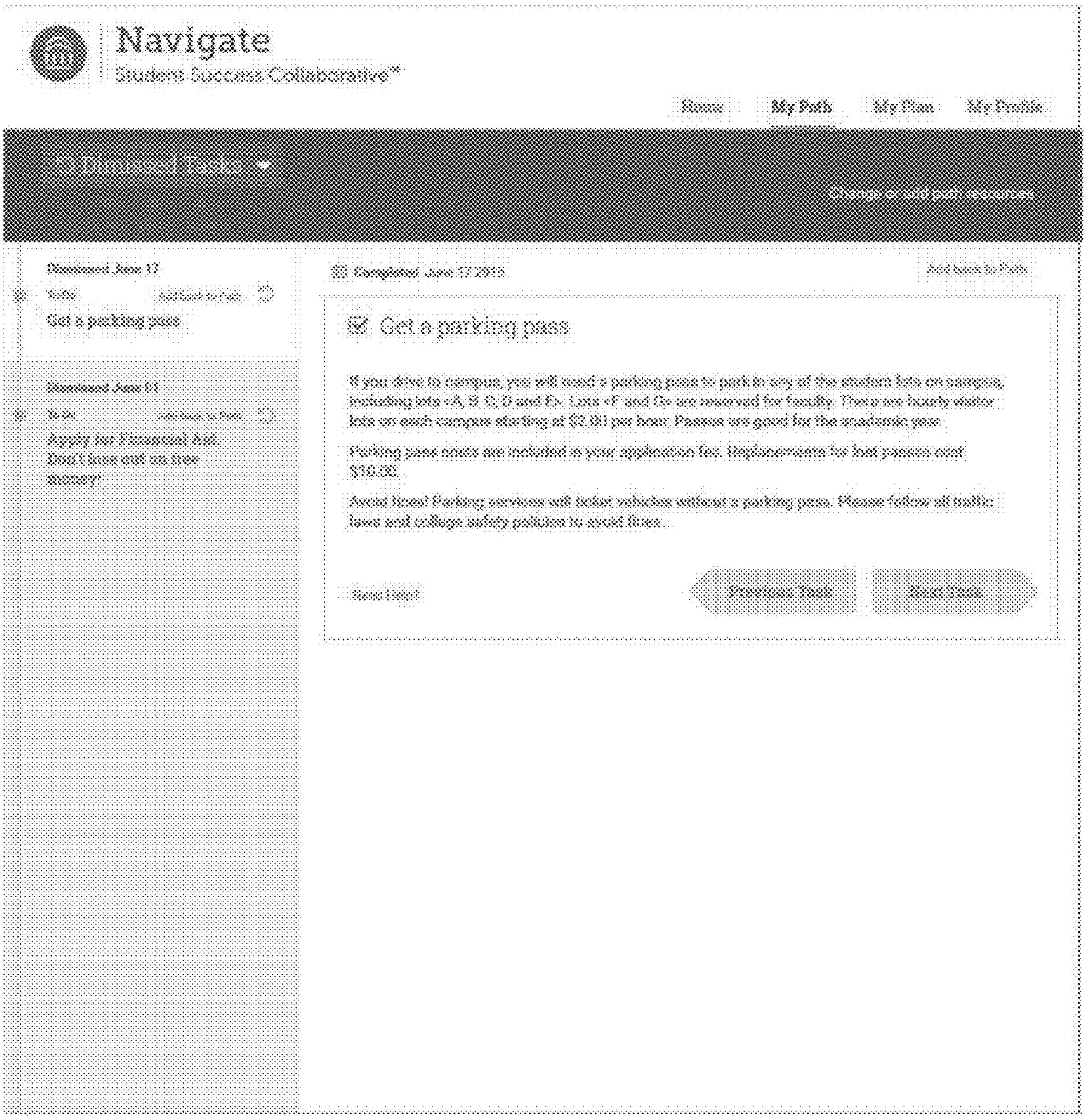

FIG. 143 depicts a form for managing a process of academic planning, according to exemplary embodiments of the present disclosure. As shown in FIG. 143, when a user has selected one of the tasks to be completed, the form may display information related to the selected task. For example, FIG. 143 shows information related to a task of getting a parking pass.

Figure 144:
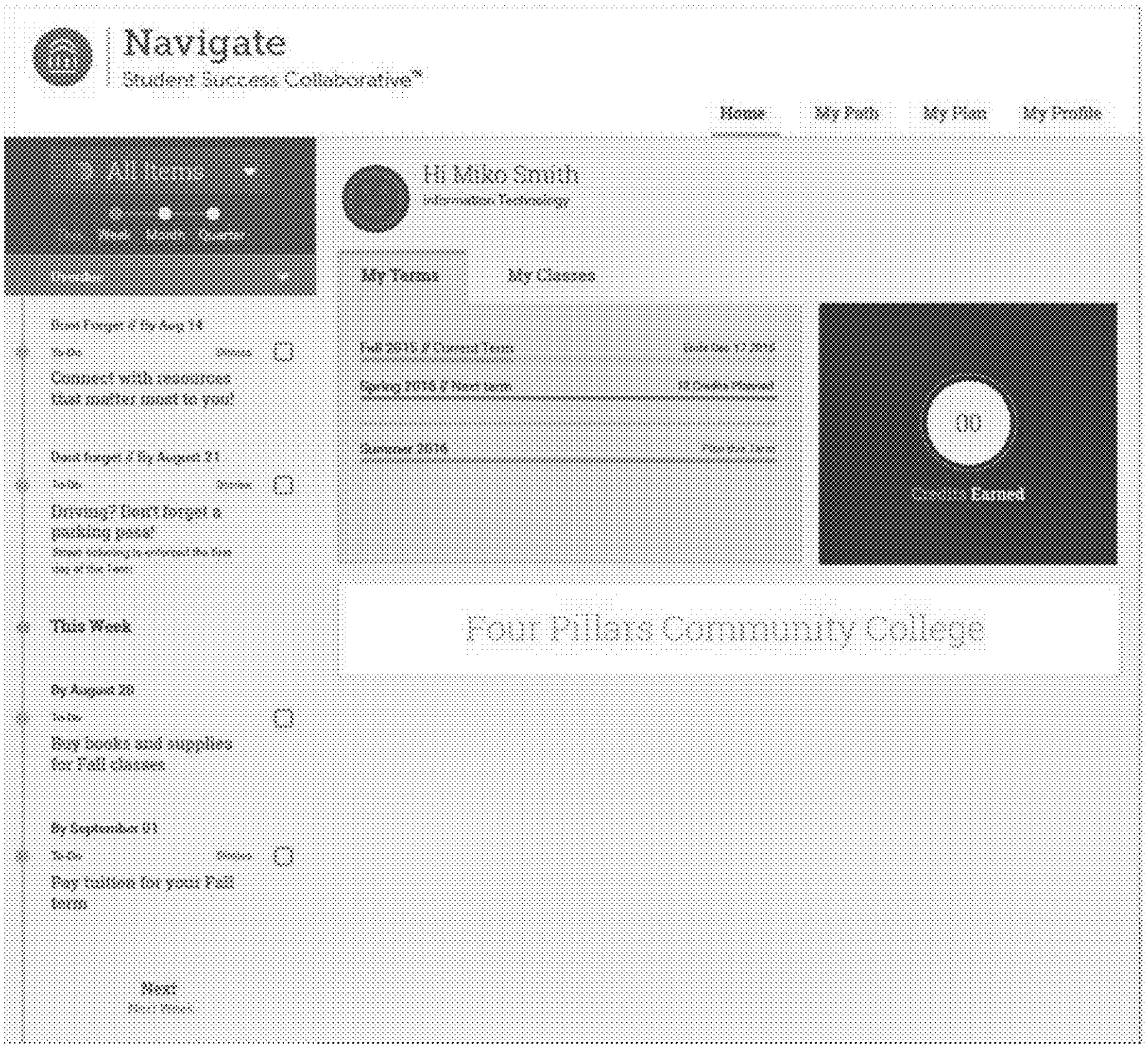

FIG. 144 depicts a form for managing a process of academic planning, according to exemplary embodiments of the present disclosure. As shown in FIG. 144, the form may include information indicating tasks that are overdue for completion. For example, in FIG. 144, the tasks "Connect with resources that matter most to you" and "Don't forget a parking pass" are indicated as overdue. The form may also indicate multiple academic terms, including a current term and terms taking place in the future.

FIGS. 145-147 depict a process of marking an overdue task as completed on a form for managing a process of academic planning, according to exemplary embodiments of the present disclosure. As shown in FIG. 145, a user may select an overdue task to be dismissed. As shown in FIG. 146, the form may display a banner indicating that the task was successfully dismissed. The form may also include controls to undo the change of a completion status of a task. The messages indicating the presence of overdue tasks and the completion of tasks may be presented with additional graphical information such as color, highlighting or icons, for example. As shown in FIG. 147, once a task has been dismissed the form may eliminate the task from the list of tasks.

As shown in FIG. 147, the form may display a message related to an overdue task.

FIG. 148 depicts a form for managing a process of academic planning, according to exemplary embodiments of the present disclosure. As shown in FIG. 148, the form may include a control to display or hide overdue tasks.

FIG. 149 depicts examples of information and controls that may be displayed on a form for managing a process of academic planning, according to exemplary embodiments of the present disclosure. As shown in FIG. 149, a form may include, for example, a "path Item" indicating a task to be completed, a task to be completed with a control indicating that the task has been completed, a task to be completed that has been selected by the user, which may be indicated by changing how the task is presented, such as, for example, by changing the background color of the displayed task, indicators of a time period such as "This week," "Next week," "June," or "July," for example, information relating to an overdue task, possibly including a message related to the overdue task, indicators of an academic term such as "Fall 2015," "Spring 2015" or "Summer 2015," for example, a control for filtering tasks by time, by a status of "Completed" or a status of "Dismissed."

FIG. 150 depicts exemplary status identifiers for courses displayed in a form for managing a process of academic planning, according to exemplary embodiments of the present disclosure.

As shown in FIG. 150, a course may be displayed as being ready to register. Such a course may be displayed, for example, with text indicating that registration is open, a control to being a registration process and/or an additional graphical element such as color or an icon, etc. indicating the course status. For example, a course with registration open may display an orange bar.

As shown in FIG. 150, a course may be displayed as having an open registration date in the future. Such a course may be displayed, for example, with text indicating a date that registration will open and/or an additional graphical element such as color or an icon, etc. indicating the course status. For example, a course with an open registration date in the future may display a grey bar.

As shown in FIG. 150, a course may be displayed as having been enrolled. Such a course may be displayed, for example, with an additional graphical element such as color or an icon, etc. indicating the course status. For example, a course that has been enrolled may display a blue bar.

As shown in FIG. 150, a course may be displayed as having been completed. Such a course may be displayed, for example, with an additional graphical element such as color or an icon, etc. indicating the course status. For example, a course that has been completed may display a green bar.

As shown in FIG. 150, a tile displaying a course may be displayed, for example, with varying levels of transparency depending on status. For example, a course that has been completed may be displayed as 50% transparent.

Figure 151:
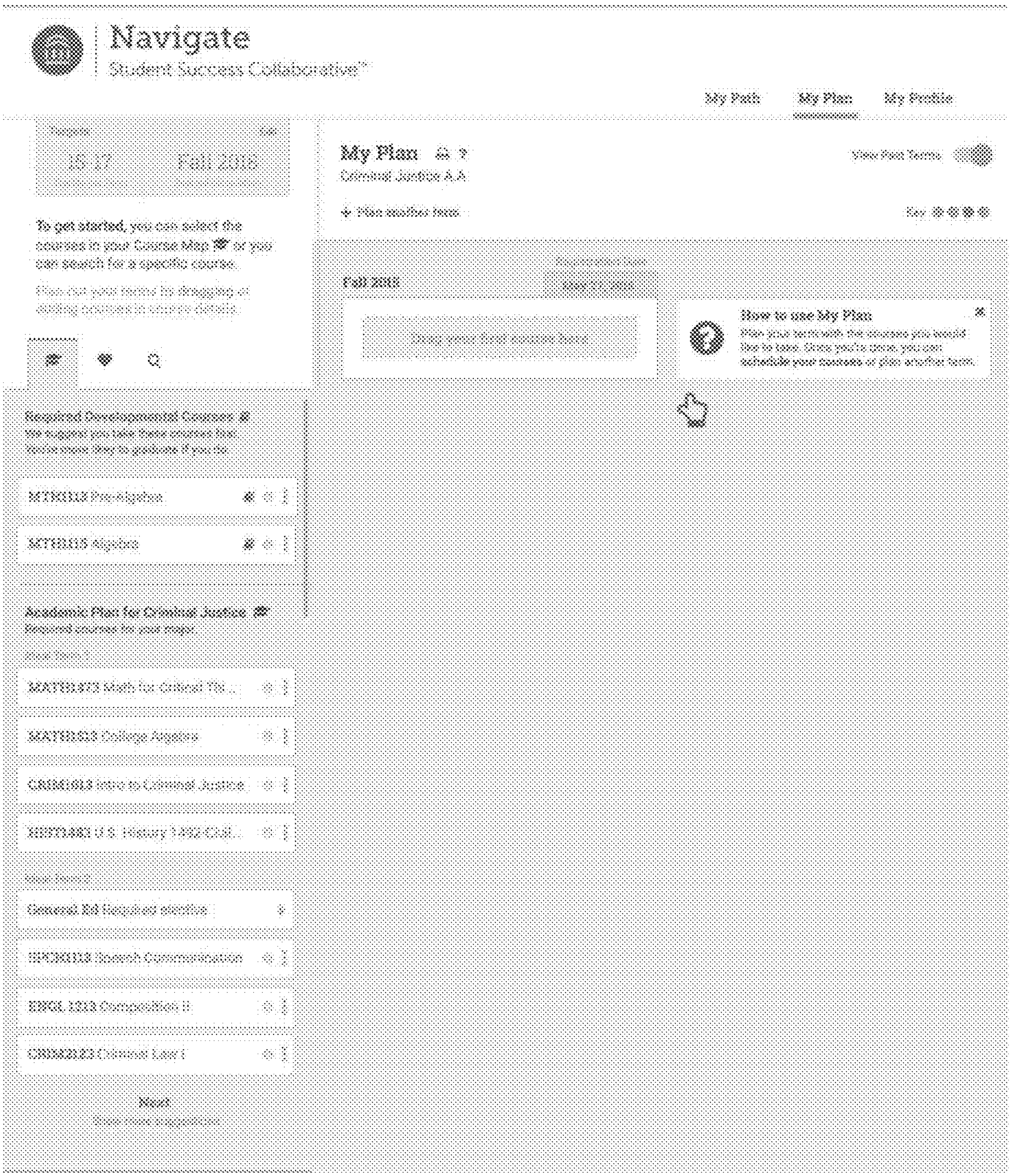

FIG. 151 depicts a form for managing a process of academic planning, according to exemplary embodiments of the present disclosure. As shown in FIG. 151, the form may display a "My Plan" form for a student. The form may display, for example, a "course map" of required and recommended courses for a particular course of study. The form may display instructional text for using the form and may include zones to drag and drop courses for further registration.

Figure 152:
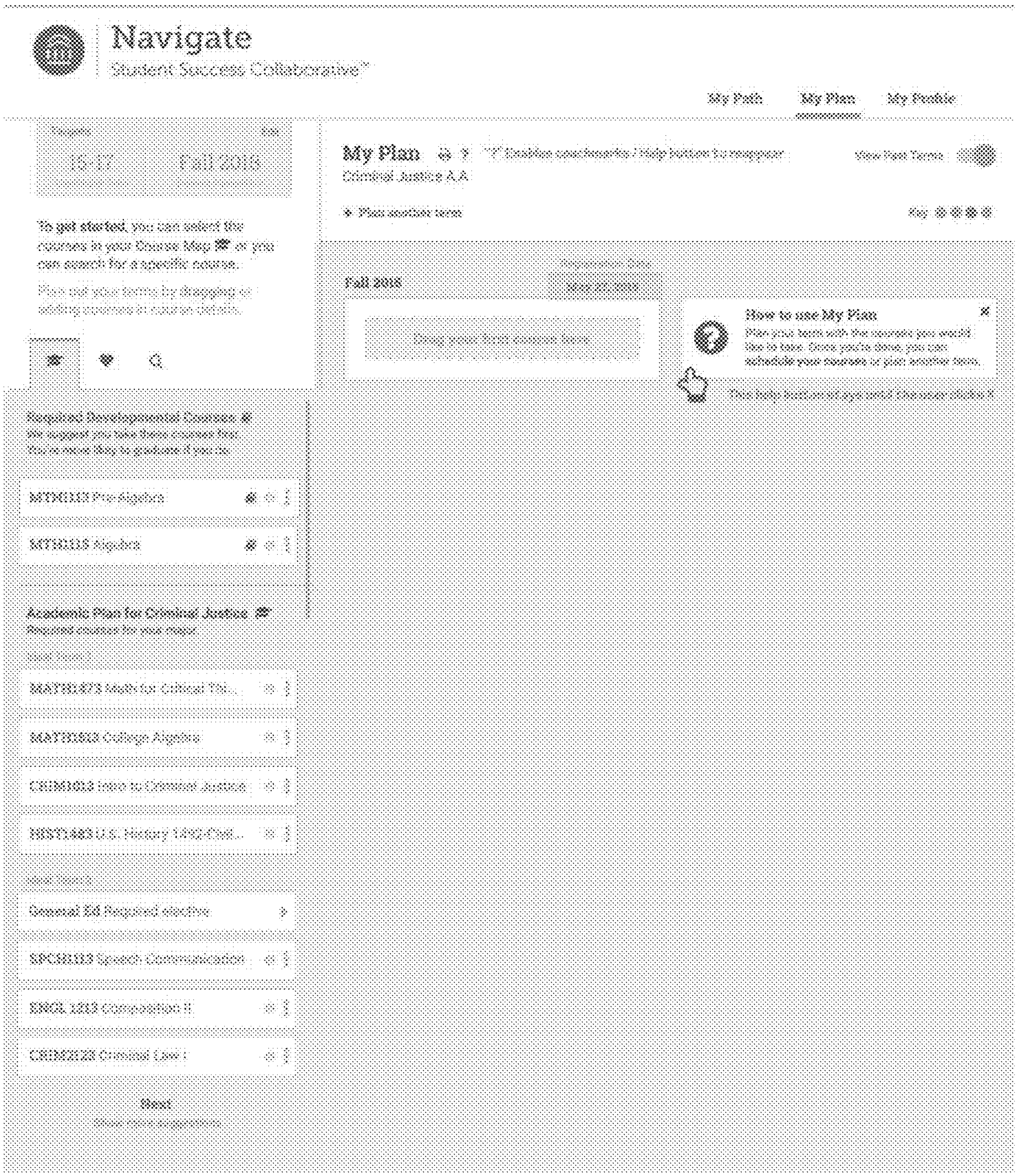

FIG. 152 depicts a form for managing a process of academic planning, according to exemplary embodiments of the present disclosure. As shown in FIG. 152, the form may display an icon a user may select in order to display instructional text. Displayed instructional text may be displayed until a user selects a control to dismiss the instructional text.

Figure 153:
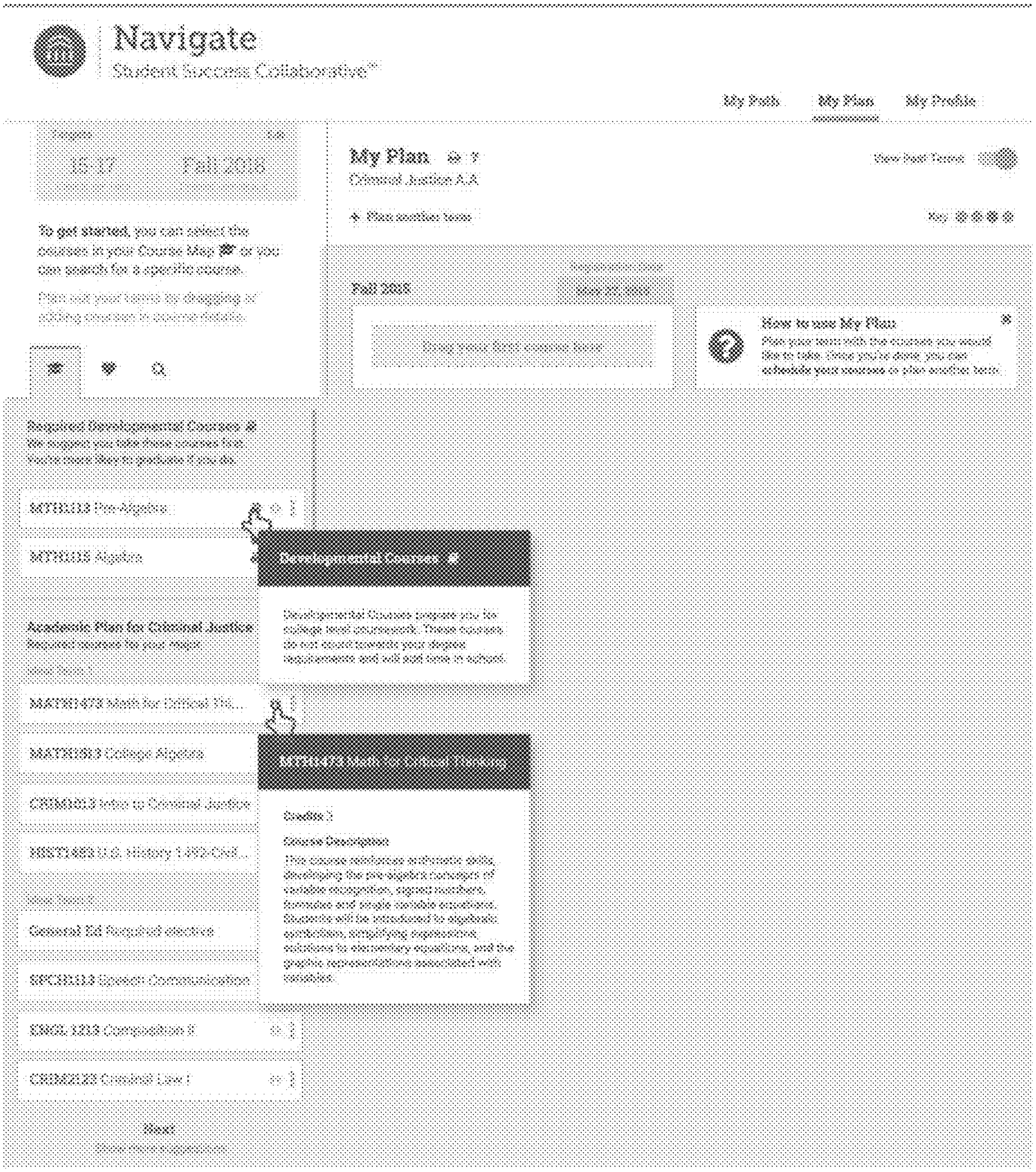

FIG. 153 depicts a form for managing a process of academic planning, according to exemplary embodiments of the present disclosure. As shown in FIG. 153, the form may display, for example, a "course map" of required and recommended courses for a particular course of study. For each listed course, the form may display icons or other graphical elements indicating additional information available. For example, an icon may indicate that a course is a required developmental course and if selected may display further information about such courses. In addition, an icon may indicate that additional information is available about a course and if selected may display detailed information about the course.

Figure 154:
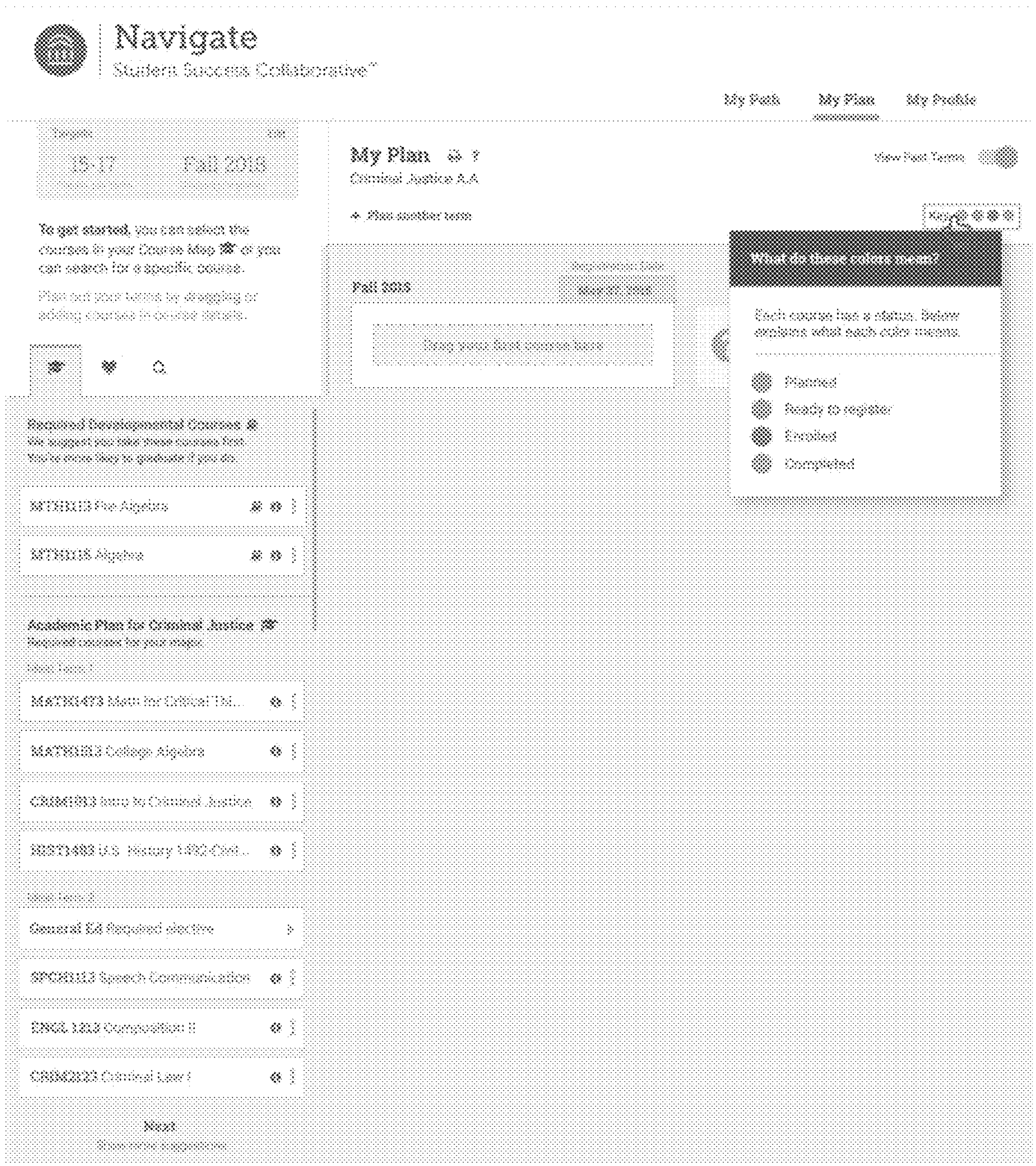

FIG. 154 depicts a form for managing a process of academic planning, according to exemplary embodiments of the present disclosure. As shown in FIG. 154, one or more items displayed on the form may display additional information if the item is selected by a user. For example, if a "key" is selected then additional information about the key, such as a meaning associated with each icon color, may be displayed.

Figure 155:
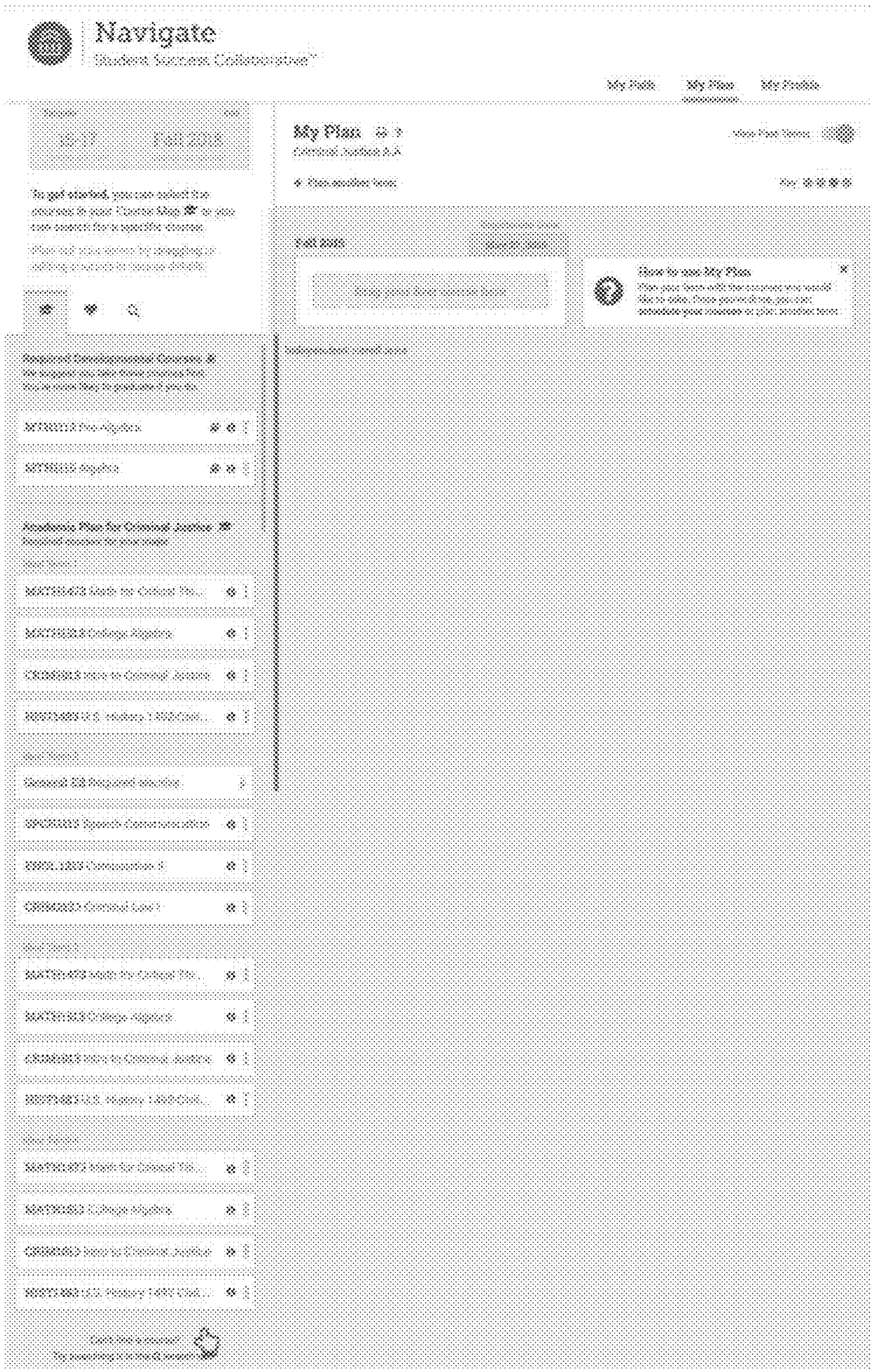

FIG. 155 depicts a form for managing a process of academic planning, according to exemplary embodiments of the present disclosure. As shown in FIG. 155, a "course map" of required and recommended courses for a particular course of study may be scrolled independently of other portions of the form.

Figure 156:
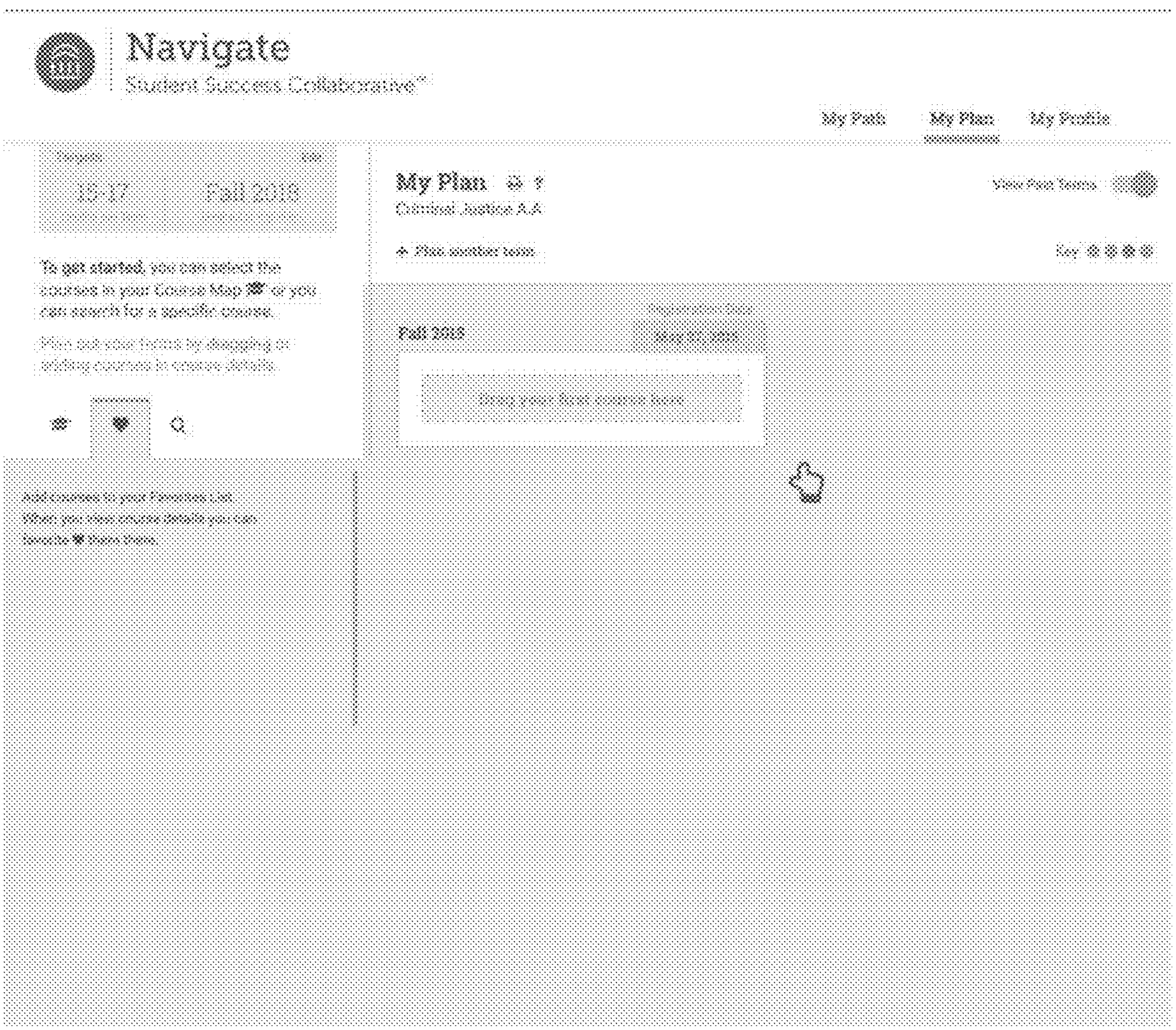
Figure 157:
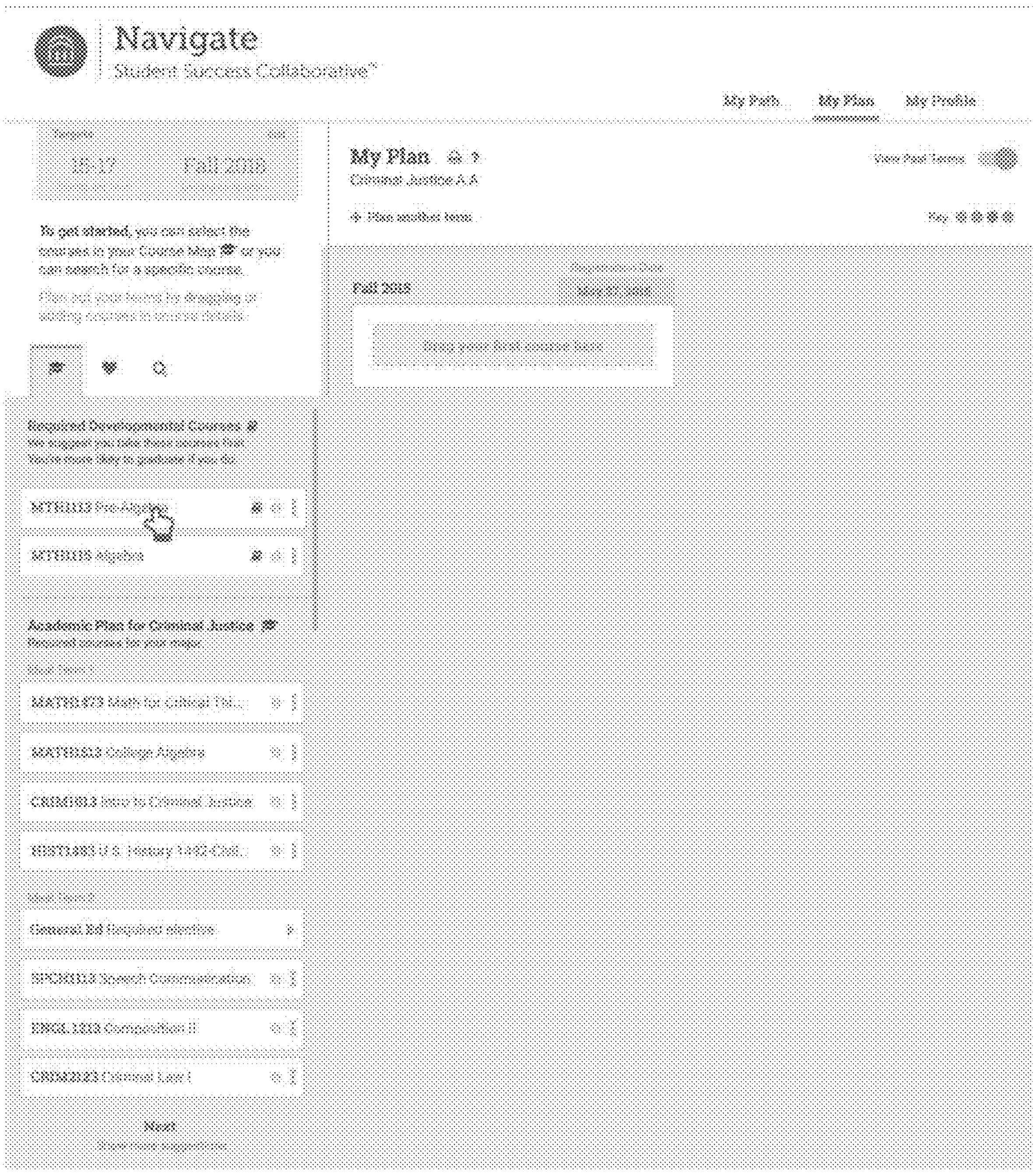
Figure 158:
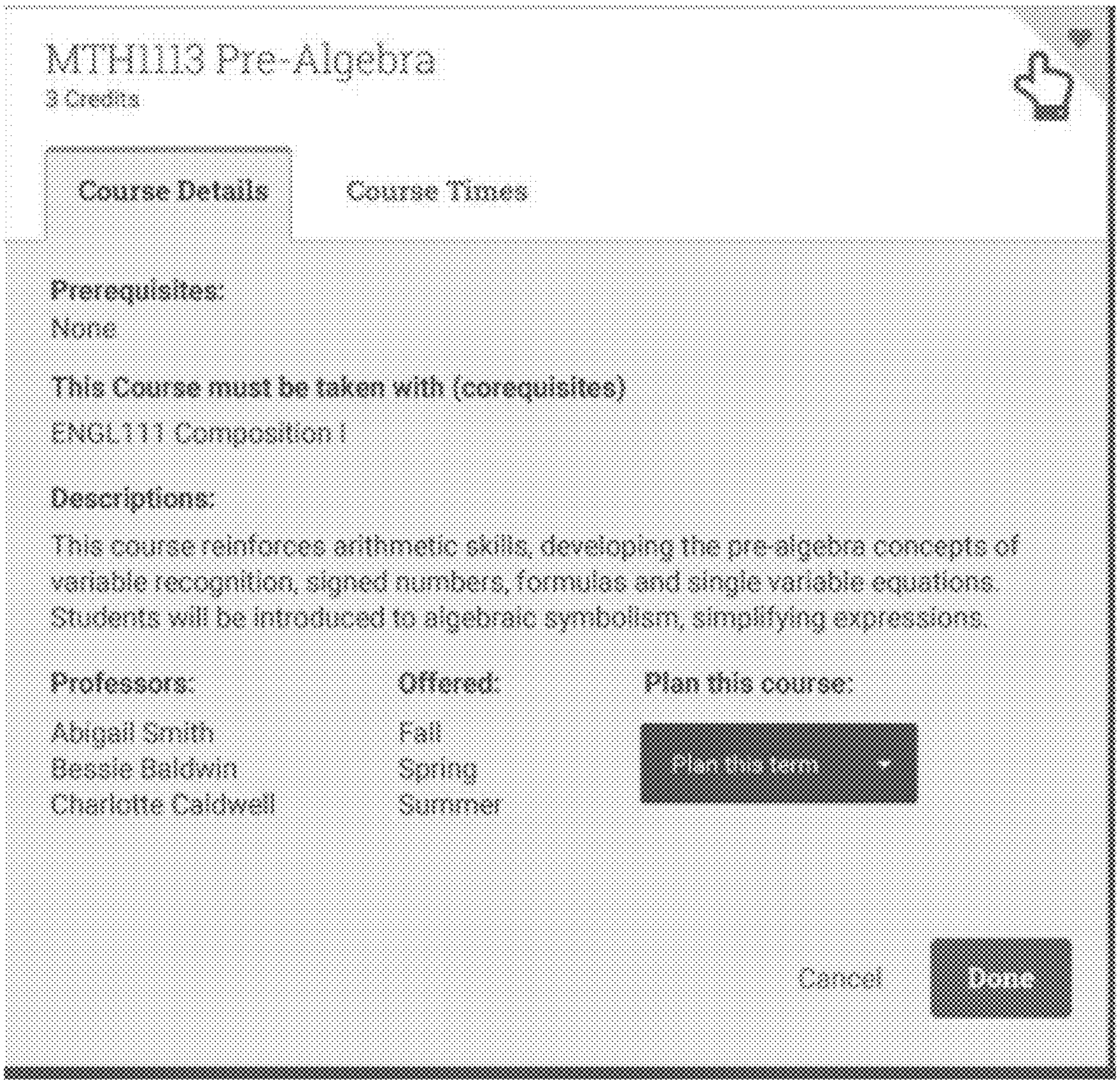

FIG. 156 depicts a form for managing a process of academic planning, according to exemplary embodiments of the present disclosure. As shown in FIG. 156, the form may display a list of favorite courses as designated by a user.

Figure 159:
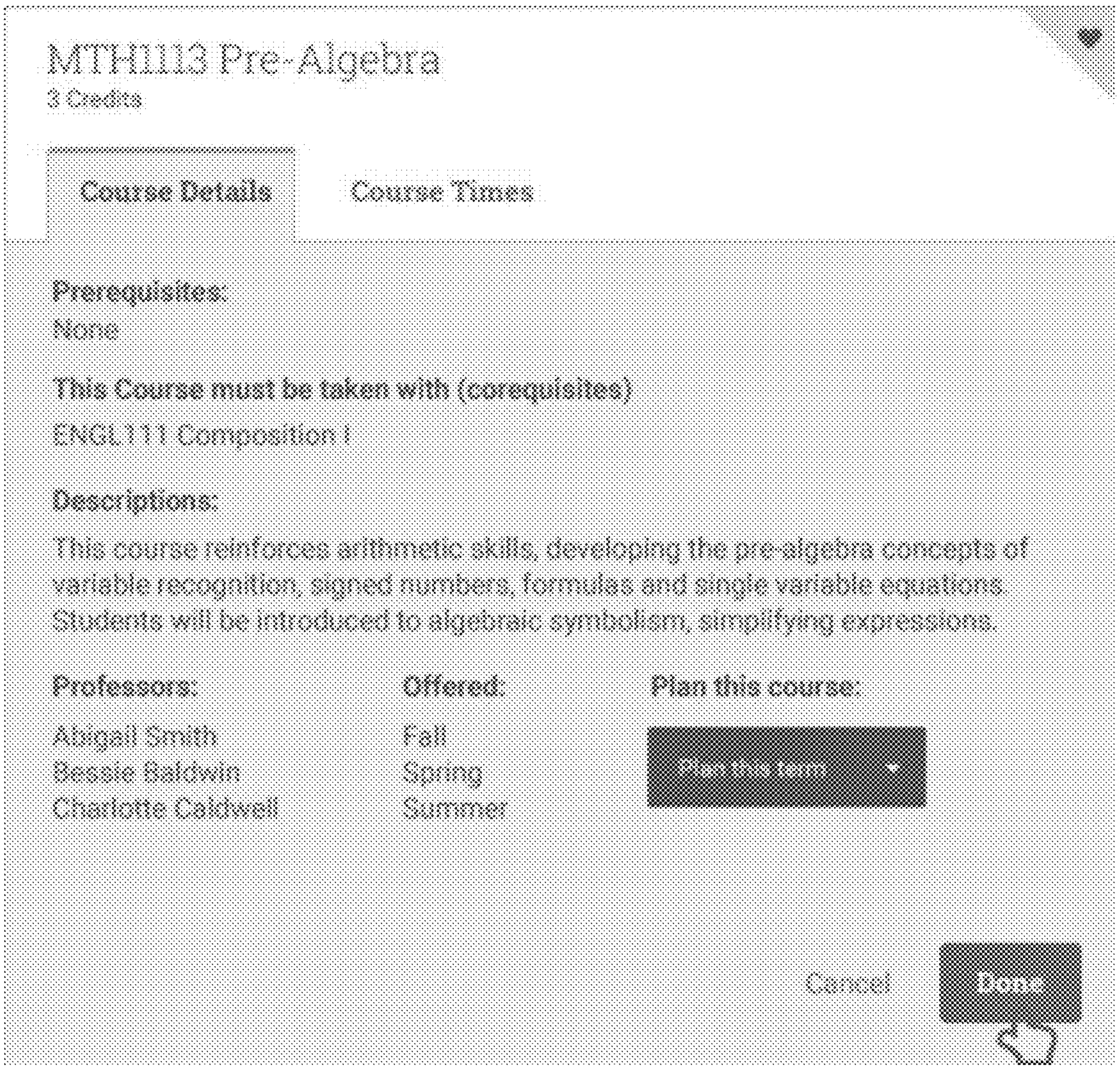

FIGS. 157-160 depict a form for managing a process of academic planning, according to exemplary embodiments of the present disclosure. As shown in FIG. 156, a user may select a course listed in a "course map" of required and recommended courses for a particular course of study. If the user selects a course, detailed information about the course may be displayed as in FIG. 158. The displayed detailed information about a course may include an icon or other graphical element indicating that a course has been saved to a list of favorites, such as a heart icon. If the course is saved to a list of favorites, the icon or other graphical element may be modified to indicating the course status, such as changing color of an icon. In FIG. 159, the heart icon is displayed in red to indicate the course has been saved to a list of favorites.

Figure 160:
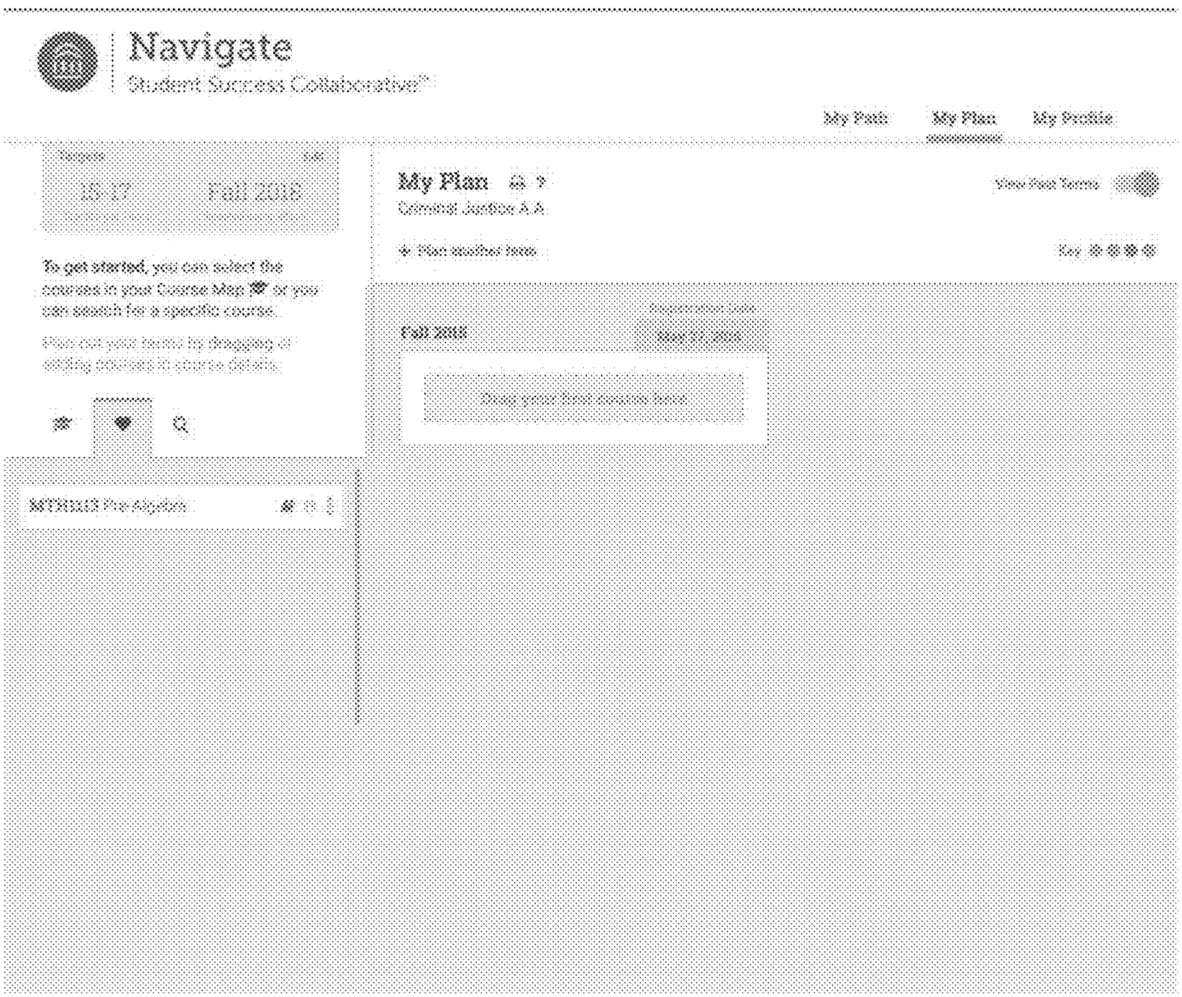

As shown in FIG. 160, a course designated as a favorite by the user may be displayed in a list of favorite courses.

Figure 161:
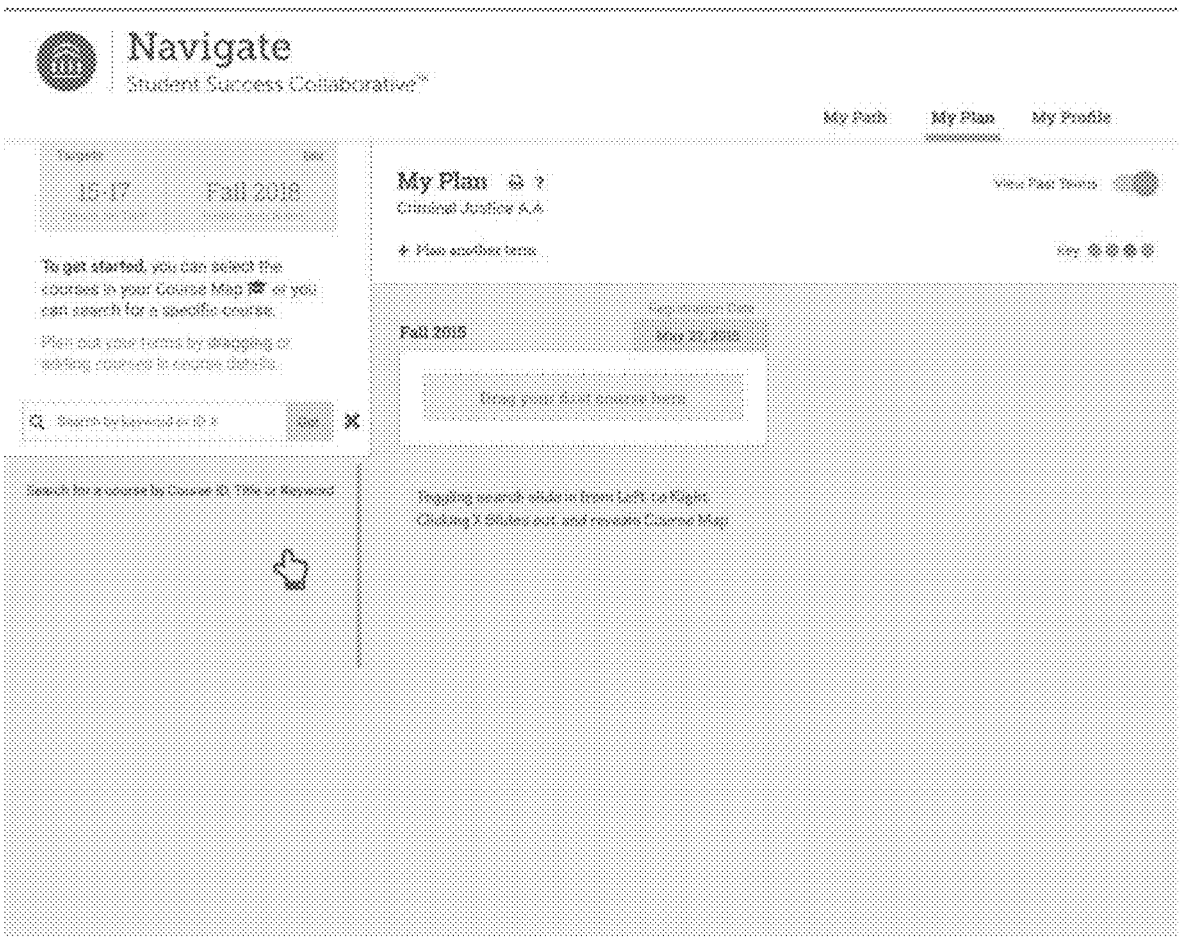
Figure 162:
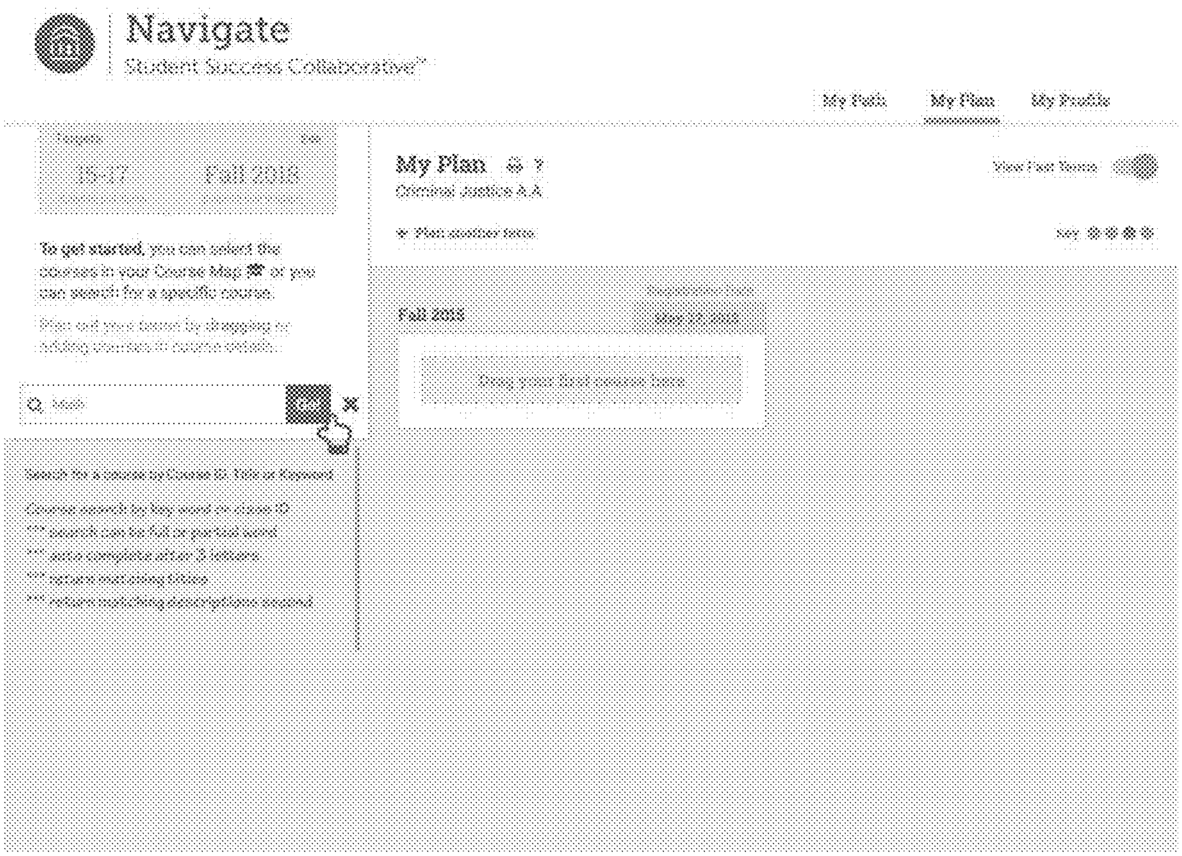

FIGS. 161-162 depict a form for managing a process of academic planning, according to exemplary embodiments of the present disclosure. As shown, for example, in FIG. 160, the form may include a control for initiating a search for a course, such as a magnifying glass icon. As shown in FIG. 161, if the search control is selected, the form may display a text area to enter search terms, such as, for example, keywords or course ID numbers and an area to list search results. The search terms may match course titles or descriptions, for example.

As shown in FIG. 161, the form may further include a control to dismiss the search.

Figure 163:
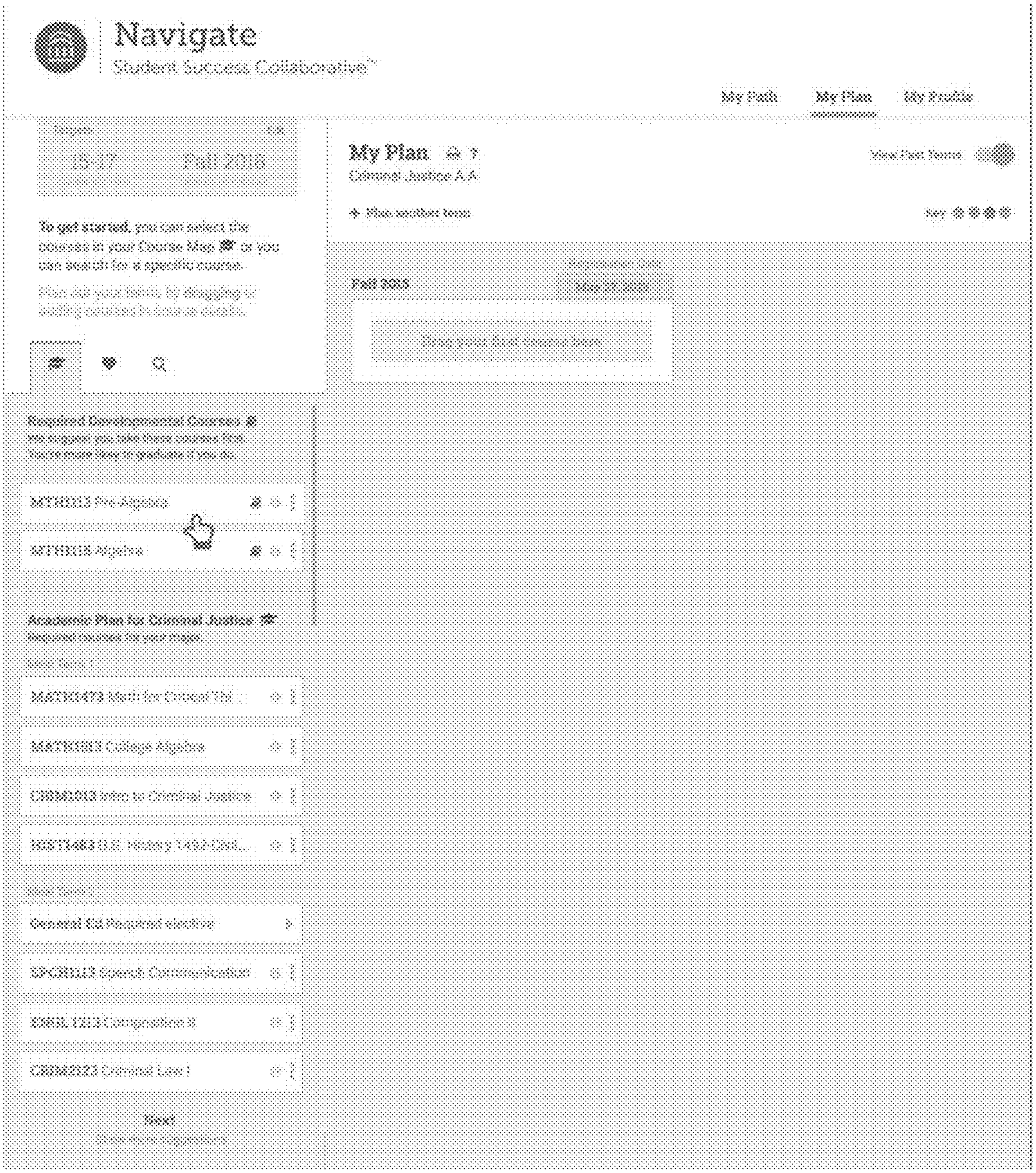
Figure 164:
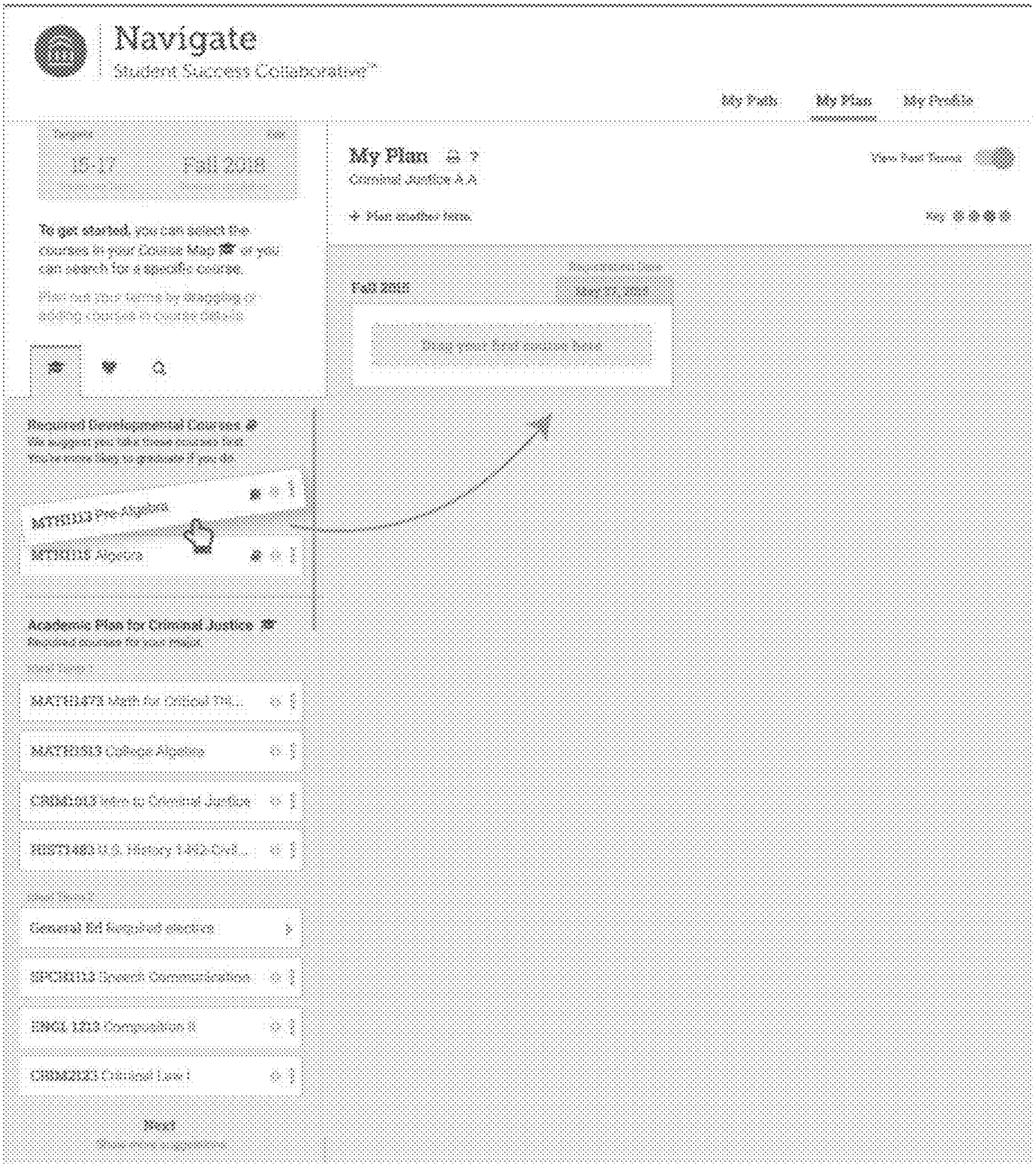
Figure 165:
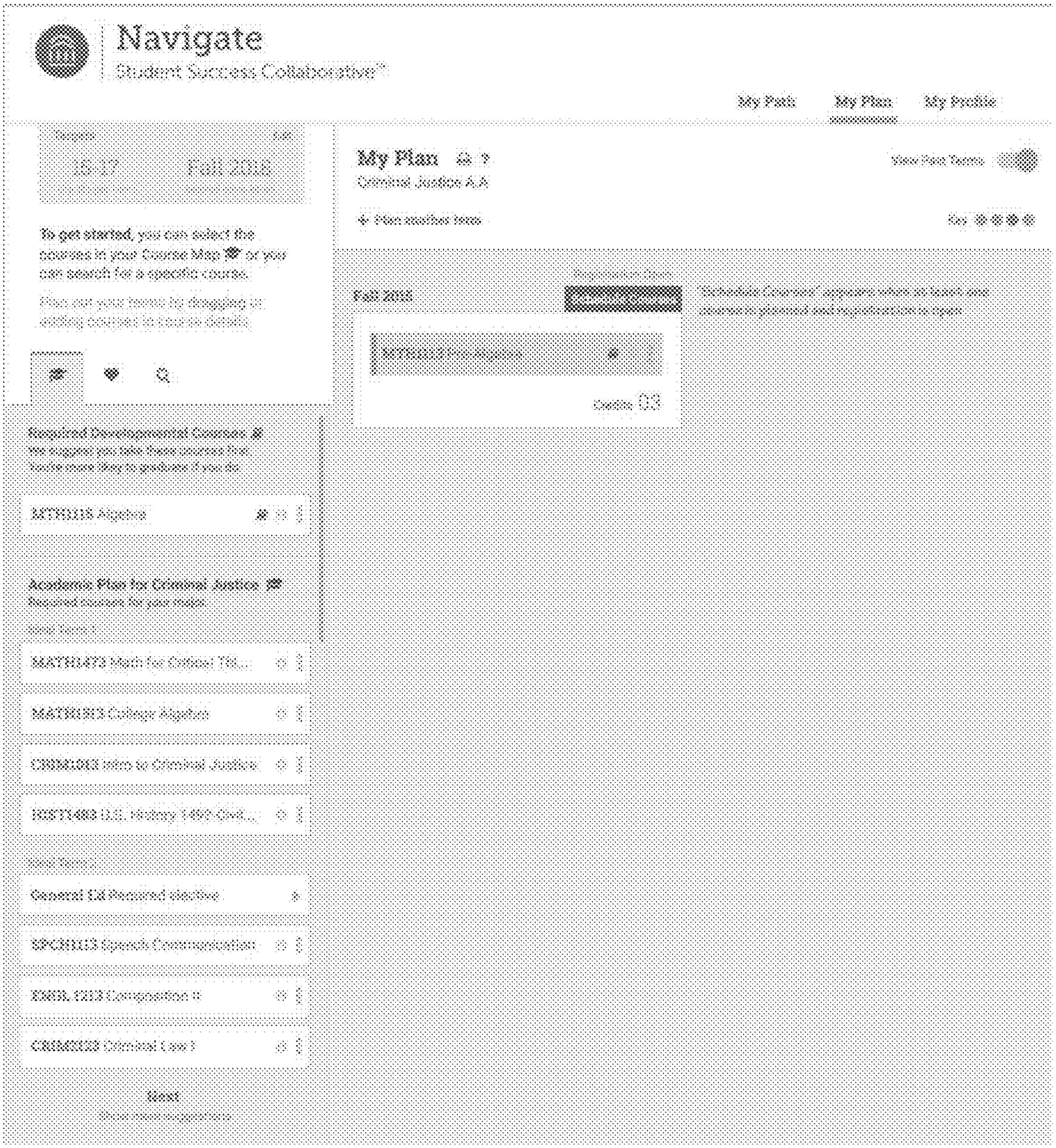
Figure 166:
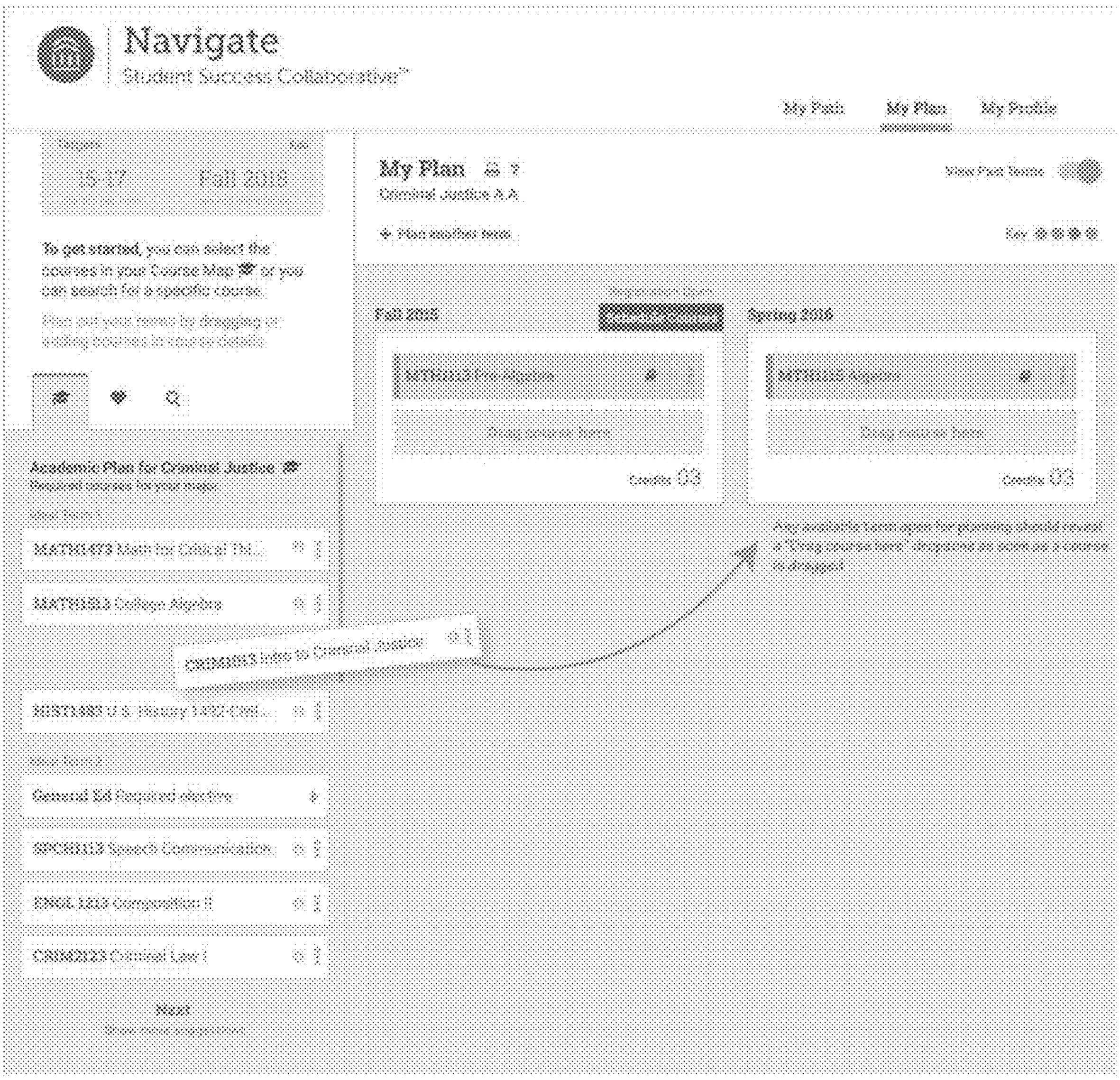

FIGS. 163-166 depict a process of selecting courses for registration on a form for managing a process of academic planning, according to exemplary embodiments of the present disclosure. As shown in FIG. 163, a uses may select a listed course and then may drag the course to a current term, as shown in FIG. 164. The selected course will then be shown a on the user's planned courses, as shown in FIG. 165. Once at least one course has been added to the list of planned courses and registration is open, the form may display a control to proceed to course registration, as shown in FIG. 165. As shown in FIG. 166, a course may likewise be added to a planned courses list for any available future academic term.

Figure 167:
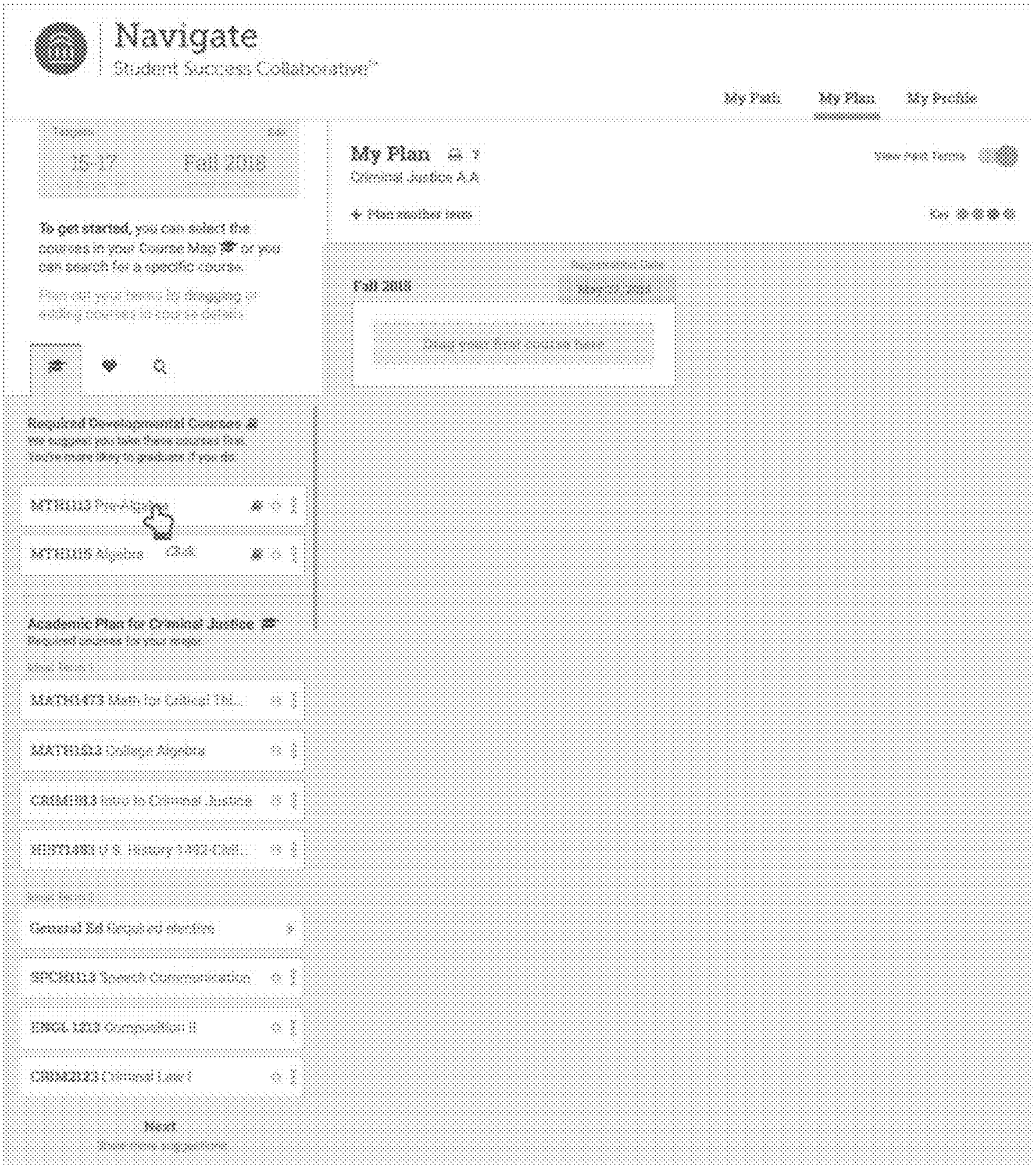

FIGS. 167-172 depict a process of selecting courses for registration on a form for managing a process of academic planning, according to exemplary embodiments of the present disclosure. As shown in FIG. 167, a user may initiate a process of selecting a course by clicking on a course listed in a list of required and recommended courses.

Figure 168:
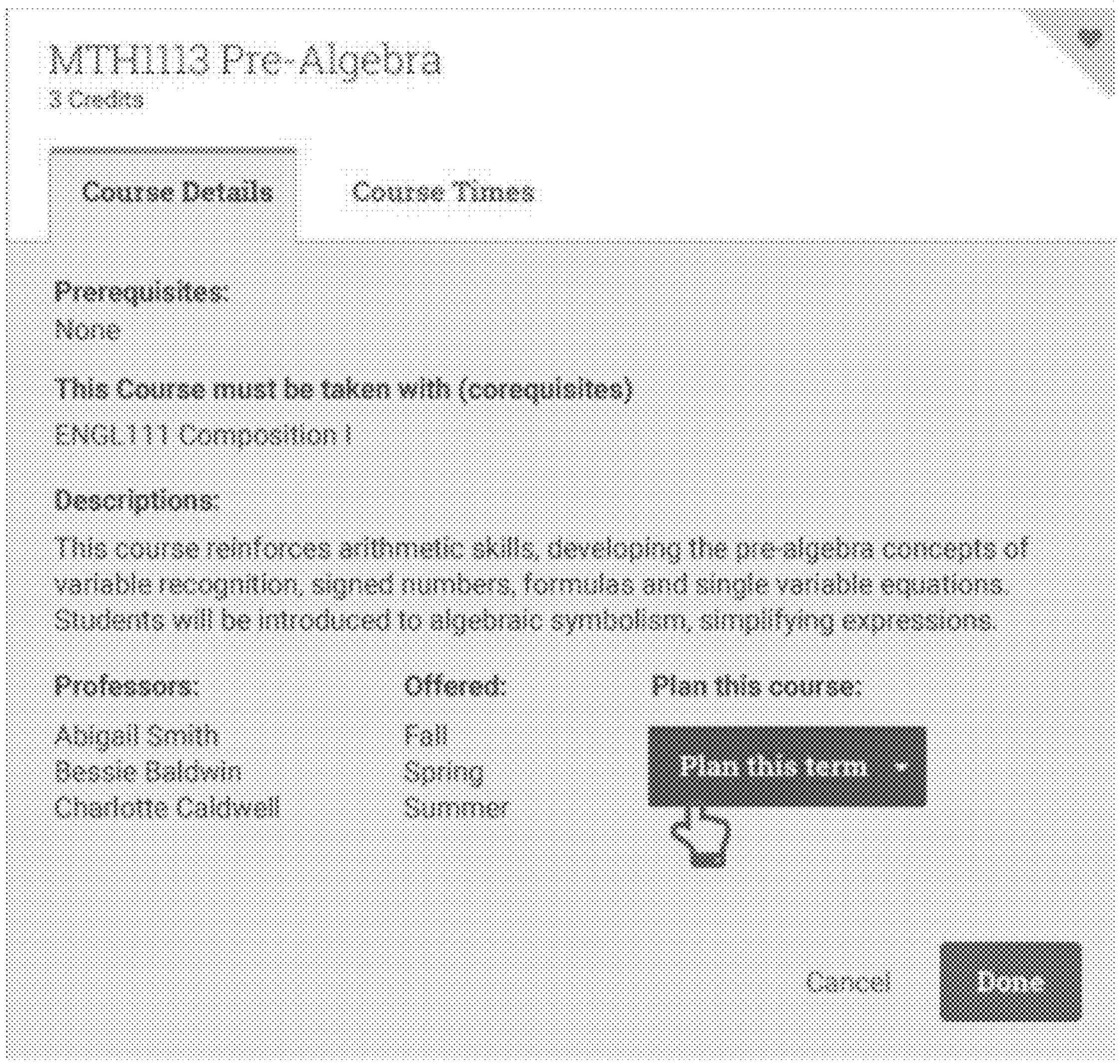
Figure 169:
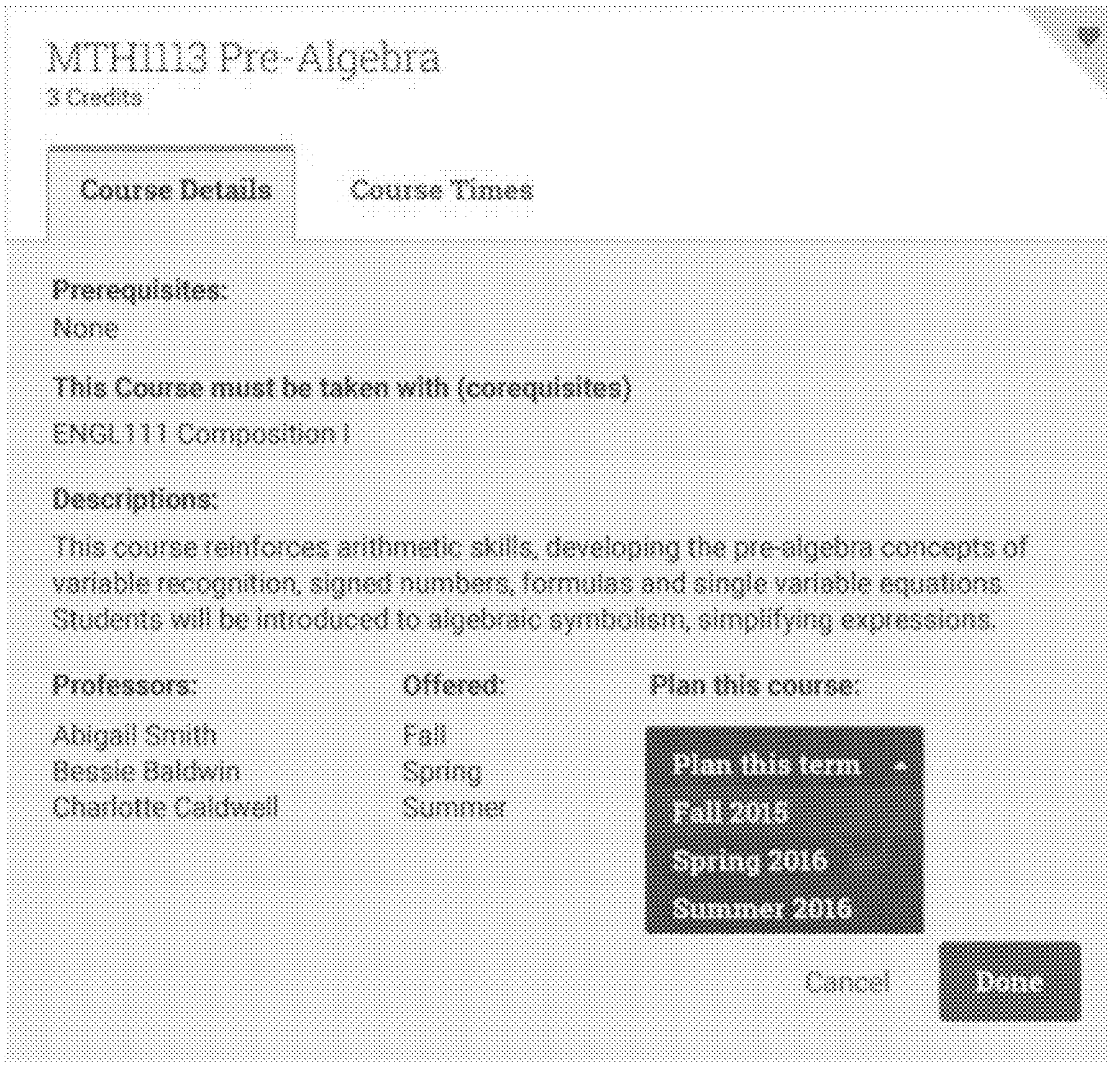
Figure 170:
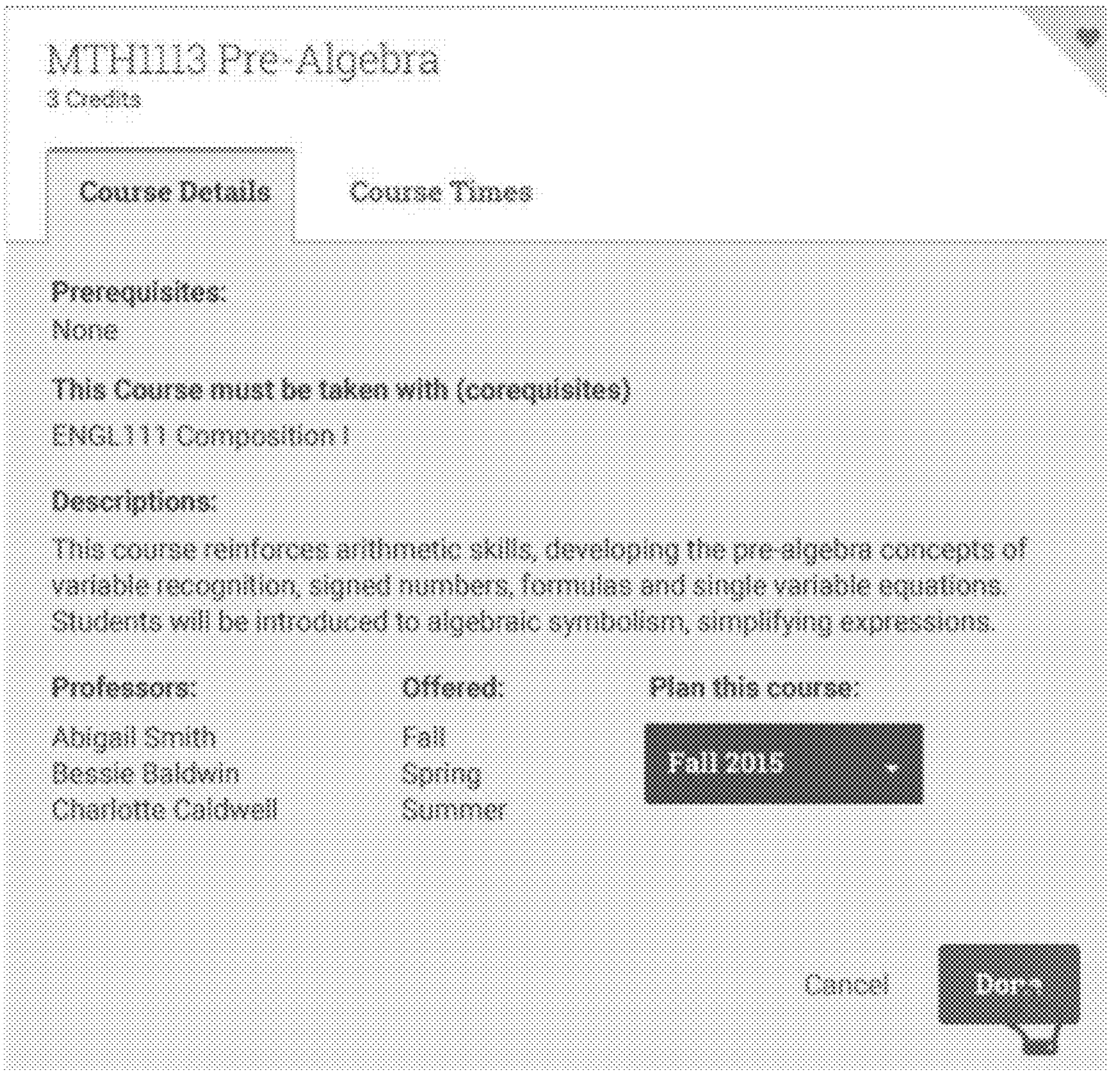

When a user clicks on a listed course, detailed information about the course may be displayed such as in FIG. 168. As shown in FIG. 168, the form may include a control to add the course to planned courses for an academic term. When a user selects the control, a list of available academic terms may be displayed as shown in FIG. 169. The user may then select a control, such as a "Done" button, for example, to return to the form for managing a process of academic planning, as shown in FIG. 170.

Figure 171:
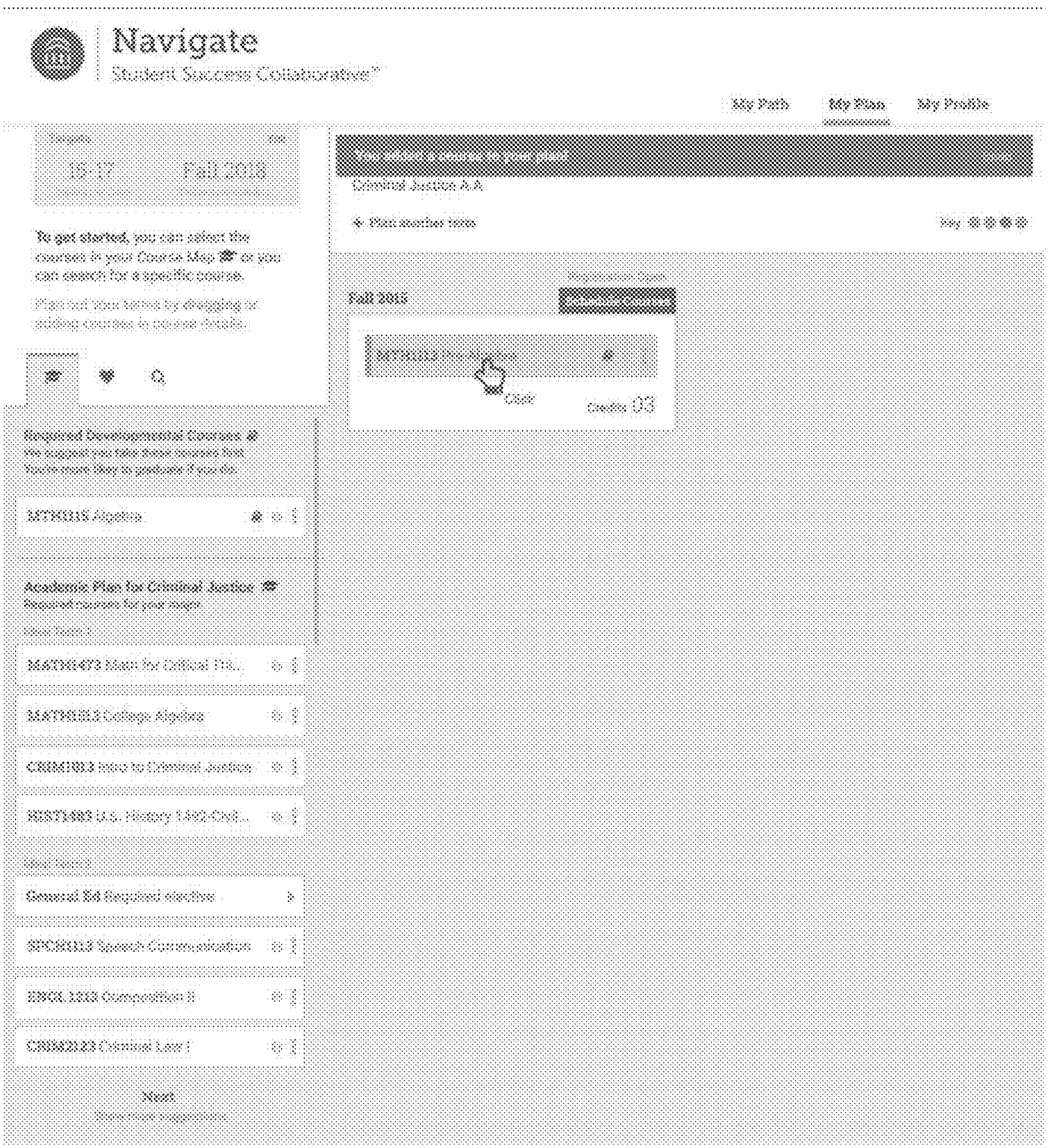

As shown in FIG. 171, the form for managing a process of academic planning may display information indicating that the course was added to the user's plan, such as a banner. The displayed information indicating that the course was added to the user's plan may include additional graphical information such as color or icons, etc. For example, as shown in FIG. 171, the banner may be displayed in green to indicate success. As shown in FIG. 171, the user may click on a planned course to display information about the course.

Figure 172:
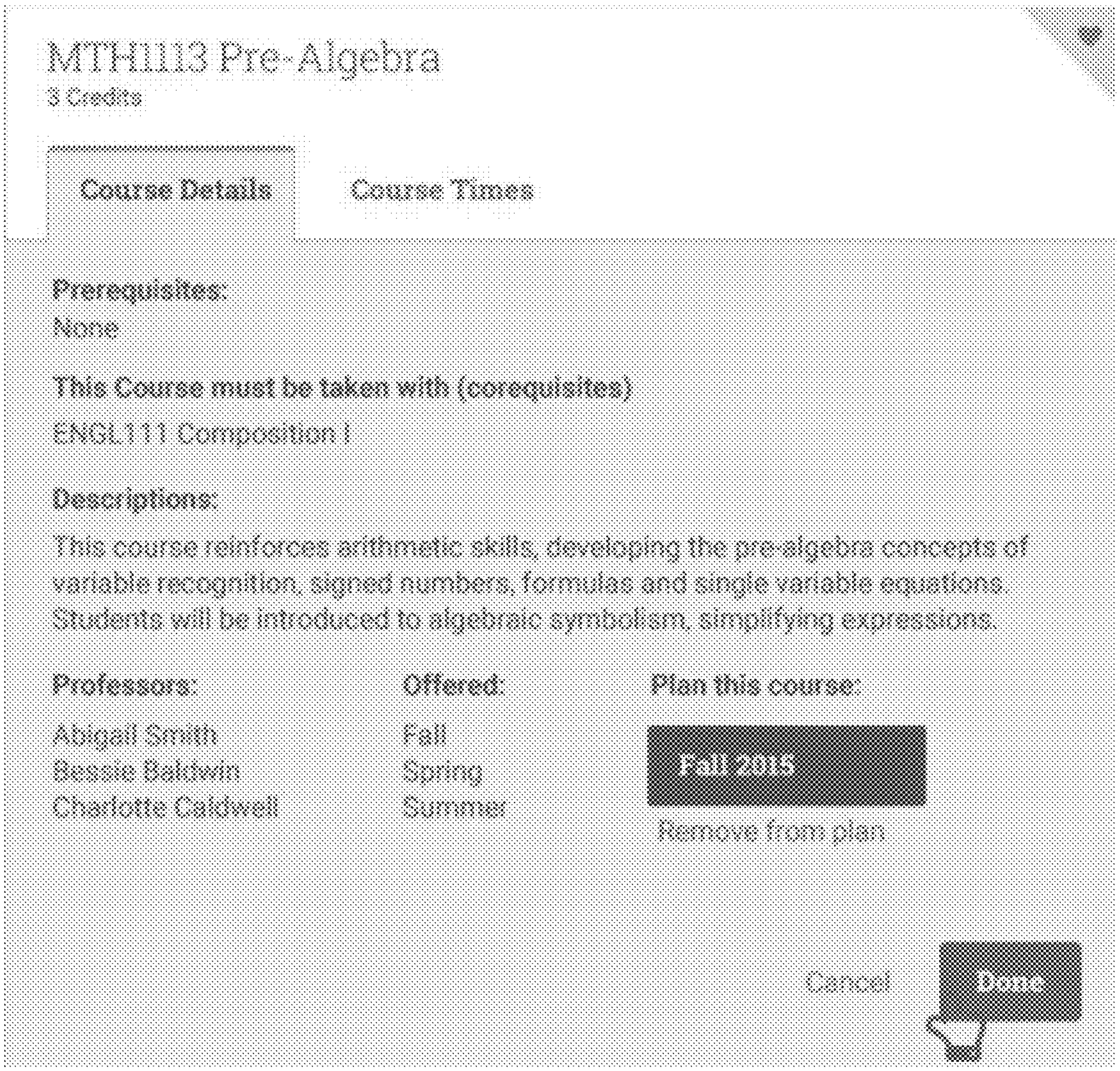

As shown in FIG. 172, the detailed information about the course may include, for example, a semester in which the course is planned and a control to remove the course from the plan. The user may dismiss the detailed information by selecting a control, such as clicking on a "done" button.

FIGS. 173-174 depict a process of removing a course from a list of planned courses for registration on a form for managing a process of academic planning, according to exemplary embodiments of the present disclosure. As shown in FIG. 173, the form may display a list of planned courses for an academic term, such as "MTH1113" planned for "Fall 2015." As shown in FIG. 174, the user may select a planned course and begin to drag the selected course. Upon dragging the selected course, a drop area to remove the course from the user's plan may be displayed and the course may be removed from the plan by releasing it in the drop area.

FIGS. 175-176 depict a process of selecting courses for registration on a form for managing a process of academic planning, according to exemplary embodiments of the present disclosure. As shown in FIG. 175, a user may click on a listed course to select the course and then may click again on a desired academic term to add the course to a list of planned courses for that academic term, as shown in FIG. 176.

FIGS. 177-179 depict a process of removing a course from a list of planned courses for registration on a form for managing a process of academic planning, according to exemplary embodiments of the present disclosure. As shown in FIG. 177, detailed information about a selected course may include, for example, a semester in which the course is planned and a control to remove the course from the plan. If the user selects the control to remove the course from the plan, such as by clicking a button, the course may be removed from the plan and the indicated semester in which the course was planned may be replaced by a control to plan the course for an available academic term, as shown in FIG. 178. The user may select a control dismiss the detailed information, such as a "Done" button to return to the form for managing a process of academic planning. As shown in FIG. 179, the form may display information indicating that the course was successfully removed from the list of planned courses, such as a banner, for example.

FIGS. 180-182 depict a process of adding an academic term in a form for managing a process of academic planning, according to exemplary embodiments of the present disclosure. As shown in FIG. 180, the form may include a control to add another academic term for planning, such as a button or selectable text. If a user selects the control to add another academic term for planning, such as by clicking selectable text, the form may display a list of available academic terms, as shown in FIG. 181. If the user selects an academic term from the displayed list, the selected academic term may be added to the form, as shown in FIG. 182.

FIGS. 183-185 depict a process of removing an academic term in a form for managing a process of academic planning, according to exemplary embodiments of the present disclosure. As shown in FIG. 183, the form may display a control to remove an academic term, such as, for example, a button, icon, or selectable text. The control may be displayed when a user hovers a pointer over the academic term. For example, as shown in FIG. 183, the form may display an 'X' next to an academic term when the user hovers a pointer over the academic term. If the user selects the control to remove the academic term, the form may display an additional form to confirm that the user wishes to remove the selected academic term, as shown in FIG. 184. The additional form may include controls to cancel or confirm the removal of the selected academic term. If the user confirms the removal of the selected academic term, the form for managing a process of academic planning may be displayed with the selected academic term removed, as shown in FIG. 185. If there are no current academic terms displayed the form will not display a control to remove a selected academic term.

FIGS. 186-187 depict a form for managing a process of academic planning, according to exemplary embodiments of the present disclosure. As shown in FIG. 186, the form may include a control to view or hide past academic terms. For example, the control may be a toggle or slider.

If the user selects the control to display past academic terms, the form may re-order the displayed current academic terms in order to display the past academic terms. For example, as shown in FIG. 187, the current academic terms may move down the form a zigzag pattern to display the past academic term at the top of the form.

FIG. 188 depicts a process of selecting courses for registration on a form for managing a process of academic planning, according to exemplary embodiments of the present disclosure. As shown in FIG. 188, if a user selects and drags a course from a list of available courses, the form may display all available slots in displayed current or future academic terms. For example, the form may display drop areas in each academic term in which the course may be scheduled, as shown in FIG. 188.

FIG. 189 depicts a form for managing a process of academic planning, according to exemplary embodiments of the present disclosure. As shown in FIG. 189, the form may display, with a course planned for an academic term, an indicator that additional information related to the course is available. For example, the additional information may relate to something missing or out of order for a course. The indicator may be, for example, an icon or text, etc., and may be distinguished by additional graphical attributes such as color or highlighting. For example, as shown in FIG. 189, the indicator may be a red icon including an exclamation mark to indicate an error in the registration of the course. If the user selects the indicator then additional information about the course may be displayed, as shown in FIG. 189.

The detailed description presents various embodiments of computer-implemented method and system for enabling users to engage to facilitate a service seeker obtaining services from a service provider providing services. In particular, the use of the various embodiments with various types and formats of user interface presentations will be described. It will be apparent to those of ordinary skill in the art that alternative embodiments of the implementations described herein can be employed and still fall within the scope of the claimed invention. It will be understood that the invention is not limited to the specific embodiments disclosed herein but is capable of numerous modifications by one of ordinary skill in the art. It will be further understood that the materials used and technological details may be slightly different or modified from the descriptions herein without departing from the methods and compositions disclosed and taught by the present invention. Many variations and modifications will be apparent to those of ordinary skill in the art.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" and "includes" and/or "including," when used in this specification, specify the presence of stated features, integers, steps, operations, elements, and/or components, but do not preclude the presence or addition of one more other features, integers, steps, operations, element components, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Although preferred embodiments of the invention have been described in the foregoing description, it will be understood that the invention is not limited to the specific embodiments disclosed herein but is capable of numerous modifications by one of ordinary skill in the art. The description of the present disclosure has been presented for purposes of illustration and description, but is not intended to be exhaustive or limited to the disclosure in the form disclosed. It will be understood that the materials used and technological details may be slightly different or modified from the descriptions herein without departing from the methods and compositions disclosed and taught by the present invention. Many variations and modifications will be apparent to those of ordinary skill in the art. Any corresponding structures, materials, steps, acts, and equivalents of all means or step plus function elements in the claims below are intended to include any structure, material, or act for performing the function in combination with other claimed elements as specifically claimed.

All user interfaces shown herein, or combinations thereof, may be present in various embodiments, and may be presented to one or more users. All features discussed herein may have associated security requirements before they may be used. For example, different users of the application may have different levels of privileges, allowing them to access differing features of the application. In addition, many steps of techniques discussed herein are disclosed in a particular order. In general, steps discussed may be performed in any order, unless expressly stated otherwise.

The flowchart and block diagrams, as well as the GUI images, in the figures illustrate the architecture, functionality and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). The flow diagrams depicted herein are just one example. There may be many variations to this diagram or the steps (or operations) described therein without departing from the spirit of the disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

What is claimed is:

1. A computer-implemented method for generating an educational plan for a user, comprising:

using a processing server, automatically retrieving data records from an electronic student information system, the data records including a plurality of educational courses and a plurality of course requirements at one or more institutions;

receiving, at the processing server, educational course data and educational course focus data from an electronic profile survey via a user interface, the educational course data or the educational course focus data including at least one of a user academic history, a user educational focus, or a user schedule associated with the user in the electronic profile survey;

using the processing server, automatically retrieving prior user data vectors from an electronic archive, the prior user data vectors including prior user educational course data and prior user educational course focus data, the prior user educational course data or prior user educational course focus data including academic histories, educational focuses, academic schedules, or educational success rates associated with individuals other than the user;

using the processing server, automatically determining at least one similarity between the user and at least one individual other than the user by comparing a current user data vector to the prior user data vectors;

using the processing server, automatically generating and transmitting to the user a first tailored course recommendation by comparing at least one of the plurality of course requirements with the current user data vector and comparing at least one of the plurality of educational courses with the at least one similarity between the user and the at least one individual other than the user;

receiving, at the processing server, a selected educational course via the user interface, wherein the selected educational course is based on the first tailored course recommendation; and using the processing server, automatically generating and transmitting to the user a second tailored course recommendation based on the selected educational course and the first tailored course recommendation.

2. The computer-implemented method of claim 1, wherein automatically generating and transmitting to the user the second tailored course recommendation further comprises:

determining a first candidate educational course and a second candidate educational course based upon the comparison between the at least one of the plurality of course requirements and the current user data vector or the comparison between the at least one of the plurality of educational courses and the at least one similarity between the user and the at least one individual other than the user; and including the second candidate educational course in the first tailored course recommendation based upon a determination that the second candidate educational course is closer to full capacity than the first candidate educational course.

3. The computer-implemented method of claim 1, wherein automatically generating and transmitting to the user the first tailored course recommendation further comprises:

determining a batch of two or more educational courses based upon the comparison between the at least one of the plurality of course requirements and the current user data vector, the comparison between the at least one of the plurality of educational courses and the at least one similarity between the user and the at least one individual other than the user, and a compatibility of the two or more educational courses in the batch; and including the batch of two or more educational courses in the first tailored course recommendation.

4. The computer-implemented method of claim 3, wherein determining the compatibility of the two or more educational courses in the batch comprises determining that the educational courses are either taken coincident with each other or within a predetermined time period of each other in the prior use data vectors.

5. The computer-implemented method of claim 1, wherein automatically generating and transmitting to the user the first tailored course recommendation further comprises:

including an educational course in the first tailored course recommendation based upon proximity between a location of the educational course and an address associated with the user.

6. The computer-implemented method of claim 1, wherein automatically generating the second tailored course recommendation based on the selected educational course comprises:

updating the current user data vector based on the selected educational course;

using the processing server, automatically determining at least one updated similarity between the user and at least one of the individuals other than the user by comparing the updated current user data vector to at least one of the prior user data vectors; and using the processing server, automatically generating the second tailored course recommendation by comparing at least one of the plurality of course requirements with the updated current user data vector and comparing at least one of the plurality of educational courses with the at least one updated similarity between the user and the at least one individual other than the user.

7. The computer-implemented method of claim 1, wherein the selected educational course is a first selected educational course, and further comprising:

receiving, at the processing server, a second selected educational course via the user interface, wherein the second selected educational course is based on the second tailored course recommendation, and wherein the second selected educational course has a dependency upon the first selected educational course;

receiving a move command, from the user via the user interface, to move the first selected educational course;

moving the first selected educational course, on the user interface, in a manner corresponding to the move command; and automatically moving the second selected educational course, on the user interface, based upon the dependency upon the first selected educational course.

8. A system for generating an educational plan for a user, the system including:

at least one data storage device storing instructions for generating an educational plan; and at least one processor configured to execute the instructions to perform operations comprising:

automatically retrieving data records from an electronic student information system, the data records including a plurality of educational courses and a plurality of course requirements at one or more institutions;

receiving educational course data and educational course focus data from an electronic profile survey via a user interface, the educational course data or the educational course focus data including at least one of a user academic history, a user educational focus, or a user schedule identified by the user in the electronic profile survey;

automatically retrieving prior user data vectors from an electronic archive, the prior user data vectors including prior user educational course data and prior user educational course focus data, the prior user educational course data or prior user educational course focus data including academic histories, educational focuses, academic schedules, or educational success rates associated with individuals other than the user;

automatically determining at least one similarity between the user and at least one individual other than the user by comparing a current user data vector to the prior user data vectors;

automatically generating and transmitting to the user a first tailored course recommendation by comparing at least one of the plurality of course requirements with the current user data vector and comparing at least one of the plurality of educational courses with the at least one similarity between the user and the at least one individual other than the user;

receiving a selected educational course via the user interface, wherein the selected educational course is based on the first tailored course recommendation; and automatically generating and transmitting to the user a second tailored course recommendation based on the selected educational course and the first tailored course recommendation.

9. The system of claim 8, wherein the operations further comprise:

determining a first candidate educational course and a second candidate educational course based upon the comparison between the at least one of the plurality of course requirements and the current user data vector or the comparison between the at least one of the plurality of educational courses and the at least one similarity between the user and the at least one individual other than the user; and including the second candidate educational course in the first tailored course recommendation based upon a determination that the second candidate educational course is closer to full capacity than the first candidate educational course.

10. The system of claim 8, wherein the operations further comprise:

determining a batch of two or more educational courses based upon their associated index scores and a compatibility of the two or more educational courses in the batch; and including the batch of two or more educational courses in the first tailored course recommendation.

11. The system of claim 10, wherein the operations further comprise determining that the educational courses are either taken coincident with each other or within a predetermined time period of each other in the prior use data vectors.

12. The system of claim 8, wherein the operations further comprise:

including an educational course in the first tailored course recommendation based upon proximity between a location of the educational course and an address associated with the user.

13. The system of claim 8, wherein the operations further comprise:

updating the current user data vector based on the selected educational course;

automatically determining at least one updated similarity between the user and at least one of the individuals other than the user by comparing the updated current user data vector to at least one of the prior user data vectors; and automatically generating the second tailored course recommendation by comparing at least one of the plurality of course requirements with the updated current user data vector and comparing at least one of the plurality of educational courses with the at least one updated similarity between the user and the at least one individual other than the user.

14. The system of claim 8, wherein the selected educational course is a first selected educational course, and wherein the operations further comprise:

receiving a second selected educational course via the user interface, wherein the second selected educational course is based on the second tailored course recommendation, and wherein the second selected educational course has a dependency upon the first selected educational course;

receiving a move command, from the user via the user interface, to move the first selected educational course;

moving the first selected educational course, on the user interface, in a manner corresponding to the move command; and automatically moving the second selected educational course, on the user interface, based upon the dependency upon the first selected educational course.

15. A non-transitory computer-readable medium storing instructions that, when executed by a processor, cause the processor to perform operations for generating an educational plan for a user, the operations comprising:

automatically retrieving data records from an electronic student information system, the data records including a plurality of educational courses and a plurality of course requirements at one or more institutions;

receiving educational course data and educational course focus data from an electronic profile survey via a user interface, the educational course data or the educational course focus data including at least one of a user academic history, a user educational focus, or a user schedule identified by the user in the electronic profile survey;

automatically retrieving prior user data vectors from an electronic archive, the prior user data vectors including prior user educational course data and prior user educational course focus data, the prior user educational course data or prior user educational course focus data including academic histories, educational focuses, academic schedules, or educational success rates associated with individuals other than the user;

automatically determining at least one similarity between the user and at least one individual other than the user by comparing a current user data vector to the prior user data vectors;

automatically generating and transmitting to the user a first tailored course recommendation by comparing at least one of the plurality of course requirements with the current user data vector and comparing at least one of the plurality of educational courses with the at least one similarity between the user and the at least one individual other than the user;

receiving a selected educational course via the user interface, wherein the selected educational course is based on the first tailored course recommendation; and automatically generating and transmitting to the user a second tailored course recommendation based on the selected educational course and the first tailored course recommendation.

16. The non-transitory computer-readable medium of claim 15, the operations further comprising:

determining a first candidate educational course and a second candidate educational course based upon the comparison between the at least one of the plurality of course requirements and the current user data vector or the comparison between the at least one of the plurality of educational courses and the at least one similarity between the user and the at least one individual other than the user; and including the second candidate educational course in the first tailored course recommendation based upon a determination that the second candidate educational course is closer to full capacity than the first candidate educational course.

17. The non-transitory computer-readable medium of claim 15, the operations further comprising:

determining a batch of two or more educational courses based upon their associated index scores and a compatibility of the two or more educational courses in the batch; and including the batch of two or more educational courses in the first tailored course recommendation.

18. The non-transitory computer-readable medium of claim 17, wherein the operations for determining the compatibility of the two or more educational courses in the batch further comprise determining that the educational courses are either taken coincident with each other or within a predetermined time period of each other in the prior use data vectors.

19. The non-transitory computer-readable medium of claim 15, the operations further comprising:

updating the current user data vector based on the selected educational course;

automatically determining at least one updated similarity between the user and at least one of the individuals other than the user by comparing the updated current user data vector to at least one of the prior user data vectors; and automatically generating the second tailored course recommendation by comparing at least one of the plurality of course requirements with the updated current user data vector and comparing at least one of the plurality of educational courses with the at least one updated similarity between the user and the at least one individual other than the user.

20. The non-transitory computer-readable medium of claim 15, wherein the selected educational course is a first selected educational course, and the operations further comprising:

receiving a second selected educational course via the user interface, wherein the second selected educational course is based on the second tailored course recommendation, and wherein the second selected educational course has a dependency upon the first selected educational course;

receiving a move command, from the user via the user interface, to move the first selected educational course;

moving the first selected educational course, on the user interface, in a manner corresponding to the move command; and automatically moving the second selected educational course, on the user interface, based upon the dependency upon the first selected educational course.

* * * * *